(12) United States Patent
Katoh et al.

(10) Patent No.: US 8,105,699 B2
(45) Date of Patent: Jan. 31, 2012

(54) ZN ALLOY PARTICLES FOR HIGH CORROSION RESISTANCE RUST PROTECTION PAINT, METHOD OF PRODUCTION OF PARTICLES, HIGH CORROSION RESISTANCE RUST PROTECTION PAINT CONTAINING PARTICLES, HIGH CORROSION RESISTANCE STEEL MATERIAL COATED WITH PAINT, AND STEEL STRUCTURE HAVING STEEL MATERIAL

(75) Inventors: Kenji Katoh, Tokyo (JP); Makoto Nagasawa, Tokyo (JP); Minoru Ito, Tokyo (JP); Michio Kaneko, Tokyo (JP); Shiro Imai, Yokohama (JP); Masatoshi Kominami, Kitakyushu (JP); Toshiro Terakawa, Himeji (JP); Takashi Kumai, Himeji (JP)

(73) Assignee: Nippon Steel Corporation, Tokyo (JP)

( * ) Notice: Subject to any disclaimer, the term of this patent is extended or adjusted under 35 U.S.C. 154(b) by 338 days.

(21) Appl. No.: 12/310,574

(22) PCT Filed: Sep. 7, 2007

(86) PCT No.: PCT/JP2007/067901
§ 371 (c)(1),
(2), (4) Date: Feb. 27, 2009

(87) PCT Pub. No.: WO2008/029960
PCT Pub. Date: Mar. 13, 2008

(65) Prior Publication Data
US 2010/0247956 A1    Sep. 30, 2010

(30) Foreign Application Priority Data

Sep. 8, 2006 (JP) ................... 2006-244346
Apr. 13, 2007 (JP) ................... 2007-106040
Sep. 4, 2007 (JP) ................... 2007-229254

(51) Int. Cl.
*B32B 5/16* (2006.01)
*B32B 15/16* (2006.01)
*B32B 15/18* (2006.01)
*C22C 18/00* (2006.01)

(52) U.S. Cl. ........ 428/659; 428/548; 428/658; 420/513; 75/255; 106/14.05

(58) Field of Classification Search ............... None
See application file for complete search history.

(56) References Cited

U.S. PATENT DOCUMENTS

| 3,464,906 | A | 9/1969 | Ridley et al. | |
| 5,135,812 | A * | 8/1992 | Phillips et al. | 428/403 |
| 2004/0191555 | A1* | 9/2004 | Germano | 428/553 |
| 2006/0263622 | A1* | 11/2006 | Nagasaki et al. | 428/570 |
| 2007/0209555 | A1* | 9/2007 | Yamamoto | 106/404 |
| 2010/0028658 | A1* | 2/2010 | Nagasawa et al. | 428/328 |

FOREIGN PATENT DOCUMENTS

| CN | 1456407 | 11/2003 |
| JP | 58-129070 | 8/1983 |
| JP | 59-52645 | 3/1984 |
| JP | 59-167249 | 9/1984 |
| JP | 59-198142 | 11/1984 |
| JP | 61-213270 | 9/1986 |
| JP | 01-311178 | 12/1989 |
| JP | 02-073932 | 3/1990 |
| JP | 10-280012 | 10/1998 |
| JP | 11-343422 | 12/1999 |
| JP | 2000-080309 | 3/2000 |
| JP | 2001-164194 | 6/2001 |
| JP | 2002-285102 | 10/2002 |
| JP | 2004-315871 | 11/2004 |
| JP | 2005-314501 | 11/2005 |
| JP | 2005-336431 | 12/2005 |
| JP | 2005-336432 | 12/2005 |

OTHER PUBLICATIONS

International Search Report dated Nov. 13, 2007 issued in corresponding PCT Application No. PCT/JP2007/067901.
Supplemental European Search Report dated Apr. 15, 2011 issued in corresponding EP Application No. EP 07 80 7308.

* cited by examiner

*Primary Examiner* — Jennifer McNeil
*Assistant Examiner* — Jason Savage
(74) *Attorney, Agent, or Firm* — Kenyon & Kenyon LLP

(57) ABSTRACT

Zn alloy particles for high corrosion resistance rust prevention paint containing, by mass %, Mg: 0.01 to 30% and having a balance of Zn and unavoidable impurities, having physical fracture facets and/or cracks of a length of 0.01 μm or more or cracks of a depth of 0.01 μm or more, having an average particle size of 0.05 to 200 μm, and having an aspect ratio of maximum size and minimum size (maximum size/minimum size) of an average value of 1 to 1.5. Also, a high corrosion resistance rust prevention paint containing these Zn alloy particles and a high corrosion resistance steel material and steel structure coated with that paint.

14 Claims, No Drawings

ZN ALLOY PARTICLES FOR HIGH CORROSION RESISTANCE RUST PROTECTION PAINT, METHOD OF PRODUCTION OF PARTICLES, HIGH CORROSION RESISTANCE RUST PROTECTION PAINT CONTAINING PARTICLES, HIGH CORROSION RESISTANCE STEEL MATERIAL COATED WITH PAINT, AND STEEL STRUCTURE HAVING STEEL MATERIAL

TECHNICAL FIELD

The present invention relates to Zn alloy particles for high corrosion resistance rust protection paint having physical fracture facets and/or cracks and imparting remarkably superior high corrosion resistance and rust protection, a method of production of said Zn alloy particles, a high corrosion resistance rust protection paint containing said Zn alloy particles, a high corrosion resistance steel material coated with said paint, and a steel structure having said steel material.

BACKGROUND ART

As a countermeasure to corrosion of ferrous metal materials, much use has been made of zinc-rich paints made using a zinc powder containing unavoidable impurities as a pigment and organic materials and/or inorganic materials as a vehicle (liquid binder ingredient).

Zinc-rich paints are mainly used as primers for heavy duty corrosion protection paint. The corrosion protection mechanism features the sacrificial corrosion protection of the zinc powder contained in a coat.

Further, the corrosion protection of a coat of a zinc-rich paint is strongly dependent on the extent of the sacrificial corrosion protection of the zinc powder, so depending on the usage environment, the rate of consumption of the zinc sometimes becomes larger and the corrosion protection on the ferrous metal material will not last long.

Therefore, in the past, the practice has been to increase the content of the zinc powder in the coat or increase the coat thickness, but as a result a drop in the adhesion with the surface of the steel material, cracking or sagging of the coat, etc. easily occur.

In the end, it is difficult to realize both the corrosion protection performance of the coat and the physical properties or coating ability. Measures increasing the content of the zinc powder in the coat are not perfect.

In view of this situation, development of a high performance zinc-rich paint able to maintain the advantages of conventional zinc-rich paints and furthermore exhibit a sacrificial corrosion protection over a long period of time has been hoped for. Up until now, various proposals have been made.

For example, Japanese Patent Publication (A) No. 59-52645 and Japanese Patent Publication (A) No. 59-167249 propose an organic-based zinc-rich paint containing not only a zinc powder, but also a Zn—Mg alloy powder, while Japanese Patent Publication (A) No. 59-198142 proposes an organic-based zinc-rich paint containing not only a zinc powder, but also a Zn—Mg alloy powder and Mn powder.

Furthermore, Japanese Patent Publication (A) No. 1-311178 discloses the long lasting corrosion protection performance of a Zn-(5 to 15%)Mg alloy powder in an organic paint, while Japanese Patent Publication (A) No. 2-73932 discloses the long lasting corrosion protection performance of an organic coat containing an Zn—Mg alloy powder with a metal structure comprised of Zn and $MgZn_2$.

Further, Japanese Patent Publication (A) No. 11-343422 proposes a rust protection pigment for an organic-based corrosion resistant paint containing flake-shaped particles of Zn alloy containing Al, Mg, etc.

In addition to the above, Japanese Patent Publication (A) No. 2001-164194 proposes an organic-based zinc-rich paint obtained by crushing an ingot of Zn—Al—Mg-based alloy powder where over 50% of the alloy powder is an Al/Zn/$Zn_2$Mg eutectic structure, while Japanese Patent Publication (A) No. 2005-314501 proposes an organic-based paint for improving the corrosion resistance of cut parts of a high corrosion resistance galvannealed steel material containing a powder of a Zn—Al alloy containing Mg or Si, having a spherical or oval shape, and having a value of the ratio of maximum size and minimum size (maximum size/minimum size) of 1 to 1.5.

The above proposals try to improve the corrosion protection performance of an organic-based paint and the corrosion resistance by the combination of a new alloy powder.

However, a general organic-based paint has the secondary problems of deteriorating in a composite environment of UV rays, moisture, oxygen, etc. and requiring maintenance in relatively short cycles.

In such a situation, several proposals have been made up to now for the purpose of improving the corrosion protection performance of inorganic-based paints not having such defects of organic-based paints.

For example, while different in object from the present invention, Japanese Patent Publication (A) No. 61-213270 proposes a paint composition containing a mixture of a zinc powder and Mg or Mg alloy for the purpose of inhibiting paint deterioration at the time of welding and cutting.

On the other hand, Japanese Patent Publication (A) No. 2000-80309 proposes a corrosion resistant paint having three types of phases, a Zn phase, Zn—Mg alloy phase, and Zn and Mg solid solution phase, as main ingredients and having these mixed in inorganic-based paint as powder particles and a corrosion resistant ferrous metal material coated with this paint.

The proposal of Japanese Patent Publication (A) No. 2000-80309 is noteworthy as being a fundamental means for improving corrosion resistance, but according to studies of the inventors, there are actually both cases where the corrosion resistance is improved and cases where the improvement in the corrosion resistance is not clear. There are questions as to the stability of the effect of improvement of the corrosion resistance.

Further, Japanese Patent Publication (A) No. 2002-285102 and Japanese Patent Publication (A) No. 2005-336431 propose an inorganic-based corrosion resistant paint containing flake-shaped particles of a Zn alloy containing Mg etc. and a corrosion resistant ferrous metal material coated with that paint.

However, including the proposal of Japanese Patent Publication (A) No. 11-343422, in the above proposals, the particles have flake shapes, so the new problem is caused that spray coating is difficult.

DISCLOSURE OF THE INVENTION

The present invention has as its object the provision of Zn alloy particles for high corrosion resistance rust protection paint having coatability and economy able to impart unprecedented, long lasting superior corrosion resistance and rust prevention to a ferrous metal material etc., a method of production of said Zn alloy particles, a high corrosion resistance rust prevention paint containing said Zn alloy particles, and a high corrosion resistance ferrous metal material and steel structure coated with that paint and as a result greatly extended in maintenance cycles.

The inventors engages in various studies and as a result newly discovered that non-flake-shaped particles comprised of Mg in 0.01 mass % to 30 mass % and a balance of Zn containing unavoidable impurities and having physical fracture facets and/or cracks exhibit remarkably superior corrosion resistance, rust protection, and coatability. This discovery is a discovery forming the basis of the present invention.

Furthermore, the inventors studied in detail the possibility of further improvement of the corrosion resistance and rust protection of said particles having physical fracture facets and/or cracks and as a result discovered that if the Zn alloy particles having physical fracture facets and/or cracks contain, by mass %, one or both of Al: 0.01 to 30% and Si: 0.01 to 3%, a more superior rust protection is exhibited and, further, that by arranging one or more of $MgZn_2$, $Mg_2Zn_{11}$, $Mg_2Zn_3$, $MgZn$, and $Mg_7Zn_3$ at the fracture facets and/or cracks, a more superior corrosion resistance is exhibited.

The inventors also simultaneously studied the shapes of particles after fracture and as a result discovered that when the number of facets of an aspherical polyhedron after fracture is two facets or more, the self dissolution can be further reduced without impairing the rust protection performance, that is, the sacrificial corrosion protection effect.

Further, the inventors studied the size of cracks and as a result discovered that if the length is 0.01 μm or more or the depth is 0.01 μm or more, the corrosion protection is remarkably improved.

The mechanism of improvement of the corrosion resistance when the particles have surface cracks is not clear.

The fact that if there are cracks in the particle surfaces, the surface areas of the Zn alloy particles become larger and an Mg solid solution phase and intermetallic compounds easily form at the crack surfaces and, further, that the activity of the Zn alloy particles themselves is improved are believed to be part of the reasons for the improvement of the corrosion resistance, but effects beyond what is expected to be caused by these are exhibited. In the final analysis, the details are unclear.

Further, the inventors studied means for obtaining particles having fracture facets and/or cracks.

As a result, the inventors discovered that rather than obtaining fractured pieces by a ball mill, beads mill, or other means used as general fracture methods in the past, making the primary particles impact each other or making particles impact with a solid so as to obtain particles having physical fracture facets and/or cracks with more superior corrosion resistance and rust prevention and, furthermore, making the primary particles disperse in a solvent to obtain a slurry and make them impact and fracture, particles having physical fracture facets and/or cracks can be obtained with a good work efficiency without impairing the superior corrosion resistance and rust protection.

The Zn alloy particles having fracture facets and/or cracks give a superior corrosion resistance and rust protection even if used as is as a pigment for a paint, but the inventors engaged in further studies and as a result discovered that if using these mixed together with the Zn particle pigment generally used as a pigment in the past, a remarkably superior corrosion resistance and rust protection are given compared with a pigment using Zn particles alone.

Furthermore, the inventors discovered that when using Zn alloy particles having fracture facets and/or cracks to make a paint, if mixing the particles of the present invention as a pigment in an organic paint, an unprecedented superior corrosion resistance and rust protection are imparted even under a harsh composite environment of UV rays, moisture, oxygen, etc.

The present invention is based on the above discovery and has as its gist the following:

(1) Zn alloy particles for high corrosion resistance rust prevention paint containing, by mass %, Mg: 0.01 to 30% and having a balance of Zn and unavoidable impurities, having physical fracture facets and/or cracks of a length of 0.01 μm or more or cracks of a depth of 0.01 μm or more, having an average particle size of 0.05 to 200 μm, and having an aspect ratio of maximum size and minimum size (maximum size/minimum size) of an average value of 1 to 1.5.

(2) Zn alloy particles for high corrosion resistance rust prevention paint as set forth in (1), characterized in that said Zn alloy particles further contain, by mass %, one or both of Al: 0.01 to 30% and Si: 0.01 to 3%

(3) Zn alloy particles for high corrosion resistance rust prevention paint as set forth in (1) or (2), characterized by having an Mg solid solution phase and Zn—Mg intermetallic compounds on the surface of said Zn alloy particles.

(4) Zn alloy particles for high corrosion resistance rust prevention paint as set forth in (3), characterized in that said Zn—Mg intermetallic compounds include at least one type of compound of $MgZn_2$, $Mg_2Zn_{11}$, $Mg_2Zn_3$, $MgZn$, and $Mg_7Zn_3$.

(5) Zn alloy particles for high corrosion resistance rust prevention paint as set forth in any one of (1) to (4), characterized in that said Zn alloy particles are shaped as aspherical polyhedrons with two or more facets.

(6) A method of production of Zn alloy particles for high corrosion resistance rust prevention paint as set forth in any one of (1) to (5), said method of production of Zn alloy particles for high corrosion resistance rust prevention paint characterized by making primary particles comprised of the composition of ingredients as described in (1) or (2) and having an average particle size of 0.05 to 1000 μm impact each other or making said primary particles impact a solid to fracture said primary particles to produce Zn alloy particles having physical fracture facets and/or cracks.

(7) A method of production of Zn alloy particles for high corrosion resistance rust prevention paint as set forth in (6) characterized by making said primary particles disperse in an organic solvent to make a slurry, then making the slurry impact itself or making said slurry impact a solid to fracture the primary particles.

(8) A high corrosion resistance rust prevention paint characterized by containing Zn alloy particles for high corrosion resistance rust prevention paint as set forth in any of (1) to (5) in 30 mass % or more converted to dry coat.

(9) A high corrosion resistance rust prevention paint as set forth in (8) characterized by comprising a high corrosion resistance rust prevention paint containing, in addition to said Zn alloy particles, Zn metal particles having an average particle size of 0.05 to 50 μm comprised of Zn and unavoidable impurities and by having an x of 300.0 or less when defining, by mass %, (mass % of said Zn alloy particles):(mass % of said Zn metal particles) as 1/x.

(10) A high corrosion resistance rust prevention paint as set forth in (8) or (9) characterized by having, by mass %, a content of Mg of 0.01 to less than 30% when the total of said Zn alloy particles and said Zn metal particles is defined as 100%.

(11) A high corrosion resistance rust prevention paint as set forth in any one of (8) to (10) characterized in that a binder of said high corrosion resistance rust prevention paint is an inorganic binder or organic binder.

(12) A ferrous metal material coated with a high corrosion resistance rust prevention paint as set forth in any one of (8) to (10) on its surface, said high corrosion resistance ferrous metal material characterized in that a coating thickness is 2 to 700 μm and in that Zn alloy particles, or Zn alloy particles and Zn metal particles, are dispersed in the coat.

(13) A steel structure characterized by being provided with a high corrosion resistance ferrous metal material as set forth in (12) as part or all of the same.

If coating a high corrosion resistance rust prevention paint containing Zn alloy particles having physical fracture facets and/or cracks of the present invention, it is possible to give ferrous metal material etc. unprecedented long-lasting superior corrosion resistance and rust prevention without impairing the coatability and economy. Further, as a result, it is possible to provide a high corrosion resistance ferrous metal material and steel structure able to greatly extend the maintenance cycles.

BEST MODE FOR CARRYING OUT THE INVENTION

The high corrosion resistance Zn alloy particles of the present invention contain Mg: 0.01 to 30% and have a balance of Zn and unavoidable impurities, have physical fracture facets and/or cracks, have an average particle size of 0.05 to 200 μm, and have an aspect ratio of the maximum size and minimum size (maximum size/minimum size) of 1 to 1.5.

In the Zn alloy particles of the present invention, Mg has to be 0.01 to 30%.

When having physical fracture facets and having an average particle size of 0.05 to 200 μm, even if Mg is less than 0.01%, a significant improvement is recognized in the corrosion resistance and corrosion protection compared with Zn alloy particles not having physical fracture facets and containing the same amount of Mg, but the remarkable effect of improvement of the corrosion resistance and corrosion protection expected due to the combination with the physical fracture facets and/or cracks is not obtained.

That is, the remarkable effect of improvement of the corrosion resistance and rust prevention due to the Zn alloy particles having physical fracture facets and/or cracks and containing Mg in 0.01% or more, that is, the remarkable effect of improvement of the corrosion resistance and rust prevention due to the synergistic effect of the physical fracture facets and/or cracks and the 0.01% or more Mg, is the basic technical idea of the present invention.

If Mg is contained over 30%, not only is the effect of improvement saturated, but also the economy and production efficiency are impaired, so the Mg was made 0.01% to 30%.

Here, the optimum value of the amount of Mg changes depending on the average particle size. In general, in the case of an average particle size of 0.2 to 30 μm considered optimum in spray coating, making the lower limit 0.1% and the upper limit 20% is preferable from the viewpoint of the effect of improvement of the corrosion resistance and corrosion protection and economy.

Furthermore, if considering the production stability, economy, and corrosion resistance, the amount of Mg is preferably 0.2 to 15%.

The "physical fracture facets" referred to in the present invention mean facets of shapes formed by parts of the spherical particles being removed. By the Zn alloy particles having physical fracture facets, as explained later, the effect of improvement of the corrosion resistance and corrosion protection is remarkably obtained.

Further, the "cracks" referred to in the present invention means cracks present on the spherical particle surface having a length of 0.01 μm or more or a depth from the surface of 0.01 μm or more. When the cracks have a length or depth of less than 0.01 μm, a sufficient corrosion resistance improvement effect is not obtained. A length or depth of 0.01 μm or more is required.

The average particle size of the Zn alloy particles is made 0.05 μm or more to secure the adhesiveness required at the time of spray coating and is made 200 μm or less to secure the work stability at the time of brush coating. If considering the coating stability, 0.2 to 50 μm is preferable. Further, if considering the coat adhesion, 0.2 to 30 μm is preferable.

The aspect ratio (maximum size/minimum size) of the particles was made an average value of 1 to 1.5 to secure coatability.

When predicated on spray coating, if the aspect ratio of the particles is over 2, the particle spraying and flight stability falls and the coat thickness and particle distribution stability in the coat falls.

If there are physical fracture facets and/or cracks on the particles, their stability falls somewhat, so considering this, the aspect ratio of the particles was made an average value of 1 to 1.5.

Therefore, even if particles with an aspect ratio exceeding 1.5 are partially present, they do not pose a problem.

Furthermore, the above range of the aspect ratio defines the Zn alloy particles in the material state and does not define the shape of Zn alloy particles in the case of absorbing the moisture etc. in the air and coagulating and coalescing before actually being used mixed in the paint or Zn alloy particles in the case of coalescence of particles cured on the steel material as a coat.

Further, at the time of production or storage, small relief shapes form at the Zn alloy powder surface, but the changes in shape due to these are not out of the range of spherical or oval shapes with an average value of the aspect ratio of 1 to 1.5.

Furthermore, the particles of the above constitution of the present invention may contain one or both of Al: 0.01 to 30% and Si: 0.01 to 3%.

If adding Al to the particles having physical fracture facets and/or cracks in an amount of 0.01% or more, the rust protection is further improved.

If making the amount of Al 0.01% or more, in addition to the rust protection, the corrosion resistance against self corrosion of the particles is remarkably improved, but even if added over 30%, not only does the effect become saturated, but also it becomes difficult to form physical fracture facets and/or cracks in the metal particles, so the amount of Al was made 0.01 to 30%.

Furthermore, from the viewpoint of production stability and corrosion resistance, the amount of Al is preferably 0.5 to 20%. Furthermore, if considering economy, 1.0 to 10% is preferable.

Si similarly improves the rust prevention if added in an amount of 0.01% or more to the particles having physical fracture facets and/or cracks. However, if adding Si over 3%, the rust prevention conversely deteriorates, so the amount of Si was made 0.01 to 3%.

From the viewpoint of production stability and corrosion resistance, the amount of Si is preferably 0.5 to 3%. Furthermore, if considering economy, 1.0 to 1.5% is preferable.

In the Zn alloy particles having physical fracture facets and/or cracks of the present invention, by giving the surfaces of the particles including the fractured parts and/or cracks an Mg solid solution phase and Zn—Mg intermetallic compounds, the corrosion resistance and the rust prevention are further improved.

The reason why the exposure of the Mg solid solution phase and Zn—Mg intermetallic compounds at the particle surfaces causes an improvement in the corrosion resistance and rust prevention is not clear, but the inventors confirm experimentally that if one or both of these phases coexist at the fracture facets and/or cracks, the chemical properties of these phases change to ones more preferable for improvement of the corrosion resistance and rust prevention and the corrosion resistance and rust prevention are stably improved.

The Mg solid solution phase and Zn—Mg intermetallic compounds can be identified by analyzing the ratio of composition of Mg and Zn of the surfaces of the physical fracture facets or cracks by observation by the X-ray diffraction method or a scanning electron microscopy equipped with an energy dispersion type X-ray analyzer.

In the present invention, by including, as said intermetallic compound phase, at least one type of compound of $MgZn_2$, $Mg_2Zn_{11}$, $Mg_2Zn_3$, $MgZn$, and $Mg_7Zn_3$, the corrosion resistance and the rust prevention are improved more.

$MgZn_2$, $Mg_2Zn_{11}$, $Mg_2Zn_3$, $MgZn$, and $Mg_7Zn_3$ can be identified by analyzing the ratio of composition of Mg and Zn of the surfaces of the physical fracture facets or cracks by observation by the X-ray diffraction method or a scanning electron microscopy equipped with an energy dispersion type X-ray analyzer.

In the above way, the Zn alloy particles having physical fracture facets and/or cracks of the present invention can improve the corrosion resistance and rust prevention to an unprecedented extent by imparting at least one physical fracture facet and/or cracks and simultaneously controlling the chemical composition of the metal particles.

Further, the Zn alloy particles having physical fracture facets and/or cracks of the present invention can simultaneously give a more superior corrosion resistance, rust prevention, and coatability by making the shape of the particles having fracture facets a polyhedron close to a nonflat shape (cracks not included at the surface) having two or more facets.

From the viewpoint of the improvement of the corrosion resistance and rust prevention, the greater the number of physical fracture facets, the better, but with just one or no fracture facet, while the reason is not clear at the present point of time, the effect of improvement of the effect greatly varies.

Further, when the average aspect ratio is more than 2 and the shape is extremely flat, the work efficiency at the time of coating falls, so this is not preferred.

Therefore, the shapes of the particles are defined as being polyhedrons close to non-flat spheres (average value of aspect ratio of 1 to 1.5) having two or more facets.

This range of shapes defines the Zn alloy particles in the material state and does not define the shape of Zn alloy particles in the case of Zn alloy particles absorbing the moisture etc. in the air and coagulating and coalescing before actually being used mixed in paints or in the case of curing and coalescing on the steel material as a coat.

At the time of production or storage, small relief shapes form at the Zn alloy powder surface, but the changes in shape due to these are not out of the range of spherical or oval shapes with an average value of the aspect ratio of 1 to 1.5.

Next, the method of production of the Zn alloy particles of the present invention will be explained.

When producing the Zn alloy particles having physical fracture facets and/or cracks of the present invention, first primary particles comprised of the chemical composition defined in (1) or (2) are produced, then the primary particles are made to impact each other or impact a solid to fracture the primary particles and form physical fracture facets and/or cracks on the primary particles of the Zn alloy particles.

That is, even among the fracture facets and/or cracks, a rolling force and shearing force greatly act. It is extremely difficult to satisfy the value of the aspect ratio of the present invention and obtain Zn alloy particles having physical fracture facets and/or cracks.

When producing the Zn alloy particles having physical fracture facets and/or cracks of the present invention, first primary particles comprised of the chemical composition defined in claim 1 or 2 are produced, then the primary particles are made to impact each other or impact a solid to fracture the primary particles and form physical fracture facets and/or cracks on the primary particles of the Zn alloy particles.

When using impact to obtain physical fracture facets and/or cracks, a large individual mass enables the kinetic energy contributing to physical surface fractures and/or cracks at the time of impact to be secured, but experimentally, if the average particle size of the primary particles is over 1000 μm, the work time for obtaining the maximum average particle size of 200 μm aimed at by the present invention remarkably increases.

On the other hand, Zn alloy particles having physical fracture facets and/or cracks and having a minimum average particle size of 0.05 μm can be obtained by using primary particles having an average particle size of 0.05 μm or more and increasing the number of times of impact.

Due to the above reasons, in the present invention, the average particle size of the primary particles is made 0.05 to 1000 μm.

The average particle size of the primary particles, to improve the corrosion resistance and rust protection, is preferably 0.05 to 100 μm. Furthermore, to reliably improve the corrosion resistance and rust protection, it is preferably 0.05 to 30 μm.

Here, the "primary particles" mean Zn alloy particles before said impact or fractures. When obtaining the primary particles, the mist method, atomization method, ingot method, or any other method can be used.

Further, as the solid used for impacting said primary particles, in addition to a solid having a flat surface and/or curved surface, it is possible to use solid particles formed with a curved surface or solid particles formed with only flat surfaces.

Here, the material of the solid and solid particles has to be higher in hardness compared with the primary particles. Further, it preferably does not have reactivity when in contact under a water environment. As solids satisfying this requirement, a metal, sintered body, etc. may be mentioned.

In the production of Zn alloy particles by making primary particles impact each other or a solid and forming physical fracture facets and/or cracks on Zn alloy particles, it is possible to use a solvent as the medium for conveying the primary particles and more efficiently produce the Zn alloy particles having physical fracture facets and/or cracks targeted with a good efficiency.

The solvent is not limited in type so long as having a larger specific gravity compared with various gases including air. However, primary particles and Zn alloy particles given fracture facets and/or cracks are high in reaction activity, so the solvent has to be one with a low reaction activity with a metal having the chemical composition of the present invention.

When the solvent is particularly high in reaction activity and contains water as an impurity, the water has to be limited to 0.3 wt % or less.

In the present invention, the solvent is not limited, but toluene, xylene, or another organic solvent is suitable.

When utilizing the Zn alloy particles having fracture facets and/or cracks of the present invention, it is necessary to include 30% or more in the coat. If less than 30 mass %, the effect of the corrosion resistance etc. is not obtained.

The upper limit of the content is not particularly limited, but if over 85%, the resin ingredient becomes smaller and defects easily occur in the coat, so the upper limit is preferably 85% or less.

Note that the resin ingredient in the coat is preferably at least 15% so as to secure coating formability.

Furthermore, if the content of said Zn alloy particles is 30% or more, it is also possible to add other powder particles. For example, for the purpose of aesthetic design, it is also possible to add Al, stainless steel, or another metal powder, titanium oxide, zinc oxide, or another oxide powder, talc, stone powder, or another body pigment.

Furthermore, when utilizing Zn alloy particles having fracture facets and/or cracks of the present invention, it is possible to mix Zn metal particles having an average particle size of 0.05 to 50 μm into the Zn alloy particles in a range of x: 300.0 or less when the ratio, by mass %, of the amount of Zn alloy particles and the amount of Zn metal particles is 1/x.

The Zn metal particles referred to here mean particles comprised of Zn and unavoidable impurities.

Further, by mixing said Zn metal particles and Zn alloy particles having fracture facets and/or cracks for use for a paint pigment, it is possible to obtain remarkably superior corrosion resistance and rust prevention compared with a pigment using Zn metal particles alone like in the past.

However, when the ratio of mass % of the amount of Zn alloy particles and amount of Zn metal particles is 1/x, if x is over 300.0, the effect of the Zn alloy particles on the improvement of the corrosion resistance and rust protection is not sufficiently exhibited. Therefore, x was made 300.0 or less. If considering corrosion resistance and economy, x is preferably 1 to 120. Furthermore, if considering the mixing stability, x is preferably 1 to 30.

In the present invention, the average particle size of the Zn metal particles used for the mixing is made 0.05 to 50 μm. The effect of improvement of the corrosion resistance in the present invention is recognized in a range of average particle size of the Zn metal particles mixed of 0.05 to 300 μm, but considering industrial stability and the inexpensively available average particle sizes, the average particle size of the Zn metal particles was made 0.05 to 50 μm.

On the other hand, the effect of mixing the Zn alloy particles having physical fracture facets and/or cracks of the present invention and Zn metal particles can be analyzed by the content of Mg contained in the total rust prevention pigment.

When the total, by mass %, of the mixed particles of the Zn alloy particles having physical fracture facets and/or cracks of the present invention and Zn metal particles is 100%, the content of Mg used may be made 0.01 to less than 30%.

The content of Mg may be suitably applied in accordance with the object, but 0.1 to 20%, where the effect of mixing Zn alloy particles having fracture facets and/or cracks and Zn metal particles becomes the most remarkable, is preferable from the viewpoint of the stability of the effect of improvement of the corrosion resistance. Further, if considering economy, 0.5 to 15% is more preferable.

Note that in the present invention, the type of the resin ingredient of the paint, that is, the base resin, is not particularly limited. Either an inorganic-based or organic-based binder may be utilized.

The present invention is not particularly limited, but when inorganically based, alkali silicate, alkyl silicate, etc. may be suitably used, while when organically based, an epoxy-based resin, modified epoxy resin, acryl-based resin, urethane-based resin, polyester resin, etc. may be suitably used.

Further, regarding the type of formulation of the curing agent as well, the single-liquid curing type, the two-liquid curing type, or other types using the effects of several liquids may be suitably used in accordance with the object.

Regarding the curing method as well, ordinary temperature curing, heated curing, UV curing, electron beam curing, water curing, etc. may be suitably used in accordance with the object.

The steel material and steel structure coated with the high corrosion resistance rust prevention paint of the present invention are not particularly limited, but to coat the paint of the present invention on the surface of a steel material or steel structure to obtain corrosion resistance or corrosion protection, the coat thickness has to be 2 μm or more.

Further, the ferrous metal materials and steel structures covered by the present invention are materials and structures coated with the high corrosion resistance rust prevention paint of the present invention to a thickness of 2 μm to 700 μm and are not limited by chemical composition of the steel material, shape, or structure. Further, they include ones with surfaces on which other corrosion protection means are jointly used.

Note that if considering economy and painting work efficiency, the thickness of the high corrosion resistance rust prevention paint of the present invention is preferably 2 to 300 μm.

While not limiting the present invention to this, as the painted objects, cast iron, carbon steel, specialty steel, stainless steel, corrosion resistant steel, welded joints, etc. may be mentioned. As shapes, thick-gauge steel plate, thin-gauge steel plate, steel pipe, steel rods, etc. and shapes obtained by working these may be mentioned.

Further, as structures, structures used under (1) car, ship, and other internal engine exhaust systems, boiler exhaust systems, low temperature heat exchangers, incinerator beds, and other high temperature moist corrosive environments, (2) bridges, support columns, interior and exterior building materials, roofing materials, doors and windows, kitchen members, various types of hand rails, guard rails, various types of hooks, roof drains, railroad cars, and other atmospheric corrosive environments, (3) various types of water storage tanks, support columns, piles, sheet piles, and other soil corrosive environments, (4) can containers, various types of containers, low temperature heat exchangers, bathroom members, automobile structural members, and other condensation corrosive environments (including composite refrigerated, moist, and dry corrosive environments), (5) water storage tanks, cold water pipes, hot water pipes, can containers, various types of containers, eating utensils, cooking utensils, bathtubs, pools, sinks, and other tap water corrosive environments, (6) various types of containers, eating utensils, cooking utensils, and other drinking water corrosive environments, (7) various types of steel reinforced structures, support columns, and other concrete corrosive environments, (8) ships, bridges, piles, sheet piles, marine structures, and other seawater corrosive environments, etc. may be mentioned.

Note that in the present invention, as other corrosion protection means able to be jointly used with, there are plating, painting, galvanic corrosion prevention, etc.

EXAMPLES

Example 1

Below, examples will be used to explain the present invention.

Under the conditions shown in Tables 1 to 14, painting test pieces were prepared. Primary particles of Zn alloy particles were prepared using the gas atomization method.

Furthermore, Zn alloy particles were made to impact each other or Zn alloy particles were made to impact a solid to prepare secondary particles or Zn alloy particles were added to toluene or xylene with a moisture content of 0.3% or less to make a slurry and the method of making the particles impact each other or impact a solid was used to prepare secondary particles so as to produce Zn alloy particles having physical fracture facets and/or cracks.

Zn alloy particles without physical fracture facets and/or cracks were produced by a beads mill or ball mill. The average particle size was measured by the laser diffraction scattering method. Therefore, the particle size was evaluated as the sphere equivalent diameter.

Further, the average value of the aspect ratio was measured by observation of 50 to 100 randomly extracted particles by a scan type electron microscope.

Paints were prepared by the general method. For the base resin, that is, the binder, a commercially available alkali silicate or alkyl silicate resin inorganic binder or four types of commercially available organic binders were used.

The prepared paints were applied to steel plates by brushing or spraying. As an evaluation test, a salt water spray test shown in JIS K5600 (5% NaCl sprayed at 35 degrees Celsius) was performed.

As painting test pieces, 150×70×3.2 mm test pieces were used. At the bottom of the test pieces, cross-cuts were made by a cutter.

The corrosion resistance was evaluated by the time for formation of red rust from the test piece surface. Formation at 900 hours or less was evaluated as "poor", formation at 900 to 2000 hours as "good", and formation at 2000 hours or more as "very good".

From Tables 1 to 14, it is learned that the painting test pieces using the Zn alloy particles of the present invention exhibit superior corrosion resistance both with inorganic-based binders and organic-based binders.

TABLE 1

| | Zn-Alloy Particle Properties | | | | Coat Properties | | | | |
| --- | --- | --- | --- | --- | --- | --- | --- | --- | --- |
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Inv. Example 1 | 12.3 | F | 0.02 | 1.05 | 30 | alkali silicate | 2 | Brushing | good |
| Inv. Example 2 | 0.8 | F | 27.89 | 1.12 | 34 | alkyl silicate | 70 | Brushing | very good |
| Inv. Example 3 | 1 | F | 0.32 | 1.23 | 42 | alkali silicate | 2 | Spraying | good |
| Inv. Example 4 | 2.3 | F | 11.44 | 1.36 | 51 | alkyl silicate | 20 | Spraying | very good |
| Inv. Example 5 | 15.6 | F | 1.05 | 1.11 | 33 | alkali silicate | 3 | Brushing | good |
| Inv. Example 6 | 6.7 | F | 36.47 | 1.07 | 64 | alkyl silicate | 80 | Brushing | very good |
| Inv. Example 7 | 7.5 | F | 5.07 | 1.42 | 74 | alkali silicate | 24 | Brushing | very good |
| Inv. Example 8 | 8.4 | F | 7.72 | 1.38 | 82 | alkyl silicate | 25 | Spraying | very good |
| Inv. Example 9 | 9.3 | F | 8.32 | 1.22 | 37 | alkali silicate | 14 | Spraying | very good |
| Inv. Example 10 | 10.4 | F | 10.05 | 1.14 | 42 | alkyl silicate | 17 | Spraying | very good |
| Inv. Example 11 | 11.2 | F | 6.08 | 1.13 | 66 | alkali silicate | 15 | Spraying | very good |
| Inv. Example 12 | 11.7 | F | 17.89 | 1.02 | 48 | alkyl silicate | 40 | Brushing | very good |
| Inv. Example 13 | 21.5 | F | 19.54 | 1.06 | 33 | alkali silicate | 30 | Brushing | very good |
| Inv. Example 14 | 13.4 | F | 21.08 | 1.05 | 75 | alkyl silicate | 35 | Brushing | very good |
| Inv. Example 15 | 14.6 | F | 23.04 | 1.24 | 77 | alkali silicate | 42 | Brushing | very good |
| Inv. Example 16 | 25.8 | F | 9.21 | 1.33 | 68 | alkyl silicate | 17 | Spraying | very good |
| Inv. Example 17 | 16.7 | F | 0.12 | 1.27 | 61 | alkali silicate | 2 | Spraying | good |
| Inv. Example 18 | 17.3 | F | 29.24 | 1.37 | 59 | alkyl silicate | 57 | Brushing | very good |
| Inv. Example 19 | 18.5 | F | 128.74 | 1.10 | 39 | alkali silicate | 150 | Brushing | very good |
| Inv. Example 20 | 19.3 | F | 33.57 | 1.04 | 42 | alkali silicate | 67 | Brushing | very good |
| Inv. Example 21 | 3.5 | F | 3.04 | 1.02 | 48 | alkali silicate | 15 | Spraying | very good |
| Inv. Example 22 | 22.5 | F | 7.54 | 1.01 | 44 | alkyl silicate | 20 | Spraying | very good |
| Inv. Example 23 | 23.7 | F | 6.81 | 1.08 | 47 | alkali silicate | 15 | Spraying | very good |
| Inv. Example 24 | 24.2 | F | 5.25 | 1.14 | 52 | alkyl silicate | 13 | Spraying | very good |
| Inv. Example 25 | 0.2 | F | 194.23 | 1.23 | 55 | alkali silicate | 200 | Brushing | very good |

(*1) F: Fracture facets existing, FC: Fracture facets and/or cracks existing, NO: No fracture facet and/or crack

TABLE 2

| | Zn-Alloy Particle Properties | | | | Coat Properties | | | | |
| --- | --- | --- | --- | --- | --- | --- | --- | --- | --- |
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Inv. Example 26 | 27.1 | F | 28.74 | 1.33 | 69 | alkyl silicate | 37 | Brushing | very good |
| Inv. Example 27 | 29.3 | F | 13.57 | 1.37 | 78 | alkali silicate | 27 | Brushing | very good |
| Inv. Example 28 | 0.5 | F | 0.65 | 1.44 | 42 | alkyl silicate | 2 | Brushing | good |
| Inv. Example 29 | 2.7 | F | 4.12 | 1.21 | 32 | alkali silicate | 15 | Spraying | very good |
| Inv. Example 30 | 28.4 | F | 0.72 | 1.22 | 66 | alkyl silicate | 2 | Spraying | good |
| Inv. Example 31 | 8.7 | F | 117.54 | 1.23 | 67 | alkali silicate | 130 | Brushing | very good |

TABLE 2-continued

| | Zn-Alloy Particle Properties | | | | Coat Properties | | | | |
|---|---|---|---|---|---|---|---|---|---|
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Inv. Example 32 | 9.2 | F | 7.81 | 1.47 | 45 | alkyl silicate | 15 | Brushing | very good |
| Inv. Example 33 | 17.8 | F | 80.25 | 1.01 | 48 | alkali silicate | 100 | Brushing | very good |
| Inv. Example 34 | 20.2 | F | 8.47 | 1.04 | 68 | alkyl silicate | 17 | Spraying | very good |
| Inv. Example 35 | 0.4 | F | 0.87 | 1.05 | 35 | alkali silicate | 2 | Spraying | good |
| Inv. Example 36 | 13.7 | F | 25.78 | 1.12 | 37 | alkyl silicate | 36 | Spraying | very good |
| Inv. Example 37 | 14.7 | F | 93.45 | 1.05 | 38 | alkali silicate | 100 | Brushing | very good |
| Inv. Example 38 | 2.4 | F | 0.97 | 1.08 | 41 | alkyl silicate | 2 | Brushing | good |
| Inv. Example 39 | 4.5 | F | 54.89 | 1.47 | 54 | alkali silicate | 60 | Brushing | very good |
| Inv. Example 40 | 0.1 | F | 10.81 | 1.50 | 57 | alkyl silicate | 18 | Brushing | very good |
| Inv. Example 41 | 30.0 | F | 18.24 | 1.13 | 59 | epoxy-based resin | 25 | Brushing | very good |
| Inv. Example 42 | 24.5 | F | 114.78 | 1.04 | 64 | acryl-based resin | 120 | Brushing | very good |
| Inv. Example 43 | 27.6 | F | 3.87 | 1.02 | 66 | urethane-based resin | 7 | Spraying | good |
| Inv. Example 44 | 4.1 | F | 11.94 | 1.08 | 67 | polyester resin | 19 | Spraying | very good |
| Inv. Example 45 | 3.2 | F | 142.58 | 1.15 | 75 | epoxy-based resin | 150 | Brushing | very good |
| Inv. Example 46 | 2.7 | F | 12.5 | 1.34 | 74 | acryl-based resin | 19 | Brushing | very good |
| Inv. Example 47 | 0.12 | F | 31.24 | 1.25 | 77 | urethane-based resin | 40 | Brushing | very good |
| Inv. Example 48 | 0.22 | F | 152.46 | 1.19 | 41 | polyester resin | 160 | Brushing | very good |
| Inv. Example 49 | 0.37 | F | 13.4 | 1.18 | 35 | epoxy-based resin | 22 | Spraying | very good |
| Inv. Example 50 | 1.4 | F | 160.57 | 1.24 | 58 | acryl-based resin | 170 | Brushing | very good |

(*1) F: Fracture facets existing, FC: Fracture facets and/or cracks existing, NO: No fracture facet and/or crack

TABLE 3

| | Zn-Alloy Particle Properties | | | | Coat Properties | | | | |
|---|---|---|---|---|---|---|---|---|---|
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Inv. Example 51 | 4.2 | F | 14.1 | 1.11 | 78 | urethane-based resin | 27 | Brushing | very good |
| Inv. Example 52 | 4.8 | F | 167.55 | 1.27 | 66 | polyester resin | 180 | Brushing | very good |
| Inv. Example 53 | 8.1 | F | 1.45 | 1.31 | 37 | epoxy-based resin | 5 | Spraying | good |
| Inv. Example 54 | 7.6 | F | 0.15 | 1.26 | 66 | acryl-based resin | 2 | Spraying | good |
| Inv. Example 55 | 9.9 | F | 13.1 | 1.14 | 80 | urethane-based resin | 29 | Spraying | very good |
| Inv. Example 56 | 14.8 | F | 15.5 | 1.34 | 45 | polyester resin | 30 | Spraying | very good |
| Inv. Example 57 | 16.7 | F | 0.67 | 1.16 | 47 | epoxy-based resin | 2 | Spraying | good |
| Inv. Example 58 | 17.9 | F | 137.89 | 1.47 | 39 | acryl-based resin | 150 | Brushing | very good |
| Inv. Example 59 | 19.5 | F | 16.3 | 1.48 | 55 | urethane-based resin | 27 | Brushing | very good |
| Inv. Example 60 | 22.4 | F | 110.38 | 1.49 | 74 | polyester resin | 130 | Brushing | very good |
| Inv. Example 61 | 0.17 | F | 12.4 | 1.34 | 68 | epoxy-based resin | 25 | Spraying | very good |
| Inv. Example 62 | 8.3 | F | 17.2 | 1.29 | 35 | acryl-based resin | 28 | Spraying | very good |
| Inv. Example 63 | 6.5 | F | 105.23 | 1.18 | 40 | urethane-based resin | 130 | Brushing | very good |
| Inv. Example 64 | 9.7 | F | 177.89 | 1.23 | 47 | polyester resin | 200 | Brushing | very good |
| Inv. Example 65 | 11.4 | F | 12.2 | 1.27 | 41 | epoxy-based resin | 17 | Spraying | very good |
| Inv. Example 66 | 22.5 | F | 1.84 | 1.17 | 38 | acryl-based resin | 4 | Spraying | very good |
| Inv. Example 67 | 25.7 | F | 16.02 | 1.16 | 66 | urethane-based resin | 29 | Spraying | very good |
| Inv. Example 68 | 17.8 | F | 1.75 | 1.49 | 64 | polyester resin | 5 | Spraying | very good |
| Inv. Example 69 | 0.14 | F | 198.78 | 1.34 | 57 | epoxy-based resin | 200 | Brushing | very good |
| Comp. Example 1 | 0.01 | F | 0.4 | 1.24 | 58 | acryl-based resin | 5 | Spraying | poor |
| Comp. Example 2 | 0.8 | F | 3.2 | 2.54 | 64 | urethane-based resin | 2 | Spraying | poor |
| Comp. Example 3 | 8.47 | NO | 0.67 | 1.25 | 54 | polyester resin | 12 | Brushing | poor |
| Comp. Example 4 | 24.5 | NO | 2.5 | 1.05 | 32 | epoxy-based resin | 15 | Brushing | poor |
| Comp. Example 5 | 0.01 | F | 0.4 | 1.24 | 57 | alkali silicate | 2 | Spraying | poor |
| Comp. Example 6 | 0.8 | F | 0.2 | 1.78 | 70 | alkyl silicate | 5 | Spraying | poor |

(*1) F: Fracture facets existing, FC: Fracture facets and/or cracks existing, NO: No fracture facet and/or crack

TABLE 4

| | Zn-Alloy Particle Properties | | | | Coat Properties | | | | |
|---|---|---|---|---|---|---|---|---|---|
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Comp. Example 7 | 8.47 | NO | 0.67 | 1.25 | 64 | alkali silicate | 12 | Brushing | poor |
| Comp. Example 8 | 24.5 | NO | 2.5 | 1.05 | 42 | alkyl silicate | 15 | Brushing | poor |

TABLE 4-continued

| | Zn-Alloy Particle Properties | | | | Coat Properties | | | | |
|---|---|---|---|---|---|---|---|---|---|
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Comp. Example 9 | 4.05 | NO | 0.02 | 1.23 | 38 | alkali silicate | 13 | Brushing | poor |
| Comp. Example 10 | 6.78 | NO | 12.5 | 1.35 | 44 | alkyl silicate | 22 | Spraying | poor |
| Comp. Example 11 | 15.8 | NO | 23.3 | 1.14 | 56 | alkyl silicate | 34 | Spraying | poor |
| Comp. Example 12 | 4.5 | F | 3.5 | 2.84 | 76 | alkyl silicate | 15 | Brushing | poor |
| Comp. Example 13 | 3.2 | F | 6.7 | 1.75 | 65 | alkyl silicate | 15 | Spraying | poor |
| Inv. Example 381 | 0.15 | FC | 0.02 | 1.05 | 35 | alkali silicate | 2 | Spraying | very good |
| Inv. Example 382 | 0.19 | FC | 10.5 | 1.12 | 77 | alkyl silicate | 37 | Spraying | very good |
| Inv. Example 383 | 0.18 | FC | 12.5 | 1.23 | 43 | alkali silicate | 2 | Spraying | good |
| Inv. Example 384 | 0.11 | FC | 18.5 | 1.36 | 52 | alkyl silicate | 160 | Brushing | very good |
| Inv. Example 385 | 0.15 | FC | 11.5 | 1.11 | 66 | alkali silicate | 5 | Brushing | very good |
| Inv. Example 386 | 0.24 | FC | 9.6 | 1.07 | 72 | alkyl silicate | 56 | Brushing | very good |
| Inv. Example 387 | 0.18 | FC | 8.5 | 1.42 | 40 | alkali silicate | 2 | Spraying | very good |
| Inv. Example 388 | 0.12 | FC | 7.72 | 1.38 | 36 | alkyl silicate | 18 | Spraying | very good |
| Inv. Example 389 | 0.19 | FC | 8.32 | 1.22 | 32 | alkyl silicate | 23 | Spraying | very good |
| Inv. Example 390 | 0.18 | FC | 10.05 | 1.14 | 53 | epoxy-based resin | 30 | Brushing | very good |
| Inv. Example 391 | 0.21 | FC | 10.6 | 1.13 | 67 | acryl-based resin | 77 | Brushing | very good |
| Inv. Example 392 | 0.76 | FC | 5.7 | 1.02 | 72 | urethane-based resin | 54 | Brushing | very good |
| Inv. Example 393 | 0.11 | FC | 6.4 | 1.06 | 77 | polyester resin | 47 | Spraying | very good |
| Inv. Example 394 | 0.14 | FC | 3.2 | 1.05 | 34 | epoxy-based resin | 43 | Spraying | very good |
| Inv. Example 395 | 15 | FC | 4.5 | 1.24 | 43 | acryl-based resin | 52 | Brushing | very good |
| Inv. Example 396 | 14.5 | FC | 5.2 | 1.33 | 53 | urethane-based resin | 20 | Brushing | very good |
| Inv. Example 397 | 18.5 | FC | 1.9 | 1.27 | 60 | polyester resin | 200 | Brushing | very good |
| Inv. Example 398 | 15.1 | FC | 0.02 | 1.05 | 35 | alkali silicate | 22 | Spraying | very good |

(*1) F: Fracture facets existing, FC: Fracture facets and/or cracks existing, NO: No fracture facet and/or crack

TABLE 5

| | Zn-Alloy Particle Properties | | | | Coat Properties | | | | |
|---|---|---|---|---|---|---|---|---|---|
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Inv. Example 399 | 15.6 | FC | 10.5 | 1.12 | 77 | alkyl silicate | 25 | Spraying | very good |
| Inv. Example 400 | 12.5 | FC | 12.5 | 1.23 | 43 | alkali silicate | 14 | Spraying | very good |
| Inv. Example 401 | 18.7 | FC | 18.5 | 1.36 | 52 | urethane-based resin | 112 | Spraying | very good |
| Inv. Example 402 | 14.5 | FC | 11.5 | 1.11 | 66 | alkali silicate | 24 | Spraying | very good |
| Inv. Example 403 | 7.5 | FC | 9.6 | 1.07 | 72 | urethane-based resin | 150 | Spraying | very good |
| Inv. Example 404 | 4.5 | FC | 8.5 | 1.42 | 40 | alkali silicate | 18 | Spraying | very good |
| Inv. Example 405 | 1.5 | FC | 7.72 | 1.38 | 36 | alkyl silicate | 19 | Brushing | very good |
| Inv. Example 406 | 4.8 | FC | 8.32 | 1.22 | 32 | alkyl silicate | 24 | Spraying | very good |
| Inv. Example 407 | 9.6 | FC | 10.05 | 1.14 | 53 | urethane-based resin | 99 | Spraying | very good |
| Inv. Example 408 | 11.5 | FC | 10.6 | 1.13 | 67 | alkyl silicate | 7 | Spraying | very good |
| Inv. Example 409 | 9.8 | FC | 5.7 | 1.02 | 72 | epoxy-based resin | 100 | Spraying | very good |
| Inv. Example 410 | 7.6 | FC | 6.4 | 1.06 | 77 | alkyl silicate | 27 | Brushing | very good |
| Inv. Example 411 | 3.2 | FC | 3.2 | 1.05 | 34 | alkali silicate | 15 | Spraying | very good |
| Inv. Example 412 | 1.9 | FC | 4.5 | 1.24 | 43 | alkyl silicate | 14 | Spraying | very good |
| Inv. Example 413 | 11.5 | FC | 5.2 | 1.33 | 53 | urethane-based resin | 55 | Spraying | very good |
| Inv. Example 414 | 8.7 | FC | 1.9 | 1.27 | 35 | alkyl silicate | 8 | Spraying | very good |
| Inv. Example 415 | 9.6 | FC | 0.02 | 1.05 | 77 | urethane-based resin | 122 | Brushing | very good |
| Inv. Example 416 | 9.4 | FC | 10.5 | 1.12 | 43 | alkyl silicate | 54 | Spraying | very good |
| Inv. Example 417 | 10.5 | FC | 12.5 | 1.23 | 52 | alkali silicate | 19 | Spraying | very good |
| Inv. Example 418 | 12.6 | FC | 18.5 | 1.36 | 66 | alkyl silicate | 25 | Brushing | very good |
| Inv. Example 419 | 29.5 | FC | 11.5 | 1.11 | 72 | alkyl silicate | 58 | Spraying | very good |
| Inv. Example 420 | 29.4 | FC | 9.6 | 1.07 | 40 | alkyl silicate | 21 | Spraying | very good |
| Inv. Example 421 | 27.5 | FC | 8.5 | 1.42 | 36 | alkali silicate | 19 | Brushing | very good |
| Inv. Example 422 | 0.8 | FC | 7.72 | 1.38 | 32 | urethane-based resin | 56 | Spraying | very good |
| Inv. Example 423 | 1.6 | FC | 8.32 | 1.22 | 53 | alkyl silicate | 77 | Spraying | very good |

(*1) F: Fracture facets existing, FC: Fracture facets and/or cracks existing, NO: No fracture facet and/or crack

TABLE 6

| | Zn-Alloy Particle Properties | | | | Coat Properties | | | | |
|---|---|---|---|---|---|---|---|---|---|
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Inv. Example 424 | 22.9 | FC | 10.05 | 1.14 | 67 | alkyl silicate | 54 | Spraying | very good |
| Inv. Example 425 | 28.5 | FC | 10.6 | 1.13 | 72 | alkyl silicate | 64 | Spraying | very good |
| Inv. Example 426 | 29.5 | FC | 5.7 | 1.02 | 77 | alkyl silicate | 34 | Brushing | very good |
| Inv. Example 427 | 18.7 | FC | 6.4 | 1.06 | 34 | alkali silicate | 28 | Spraying | very good |
| Inv. Example 428 | 19.5 | FC | 3.2 | 1.05 | 43 | urethane-based resin | 109 | Brushing | very good |
| Inv. Example 429 | 20.4 | FC | 4.5 | 1.24 | 53 | alkyl silicate | 15 | Spraying | very good |
| Inv. Example 430 | 0.6 | FC | 5.2 | 1.33 | 72 | alkyl silicate | 14 | Spraying | very good |
| Inv. Example 431 | 0.8 | FC | 1.9 | 1.27 | 77 | alkyl silicate | 18 | Spraying | very good |
| Inv. Example 432 | 22.5 | FC | 0.02 | 1.05 | 35 | alkali silicate | 2 | Spraying | very good |
| Inv. Example 433 | 20.6 | FC | 10.5 | 1.12 | 77 | alkyl silicate | 37 | Spraying | very good |
| Inv. Example 434 | 21.6 | FC | 12.5 | 1.23 | 43 | alkali silicate | 2 | Spraying | good |
| Inv. Example 435 | 20.8 | FC | 7.72 | 1.38 | 52 | alkyl silicate | 160 | Brushing | very good |
| Inv. Example 436 | 23.6 | FC | 8.32 | 1.22 | 66 | alkali silicate | 5 | Brushing | very good |
| Inv. Example 437 | 24.5 | FC | 10.05 | 1.14 | 72 | alkyl silicate | 56 | Brushing | very good |
| Inv. Example 438 | 18.6 | FC | 10.6 | 1.13 | 40 | alkali silicate | 2 | Spraying | very good |
| Inv. Example 439 | 17.8 | FC | 5.2 | 1.33 | 36 | alkyl silicate | 18 | Spraying | very good |
| Inv. Example 440 | 16.5 | FC | 1.9 | 1.27 | 32 | alkyl silicate | 23 | Spraying | very good |
| Inv. Example 441 | 14.5 | FC | 0.02 | 1.05 | 53 | epoxy-based resin | 30 | Brushing | very good |
| Inv. Example 442 | 19 | FC | 10.5 | 1.12 | 67 | acryl-based resin | 77 | Brushing | very good |
| Inv. Example 443 | 15 | FC | 12.5 | 1.23 | 72 | urethane-based resin | 54 | Brushing | very good |
| Inv. Example 444 | 16.4 | FC | 18.5 | 1.36 | 77 | polyester resin | 47 | Spraying | very good |
| Inv. Example 445 | 13.5 | FC | 11.5 | 1.11 | 34 | epoxy-based resin | 43 | Spraying | very good |
| Inv. Example 446 | 10.6 | FC | 11.5 | 1.11 | 43 | acryl-based resin | 52 | Brushing | very good |
| Inv. Example 447 | 10.7 | FC | 9.6 | 1.07 | 53 | urethane-based resin | 20 | Brushing | very good |
| Inv. Example 448 | 10.9 | FC | 8.5 | 1.42 | 60 | polyester resin | 200 | Brushing | very good |

(*1) F: Fracture facets existing, FC: Fracture facets and/or cracks existing, NO: No fracture facet and/or crack

TABLE 7

| | Zn-Alloy Particle Properties | | | | Coat Properties | | | | |
|---|---|---|---|---|---|---|---|---|---|
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Inv. Example 449 | 11.6 | FC | 7.72 | 1.38 | 35 | alkali silicate | 22 | Spraying | very good |
| Inv. Example 450 | 14.7 | FC | 8.32 | 1.22 | 77 | alkyl silicate | 25 | Spraying | very good |
| Inv. Example 451 | 19.5 | FC | 10.05 | 1.14 | 43 | alkali silicate | 14 | Spraying | very good |
| Inv. Example 452 | 10.2 | FC | 10.6 | 1.13 | 52 | urethane-based resin | 112 | Spraying | very good |
| Inv. Example 453 | 4 | FC | 5.7 | 1.02 | 66 | alkali silicate | 24 | Spraying | very good |
| Inv. Example 454 | 7.2 | FC | 6.4 | 1.06 | 72 | urethane-based resin | 150 | Spraying | very good |
| Inv. Example 455 | 3.6 | FC | 3.2 | 1.05 | 40 | alkali silicate | 18 | Spraying | very good |
| Inv. Example 456 | 26.9 | FC | 4.5 | 1.24 | 36 | alkyl silicate | 19 | Brushing | very good |
| Inv. Example 457 | 27.9 | FC | 5.2 | 1.33 | 32 | alkyl silicate | 24 | Spraying | very good |
| Inv. Example 458 | 28.9 | FC | 1.9 | 1.27 | 53 | urethane-based resin | 99 | Spraying | very good |
| Inv. Example 459 | 23.8 | FC | 0.02 | 1.05 | 67 | alkyl silicate | 7 | Spraying | very good |
| Inv. Example 460 | 26.8 | FC | 10.5 | 1.12 | 72 | epoxy-based resin | 100 | Spraying | very good |
| Inv. Example 461 | 25.6 | FC | 12.5 | 1.23 | 77 | alkyl silicate | 27 | Brushing | very good |
| Inv. Example 462 | 29.8 | FC | 18.5 | 1.36 | 34 | alkali silicate | 15 | Spraying | very good |
| Inv. Example 463 | 18.9 | FC | 11.5 | 1.11 | 43 | alkyl silicate | 14 | Spraying | very good |
| Inv. Example 464 | 5.6 | FC | 9.6 | 1.07 | 53 | urethane-based resin | 55 | Spraying | very good |
| Inv. Example 465 | 4.7 | FC | 8.5 | 1.42 | 35 | alkyl silicate | 8 | Spraying | very good |
| Inv. Example 466 | 6.8 | FC | 7.72 | 1.38 | 77 | urethane-based resin | 122 | Brushing | very good |
| Inv. Example 467 | 9 | FC | 8.32 | 1.22 | 43 | alkyl silicate | 54 | Spraying | very good |
| Inv. Example 468 | 2.1 | FC | 10.05 | 1.14 | 52 | alkali silicate | 19 | Spraying | very good |
| Inv. Example 469 | 4.8 | FC | 10.6 | 1.13 | 66 | alkali silicate | 25 | Brushing | very good |
| Inv. Example 470 | 4.2 | FC | 5.7 | 1.02 | 72 | alkyl silicate | 58 | Spraying | very good |
| Inv. Example 471 | 4.3 | FC | 6.4 | 1.06 | 40 | alkyl silicate | 21 | Spraying | very good |
| Inv. Example 472 | 4 | FC | 3.2 | 1.05 | 36 | alkali silicate | 19 | Brushing | very good |
| Inv. Example 473 | 3.7 | FC | 4.5 | 1.24 | 32 | urethane-based resin | 56 | Spraying | very good |

(*1) F: Fracture facets existing, FC: Fracture facets and/or cracks existing, NO: No fracture facet and/or crack

TABLE 8

| | Zn-Alloy Particle Properties | | | | Coat Properties | | | | |
|---|---|---|---|---|---|---|---|---|---|
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Inv. Example 474 | 6.4 | FC | 5.2 | 1.33 | 53 | alkyl silicate | 77 | Spraying | very good |
| Inv. Example 475 | 6.9 | FC | 1.9 | 1.27 | 67 | alkyl silicate | 54 | Spraying | very good |
| Inv. Example 476 | 16.9 | FC | 0.02 | 1.05 | 72 | alkyl silicate | 64 | Spraying | very good |
| Inv. Example 477 | 18.7 | FC | 10.5 | 1.12 | 77 | alkyl silicate | 34 | Brushing | very good |
| Inv. Example 478 | 24.4 | FC | 12.5 | 1.23 | 34 | alkali silicate | 28 | Spraying | very good |
| Inv. Example 479 | 10.6 | FC | 18.5 | 1.36 | 43 | urethane-based resin | 109 | Brushing | very good |
| Inv. Example 480 | 15.8 | FC | 11.5 | 1.11 | 53 | alkyl silicate | 15 | Spraying | very good |
| Inv. Example 481 | 19.5 | FC | 9.6 | 1.07 | 72 | alkyl silicate | 14 | Spraying | very good |
| Inv. Example 482 | 7.8 | FC | 8.5 | 1.42 | 77 | alkyl silicate | 18 | Spraying | very good |
| Inv. Example 483 | 4.9 | FC | 7.72 | 1.38 | 77 | urethane-based resin | 122 | Brushing | very good |
| Inv. Example 484 | 10.8 | FC | 8.32 | 1.22 | 43 | alkyl silicate | 54 | Spraying | very good |
| Inv. Example 485 | 3.8 | FC | 10.05 | 1.14 | 52 | alkali silicate | 19 | Spraying | very good |
| Inv. Example 486 | 22.6 | FC | 10.6 | 1.13 | 66 | alkyl silicate | 25 | Brushing | very good |
| Inv. Example 487 | 27.9 | FC | 5.7 | 1.02 | 72 | alkyl silicate | 58 | Spraying | very good |
| Inv. Example 488 | 24.8 | FC | 6.4 | 1.06 | 40 | alkyl silicate | 21 | Spraying | very good |
| Inv. Example 489 | 26.8 | FC | 3.2 | 1.05 | 36 | alkali silicate | 19 | Brushing | very good |
| Inv. Example 490 | 25.9 | FC | 4.5 | 1.24 | 32 | urethane-based resin | 56 | Spraying | very good |
| Inv. Example 491 | 9.8 | FC | 5.2 | 1.33 | 53 | alkyl silicate | 77 | Spraying | very good |
| Inv. Example 492 | 5.6 | FC | 1.9 | 1.27 | 67 | alkyl silicate | 54 | Spraying | very good |
| Inv. Example 493 | 12.3 | FC | 0.02 | 1.05 | 52 | alkali silicate | 2 | Spraying | very good |
| Inv. Example 494 | 0.8 | FC | 27.89 | 1.12 | 55 | alkali silicate | 20 | Spraying | very good |
| Inv. Example 495 | 1 | FC | 0.32 | 1.23 | 69 | alkali silicate | 5 | Spraying | very good |
| Inv. Example 496 | 2.3 | FC | 11.44 | 1.36 | 78 | alkyl silicate | 20 | Spraying | very good |
| Inv. Example 497 | 15.6 | FC | 1.05 | 1.11 | 42 | alkali silicate | 15 | Brushing | very good |
| Inv. Example 498 | 6.7 | FC | 36.47 | 1.07 | 32 | alkyl silicate | 57 | Brushing | very good |
| Inv. Example 499 | 7.5 | FC | 5.07 | 1.42 | 66 | alkali silicate | 13 | Brushing | very good |

(*1) F: Fracture facets existing, FC: Fracture facets and/or cracks existing, NO: No fracture facet and/or crack

TABLE 9

| | Zn-Alloy Particle Properties | | | | Coat Properties | | | | |
|---|---|---|---|---|---|---|---|---|---|
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Inv. Example 500 | 8.4 | FC | 7.72 | 1.38 | 67 | alkyl silicate | 22 | Brushing | very good |
| Inv. Example 501 | 9.3 | FC | 8.32 | 1.22 | 64 | alkali silicate | 20 | Spraying | very good |
| Inv. Example 502 | 10.4 | FC | 10.05 | 1.14 | 74 | alkyl silicate | 27 | Spraying | very good |
| Inv. Example 503 | 11.2 | FC | 6.08 | 1.13 | 82 | alkali silicate | 15 | Spraying | very good |
| Inv. Example 504 | 11.7 | FC | 17.89 | 1.02 | 37 | alkyl silicate | 35 | Spraying | very good |
| Inv. Example 505 | 21.5 | FC | 19.54 | 1.06 | 42 | alkali silicate | 34 | Brushing | very good |
| Inv. Example 506 | 13.4 | FC | 21.08 | 1.05 | 66 | alkyl silicate | 45 | Brushing | very good |
| Inv. Example 507 | 14.6 | FC | 23.04 | 1.24 | 48 | alkali silicate | 52 | Brushing | very good |
| Inv. Example 508 | 25.8 | FC | 9.21 | 1.33 | 33 | alkyl silicate | 23 | Brushing | very good |
| Inv. Example 509 | 16.7 | FC | 0.12 | 1.27 | 75 | alkali silicate | 5 | Spraying | very good |
| Inv. Example 510 | 17.3 | FC | 29.24 | 1.37 | 77 | alkyl silicate | 52 | Brushing | very good |
| Inv. Example 511 | 18.5 | FC | 128.74 | 1.10 | 66 | alkali silicate | 150 | Brushing | very good |
| Inv. Example 512 | 19.3 | FC | 33.57 | 1.04 | 67 | alkyl silicate | 60 | Brushing | very good |
| Inv. Example 513 | 3.5 | FC | 3.04 | 1.02 | 45 | alkali silicate | 15 | Spraying | very good |
| Inv. Example 514 | 22.5 | FC | 7.54 | 1.01 | 48 | alkyl silicate | 24 | Spraying | very good |
| Inv. Example 515 | 23.7 | FC | 6.81 | 1.08 | 68 | alkyl silicate | 34 | Spraying | very good |
| Inv. Example 516 | 24.2 | FC | 5.25 | 1.14 | 35 | alkyl silicate | 20 | Brushing | very good |
| Inv. Example 517 | 0.2 | FC | 194.23 | 1.23 | 37 | alkali silicate | 200 | Brushing | very good |
| Inv. Example 518 | 27.1 | FC | 28.74 | 1.33 | 38 | alkyl silicate | 56 | Brushing | very good |
| Inv. Example 519 | 29.3 | FC | 13.57 | 1.37 | 41 | alkali silicate | 34 | Spraying | very good |
| Inv. Example 520 | 0.5 | FC | 0.65 | 1.44 | 54 | alkyl silicate | 2 | Spraying | very good |
| Inv. Example 521 | 2.7 | FC | 4.12 | 1.21 | 57 | alkali silicate | 15 | Spraying | very good |
| Inv. Example 522 | 28.4 | FC | 0.72 | 1.22 | 59 | alkali silicate | 10 | Spraying | very good |
| Inv. Example 523 | 8.7 | FC | 117.54 | 1.23 | 64 | alkyl silicate | 125 | Brushing | very good |
| Inv. Example 524 | 9.2 | FC | 7.81 | 1.47 | 66 | alkali silicate | 24 | Brushing | very good |
| Inv. Example 525 | 17.8 | FC | 80.25 | 1.01 | 67 | alkyl silicate | 110 | Brushing | very good |

(*1) F: Fracture facets existing, FC: Fracture facets and/or cracks existing, NO: No fracture facet and/or crack

TABLE 10

| | Zn-Alloy Particle Properties | | | | Coat Properties | | | | |
|---|---|---|---|---|---|---|---|---|---|
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Inv. Example 526 | 20.2 | FC | 8.47 | 1.04 | 34 | alkali silicate | 24 | Brushing | very good |
| Inv. Example 527 | 0.4 | FC | 0.87 | 1.05 | 54 | alkyl silicate | 2 | Spraying | very good |
| Inv. Example 528 | 13.7 | FC | 25.78 | 1.12 | 62 | alkali silicate | 37 | Spraying | very good |
| Inv. Example 529 | 14.7 | FC | 93.45 | 1.11 | 66 | alkyl silicate | 113 | Brushing | very good |
| Inv. Example 530 | 2.4 | FC | 0.97 | 1.08 | 67 | alkali silicate | 2 | Spraying | very good |
| Inv. Example 531 | 4.5 | FC | 54.89 | 1.47 | 68 | alkyl silicate | 75 | Brushing | very good |
| Inv. Example 532 | 0.1 | FC | 10.81 | 1.50 | 33 | alkali silicate | 30 | Brushing | very good |
| Inv. Example 533 | 30.0 | FC | 18.24 | 1.13 | 35 | alkyl silicate | 34 | Brushing | very good |
| Inv. Example 534 | 24.5 | FC | 114.78 | 1.04 | 43 | epoxy-based resin | 124 | Brushing | very good |
| Inv. Example 535 | 27.6 | FC | 3.87 | 1.02 | 44 | acryl-based resin | 15 | Spraying | very good |
| Inv. Example 536 | 4.1 | FC | 11.94 | 1.08 | 43 | urethane-based resin | 23 | Spraying | very good |
| Inv. Example 537 | 3.2 | FC | 142.58 | 1.15 | 44 | polyester resin | 157 | Brushing | very good |
| Inv. Example 538 | 2.7 | FC | 12.5 | 1.34 | 54 | epoxy-based resin | 26 | Spraying | very good |
| Inv. Example 539 | 0.12 | FC | 31.24 | 1.25 | 79 | acryl-based resin | 38 | Spraying | very good |
| Inv. Example 540 | 0.22 | FC | 152.46 | 1.19 | 73 | urethane-based resin | 160 | Brushing | very good |
| Inv. Example 541 | 0.37 | FC | 13.4 | 1.18 | 69 | polyester resin | 27 | Brushing | very good |
| Inv. Example 542 | 1.4 | FC | 160.57 | 1.24 | 63 | epoxy-based resin | 180 | Brushing | very good |
| Inv. Example 543 | 4.2 | FC | 14.1 | 1.11 | 35 | acryl-based resin | 26 | Spraying | very good |
| Inv. Example 544 | 4.8 | FC | 167.55 | 1.27 | 35 | urethane-based resin | 180 | Brushing | very good |
| Inv. Example 545 | 8.1 | FC | 1.45 | 1.31 | 66 | polyester resin | 15 | Spraying | very good |
| Inv. Example 546 | 7.6 | FC | 0.15 | 1.26 | 67 | epoxy-based resin | 2 | Spraying | very good |
| Inv. Example 547 | 9.9 | FC | 13.1 | 1.14 | 68 | acryl-based resin | 28 | Spraying | very good |
| Inv. Example 548 | 14.8 | FC | 15.5 | 1.34 | 33 | urethane-based resin | 30 | Spraying | very good |
| Inv. Example 549 | 16.7 | FC | 0.67 | 1.16 | 35 | polyester resin | 2 | Spraying | very good |
| Inv. Example 550 | 17.9 | FC | 137.89 | 1.47 | 43 | epoxy-based resin | 157 | Brushing | very good |
| Inv. Example 551 | 19.5 | FC | 16.3 | 1.48 | 44 | acryl-based resin | 28 | Brushing | very good |

(*1) F: Fracture facets existing, FC: Fracture facets and/or cracks existing, NO: No fracture facet and/or crack

TABLE 11

| | Zn-Alloy Particle Properties | | | | Coat Properties | | | | |
|---|---|---|---|---|---|---|---|---|---|
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Inv. Example 552 | 22.4 | FC | 110.38 | 1.49 | 42 | urethane-based resin | 130 | Brushing | very good |
| Inv. Example 553 | 0.17 | FC | 12.4 | 1.34 | 33 | polyester resin | 29 | Brushing | very good |
| Inv. Example 554 | 8.3 | FC | 17.2 | 1.29 | 30 | epoxy-based resin | 30 | Brushing | very good |
| Inv. Example 555 | 6.5 | FC | 105.23 | 1.18 | 35 | acryl-based resin | 120 | Brushing | very good |
| Inv. Example 556 | 9.7 | FC | 177.89 | 1.23 | 37 | urethane-based resin | 187 | Brushing | very good |
| Inv. Example 557 | 11.4 | FC | 12.2 | 1.27 | 77 | polyester resin | 28 | Spraying | very good |
| Inv. Example 558 | 22.5 | FC | 1.84 | 1.17 | 41 | epoxy-based resin | 5 | Spraying | very good |
| Inv. Example 559 | 25.7 | FC | 16.02 | 1.16 | 35 | acryl-based resin | 35 | Spraying | very good |
| Inv. Example 560 | 17.8 | FC | 1.75 | 1.49 | 58 | urethane-based resin | 5 | Spraying | very good |
| Inv. Example 561 | 0.14 | FC | 198.78 | 1.34 | 37 | polyester resin | 200 | Brushing | very good |
| Inv. Example 562 | 6.7 | FC | 13.1 | 1.16 | 68 | alkali silicate | 25 | Spraying | very good |
| Inv. Example 563 | 7.5 | FC | 15.5 | 1.47 | 55 | alkali silicate | 15 | Spraying | very good |
| Inv. Example 564 | 8.4 | FC | 0.67 | 1.48 | 77 | alkyl silicate | 20 | Spraying | very good |
| Inv. Example 565 | 9.3 | FC | 12.2 | 1.49 | 43 | alkali silicate | 18 | Spraying | very good |
| Inv. Example 566 | 1.4 | FC | 1.84 | 1.34 | 45 | alkyl silicate | 22 | Spraying | very good |
| Inv. Example 567 | 4.2 | FC | 16.02 | 1.29 | 66 | alkali silicate | 19 | Spraying | very good |
| Inv. Example 568 | 4.8 | FC | 1.75 | 1.18 | 33 | alkyl silicate | 29 | Spraying | very good |
| Inv. Example 569 | 8.1 | FC | 12.4 | 1.23 | 66 | alkali silicate | 23 | Spraying | very good |
| Inv. Example 570 | 7.6 | FC | 17.2 | 1.27 | 55 | alkyl silicate | 21 | Spraying | very good |
| Inv. Example 571 | 9.9 | FC | 13.1 | 1.17 | 49 | alkali silicate | 19 | Spraying | very good |
| Inv. Example 572 | 0.4 | FC | 29.9 | 1.16 | 77 | alkyl silicate | 15 | Spraying | very good |
| Inv. Example 573 | 10.5 | FC | 0.21 | 1.27 | 41 | alkali silicate | 18 | Spraying | very good |
| Inv. Example 574 | 0.4 | FC | 0.22 | 1.17 | 64 | alkyl silicate | 22 | Spraying | very good |
| Inv. Example 575 | 10.5 | FC | 29.5 | 1.27 | 58 | alkyl silicate | 21 | Spraying | very good |
| Inv. Example 576 | 0.51 | FC | 29.9 | 1.18 | 33 | alkyl silicate | 29 | Spraying | very good |
| Inv. Example 577 | 9.8 | FC | 0.21 | 1.23 | 66 | alkali silicate | 23 | Spraying | very good |

(*1) F: Fracture facets existing, FC: Fracture facets and/or cracks existing, NO: No fracture facet and/or crack

TABLE 12

| | Zn-Alloy Particle Properties | | | | Coat Properties | | | | |
| --- | --- | --- | --- | --- | --- | --- | --- | --- | --- |
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Inv. Example 578 | 0.52 | FC | 0.22 | 1.27 | 55 | alkyl silicate | 21 | Spraying | very good |
| Inv. Example 579 | 9.9 | FC | 29.5 | 1.17 | 49 | alkali silicate | 19 | Spraying | very good |
| Inv. Example 580 | 14.8 | FC | 16.02 | 1.48 | 77 | alkyl silicate | 21 | Spraying | very good |
| Inv. Example 581 | 16.7 | FC | 1.75 | 1.49 | 43 | alkali silicate | 19 | Spraying | very good |
| Inv. Example 582 | 17.9 | FC | 12.4 | 1.34 | 45 | alkyl silicate | 15 | Spraying | very good |
| Inv. Example 583 | 19.5 | FC | 17.2 | 1.29 | 66 | alkali silicate | 18 | Spraying | very good |
| Comp. Example 14 | 2.3 | FC | 205.6 | 1.23 | 75 | alkyl silicate | 25 | Spraying | poor |
| Comp. Example 15 | 2.3 | FC | 0.005 | 1.23 | 75 | alkyl silicate | 25 | Spraying | poor |
| Comp. Example 16 | 2.3 | FC | 205.6 | 1.23 | 75 | alkyl silicate | 105 | Brushing | poor |
| Comp. Example 17 | 2.3 | FC | 0.005 | 1.23 | 75 | alkyl silicate | 165 | Spraying | poor |
| Inv. Example 2005 | 0.05 | FC | 2.5 | 1.05 | 38 | alkali silicate | 19 | Spraying | very good |
| Inv. Example 2006 | 0.07 | FC | 0.09 | 1.12 | 49 | alkyl silicate | 11 | Spraying | very good |
| Inv. Example 2007 | 2.64 | FC | 5.5 | 1.22 | 43 | alkyl silicate | 16 | Spraying | very good |
| Inv. Example 2008 | 0.08 | FC | 5.6 | 1.36 | 66 | alkyl silicate | 16 | Brushing | very good |
| Inv. Example 2009 | 0.09 | FC | 11.5 | 1.11 | 67 | alkali silicate | 33 | Brushing | very good |
| Inv. Example 2010 | 0.05 | FC | 19.5 | 1.07 | 54 | alkyl silicate | 8 | Brushing | good |
| Inv. Example 2011 | 1.59 | FC | 6.7 | 1.14 | 76 | alkyl silicate | 5 | Spraying | very good |
| Inv. Example 2012 | 2.58 | FC | 8.9 | 1.13 | 49 | alkyl silicate | 22 | Spraying | very good |
| Inv. Example 2013 | 0.06 | FC | 8.32 | 1.22 | 32 | alkyl silicate | 23 | Spraying | very good |
| Inv. Example 2014 | 0.18 | FC | 10.05 | 1.14 | 53 | epoxy-based resin | 30 | Spraying | very good |
| Inv. Example 2015 | 7.55 | FC | 2.15 | 1.14 | 75 | alkyl silicate | 18 | Spraying | very good |
| Inv. Example 2016 | 0.01 | FC | 0.06 | 1.23 | 75 | alkali silicate | 5 | Spraying | good |
| Inv. Example 2017 | 8.01 | FC | 2.54 | 1.13 | 73 | alkyl silicate | 16 | Spraying | very good |
| Inv. Example 2018 | 1.06 | FC | 3.4 | 1.38 | 49 | alkyl silicate | 8 | Spraying | very good |
| Inv. Example 2019 | 0.04 | FC | 8.5 | 1.42 | 40 | alkali silicate | 2 | Spraying | very good |
| Inv. Example 2020 | 0.06 | FC | 7.72 | 1.38 | 36 | alkyl silicate | 18 | Spraying | very good |

(*1) F: Fracture facets existing, FC: Fracture facets and/or cracks existing, NO: No fracture facet and/or crack

TABLE 13

| | Zn-Alloy Particle Properties | | | | Coat Properties | | | | |
| --- | --- | --- | --- | --- | --- | --- | --- | --- | --- |
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Inv. Example 2021 | 9.51 | FC | 2.77 | 1.38 | 55 | alkyl silicate | 5 | Spraying | very good |
| Inv. Example 2022 | 10.01 | FC | 3.68 | 1.22 | 48 | alkyl silicate | 22 | Spraying | very good |
| Inv. Example 2023 | 0.05 | FC | 10.6 | 1.13 | 67 | acryl-based resin | 77 | Brushing | very good |
| Inv. Example 2024 | 0.07 | FC | 5.7 | 1.02 | 72 | urethane-based resin | 54 | Brushing | very good |
| Inv. Example 2025 | 3.54 | FC | 5.5 | 1.22 | 78 | alkyl silicate | 18 | Spraying | very good |
| Inv. Example 2026 | 0.08 | FC | 3.2 | 1.05 | 34 | epoxy-based resin | 43 | Spraying | very good |
| Inv. Example 2027 | 0.09 | FC | 4.5 | 1.24 | 43 | acryl-based resin | 52 | Brushing | very good |
| Inv. Example 2028 | 5.22 | FC | 2.54 | 1.14 | 45 | alkyl silicate | 19 | Spraying | very good |
| Inv. Example 2029 | 4.05 | FC | 2.06 | 1.13 | 52 | alkyl silicate | 8 | Spraying | very good |
| Inv. Example 2030 | 8.57 | FC | 4.99 | 1.02 | 61 | alkyl silicate | 16 | Spraying | very good |
| Inv. Example 2031 | 0.01 | FC | 6.4 | 1.06 | 77 | polyester resin | 47 | Spraying | very good |
| Inv. Example 2032 | 4.59 | FC | 3.09 | 1.07 | 49 | alkyl silicate | 22 | Spraying | very good |
| Inv. Example 2033 | 9.88 | FC | 4.66 | 1.42 | 79 | alkyl silicate | 18 | Spraying | very good |
| Inv. Example 2034 | 4.55 | FC | 4.09 | 1.38 | 76 | alkyl silicate | 18 | Spraying | very good |
| Inv. Example 2035 | 2.36 | FC | 3.99 | 1.22 | 80 | alkyl silicate | 21 | Spraying | very good |
| Inv. Example 2036 | 0.05 | FC | 7.72 | 1.38 | 36 | alkyl silicate | 19 | Brushing | very good |
| Inv. Example 2037 | 0.04 | FC | 8.32 | 1.22 | 32 | alkyl silicate | 24 | Spraying | very good |
| Inv. Example 2038 | 2.64 | FC | 4.55 | 1.11 | 43 | alkyl silicate | 5 | Spraying | very good |
| Inv. Example 2039 | 0.06 | FC | 10.6 | 1.13 | 67 | alkyl silicate | 7 | Spraying | very good |
| Inv. Example 2040 | 0.18 | FC | 5.7 | 1.02 | 72 | epoxy-based resin | 100 | Spraying | very good |
| Inv. Example 2041 | 6.31 | FC | 3.52 | 1.27 | 51 | alkyl silicate | 21 | Spraying | very good |
| Inv. Example 2042 | 5..22 | FC | 3.55 | 1.12 | 55 | alkyl silicate | 19 | Spraying | very good |
| Inv. Example 2043 | 4.01 | FC | 2.64 | 1.23 | 40 | alkyl silicate | 8 | Spraying | very good |
| Inv. Example 2044 | 3.52 | FC | 3.15 | 1.36 | 51 | alkyl silicate | 16 | Spraying | very good |
| Inv. Example 2045 | 0.05 | FC | 5.2 | 1.33 | 53 | urethane-based resin | 20 | Brushing | very good |

(*1) F: Fracture facets existing, FC: Fracture facets and/or cracks existing, NO: No fracture facet and/or crack

TABLE 14

| | Zn-Alloy Particle Properties | | | | Coat Properties | | | | |
|---|---|---|---|---|---|---|---|---|---|
| | Mg (mass %) | Fracture Facet &/or Cracks (*1) | Mean Size (μm) | Average Value of Aspect Ratio | Ratio of Metal Particle in Dry Coat (mass %) | Base Resin | Coat Thickness (μm) | Coating Method | Result of Corrosion Test |
| Inv. Example 2046 | 0.04 | FC | 1.9 | 1.27 | 60 | polyester resin | 200 | Brushing | very good |
| Inv. Example 2047 | 0.06 | FC | 10.5 | 1.12 | 77 | alkyl silicate | 25 | Spraying | very good |
| Inv. Example 2048 | 0.05 | FC | 12.5 | 1.23 | 43 | alkali silicate | 14 | Spraying | very good |
| Inv. Example 2049 | 0.07 | FC | 18.5 | 1.36 | 52 | urethane-based resin | 112 | Spraying | very good |
| Inv. Example 2050 | 0.01 | FC | 11.5 | 1.11 | 66 | alkali silicate | 24 | Spraying | very good |
| Inv. Example 2051 | 0.08 | FC | 9.6 | 1.07 | 72 | urethane-based resin | 150 | Spraying | very good |
| Inv. Example 2052 | 0.09 | FC | 8.5 | 1.42 | 40 | alkali silicate | 18 | Spraying | very good |
| Inv. Example 2053 | 4.25 | FC | 2.36 | 1.33 | 44 | alkyl silicate | 18 | Spraying | very good |
| Inv. Example 2054 | 0.04 | FC | 23.5 | 1.42 | 44 | alkali silicate | 38 | Spraying | very good |
| Inv. Example 2055 | 0.06 | FC | 101.5 | 1.38 | 36 | alkyl silicate | 18 | Spraying | very good |
| Inv. Example 2056 | 0.06 | FC | 55.4 | 1.38 | 76 | alkyl silicate | 10 | Spraying | very good |
| Inv. Example 2057 | 0.07 | FC | 10.5 | 1.12 | 77 | alkyl silicate | 37 | Spraying | very good |
| Inv. Example 2058 | 0.01 | FC | 12.5 | 1.23 | 43 | alkali silicate | 2 | Spraying | good |
| Inv. Example 2059 | 0.08 | FC | 18.5 | 1.36 | 52 | alkyl silicate | 160 | Brushing | very good |
| Inv. Example 2060 | 0.09 | FC | 11.5 | 1.11 | 66 | alkali silicate | 5 | Brushing | very good |
| Inv. Example 2061 | 0.05 | FC | 9.6 | 1.07 | 72 | alkyl silicate | 56 | Brushing | very good |
| Inv. Example 2062 | 0.06 | FC | 10.05 | 1.14 | 53 | urethane-based resin | 99 | Spraying | very good |
| Inv. Example 2063 | 29.9 | FC | 10.5 | 1.36 | 55 | urethane-based resin | 700 | Spraying | very good |
| Inv. Example 2064 | 16.5 | FC | 7.5 | 1.11 | 47 | alkyl silicate | 554 | Spraying | very good |
| Inv. Example 2065 | 12.5 | FC | 2.6 | 1.07 | 79 | urethane-based resin | 688 | Brushing | very good |
| Inv. Example 2066 | 9.8 | FC | 3.5 | 1.42 | 42 | urethane-based resin | 421 | Spraying | very good |
| Inv. Example 2067 | 9.6 | FC | 4.5 | 1.33 | 36 | urethane-based resin | 651 | Spraying | very good |
| Inv. Example 2068 | 7.5 | FC | 1.6 | 1.42 | 53 | urethane-based resin | 402 | Brushing | very good |
| Inv. Example 2069 | 4.6 | FC | 2.5 | 1.12 | 55 | alkali silicate | 354 | Spraying | very good |
| Inv. Example 2070 | 3.8 | FC | 23.5 | 1.23 | 42 | urethane-based resin | 504 | Brushing | very good |
| Inv. Example 2071 | 0.05 | FC | 9.8 | 1.27 | 76 | urethane-based resin | 666 | Spraying | very good |

(*1) F: Fracture facets existing, FC: Fracture facets and/or cracks existing, NO: No fracture facet and/or crack Example 2

Zn alloy particles further containing one or both of Al and Si were produced as shown by the chemical ingredients in Tables 15 to 26. The rest is the same as Example 1.

From Tables 15 to 26, it is learned that the painting test pieces using the Zn alloy particles of the present invention exhibit superior corrosion resistance both with inorganic-based binders and organic-based binders.

TABLE 15

| | Zn-Alloy Particle Properties | | | | | | Coat Properties | | | |
|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Ratio of Metal Particle in Dry Coat (mass %) | Base Resin | Coat Thickness (μm) | Coating Method | Result of Corrosion Test |
| Inv. Example 70 | 12.3 | F | 0.02 | 1.05 | 0.1 | 0.07 | 35 | alkali silicate | 2 | Spraying | very good |
| Inv. Example 71 | 0.8 | F | 27.89 | 1.12 | 0.04 | 0.1 | 77 | alkyl silicate | 37 | Spraying | very good |
| Inv. Example 72 | 1.0 | F | 0.32 | 1.23 | 30.0 | 0.01 | 43 | alkali silicate | 2 | Spraying | good |
| Inv. Example 73 | 2.3 | F | 158.96 | 1.36 | 0.02 | 3 | 52 | alkyl silicate | 160 | Brushing | very good |
| Inv. Example 74 | 15.6 | F | 1.05 | 1.11 | 8.02 | 2.04 | 66 | alkali silicate | 5 | Brushing | very good |
| Inv. Example 75 | 6.7 | F | 36.47 | 1.07 | 15.6 | 1.27 | 72 | alkyl silicate | 56 | Brushing | very good |
| Inv. Example 76 | 7.5 | F | 0.51 | 1.42 | 10.4 | 0.57 | 40 | alkali silicate | 2 | Spraying | very good |
| Inv. Example 77 | 8.4 | F | 7.72 | 1.38 | 4.65 | 2.67 | 36 | alkyl silicate | 18 | Spraying | very good |
| Inv. Example 78 | 9.3 | F | 8.32 | 1.22 | 24.8 | 2.4 | 32 | alkyl silicate | 23 | Spraying | very good |
| Inv. Example 79 | 10.4 | F | 10.05 | 1.14 | 4.52 | 0.57 | 53 | epoxy-based resin | 30 | Brushing | very good |
| Inv. Example 80 | 11.2 | F | 60.08 | 1.13 | 17.5 | 2.45 | 67 | acryl-based resin | 77 | Brushing | very good |
| Inv. Example 81 | 11.7 | F | 17.89 | 1.02 | 745 | 1.75 | 72 | urethane-based resin | 54 | Brushing | very good |
| Inv. Example 82 | 21.5 | F | 19.54 | 1.06 | 11.05 | 0.23 | 77 | polyester resin | 47 | Spraying | very good |
| Inv. Example 83 | 13.4 | F | 21.08 | 1.05 | 2.65 | 0.74 | 34 | epoxy-based resin | 43 | Spraying | very good |
| Inv. Example 84 | 14.6 | F | 23.04 | 1.24 | 6.45 | 2.14 | 43 | acryl-based resin | 52 | Brushing | very good |
| Inv. Example 85 | 25.8 | F | 9.02 | 1.33 | 27.6 | 2.4 | 53 | urethane-based resin | 20 | Brushing | very good |
| Inv. Example 86 | 16.7 | F | 194.23 | 1.27 | 4.32 | 1.07 | 60 | polyester resin | 200 | Brushing | very good |

(*1) F: Fracture facets existing, FC: Fracture facets and/or cracks existing, NO: No fracture facet and/or crack

TABLE 16

| | Zn-Alloy Particle Properties | | | | | | Coat Properties | | | | |
|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Ratio of Metal Particle in Dry Coat (mass %) | Base Resin | Coat Thickness (μm) | Coating Method | Result of Corrosion Test |
| Inv. Example 584 | 0.15 | FC | 0.02 | 1.05 | 0.1 | 0.07 | 35 | alkali silicate | 2 | Spraying | very good |
| Inv. Example 585 | 0.19 | FC | 10.5 | 1.12 | 0.04 | 0.1 | 77 | alkyl silicate | 37 | Spraying | very good |
| Inv. Example 586 | 0.18 | FC | 12.5 | 1.23 | 30.0 | 0.01 | 43 | alkali silicate | 2 | Spraying | good |
| Inv. Example 587 | 0.11 | FC | 18.5 | 1.36 | 0.02 | 3 | 52 | alkyl silicate | 160 | Brushing | very good |
| Inv. Example 588 | 0.15 | FC | 11.5 | 1.11 | 0 | 0 | 66 | alkali silicate | 5 | Brushing | very good |
| Inv. Example 589 | 0.24 | FC | 9.6 | 1.07 | 0 | 0 | 72 | alkyl silicate | 56 | Brushing | very good |
| Inv. Example 590 | 0.18 | FC | 8.5 | 1.42 | 10.4 | 0.57 | 40 | alkali silicate | 2 | Spraying | very good |
| Inv. Example 591 | 0.12 | FC | 7.72 | 1.38 | 4.65 | 2.67 | 36 | alkyl silicate | 18 | Spraying | very good |
| Inv. Example 592 | 0.19 | FC | 8.32 | 1.22 | 24.8 | 2.4 | 32 | alkyl silicate | 23 | Spraying | very good |
| Inv. Example 593 | 0.18 | FC | 10.05 | 1.14 | 4.52 | 0.57 | 53 | epoxy-based resin | 30 | Brushing | very good |
| Inv. Example 594 | 0.21 | FC | 10.6 | 1.13 | 17.5 | 2.45 | 67 | acryl-based resin | 77 | Brushing | very good |
| Inv. Example 595 | 0.76 | FC | 5.7 | 1.02 | 0 | 0 | 72 | urethane-based resin | 54 | Brushing | very good |
| Inv. Example 596 | 0.11 | FC | 6.4 | 1.06 | 11.05 | 0.23 | 77 | polyester resin | 47 | Spraying | very good |
| Inv. Example 597 | 0.14 | FC | 3.2 | 1.05 | 2.65 | 0.74 | 34 | epoxy-based resin | 43 | Spraying | very good |
| Inv. Example 598 | 15 | FC | 4.5 | 1.24 | 6.45 | 2.14 | 43 | acryl-based resin | 52 | Brushing | very good |
| Inv. Example 599 | 14.5 | FC | 5.2 | 1.33 | 0 | 0 | 53 | urethane-based resin | 20 | Brushing | very good |
| Inv. Example 600 | 18.5 | FC | 1.9 | 1.27 | 0 | 0 | 60 | polyester resin | 200 | Brushing | very good |
| Inv. Example 601 | 15.1 | FC | 0.02 | 1.05 | 0.05 | 0.03 | 35 | alkali silicate | 22 | Spraying | very good |
| Inv. Example 602 | 15.6 | FC | 10.5 | 1.12 | 0 | 0.08 | 77 | alkyl silicate | 25 | Spraying | very good |
| Inv. Example 603 | 12.5 | FC | 12.5 | 1.23 | 0.05 | 0 | 43 | alkali silicate | 14 | Spraying | very good |
| Inv. Example 604 | 18.7 | FC | 18.5 | 1.36 | 0.44 | 0.07 | 52 | urethane-based resin | 112 | Spraying | very good |
| Inv. Example 605 | 14.5 | FC | 11.5 | 1.11 | 0.08 | 0.07 | 66 | alkali silicate | 24 | Spraying | very good |
| Inv. Example 606 | 7.5 | FC | 9.6 | 1.07 | 0.1 | 0.2 | 72 | urethane-based resin | 150 | Spraying | very good |
| Inv. Example 607 | 4.5 | FC | 8.5 | 1.42 | 0 | 0 | 40 | alkali silicate | 18 | Spraying | very good |
| Inv. Example 608 | 1.5 | FC | 7.72 | 1.38 | 0 | 0 | 36 | alkyl silicate | 19 | Brushing | very good |
| Inv. Example 609 | 4.8 | FC | 8.32 | 1.22 | 0 | 0.07 | 32 | alkyl silicate | 24 | Spraying | very good |

(*1) F: Fracture facets existing, FC: Fracture facets and/or cracks existing, NO: No fracture facet and/or crack

TABLE 17

| | Zn-Alloy Particle Properties | | | | | | Coat Properties | | | | |
|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Ratio of Metal Particle in Dry Coat (mass %) | Base Resin | Coat Thickness (μm) | Coating Method | Result of Corrosion Test |
| Inv. Example 610 | 9.6 | FC | 10.05 | 1.14 | 0 | 0.02 | 53 | urethane-based resin | 99 | Spraying | very good |
| Inv. Example 611 | 11.5 | FC | 10.6 | 1.13 | 25.8 | 0.05 | 67 | alkyl silicate | 7 | Spraying | very good |
| Inv. Example 612 | 9.8 | FC | 5.7 | 1.02 | 22.1 | 0 | 72 | epoxy-based resin | 100 | Spraying | very good |
| Inv. Example 613 | 7.6 | FC | 6.4 | 1.06 | 21.5 | 0.05 | 77 | alkyl silicate | 27 | Brushing | very good |
| Inv. Example 614 | 3.2 | FC | 3.2 | 1.05 | 0.05 | 2.29 | 34 | alkali silicate | 15 | Spraying | very good |
| Inv. Example 615 | 1.9 | FC | 4.5 | 1.24 | 0.05 | 0.03 | 43 | alkyl silicate | 14 | Spraying | very good |
| Inv. Example 616 | 11.5 | FC | 5.2 | 1.33 | 0 | 0.08 | 53 | urethane-based resin | 55 | Spraying | very good |
| Inv. Example 617 | 8.7 | FC | 1.9 | 1.27 | 0 | 0 | 35 | alkyl silicate | 8 | Spraying | very good |
| Inv. Example 618 | 9.6 | FC | 0.02 | 1.05 | 0 | 0 | 77 | urethane-based resin | 122 | Brushing | very good |
| Inv. Example 619 | 9.4 | FC | 10.5 | 1.12 | 0.08 | 0.07 | 43 | alkyl silicate | 54 | Spraying | very good |
| Inv. Example 620 | 10.5 | FC | 12.5 | 1.23 | 0.1 | 0.2 | 52 | alkali silicate | 19 | Spraying | very good |
| Inv. Example 621 | 12.6 | FC | 18.5 | 1.36 | 0.05 | 0.2 | 66 | alkyl silicate | 25 | Brushing | very good |
| Inv. Example 622 | 29.5 | FC | 11.5 | 1.11 | 0.07 | 0 | 72 | alkyl silicate | 58 | Spraying | very good |
| Inv. Example 623 | 29.4 | FC | 9.6 | 1.07 | 0 | 0.07 | 40 | alkyl silicate | 21 | Spraying | very good |
| Inv. Example 624 | 27.5 | FC | 8.5 | 1.42 | 0 | 0.02 | 36 | alkali silicate | 19 | Brushing | very good |
| Inv. Example 625 | 0.8 | FC | 7.72 | 1.38 | 25.8 | 0.05 | 32 | urethane-based resin | 56 | Spraying | very good |
| Inv. Example 626 | 1.6 | FC | 8.32 | 1.22 | 22.1 | 0 | 53 | alkyl silicate | 77 | Spraying | very good |
| Inv. Example 627 | 22.9 | FC | 10.05 | 1.14 | 21.5 | 0.05 | 67 | alkyl silicate | 54 | Spraying | very good |
| Inv. Example 628 | 28.5 | FC | 10.6 | 1.13 | 0.05 | 2.29 | 72 | alkyl silicate | 64 | Spraying | very good |
| Inv. Example 629 | 29.5 | FC | 5.7 | 1.02 | 0.1 | 0.2 | 77 | alkali silicate | 34 | Brushing | very good |
| Inv. Example 630 | 18.7 | FC | 6.4 | 1.06 | 0.05 | 0.2 | 34 | alkali silicate | 28 | Spraying | very good |
| Inv. Example 631 | 19.5 | FC | 3.2 | 1.05 | 0.07 | 0 | 43 | urethane-based resin | 109 | Brushing | very good |
| Inv. Example 632 | 20.4 | FC | 4.5 | 1.24 | 0 | 0.07 | 53 | alkyl silicate | 15 | Spraying | very good |
| Inv. Example 633 | 0.6 | FC | 5.2 | 1.33 | 0 | 0.02 | 72 | alkyl silicate | 14 | Spraying | very good |
| Inv. Example 634 | 0.8 | FC | 1.9 | 1.27 | 22.1 | 0 | 77 | alkyl silicate | 18 | Spraying | very good |
| Inv. Example 635 | 22.5 | FC | 0.02 | 1.05 | 0.1 | 0.07 | 35 | alkali silicate | 2 | Spraying | very good |

(*1) F: Fracture facets existing, FC: Fracture facets and/or cracks existing, NO: No fracture facet and/or crack

TABLE 18

| | Zn-Alloy Particle Properties | | | | | | Coat Properties | | | | |
| --- | --- | --- | --- | --- | --- | --- | --- | --- | --- | --- | --- |
| | Mg (mass %) | Fracture Facet &/or Cracks (*1) | Mean Size (μm) | Average Value of Aspect Ratio | Al (mass %) | Si (mass %) | Ratio of Metal Particle in Dry Coat (mass %) | Base Resin | Coat Thickness (μm) | Coating Method | Result of Corrosion Test |
| Inv. Example 636 | 20.6 | FC | 10.5 | 1.12 | 0.04 | 0.1 | 77 | alkyl silicate | 37 | Spraying | very good |
| Inv. Example 637 | 21.6 | FC | 12.5 | 1.23 | 30.0 | 0.01 | 43 | alkali silicate | 2 | Spraying | good |
| Inv. Example 638 | 20.8 | FC | 7.72 | 1.38 | 0 | 0 | 52 | alkyl silicate | 160 | Brushing | very good |
| Inv. Example 639 | 23.6 | FC | 8.32 | 1.22 | 0 | 0 | 66 | alkali silicate | 5 | Brushing | very good |
| Inv. Example 640 | 24.5 | FC | 10.05 | 1.14 | 4.52 | 0.57 | 72 | alkyl silicate | 56 | Brushing | very good |
| Inv. Example 641 | 18.6 | FC | 10.6 | 1.13 | 17.5 | 2.45 | 40 | alkali silicate | 2 | Spraying | very good |
| Inv. Example 642 | 17.8 | FC | 5.2 | 1.33 | 27.6 | 2.4 | 36 | alkyl silicate | 18 | Spraying | very good |
| Inv. Example 643 | 16.5 | FC | 1.9 | 1.27 | 4.32 | 1.07 | 32 | alkyl silicate | 23 | Spraying | very good |
| Inv. Example 644 | 14.5 | FC | 0.02 | 1.05 | 0.05 | 0.03 | 53 | epoxy-based resin | 30 | Brushing | very good |
| Inv. Example 645 | 19 | FC | 10.5 | 1.12 | 0 | 0.08 | 67 | acryl-based resin | 77 | Brushing | very good |
| Inv. Example 646 | 15 | FC | 12.5 | 1.23 | 0.05 | 0 | 72 | urethane-based resin | 54 | Brushing | very good |
| Inv. Example 647 | 16.4 | FC | 18.5 | 1.36 | 0.44 | 0.07 | 77 | polyester resin | 47 | Spraying | very good |
| Inv. Example 648 | 13.5 | FC | 11.5 | 1.11 | 0.08 | 0.07 | 34 | epoxy-based resin | 43 | Spraying | very good |
| Inv. Example 649 | 10.6 | FC | 11.5 | 1.11 | 8.02 | 2.04 | 43 | acryl-based resin | 52 | Brushing | very good |
| Inv. Example 650 | 10.7 | FC | 9.6 | 1.07 | 15.6 | 1.27 | 53 | urethane-based resin | 20 | Brushing | very good |
| Inv. Example 651 | 10.9 | FC | 8.5 | 1.42 | 10.4 | 0.57 | 60 | polyester resin | 200 | Brushing | very good |
| Inv. Example 652 | 11.6 | FC | 7.72 | 1.38 | 4.65 | 2.67 | 35 | alkali silicate | 22 | Spraying | very good |
| Inv. Example 653 | 14.7 | FC | 8.32 | 1.22 | 24.8 | 2.4 | 77 | alkyl silicate | 25 | Spraying | very good |
| Inv. Example 654 | 19.5 | FC | 10.05 | 1.14 | 4.52 | 0.57 | 43 | alkali silicate | 14 | Spraying | very good |
| Inv. Example 655 | 10.2 | FC | 10.6 | 1.13 | 0 | 0 | 52 | urethane-based resin | 112 | Spraying | very good |
| Inv. Example 656 | 4 | FC | 5.7 | 1.02 | 0 | 0 | 66 | alkali silicate | 24 | Spraying | very good |
| Inv. Example 657 | 7.2 | FC | 6.4 | 1.06 | 11.05 | 0.23 | 72 | urethane-based resin | 150 | Spraying | very good |
| Inv. Example 658 | 3.6 | FC | 3.2 | 1.05 | 2.65 | 0.74 | 40 | alkali silicate | 18 | Spraying | very good |
| Inv. Example 659 | 26.9 | FC | 4.5 | 1.24 | 6.45 | 2.14 | 36 | alkyl silicate | 19 | Brushing | very good |
| Inv. Example 660 | 27.9 | FC | 5.2 | 1.33 | 27.6 | 2.4 | 32 | alkyl silicate | 24 | Spraying | very good |
| Inv. Example 661 | 28.9 | FC | 1.9 | 1.27 | 4.32 | 1.07 | 53 | urethane-based resin | 99 | Spraying | very good |

(*1) F: Fracture facets existing, FC: Fracture facets and/or cracks existing, NO: No fracture facet and/or crack

TABLE 19

| | Zn-Alloy Particle Properties | | | | | | Coat Properties | | | | |
| --- | --- | --- | --- | --- | --- | --- | --- | --- | --- | --- | --- |
| | Mg (mass %) | Fracture Facet &/or Cracks (*1) | Mean Size (μm) | Average Value of Aspect Ratio | Al (mass %) | Si (mass %) | Ratio of Metal Particle in Dry Coat (mass %) | Base Resin | Coat Thickness (μm) | Coating Method | Result of Corrosion Test |
| Inv. Example 662 | 23.8 | FC | 0.02 | 1.05 | 0.05 | 0.03 | 67 | alkyl silicate | 7 | Spraying | very good |
| Inv. Example 663 | 26.8 | FC | 10.5 | 1.12 | 0 | 0.08 | 72 | epoxy-based resin | 100 | Spraying | very good |
| Inv. Example 664 | 25.6 | FC | 12.5 | 1.23 | 0.05 | 0 | 77 | alkyl silicate | 27 | Brushing | very good |
| Inv. Example 665 | 29.8 | FC | 18.5 | 1.36 | 0.44 | 0.07 | 34 | alkali silicate | 15 | Spraying | very good |
| Inv. Example 666 | 18.9 | FC | 11.5 | 1.11 | 0.08 | 0.07 | 43 | alkyl silicate | 14 | Spraying | very good |
| Inv. Example 667 | 5.6 | FC | 9.6 | 1.07 | 0.1 | 0.2 | 53 | urethane-based resin | 55 | Spraying | very good |
| Inv. Example 668 | 4.7 | FC | 8.5 | 1.42 | 0.05 | 0.2 | 35 | alkyl silicate | 8 | Spraying | very good |
| Inv. Example 669 | 6.8 | FC | 7.72 | 1.38 | 0.07 | 0 | 77 | urethane-based resin | 122 | Brushing | very good |
| Inv. Example 670 | 9 | FC | 8.32 | 1.22 | 0 | 0.07 | 43 | alkyl silicate | 54 | Spraying | very good |
| Inv. Example 671 | 2.1 | FC | 10.05 | 1.14 | 0 | 0.02 | 52 | alkali silicate | 19 | Spraying | very good |
| Inv. Example 672 | 4.8 | FC | 10.6 | 1.13 | 0 | 0 | 66 | alkyl silicate | 25 | Brushing | very good |
| Inv. Example 673 | 4.2 | FC | 5.7 | 1.02 | 0 | 0 | 72 | alkyl silicate | 58 | Spraying | very good |
| Inv. Example 674 | 4.3 | FC | 6.4 | 1.06 | 21.5 | 0.05 | 40 | alkyl silicate | 21 | Spraying | very good |
| Inv. Example 675 | 4 | FC | 3.2 | 1.05 | 0.05 | 2.29 | 36 | alkali silicate | 19 | Brushing | very good |
| Inv. Example 676 | 3.7 | FC | 4.5 | 1.24 | 0.05 | 0.03 | 32 | urethane-based resin | 56 | Spraying | very good |
| Inv. Example 677 | 6.4 | FC | 5.2 | 1.33 | 0 | 0.08 | 53 | alkyl silicate | 77 | Spraying | very good |
| Inv. Example 678 | 6.9 | FC | 1.9 | 1.27 | 0.05 | 0 | 67 | alkyl silicate | 54 | Spraying | very good |
| Inv. Example 679 | 16.9 | FC | 0.02 | 1.05 | 0.44 | 0.07 | 72 | alkyl silicate | 64 | Spraying | very good |
| Inv. Example 680 | 18.7 | FC | 10.5 | 1.12 | 0.08 | 0.07 | 77 | alkyl silicate | 34 | Brushing | very good |
| Inv. Example 681 | 24.4 | FC | 12.5 | 1.23 | 0.1 | 0.2 | 34 | alkali silicate | 28 | Spraying | very good |
| Inv. Example 682 | 10.6 | FC | 18.5 | 1.36 | 0 | 0 | 43 | urethane-based resin | 109 | Brushing | very good |
| Inv. Example 683 | 15.8 | FC | 11.5 | 1.11 | 0 | 0 | 53 | alkyl silicate | 15 | Spraying | very good |
| Inv. Example 684 | 19.5 | FC | 9.6 | 1.07 | 0 | 0.07 | 72 | alkyl silicate | 14 | Spraying | very good |
| Inv. Example 685 | 7.8 | FC | 8.5 | 1.42 | 0 | 0.02 | 77 | alkyl silicate | 18 | Spraying | very good |
| Inv. Example 686 | 4.9 | FC | 7.72 | 1.38 | 25.8 | 0.05 | 77 | urethane-based resin | 122 | Brushing | very good |
| Inv. Example 687 | 10.8 | FC | 8.32 | 1.22 | 22.1 | 0 | 43 | alkyl silicate | 54 | Spraying | very good |

(*1) F: Fracture facets existing, FC: Fracture facets and/or cracks existing, NO: No fracture facet and/or crack

TABLE 20

| | Zn-Alloy Particle Properties | | | | | Coat Properties | | | | |
|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Ratio of Metal Particle in Dry Coat (mass %) | Base Resin | Coat Thickness (μm) | Coating Method | Result of Corrosion Test |
| Inv. Example 688 | 3.8 | FC | 10.05 | 1.14 | 21.5 | 0.05 | 52 | alkali silicate | 19 | Spraying | very good |
| Inv. Example 689 | 22.6 | FC | 10.6 | 1.13 | 0.05 | 2.29 | 66 | alkyl silicate | 25 | Brushing | very good |
| Inv. Example 690 | 27.9 | FC | 5.7 | 1.02 | 0 | 0 | 72 | alkyl silicate | 58 | Spraying | very good |
| Inv. Example 691 | 24.8 | FC | 6.4 | 1.06 | 0 | 0 | 40 | alkyl silicate | 21 | Spraying | very good |
| Inv. Example 692 | 26.8 | FC | 3.2 | 1.05 | 0.07 | 0 | 36 | alkali silicate | 19 | Brushing | very good |
| Inv. Example 693 | 25.9 | FC | 4.5 | 1.24 | 0 | 0.07 | 32 | urethane-based resin | 56 | Spraying | very good |
| Inv. Example 694 | 9.8 | FC | 5.2 | 1.33 | 0 | 0.02 | 53 | alkyl silicate | 77 | Spraying | very good |
| Inv. Example 695 | 5.6 | FC | 1.9 | 1.27 | 22.1 | 0 | 67 | alkyl silicate | 54 | Spraying | very good |
| Inv. Example 696 | 12.3 | FC | 0.02 | 1.05 | 1.24 | 1.8 | 52 | alkali silicate | 2 | Spraying | very good |
| Inv. Example 697 | 0.8 | FC | 27.89 | 1.12 | 1.24 | 0.9 | 55 | alkali silicate | 20 | Spraying | very good |
| Inv. Example 698 | 1 | FC | 0.32 | 1.23 | 0.8 | 0.7 | 69 | alkali silicate | 5 | Spraying | very good |
| Inv. Example 699 | 2.3 | FC | 11.44 | 1.36 | 0 | 1.8 | 78 | alkyl silicate | 20 | Spraying | very good |
| Inv. Example 700 | 15.6 | FC | 1.05 | 1.11 | 1.1 | 2.41 | 42 | alkali silicate | 15 | Brushing | very good |
| Inv. Example 701 | 6.7 | FC | 36.47 | 1.07 | 1.8 | 0.08 | 32 | alkyl silicate | 57 | Brushing | very good |
| Inv. Example 702 | 7.5 | FC | 5.07 | 1.42 | 3.8 | 2.23 | 66 | alkyl silicate | 13 | Brushing | very good |
| Inv. Example 703 | 8.4 | FC | 7.72 | 1.38 | 2.9 | 0.06 | 67 | alkyl silicate | 22 | Brushing | very good |
| Inv. Example 704 | 9.3 | FC | 8.32 | 1.22 | 10.5 | 0.02 | 64 | alkali silicate | 20 | Spraying | very good |
| Inv. Example 705 | 10.4 | FC | 10.05 | 1.14 | 2.9 | 0.02 | 74 | alkyl silicate | 27 | Spraying | very good |
| Inv. Example 706 | 11.2 | FC | 6.08 | 1.13 | 16.8 | 1.37 | 82 | alkali silicate | 15 | Spraying | very good |
| Inv. Example 707 | 11.7 | FC | 17.89 | 1.02 | 0 | 2.43 | 37 | alkyl silicate | 35 | Spraying | very good |
| Inv. Example 708 | 21.5 | FC | 19.54 | 1.06 | 3.6 | 0.02 | 42 | alkyl silicate | 34 | Brushing | very good |
| Inv. Example 709 | 13.4 | FC | 21.08 | 1.05 | 2.1 | 1.5 | 66 | alkyl silicate | 45 | Brushing | very good |
| Inv. Example 710 | 14.6 | FC | 23.04 | 1.24 | 0.06 | 1.3 | 48 | alkali silicate | 52 | Brushing | very good |
| Inv. Example 711 | 25.8 | FC | 9.21 | 1.33 | 0.02 | 1.8 | 33 | alkyl silicate | 23 | Brushing | very good |
| Inv. Example 712 | 16.7 | FC | 0.12 | 1.27 | 1.6 | 0.9 | 75 | alkali silicate | 5 | Spraying | very good |
| Inv. Example 713 | 17.3 | FC | 29.24 | 1.37 | 3.5 | 0 | 77 | alkyl silicate | 52 | Brushing | very good |

(*1) F: Fracture facets existing, FC: Fracture facets and/or cracks existing, NO: No fracture facet and/or crack

TABLE 21

| | Zn-Alloy Particle Properties | | | | | Coat Properties | | | | |
|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Ratio of Metal Particle in Dry Coat (mass %) | Base Resin | Coat Thickness (μm) | Coating Method | Result of Corrosion Test |
| Inv. Example 714 | 18.5 | FC | 128.74 | 1.10 | 9.8 | 1.8 | 66 | alkali silicate | 150 | Brushing | very good |
| Inv. Example 715 | 19.3 | FC | 33.57 | 1.04 | 11.5 | 0.7 | 67 | alkyl silicate | 60 | Brushing | very good |
| Inv. Example 716 | 3.5 | FC | 3.04 | 1.02 | 0.4 | 1.5 | 45 | alkali silicate | 15 | Spraying | very good |
| Inv. Example 717 | 22.5 | FC | 7.54 | 1.01 | 0.6 | 1.3 | 48 | alkyl silicate | 24 | Spraying | very good |
| Inv. Example 718 | 23.7 | FC | 6.81 | 1.08 | 10.6 | 1.8 | 68 | alkali silicate | 34 | Brushing | very good |
| Inv. Example 719 | 24.2 | FC | 5.25 | 1.14 | 9.5 | 0 | 35 | alkyl silicate | 20 | Brushing | very good |
| Inv. Example 720 | 0.2 | FC | 194.23 | 1.23 | 11.04 | 0.7 | 37 | alkali silicate | 200 | Brushing | very good |
| Inv. Example 721 | 27.1 | FC | 28.74 | 1.33 | 0.01 | 1.8 | 38 | alkyl silicate | 56 | Brushing | very good |
| Inv. Example 722 | 29.3 | FC | 13.57 | 1.37 | 0.07 | 0.7 | 41 | alkali silicate | 34 | Spraying | very good |
| Inv. Example 723 | 0.5 | FC | 0.65 | 1.44 | 1.8 | 1.5 | 54 | alkyl silicate | 2 | Spraying | very good |
| Inv. Example 724 | 2.7 | FC | 4.12 | 1.21 | 0 | 1.3 | 57 | alkali silicate | 15 | Spraying | very good |
| Inv. Example 725 | 28.4 | FC | 0.72 | 1.22 | 2.9 | 1.8 | 59 | alkali silicate | 10 | Spraying | very good |
| Inv. Example 726 | 8.7 | FC | 117.54 | 1.23 | 10.5 | 0.9 | 64 | alkyl silicate | 125 | Brushing | very good |
| Inv. Example 727 | 9.2 | FC | 7.81 | 1.47 | 2.9 | 0.7 | 66 | alkali silicate | 24 | Brushing | very good |
| Inv. Example 728 | 17.8 | FC | 80.25 | 1.01 | 16.8 | 1.8 | 67 | alkali silicate | 110 | Brushing | very good |
| Inv. Example 729 | 20.2 | FC | 8.47 | 1.04 | 2.7 | 0.7 | 34 | alkali silicate | 24 | Brushing | very good |
| Inv. Example 730 | 0.4 | FC | 0.87 | 1.05 | 0.04 | 0.7 | 54 | alkyl silicate | 2 | Spraying | very good |
| Inv. Example 731 | 13.7 | FC | 25.78 | 1.12 | 0 | 0.04 | 62 | alkali silicate | 37 | Spraying | very good |
| Inv. Example 732 | 14.7 | FC | 93.45 | 1.11 | 1.24 | 0.05 | 66 | alkali silicate | 113 | Brushing | very good |
| Inv. Example 733 | 2.4 | FC | 0.97 | 1.08 | 0.05 | 1.24 | 67 | alkali silicate | 2 | Spraying | very good |
| Inv. Example 734 | 4.5 | FC | 54.89 | 1.47 | 1.24 | 0.06 | 68 | alkyl silicate | 75 | Brushing | very good |
| Inv. Example 735 | 0.1 | FC | 10.81 | 1.50 | 1.24 | 0.07 | 33 | alkali silicate | 30 | Brushing | very good |
| Inv. Example 736 | 30.0 | FC | 18.24 | 1.13 | 0 | 0.75 | 35 | alkyl silicate | 34 | Brushing | very good |
| Inv. Example 737 | 24.5 | FC | 114.78 | 1.04 | 0.9 | 1.5 | 43 | epoxy-based resin | 124 | Brushing | very good |
| Inv. Example 738 | 27.6 | FC | 3.87 | 1.02 | 0.03 | 1.3 | 44 | acryl-based resin | 15 | Spraying | very good |
| Inv. Example 739 | 4.1 | FC | 11.94 | 1.08 | 10.5 | 1.8 | 43 | urethane-based resin | 23 | Spraying | very good |

(*1) F: Fracture facets existing, FC: Fracture facets and/or cracks existing, NO: No fracture facet and/or crack

TABLE 22

| | Zn-Alloy Particle Properties | | | | | | Coat Properties | | | | |
| --- | --- | --- | --- | --- | --- | --- | --- | --- | --- | --- | --- |
| | Mg (mass %) | Fracture Facet &/or Cracks (*1) | Mean Size (μm) | Average Value of Aspect Ratio | Al (mass %) | Si (mass %) | Ratio of Metal Particle in Dry Coat (mass %) | Base Resin | Coat Thickness (μm) | Coating Method | Result of Corrosion Test |
| Inv. Example 740 | 3.2 | FC | 142.58 | 1.15 | 2.9 | 0.9 | 44 | polyester resin | 157 | Brushing | very good |
| Inv. Example 741 | 2.7 | FC | 12.5 | 1.34 | 16.8 | 0.7 | 54 | epoxy-based resin | 26 | Spraying | very good |
| Inv. Example 742 | 0.12 | FC | 31.24 | 1.25 | 2.7 | 1.8 | 79 | acryl-based resin | 38 | Spraying | very good |
| Inv. Example 743 | 0.22 | FC | 152.46 | 1.19 | 0.02 | 0.7 | 73 | urethane-based resin | 160 | Brushing | very good |
| Inv. Example 744 | 0.37 | FC | 13.4 | 1.18 | 0 | 1.5 | 69 | polyester resin | 27 | Brushing | very good |
| Inv. Example 745 | 1.4 | FC | 160.57 | 1.24 | 7.42 | 1.3 | 63 | epoxy-based resin | 180 | Brushing | very good |
| Inv. Example 746 | 4.2 | FC | 14.1 | 1.11 | 0.02 | 1.8 | 35 | acryl-based resin | 26 | Spraying | very good |
| Inv. Example 747 | 4.8 | FC | 167.55 | 1.27 | 0.04 | 0.9 | 35 | urethane-based resin | 180 | Brushing | very good |
| Inv. Example 748 | 8.1 | FC | 1.45 | 1.31 | 17.5 | 0 | 66 | polyester resin | 15 | Spraying | very good |
| Inv. Example 749 | 7.6 | FC | 0.15 | 1.26 | 0.01 | 1.8 | 67 | epoxy-based resin | 2 | Spraying | very good |
| Inv. Example 750 | 9.9 | FC | 13.1 | 1.14 | 0.02 | 0.7 | 68 | acryl-based resin | 28 | Spraying | very good |
| Inv. Example 751 | 14.8 | FC | 15.5 | 1.34 | 3.8 | 0 | 33 | urethane-based resin | 30 | Spraying | very good |
| Inv. Example 752 | 16.7 | FC | 0.67 | 1.16 | 2.9 | 0 | 35 | polyester resin | 2 | Spraying | very good |
| Inv. Example 753 | 17.9 | FC | 137.89 | 1.47 | 10.5 | 1.8 | 43 | epoxy-based resin | 157 | Brushing | very good |
| Inv. Example 754 | 19.5 | FC | 16.3 | 1.48 | 2.9 | 0.9 | 44 | acryl-based resin | 28 | Brushing | very good |
| Inv. Example 755 | 22.4 | FC | 110.38 | 1.49 | 16.8 | 0.7 | 42 | urethane-based resin | 130 | Brushing | very good |
| Inv. Example 756 | 0.17 | FC | 12.4 | 1.34 | 2.7 | 1.8 | 33 | polyester resin | 29 | Brushing | very good |
| Inv. Example 757 | 8.3 | FC | 17.2 | 1.29 | 0.02 | 0.7 | 30 | epoxy-based resin | 30 | Brushing | very good |
| Inv. Example 758 | 6.5 | FC | 105.23 | 1.18 | 0.02 | 0.7 | 35 | acryl-based resin | 120 | Brushing | very good |
| Inv. Example 759 | 9.7 | FC | 177.89 | 1.23 | 0.04 | 0.02 | 37 | urethane-based resin | 187 | Brushing | very good |
| Inv. Example 760 | 11.4 | FC | 12.2 | 1.27 | 0.05 | 0.02 | 77 | polyester resin | 28 | Spraying | very good |
| Inv. Example 761 | 22.5 | FC | 1.84 | 1.17 | 1.24 | 1.37 | 41 | epoxy-based resin | 5 | Spraying | very good |
| Inv. Example 762 | 25.7 | FC | 16.02 | 1.16 | 0.05 | 0.02 | 35 | acryl-based resin | 35 | Spraying | very good |
| Inv. Example 763 | 17.8 | FC | 1.75 | 1.49 | 1.24 | 1.37 | 58 | urethane-based resin | 5 | Spraying | very good |
| Inv. Example 764 | 0.14 | FC | 198.78 | 1.34 | 1.24 | 1.37 | 37 | polyester resin | 200 | Brushing | very good |
| Inv. Example 765 | 6.7 | FC | 13.1 | 1.16 | 0.8 | 1.5 | 68 | alkali silicate | 25 | Spraying | very good |

(*1) F: Fracture facets existing, FC: Fracture facets and/or cracks existing, NO: No fracture facet and/or crack

TABLE 23

| | Zn-Alloy Particle Properties | | | | | | Coat Properties | | | | |
| --- | --- | --- | --- | --- | --- | --- | --- | --- | --- | --- | --- |
| | Mg (mass %) | Fracture Facet &/or Cracks (*1) | Mean Size (μm) | Average Value of Aspect Ratio | Al (mass %) | Si (mass %) | Ratio of Metal Particle in Dry Coat (mass %) | Base Resin | Coat Thickness (μm) | Coating Method | Result of Corrosion Test |
| Inv. Example 766 | 7.5 | FC | 15.5 | 1.47 | 0.9 | 1.3 | 55 | alkali silicate | 15 | Spraying | very good |
| Inv. Example 767 | 8.4 | FC | 0.67 | 1.48 | 1.1 | 1.8 | 77 | alkyl silicate | 20 | Spraying | very good |
| Inv. Example 768 | 9.3 | FC | 12.2 | 1.49 | 1.8 | 0.9 | 43 | alkali silicate | 18 | Spraying | very good |
| Inv. Example 769 | 1.4 | FC | 1.84 | 1.34 | 3.8 | 0.7 | 45 | alkyl silicate | 22 | Spraying | very good |
| Inv. Example 770 | 4.2 | FC | 16.02 | 1.29 | 2.9 | 1.8 | 66 | alkali silicate | 19 | Spraying | very good |
| Inv. Example 771 | 4.8 | FC | 1.75 | 1.18 | 10.5 | 0.7 | 33 | alkali silicate | 29 | Spraying | very good |
| Inv. Example 772 | 8.1 | FC | 12.4 | 1.23 | 2.9 | 1.5 | 66 | alkali silicate | 23 | Spraying | very good |
| Inv. Example 773 | 7.6 | FC | 17.2 | 1.27 | 16.8 | 1.3 | 55 | alkali silicate | 21 | Spraying | very good |
| Inv. Example 774 | 9.9 | FC | 13.1 | 1.17 | 2.7 | 1.8 | 49 | alkali silicate | 19 | Spraying | very good |
| Inv. Example 775 | 0.4 | FC | 29.9 | 1.16 | 3.6 | 0.9 | 77 | alkali silicate | 15 | Spraying | very good |
| Inv. Example 776 | 10.5 | FC | 0.21 | 1.27 | 0 | 0.7 | 41 | alkali silicate | 18 | Spraying | very good |
| Inv. Example 777 | 0.4 | FC | 0.22 | 1.17 | 0.06 | 1.8 | 64 | alkyl silicate | 22 | Spraying | very good |
| Inv. Example 778 | 10.5 | FC | 29.5 | 1.27 | 0.02 | 0.7 | 58 | alkali silicate | 21 | Spraying | very good |
| Inv. Example 779 | 0.51 | FC | 29.9 | 1.18 | 1.6 | 1.5 | 33 | alkali silicate | 29 | Spraying | very good |
| Inv. Example 780 | 9.8 | FC | 0.21 | 1.23 | 3.5 | 0 | 66 | alkali silicate | 23 | Spraying | very good |
| Inv. Example 781 | 0.52 | FC | 0.22 | 1.27 | 9.8 | 1.8 | 55 | alkali silicate | 21 | Spraying | very good |
| Inv. Example 782 | 9.9 | FC | 29.5 | 1.17 | 11.5 | 0.9 | 49 | alkali silicate | 19 | Spraying | very good |
| Inv. Example 783 | 14.8 | FC | 16.02 | 1.48 | 0.4 | 0.7 | 77 | alkali silicate | 21 | Spraying | very good |
| Inv. Example 784 | 16.7 | FC | 1.75 | 1.49 | 0.6 | 1.8 | 43 | alkali silicate | 19 | Spraying | very good |
| Inv. Example 785 | 17.9 | FC | 12.4 | 1.34 | 10.6 | 0.7 | 45 | alkali silicate | 15 | Spraying | very good |
| Inv. Example 786 | 19.5 | FC | 17.2 | 1.29 | 9.5 | 0.7 | 66 | alkali silicate | 18 | Spraying | very good |
| Comp. Example 18 | 2.3 | FC | 205.6 | 1.23 | 0.07 | 0 | 75 | alkyl silicate | 25 | Spraying | poor |
| Comp. Example 19 | 2.3 | FC | 0.005 | 1.23 | 0 | 0.07 | 75 | alkyl silicate | 25 | Spraying | poor |
| Comp. Example 20 | 2.3 | FC | 205.6 | 1.23 | 0 | 0.02 | 75 | alkyl silicate | 105 | Brushing | poor |
| Comp. Example 21 | 2.3 | FC | 0.005 | 1.23 | 22.1 | 0 | 75 | alkyl silicate | 165 | Spraying | poor |
| Comp. Example 22 | 0.01 | FC | 0.4 | 1.24 | 1.2 | 0.5 | 58 | acryl-based resin | 5 | Spraying | poor |

(*1) F: Fracture facets existing, FC: Fracture facets and/or cracks existing, NO: No fracture facet and/or crack

TABLE 24

| | Zn-Alloy Particle Properties | | | | | Coat Properties | | | | |
|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Ratio of Metal Particle in Dry Coat (mass %) | Base Resin | Coat Thickness (μm) | Coating Method | Result of Corrosion Test |
| Comp. Example23 | 0.8 | FC | 3.2 | 2.54 | 0.6 | 0.8 | 64 | urethane-based resin | 2 | Spraying | poor |
| Comp. Example24 | 8.47 | NO | 0.67 | 1.25 | 2 | 1.9 | 54 | polyester resin | 12 | Brushing | poor |
| Comp. Example25 | 24.5 | NO | 2.5 | 1.05 | 0.8 | 0.9 | 32 | epoxy-based resin | 15 | Brushing | poor |
| Comp. Example26 | 0.01 | FC | 0.4 | 1.24 | 0 | 0.02 | 57 | alkali silicate | 2 | Spraying | poor |
| Comp. Example27 | 0.8 | FC | 0.2 | 1.78 | 25.8 | 0.05 | 70 | alkyl silicate | 5 | Spraying | poor |
| Comp. Example28 | 8.47 | NO | 0.67 | 1.25 | 22.1 | 0 | 64 | alkyl silicate | 12 | Brushing | poor |
| Comp. Example29 | 24.5 | NO | 2.5 | 1.05 | 21.5 | 0.05 | 42 | alkyl silicate | 15 | Brushing | poor |
| Comp. Example30 | 4.05 | NO | 0.02 | 1.23 | 0.05 | 2.29 | 38 | alkali silicate | 13 | Brushing | poor |
| Comp. Example31 | 6.78 | NO | 12.5 | 1.35 | 0 | 0 | 44 | alkyl silicate | 22 | Spraying | poor |
| Comp. Example32 | 15.8 | NO | 23.3 | 1.14 | 0 | 0 | 56 | alkali silicate | 34 | Spraying | poor |
| Comp. Example33 | 4.5 | FC | 3.5 | 2.84 | 22.1 | 0 | 76 | alkyl silicate | 15 | Brushing | poor |
| Comp. Example34 | 3.2 | FC | 6.7 | 1.75 | 0.05 | 2.29 | 65 | alkyl silicate | 15 | Spraying | poor |
| Inv. Example 2072 | 0.05 | FC | 2.5 | 1.05 | 0 | 1.2 | 38 | alkali silicate | 19 | Spraying | very good |
| Inv. Example 2073 | 0.07 | FC | 0.09 | 1.12 | 0 | 0.6 | 49 | alkyl silicate | 11 | Spraying | very good |
| Inv. Example 2074 | 2.64 | FC | 5.5 | 1.22 | 0 | 0.01 | 43 | alkyl silicate | 16 | Spraying | very good |
| Inv. Example 2075 | 0.08 | FC | 5.6 | 1.36 | 1.5 | 0 | 66 | alkyl silicate | 16 | Brushing | very good |
| Inv. Example 2076 | 0.09 | FC | 11.5 | 1.11 | 5.5 | 1.6 | 67 | alkali silicate | 33 | Brushing | very good |
| Inv. Example 2077 | 0.05 | FC | 19.5 | 1.07 | 4.5 | 0 | 54 | alkyl silicate | 8 | Brushing | good |
| Inv. Example 2078 | 1.59 | FC | 6.7 | 1.14 | 0 | 0.1 | 76 | alkyl silicate | 5 | Spraying | very good |
| Inv. Example 2079 | 2.58 | FC | 8.9 | 1.13 | 0.01 | 0 | 49 | alkyl silicate | 22 | Spraying | very good |
| Inv. Example 2080 | 0.06 | FC | 8.32 | 1.22 | 3.2 | 0.9 | 32 | alkyl silicate | 23 | Spraying | very good |
| Inv. Example 2081 | 0.18 | FC | 10.05 | 1.14 | 0 | 0.5 | 53 | epoxy-based resin | 30 | Spraying | very good |
| Inv. Example 2082 | 7.55 | FC | 2.15 | 1.14 | 0.2 | 0.1 | 75 | alkyl silicate | 18 | Spraying | very good |
| Inv. Example 2083 | 0.01 | FC | 0.06 | 1.23 | 1.2 | 0.6 | 75 | alkali silicate | 5 | Spraying | good |
| Inv. Example 2084 | 8.01 | FC | 2.54 | 1.13 | 0.5 | 0 | 73 | alkyl silicate | 16 | Spraying | very good |
| Inv. Example 2085 | 1.06 | FC | 3.4 | 1.38 | 1.5 | 0.9 | 49 | alkyl silicate | 8 | Spraying | very good |

(*1) F: Fracture facets existing, FC: Fracture facets and/or cracks existing, NO: No fracture facet and/or crack

TABLE 25

| | Zn-Alloy Particle Properties | | | | | Coat Properties | | | | |
|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Ratio of Metal Particle in Dry Coat (mass %) | Base Resin | Coat Thickness (μm) | Coating Method | Result of Corrosion Test |
| Inv. Example 2086 | 0.04 | FC | 8.5 | 1.42 | 0 | 1.2 | 40 | alkali silicate | 2 | Spraying | very good |
| Inv. Example 2087 | 0.06 | FC | 7.72 | 1.38 | 0 | 0.6 | 36 | alkyl silicate | 18 | Spraying | very good |
| Inv. Example 2088 | 9.51 | FC | 2.77 | 1.38 | 0 | 0.01 | 55 | alkyl silicate | 5 | Spraying | very good |
| Inv. Example 2089 | 10.01 | FC | 3.68 | 1.22 | 1.5 | 0 | 48 | alkyl silicate | 22 | Spraying | very good |
| Inv. Example 2090 | 0.05 | FC | 10.6 | 1.13 | 5.5 | 1.6 | 67 | acryl-based resin | 77 | Brushing | very good |
| Inv. Example 2091 | 0.07 | FC | 5.7 | 1.02 | 4.5 | 0 | 72 | urethane-based resin | 54 | Brushing | very good |
| Inv. Example 2092 | 3.54 | FC | 5.5 | 1.22 | 0 | 0.1 | 78 | alkyl silicate | 18 | Spraying | very good |
| Inv. Example 2093 | 0.08 | FC | 3.2 | 1.05 | 0.01 | 0 | 34 | epoxy-based resin | 43 | Spraying | very good |
| Inv. Example 2094 | 0.09 | FC | 4.5 | 1.24 | 3.2 | 0.9 | 43 | acryl-based resin | 52 | Brushing | very good |
| Inv. Example 2095 | 5.22 | FC | 2.54 | 1.14 | 0 | 0.5 | 45 | alkyl silicate | 19 | Spraying | very good |
| Inv. Example 2096 | 4.05 | FC | 2.06 | 1.13 | 0.2 | 0.1 | 52 | alkyl silicate | 8 | Spraying | very good |
| Inv. Example 2097 | 8.57 | FC | 4.99 | 1.02 | 1.2 | 0.6 | 61 | alkyl silicate | 16 | Spraying | very good |
| Inv. Example 2098 | 0.01 | FC | 6.4 | 1.06 | 0.5 | 0 | 77 | polyester resin | 47 | Spraying | very good |
| Inv. Example 2099 | 4.59 | FC | 3.09 | 1.07 | 1.5 | 0.9 | 49 | alkyl silicate | 22 | Spraying | very good |
| Inv. Example 2100 | 9.88 | FC | 4.66 | 1.42 | 0 | 1.2 | 79 | alkyl silicate | 18 | Spraying | very good |
| Inv. Example 2101 | 4.55 | FC | 4.09 | 1.38 | 0 | 0.6 | 76 | alkyl silicate | 18 | Spraying | very good |
| Inv. Example 2102 | 2.36 | FC | 3.99 | 1.22 | 0 | 0.01 | 80 | alkyl silicate | 21 | Spraying | very good |
| Inv. Example 2103 | 0.05 | FC | 7.72 | 1.38 | 1.5 | 0 | 36 | alkyl silicate | 19 | Brushing | very good |
| Inv. Example 2104 | 0.04 | FC | 8.32 | 1.22 | 5.5 | 1.6 | 32 | alkyl silicate | 24 | Spraying | very good |
| Inv. Example 2105 | 2.64 | FC | 4.55 | 1.11 | 4.5 | 0 | 43 | alkyl silicate | 5 | Spraying | very good |
| Inv. Example 2106 | 0.06 | FC | 10.6 | 1.13 | 0 | 0.1 | 67 | alkyl silicate | 7 | Spraying | very good |
| Inv. Example 2107 | 0.18 | FC | 5.7 | 1.02 | 0.01 | 0 | 72 | epoxy-based resin | 100 | Spraying | very good |
| Inv. Example 2108 | 6.31 | FC | 3.52 | 1.27 | 3.2 | 0.9 | 51 | alkyl silicate | 21 | Spraying | very good |
| Inv. Example 2109 | 5..22 | FC | 3.55 | 1.12 | 0 | 0.5 | 55 | alkyl silicate | 19 | Spraying | very good |
| Inv. Example 2110 | 4.01 | FC | 2.64 | 1.23 | 0.2 | 0.1 | 40 | alkyl silicate | 8 | Spraying | very good |
| Inv. Example 2111 | 3.52 | FC | 3.15 | 1.36 | 1.2 | 0.6 | 51 | alkyl silicate | 16 | Spraying | very good |

(*1) F: Fracture facets existing, FC: Fracture facets and/or cracks existing, NO: No fracture facet and/or crack

TABLE 26

| | Zn-Alloy Particle Properties | | | | | | Coat Properties | | | | |
|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Ratio of Metal Particle in Dry Coat (mass %) | Base Resin | Coat Thickness (μm) | Coating Method | Result of Corrosion Test |
| Inv. Example 2112 | 0.05 | FC | 5.2 | 1.33 | 0.5 | 0 | 53 | urethane-based resin | 20 | Brushing | very good |
| Inv. Example 2113 | 0.04 | FC | 1.9 | 1.27 | 1.5 | 0.9 | 60 | polyester resin | 200 | Brushing | very good |
| Inv. Example 2114 | 0.06 | FC | 10.5 | 1.12 | 0 | 1.2 | 77 | alkyl silicate | 25 | Spraying | very good |
| Inv. Example 2115 | 0.05 | FC | 12.5 | 1.23 | 0 | 0.6 | 43 | alkali silicate | 14 | Spraying | very good |
| Inv. Example 2116 | 0.07 | FC | 18.5 | 1.36 | 0 | 0.01 | 52 | urethane-based resin | 112 | Spraying | very good |
| Inv. Example 2117 | 0.01 | FC | 11.5 | 1.11 | 1.5 | 0 | 66 | alkali silicate | 24 | Spraying | very good |
| Inv. Example 2118 | 0.08 | FC | 9.6 | 1.07 | 5.5 | 1.6 | 72 | urethane-based resin | 150 | Spraying | very good |
| Inv. Example 2119 | 0.09 | FC | 8.5 | 1.42 | 4.5 | 0 | 40 | alkali silicate | 18 | Spraying | very good |
| Inv. Example 2120 | 4.25 | FC | 2.36 | 1.33 | 0 | 0.1 | 44 | alkyl silicate | 18 | Spraying | very good |
| Inv. Example 2121 | 0.04 | FC | 23.5 | 1.42 | 0.01 | 0 | 44 | alkali silicate | 38 | Spraying | very good |
| Inv. Example 2122 | 0.06 | FC | 101.5 | 1.38 | 3.2 | 0.9 | 36 | alkyl silicate | 18 | Spraying | very good |
| Inv. Example 2123 | 0.06 | FC | 55.4 | 1.38 | 0 | 0.5 | 76 | alkyl silicate | 10 | Spraying | very good |
| Inv. Example 2124 | 0.07 | FC | 10.5 | 1.12 | 0.2 | 0.1 | 77 | alkyl silicate | 37 | Spraying | very good |
| Inv. Example 2125 | 0.01 | FC | 12.5 | 1.23 | 1.2 | 0.6 | 43 | alkali silicate | 2 | Spraying | good |
| Inv. Example 2126 | 0.08 | FC | 18.5 | 1.36 | 0.5 | 0 | 52 | alkyl silicate | 160 | Brushing | very good |
| Inv. Example 2127 | 0.09 | FC | 11.5 | 1.11 | 1.5 | 0.9 | 66 | alkali silicate | 5 | Brushing | very good |
| Inv. Example 2128 | 0.05 | FC | 9.6 | 1.07 | 0.5 | 0 | 72 | alkyl silicate | 56 | Brushing | very good |
| Inv. Example 2129 | 0.06 | FC | 10.05 | 1.14 | 1.5 | 0.9 | 53 | urethane-based resin | 99 | Spraying | very good |
| Inv. Example 2130 | 29.9 | FC | 10.5 | 1.36 | 0 | 0 | 55 | urethane-based resin | 700 | Spraying | very good |
| Inv. Example 2131 | 16.5 | FC | 7.5 | 1.11 | 0.01 | 0 | 47 | alkyl silicate | 554 | Spraying | very good |
| Inv. Example 2132 | 12.5 | FC | 2.6 | 1.07 | 3.2 | 0.9 | 79 | urethane-based resin | 688 | Brushing | very good |
| Inv. Example 2133 | 9.8 | FC | 3.5 | 1.42 | 0 | 0.5 | 42 | urethane-based resin | 421 | Spraying | very good |
| Inv. Example 2134 | 9.6 | FC | 4.5 | 1.33 | 0.2 | 0.1 | 36 | urethane-based resin | 651 | Spraying | very good |
| Inv. Example 2135 | 7.5 | FC | 1.6 | 1.42 | 0 | 0.5 | 53 | urethane-based resin | 402 | Brushing | very good |
| Inv. Example 2136 | 4.6 | FC | 2.5 | 1.12 | 5.8 | 0.1 | 55 | alkali silicate | 354 | Spraying | very good |
| Inv. Example 2137 | 3.8 | FC | 23.5 | 1.23 | 1.2 | 0.6 | 42 | urethane-based resin | 504 | Brushing | very good |
| Inv. Example 2138 | 0.05 | FC | 9.8 | 1.27 | 15.5 | 0 | 76 | urethane-based resin | 666 | Spraying | very good |

(*1) F: Fracture facets existing, FC: Fracture facets and/or cracks existing, NO: No fracture facet and/or crack Example 3

Zn alloy particles with the chemical ingredients shown in Tables 27 to 42 were produced in the same way as in Example 1. The rest is the same as Example 1.

The Mg solid solution phase was identified by the X-ray diffraction method. Further, the Zn—Mg intermetallic compounds were identified by analysis of the ratio of composition of the Mg and Zn at the physical fracture facets or crack surfaces by the X-ray diffraction method or by observation by a scanning electron microscopy with an energy dispersion type X-ray analyzer.

When the content of Mg was less than 16 mass %, at the detected X-ray diffraction peaks, the $Mg_2Zn_{11}$ or $MgZn_2$ peaks were the main peaks. When the content of Mg was 16 mass % or more, the ratio of composition of the Mg and Zn at the physical fracture facets or crack surfaces was analyzed by the X-ray diffraction method or by observation by a scanning electron microscopy with an energy dispersion type X-ray analyzer whereupon the presence of $Mg_2Zn_3$, $MgZn$, or $Mg_7Zn_3$ was confirmed.

From Tables 27 to 42, it is learned that due to the presence of the Mg solid solution phase and Zn—Mg intermetallic compounds at the surfaces of the particles including fractured parts, the painting test pieces using the Zn alloy particles of the present invention are improved in corrosion resistance and rust protection regardless of the type of base resin, that is, both for inorganic-based and organic-based binders.

TABLE 27

| | Zn-Alloy Particle Properties | | | | | | | | Coat Properties | | | |
|---|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ | Ratio of Metal Particle in Dry Coat (mass %) | Base Resin | Coat Thickness (μm) | Coating Method | Result of Corrosion Test |
| Inv. Example 87 | 17.3 | F | 29.24 | 1.37 | 11.4 | 0.24 | Existence | No | 30 | alkali silicate | 30 | Spraying | very good |
| Inv. Example 88 | 18.5 | F | 1.28 | 1.10 | 0.04 | 0.03 | Existence | No | 80 | alkyl silicate | 5 | Spraying | very good |
| Inv. Example 89 | 19.3 | F | 33.57 | 1.04 | 0.25 | 0.07 | Existence | No | 35 | alkali silicate | 57 | Brushing | very good |
| Inv. Example 90 | 3.5 | F | 3.04 | 1.02 | 5.43 | 0.65 | Existence | No | 43 | alkyl silicate | 12 | Brushing | very good |
| Inv. Example 91 | 22.5 | F | 7.54 | 1.01 | 17.5 | 2.41 | Existence | No | 55 | alkali silicate | 15 | Spraying | very good |
| Inv. Example 92 | 23.7 | F | 68.12 | 1.08 | 0.01 | 0.08 | Existence | No | 76 | alkyl silicate | 85 | Brushing | very good |
| Inv. Example 93 | 24.2 | F | 0.52 | 1.14 | 0.02 | 2.23 | Existence | No | 65 | alkali silicate | 2 | Spraying | very good |
| Inv. Example 94 | 0.2 | F | 0.12 | 1.23 | 0.02 | 0.06 | Existence | No | 73 | alkyl silicate | 2 | Spraying | very good |

TABLE 27-continued

| | Zn-Alloy Particle Properties | | | | | | | Coat Properties | | | | |
|---|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | Ratio of Metal Particle in Dry Coat (mass %) | Base Resin | Coat Thickness (μm) | Coating Method | Result of Corrosion Test |
| Inv. Example 95 | 27.1 | F | 58.74 | 1.33 | 0.04 | 0.02 | Existence | No | 54 | alkali silicate | 70 | Brushing | very good |
| Inv. Example 96 | 29.3 | F | 13.57 | 1.37 | 0.05 | 0.02 | Existence | No | 62 | alkyl silicate | 30 | Spraying | very good |
| Inv. Example 97 | 0.5 | F | 6.4 | 1.44 | 1.24 | 1.37 | Existence | No | 57 | alkali silicate | 15 | Spraying | very good |
| Inv. Example 98 | 2.7 | F | 41.23 | 1.21 | 27.5 | 2.43 | Existence | No | 32 | alkyl silicate | 64 | Brushing | very good |
| Inv. Example 99 | 28.4 | F | 0.72 | 1.22 | 0.01 | 0.02 | Existence | No | 43 | alkali silicate | 2 | Spraying | very good |
| Inv. Example 100 | 8.7 | F | 1.18 | 1.23 | 0.01 | 0.01 | Existence | No | 44 | alkyl silicate | 5 | Spraying | very good |
| Inv. Example 101 | 9.2 | F | 7.12 | 1.47 | 0.02 | 0.05 | Existence | No | 54 | alkali silicate | 15 | Brushing | very good |
| Inv. Example 102 | 17.8 | F | 8.01 | 1.01 | 0.03 | 0.04 | Existence | No | 79 | alkali silicate | 20 | Brushing | very good |
| Inv. Example 103 | 20.2 | F | 0.84 | 1.04 | 7.78 | 0.24 | Existence | No | 73 | alkali silicate | 2 | Brushing | very good |
| Inv. Example 104 | 0.4 | F | 87.65 | 1.05 | 0.04 | 0.06 | Existence | No | 69 | alkyl silicate | 100 | Brushing | very good |
| Inv. Example 105 | 13.7 | F | 2.59 | 1.12 | 11.21 | 0.74 | Existence | No | 63 | alkali silicate | 5 | Spraying | very good |
| Inv. Example 106 | 14.7 | F | 93.45 | 1.11 | 0.09 | 0.01 | Existence | No | 35 | alkyl silicate | 110 | Brushing | very good |
| Inv. Example 107 | 2.4 | F | 9.84 | 1.08 | 5.41 | 1.27 | Existence | No | 35 | alkali silicate | 23 | Spraying | very good |
| Inv. Example 108 | 4.5 | F | 5.45 | 1.47 | 0.02 | 0.03 | Existence | No | 72 | alkyl silicate | 15 | Spraying | very good |
| Inv. Example 109 | 0.1 | F | 1.08 | 1.50 | 0.02 | 0.07 | Existence | No | 46 | alkali silicate | 5 | Spraying | good |
| Inv. Example 110 | 30.0 | F | 180.24 | 1.13 | 0.03 | 0.08 | Existence | Existence | 34 | alkali silicate | 200 | Brushing | very good |
| Inv. Example 111 | 24.5 | F | 11.4 | 1.04 | 11.04 | 0.21 | Existence | Existence | 32 | alkali silicate | 32 | Brushing | very good |

(*1) F: Fracture facets existing, FC: Fracture facets and/or cracks existing, NO: No fracture facet and/or crack

TABLE 28

| | Zn-Alloy Particle Properties | | | | | | | Coat Properties | | | | |
|---|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | Ratio of Metal Particle in Dry Coat (mass %) | Base Resin | Coat Thickness (μm) | Coating Method | Result of Corrosion Test |
| Inv. Example 112 | 27.6 | F | 38.75 | 1.02 | 0.01 | 0.02 | Existence | Existence | 45 | alkyl silicate | 54 | Brushing | very good |
| Inv. Example 113 | 4.1 | F | 119.87 | 1.08 | 0.07 | 0.04 | Existence | Existence | 47 | alkali silicate | 56 | Brushing | very good |
| Inv. Example 114 | 3.2 | F | 1.42 | 1.15 | 0.08 | 0.01 | Existence | Existence | 74 | alkali silicate | 130 | Brushing | very good |
| Inv. Example 115 | 2.7 | F | 12.5 | 1.34 | 0.04 | 0.03 | Existence | Existence | 77 | alkali silicate | 22 | Spraying | very good |
| Inv. Example 116 | 0.12 | F | 31.24 | 1.25 | 0.02 | 0.04 | Existence | Existence | 34 | alkyl silicate | 43 | Spraying | very good |
| Inv. Example 117 | 0.22 | F | 152.46 | 1.19 | 0.02 | 0.02 | Existence | Existence | 42 | epoxy-based resin | 160 | Brushing | very good |
| Inv. Example 118 | 0.37 | F | 13.4 | 1.18 | 4.12 | 0.61 | Existence | Existence | 46 | acryl-based resin | 27 | Spraying | good |
| Inv. Example 119 | 1.4 | F | 1.61 | 1.24 | 0.05 | 0.02 | Existence | Existence | 47 | urethane-based resin | 5 | Spraying | good |
| Inv. Example 120 | 4.2 | F | 14.1 | 1.11 | 2.14 | 0.74 | Existence | Existence | 34 | polyester resin | 27 | Spraying | very good |
| Inv. Example 121 | 4.8 | F | 1.67 | 1.27 | 0.03 | 0.02 | Existence | Existence | 54 | epoxy-based resin | 5 | Brushing | very good |
| Inv. Example 122 | 8.1 | F | 1.45 | 1.31 | 0.03 | 0.04 | Existence | Existence | 62 | acryl-based resin | 5 | Brushing | very good |
| Inv. Example 123 | 7.6 | F | 14.8 | 1.26 | 0.04 | 0.05 | Existence | Existence | 66 | urethane-based resin | 34 | Brushing | very good |
| Inv. Example 124 | 9.9 | F | 1.31 | 1.14 | 7.54 | 1.24 | Existence | Existence | 67 | polyester resin | 5 | Spraying | very good |
| Inv. Example 125 | 14.8 | F | 15.5 | 1.34 | 0.08 | 0.06 | Existence | Existence | 68 | epoxy-based resin | 23 | Spraying | very good |
| Inv. Example 126 | 16.7 | F | 0.67 | 1.16 | 0.01 | 0.07 | Existence | Existence | 33 | acryl-based resin | 2 | Spraying | very good |
| Inv. Example 127 | 17.9 | F | 137.89 | 1.47 | 29.8 | 0.75 | Existence | Existence | 35 | urethane-based resin | 150 | Brushing | very good |
| Inv. Example 128 | 19.5 | F | 1.63 | 1.48 | 0.01 | 0.02 | Existence | Existence | 43 | polyester resin | 5 | Brushing | very good |
| Inv. Example 129 | 22.4 | F | 1.12 | 1.49 | 0.03 | 0.01 | Existence | Existence | 44 | epoxy-based resin | 3 | Spraying | very good |
| Inv. Example 130 | 0.17 | F | 169.88 | 1.34 | 0.02 | 0.01 | Existence | Existence | 42 | acryl-based resin | 180 | Brushing | very good |
| Inv. Example 131 | 8.3 | F | 1.72 | 1.29 | 8.04 | 1.24 | Existence | Existence | 33 | urethane-based resin | 5 | Spraying | very good |
| Inv. Example 132 | 6.5 | F | 10.5 | 1.18 | 0.06 | 0.04 | Existence | Existence | 30 | polyester resin | 23 | Spraying | very good |
| Inv. Example 133 | 9.7 | F | 17.7 | 1.23 | 0.08 | 0.02 | Existence | Existence | 35 | epoxy-based resin | 34 | Brushing | very good |
| Inv. Example 134 | 11.4 | F | 122.54 | 1.27 | 0.03 | 0.01 | Existence | Existence | 37 | acryl-based resin | 140 | Brushing | very good |
| Inv. Example 135 | 22.5 | F | 1.84 | 1.17 | 0.04 | 0.03 | Existence | Existence | 38 | urethane-based | 5 | Brushing | very good |

TABLE 28-continued

| | Zn-Alloy Particle Properties | | | | | | | Coat Properties | | | | |
|---|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | Ratio of Metal Particle in Dry Coat (mass %) | Base Resin | Coat Thickness (μm) | Coating Method | Result of Corrosion Test |
| Inv. Example 136 | 25.7 | F | 19.1 | 1.16 | 7.42 | 1.22 | Existence | Existence | 49 | resin polyester resin | 34 | Spraying | very good |
| Inv. Example 137 | 17.8 | F | 1.75 | 1.49 | 0.02 | 0.01 | Existence | Existence | 33 | epoxy-based resin | 5 | Spraying | very good |
| Inv. Example 138 | 0.14 | F | 198.78 | 1.34 | 0.08 | 0.02 | Existence | Existence | 53 | acryl-based resin | 200 | Brushing | very good |

(*1) F: Fracture facets existing, FC: Fracture facets and/or cracks existing, NO: No fracture facet and/or crack

TABLE 29

| | Zn-Alloy Particle Properties | | | | | | | | Coat Properties | | | | |
|---|---|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | Ratio of Metal Particle in Dry Coat (mass %) | Base Resin | Coat Thickness (μm) | Coating Method | Result of Corrosion Test |
| Inv. Example 787 | 0.15 | FC | 0.02 | 1.05 | 0.1 | 0.07 | Existence | Existence | 35 | alkali silicate | 2 | Spraying | very good |
| Inv. Example 788 | 0.19 | FC | 10.5 | 1.12 | 0.04 | 0.1 | Existence | Existence | 77 | alkyl silicate | 37 | Spraying | very good |
| Inv. Example 789 | 0.18 | FC | 12.5 | 1.23 | 30.0 | 0.01 | Existence | No | 43 | alkyl silicate | 2 | Spraying | good |
| Inv. Example 790 | 0.11 | FC | 18.5 | 1.36 | 0.02 | 3 | Existence | Existence | 52 | alkyl silicate | 160 | Brushing | very good |
| Inv. Example 791 | 0.15 | FC | 11.5 | 1.11 | 0 | 0 | Existence | No | 66 | alkali silicate | 5 | Brushing | very good |
| Inv. Example 792 | 0.24 | FC | 9.6 | 1.07 | 0 | 0 | Existence | Existence | 72 | alkyl silicate | 56 | Brushing | very good |
| Inv. Example 793 | 0.18 | FC | 8.5 | 1.42 | 10.4 | 0.57 | Existence | No | 40 | alkali silicate | 2 | Spraying | very good |
| Inv. Example 794 | 0.12 | FC | 7.72 | 1.38 | 4.65 | 2.67 | Existence | Existence | 36 | alkyl silicate | 18 | Spraying | very good |
| Inv. Example 795 | 0.19 | FC | 8.32 | 1.22 | 24.8 | 2.4 | Existence | No | 32 | alkyl silicate | 23 | Spraying | very good |
| Inv. Example 796 | 0.18 | FC | 10.05 | 1.14 | 4.52 | 0.57 | Existence | No | 53 | epoxy-based resin | 30 | Brushing | very good |
| Inv. Example 797 | 0.21 | FC | 10.6 | 1.13 | 17.5 | 2.45 | Existence | Existence | 67 | acryl-based resin | 77 | Brushing | very good |
| Inv. Example 798 | 0.76 | FC | 5.7 | 1.02 | 0 | 0 | Existence | No | 72 | urethane-based resin | 54 | Brushing | very good |
| Inv. Example 799 | 0.11 | FC | 6.4 | 1.06 | 11.05 | 0.23 | Existence | Existence | 77 | polyester resin | 47 | Spraying | very good |
| Inv. Example 800 | 0.14 | FC | 3.2 | 1.05 | 2.65 | 0.74 | Existence | Existence | 34 | epoxy-based resin | 43 | Spraying | very good |
| Inv. Example 801 | 15 | FC | 4.5 | 1.24 | 6.45 | 2.14 | Existence | No | 43 | acryl-based resin | 52 | Brushing | very good |
| Inv. Example 802 | 14.5 | FC | 5.2 | 1.33 | 0 | 0 | Existence | No | 53 | urethane-based resin | 20 | Brushing | very good |
| Inv. Example 803 | 18.5 | FC | 1.9 | 1.27 | 0 | 0 | Existence | Existence | 60 | polyester resin | 200 | Brushing | very good |
| Inv. Example 804 | 15.1 | FC | 0.02 | 1.05 | 0.05 | 0.03 | Existence | No | 35 | alkali silicate | 22 | Spraying | very good |
| Inv. Example 805 | 15.6 | FC | 10.5 | 1.12 | 0 | 0.08 | Existence | No | 77 | alkyl silicate | 25 | Spraying | very good |
| Inv. Example 806 | 12.5 | FC | 12.5 | 1.23 | 0.05 | 0 | Existence | Existence | 43 | alkali silicate | 14 | Spraying | very good |
| Inv. Example 807 | 18.7 | FC | 18.5 | 1.36 | 0.44 | 0.07 | Existence | Existence | 52 | urethane-based resin | 112 | Spraying | very good |
| Inv. Example 808 | 14.5 | FC | 11.5 | 1.11 | 0.08 | 0.07 | Existence | Existence | 66 | alkali silicate | 24 | Spraying | very good |
| Inv. Example 809 | 7.5 | FC | 9.6 | 1.07 | 0.1 | 0.2 | Existence | No | 72 | urethane-based resin | 150 | Spraying | very good |
| Inv. Example 810 | 4.5 | FC | 8.5 | 1.42 | 0 | 0 | Existence | Existence | 40 | alkali silicate | 18 | Spraying | very good |
| Inv. Example 811 | 1.5 | FC | 7.72 | 1.38 | 0 | 0 | Existence | Existence | 36 | alkyl silicate | 19 | Brushing | very good |

(*1) F: Fracture facets existing, FC: Fracture facets and/or cracks existing, NO: No fracture facet and/or crack

TABLE 30

| | Zn-Alloy Particle Properties | | | | | | | Coat Properties | | | | |
|---|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn₂ or Mg₂Zn₁₁ | Ratio of Metal Particle in Dry Coat (mass %) | Base Resin | Coat Thickness (μm) | Coating Method | Result of Corrosion Test |
| Inv. Example 812 | 4.8 | FC | 8.32 | 1.22 | 0 | 0.07 | Existence | Existence | 32 | alkyl silicate | 24 | Spraying | very good |
| Inv. Example 813 | 9.6 | FC | 10.05 | 1.14 | 0 | 0.02 | Existence | No | 53 | urethane-based resin | 99 | Spraying | very good |
| Inv. Example 814 | 11.5 | FC | 10.6 | 1.13 | 25.8 | 0.05 | Existence | Existence | 67 | alkyl silicate | 7 | Spraying | very good |
| Inv. Example 815 | 9.8 | FC | 5.7 | 1.02 | 22.1 | 0 | Existence | Existence | 72 | epoxy-based resin | 100 | Spraying | very good |
| Inv. Example 816 | 7.6 | FC | 6.4 | 1.06 | 21.5 | 0.05 | Existence | Existence | 77 | alkyl silicate | 27 | Brushing | very good |
| Inv. Example 817 | 3.2 | FC | 3.2 | 1.05 | 0.05 | 2.29 | Existence | No | 34 | alkyl silicate | 15 | Spraying | very good |
| Inv. Example 818 | 1.9 | FC | 4.5 | 1.24 | 0.05 | 0.03 | Existence | Existence | 43 | alkyl silicate | 14 | Spraying | very good |
| Inv. Example 819 | 11.5 | FC | 5.2 | 1.33 | 0 | 0.08 | Existence | Existence | 53 | urethane-based resin | 55 | Spraying | very good |
| Inv. Example 820 | 8.7 | FC | 1.9 | 1.27 | 0 | 0 | Existence | No | 35 | alkyl silicate | 8 | Spraying | very good |
| Inv. Example 821 | 9.6 | FC | 0.02 | 1.05 | 0 | 0 | Existence | Existence | 77 | urethane-based resin | 122 | Brushing | very good |
| Inv. Example 822 | 9.4 | FC | 10.5 | 1.12 | 0.08 | 0.07 | Existence | No | 43 | alkyl silicate | 54 | Spraying | very good |
| Inv. Example 823 | 10.5 | FC | 12.5 | 1.23 | 0.1 | 0.2 | Existence | Existence | 52 | alkyl silicate | 19 | Spraying | very good |
| Inv. Example 824 | 12.6 | FC | 18.5 | 1.36 | 0.05 | 0.2 | Existence | No | 66 | alkyl silicate | 25 | Brushing | very good |
| Inv. Example 825 | 29.5 | FC | 11.5 | 1.11 | 0.07 | 0 | Existence | Existence | 72 | alkyl silicate | 58 | Spraying | very good |
| Inv. Example 826 | 29.4 | FC | 9.6 | 1.07 | 0 | 0.07 | Existence | Existence | 40 | alkyl silicate | 21 | Spraying | very good |
| Inv. Example 827 | 27.5 | FC | 8.5 | 1.42 | 0 | 0.02 | Existence | Existence | 36 | alkyl silicate | 19 | Brushing | very good |
| Inv. Example 828 | 0.8 | FC | 7.72 | 1.38 | 25.8 | 0.05 | Existence | Existence | 32 | urethane-based resin | 56 | Spraying | very good |
| Inv. Example 829 | 1.6 | FC | 8.32 | 1.22 | 22.1 | 0 | Existence | No | 53 | alkyl silicate | 77 | Spraying | very good |
| Inv. Example 830 | 22.9 | FC | 10.05 | 1.14 | 21.5 | 0.05 | Existence | No | 67 | alkyl silicate | 54 | Spraying | very good |
| Inv. Example 831 | 28.5 | FC | 10.6 | 1.13 | 0.05 | 2.29 | Existence | No | 72 | alkyl silicate | 64 | Spraying | very good |
| Inv. Example 832 | 29.5 | FC | 5.7 | 1.02 | 0.1 | 0.2 | Existence | Existence | 77 | alkyl silicate | 34 | Brushing | very good |
| Inv. Example 833 | 18.7 | FC | 6.4 | 1.06 | 0.05 | 0.2 | Existence | No | 34 | alkyl silicate | 28 | Spraying | very good |
| Inv. Example 834 | 19.5 | FC | 3.2 | 1.05 | 0.07 | 0 | Existence | Existence | 43 | urethane-based resin | 109 | Brushing | very good |
| Inv. Example 835 | 20.4 | FC | 4.5 | 1.24 | 0 | 0.07 | Existence | Existence | 53 | alkyl silicate | 15 | Spraying | very good |
| Inv. Example 836 | 0.6 | FC | 5.2 | 1.33 | 0 | 0.02 | Existence | Existence | 72 | alkyl silicate | 14 | Spraying | very good |

(*1) F: Fracture facets existing, FC: Fracture facets and/or cracks existing, NO: No fracture facet and/or crack

TABLE 31

| | Zn-Alloy Particle Properties | | | | | | | Coat Properties | | | | |
|---|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn₂ or Mg₂Zn₁₁ | Ratio of Metal Particle in Dry Coat (mass %) | Base Resin | Coat Thickness (μm) | Coating Method | Result of Corrosion Test |
| Inv. Example 837 | 0.8 | FC | 1.9 | 1.27 | 22.1 | 0 | Existence | Existence | 77 | alkyl silicate | 18 | Spraying | very good |
| Inv. Example 838 | 22.5 | FC | 0.02 | 1.05 | 0.1 | 0.07 | Existence | Existence | 35 | alkali silicate | 2 | Spraying | very good |
| Inv. Example 839 | 20.6 | FC | 10.5 | 1.12 | 0.04 | 0.1 | Existence | Existence | 77 | alkali silicate | 37 | Spraying | very good |
| Inv. Example 840 | 21.6 | FC | 12.5 | 1.23 | 30.0 | 0.01 | Existence | No | 43 | alkali silicate | 2 | Spraying | good |
| Inv. Example 841 | 20.8 | FC | 7.72 | 1.38 | 0 | 0 | Existence | Existence | 52 | alkyl silicate | 160 | Brushing | very good |
| Inv. Example 842 | 23.6 | FC | 8.32 | 1.22 | 0 | 0 | Existence | Existence | 66 | alkali silicate | 5 | Brushing | very good |
| Inv. Example 843 | 24.5 | FC | 10.05 | 1.14 | 4.52 | 0.57 | Existence | No | 72 | alkyl silicate | 56 | Brushing | very good |
| Inv. Example 844 | 18.6 | FC | 10.6 | 1.13 | 17.5 | 2.45 | Existence | Existence | 40 | alkali silicate | 2 | Spraying | very good |
| Inv. Example 845 | 17.8 | FC | 5.2 | 1.33 | 27.6 | 2.4 | Existence | No | 36 | alkyl silicate | 18 | Spraying | very good |
| Inv. Example 846 | 16.5 | FC | 1.9 | 1.27 | 4.32 | 1.07 | Existence | Existence | 32 | alkyl silicate | 23 | Brushing | very good |
| Inv. Example 847 | 14.5 | FC | 0.02 | 1.05 | 0.05 | 0.03 | Existence | No | 53 | epoxy-based resin | 30 | Brushing | very good |
| Inv. Example 848 | 19 | FC | 10.5 | 1.12 | 0 | 0.08 | Existence | No | 67 | acryl-based resin | 77 | Brushing | very good |
| Inv. Example 849 | 15 | FC | 12.5 | 1.23 | 0.05 | 0 | Existence | Existence | 72 | urethane-based resin | 54 | Brushing | very good |

TABLE 31-continued

|  | Zn-Alloy Particle Properties | | | | | | | Coat Properties | | | | |
|---|---|---|---|---|---|---|---|---|---|---|---|---|
|  | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | Ratio of Metal Particle in Dry Coat (mass %) | Base Resin | Coat Thickness (μm) | Coating Method | Result of Corrosion Test |
| Inv. Example 850 | 16.4 | FC | 18.5 | 1.36 | 0.44 | 0.07 | Existence | Existence | 77 | polyester resin | 47 | Spraying | very good |
| Inv. Example 851 | 13.5 | FC | 11.5 | 1.11 | 0.08 | 0.07 | Existence | Existence | 34 | epoxy-based resin | 43 | Spraying | very good |
| Inv. Example 852 | 10.6 | FC | 11.5 | 1.11 | 8.02 | 2.04 | Existence | No | 43 | acryl-based resin | 52 | Brushing | very good |
| Inv. Example 853 | 10.7 | FC | 9.6 | 1.07 | 15.6 | 1.27 | Existence | Existence | 53 | urethane-based resin | 20 | Brushing | very good |
| Inv. Example 854 | 10.9 | FC | 8.5 | 1.42 | 10.4 | 0.57 | Existence | No | 60 | polyester resin | 200 | Brushing | very good |
| Inv. Example 855 | 11.6 | FC | 7.72 | 1.38 | 4.65 | 2.67 | Existence | Existence | 35 | alkali silicate | 22 | Spraying | very good |
| Inv. Example 856 | 14.7 | FC | 8.32 | 1.22 | 24.8 | 2.4 | Existence | No | 77 | alkyl silicate | 25 | Spraying | very good |
| Inv. Example 857 | 19.5 | FC | 10.05 | 1.14 | 4.52 | 0.57 | Existence | No | 43 | alkali silicate | 14 | Spraying | very good |
| Inv. Example 858 | 10.2 | FC | 10.6 | 1.13 | 0 | 0 | Existence | Existence | 52 | urethane-based resin | 112 | Spraying | very good |
| Inv. Example 859 | 4 | FC | 5.7 | 1.02 | 0 | 0 | Existence | No | 66 | alkali silicate | 24 | Spraying | very good |
| Inv. Example 860 | 7.2 | FC | 6.4 | 1.06 | 11.05 | 0.23 | Existence | Existence | 72 | urethane-based resin | 150 | Spraying | very good |
| Inv. Example 861 | 3.6 | FC | 3.2 | 1.05 | 2.65 | 0.74 | Existence | Existence | 40 | alkali silicate | 18 | Spraying | very good |

(*1) F: Fracture facets existing, FC: Fracture facets and/or cracks existing, NO: No fracture facet and/or crack

TABLE 32

|  | Zn-Alloy Particle Properties | | | | | | | Coat Properties | | | | |
|---|---|---|---|---|---|---|---|---|---|---|---|---|
|  | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | Ratio of Metal Particle in Dry Coat (mass %) | Base Resin | Coat Thickness (μm) | Coating Method | Result of Corrosion Test |
| Inv. Example 862 | 26.9 | FC | 4.5 | 1.24 | 6.45 | 2.14 | Existence | No | 36 | alkyl silicate | 19 | Brushing | very good |
| Inv. Example 863 | 27.9 | FC | 5.2 | 1.33 | 27.6 | 2.4 | Existence | No | 32 | alkyl silicate | 24 | Spraying | very good |
| Inv. Example 864 | 28.9 | FC | 1.9 | 1.27 | 4.32 | 1.07 | Existence | Existence | 53 | urethane-based resin | 99 | Spraying | very good |
| Inv. Example 865 | 23.8 | FC | 0.02 | 1.05 | 0.05 | 0.03 | Existence | No | 67 | alkyl silicate | 7 | Spraying | very good |
| Inv. Example 866 | 26.8 | FC | 10.5 | 1.12 | 0 | 0.08 | Existence | No | 72 | epoxy-based resin | 100 | Spraying | very good |
| Inv. Example 867 | 25.6 | FC | 12.5 | 1.23 | 0.05 | 0 | Existence | Existence | 77 | alkyl silicate | 27 | Brushing | very good |
| Inv. Example 868 | 29.8 | FC | 18.5 | 1.36 | 0.44 | 0.07 | Existence | Existence | 34 | alkali silicate | 15 | Spraying | very good |
| Inv. Example 869 | 18.9 | FC | 11.5 | 1.11 | 0.08 | 0.07 | Existence | Existence | 43 | alkyl silicate | 14 | Spraying | very good |
| Inv. Example 870 | 5.6 | FC | 9.6 | 1.07 | 0.1 | 0.2 | Existence | No | 53 | urethane-based resin | 55 | Spraying | very good |
| Inv. Example 871 | 4.7 | FC | 8.5 | 1.42 | 0.05 | 0.2 | Existence | Existence | 35 | alkyl silicate | 8 | Spraying | very good |
| Inv. Example 872 | 6.8 | FC | 7.72 | 1.38 | 0.07 | 0 | Existence | Existence | 77 | urethane-based resin | 122 | Brushing | very good |
| Inv. Example 873 | 9 | FC | 8.32 | 1.22 | 0 | 0.07 | Existence | Existence | 43 | alkyl silicate | 54 | Spraying | very good |
| Inv. Example 874 | 2.1 | FC | 10.05 | 1.14 | 0 | 0.02 | Existence | No | 52 | alkali silicate | 19 | Spraying | very good |
| Inv. Example 875 | 4.8 | FC | 10.6 | 1.13 | 0 | 0 | Existence | Existence | 66 | alkyl silicate | 25 | Brushing | very good |
| Inv. Example 876 | 4.2 | FC | 5.7 | 1.02 | 0 | 0 | Existence | Existence | 72 | alkyl silicate | 58 | Spraying | very good |
| Inv. Example 877 | 4.3 | FC | 6.4 | 1.06 | 21.5 | 0.05 | Existence | Existence | 40 | alkyl silicate | 21 | Spraying | very good |
| Inv. Example 878 | 4 | FC | 3.2 | 1.05 | 0.05 | 2.29 | Existence | No | 36 | alkali silicate | 19 | Brushing | very good |
| Inv. Example 879 | 3.7 | FC | 4.5 | 1.24 | 0.05 | 0.03 | Existence | Existence | 32 | urethane-based resin | 56 | Spraying | very good |
| Inv. Example 880 | 6.4 | FC | 5.2 | 1.33 | 0 | 0.08 | Existence | Existence | 53 | alkyl silicate | 77 | Spraying | very good |
| Inv. Example 881 | 6.9 | FC | 1.9 | 1.27 | 0.05 | 0 | Existence | No | 67 | alkyl silicate | 54 | Spraying | very good |
| Inv. Example 882 | 16.9 | FC | 0.02 | 1.05 | 0.44 | 0.07 | Existence | Existence | 72 | alkyl silicate | 64 | Spraying | very good |
| Inv. Example 883 | 18.7 | FC | 10.5 | 1.12 | 0.08 | 0.07 | Existence | No | 77 | alkyl silicate | 34 | Brushing | very good |
| Inv. Example 884 | 24.4 | FC | 12.5 | 1.23 | 0.1 | 0.2 | Existence | Existence | 34 | alkali silicate | 28 | Spraying | very good |

TABLE 32-continued

| | Zn-Alloy Particle Properties | | | | | | | Coat Properties | | | | |
|---|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | Ratio of Metal Particle in Dry Coat (mass %) | Base Resin | Coat Thickness (μm) | Coating Method | Result of Corrosion Test |
| Inv. Example 885 | 10.6 | FC | 18.5 | 1.36 | 0 | 0 | Existence | No | 43 | urethane-based resin | 109 | Brushing | very good |
| Inv. Example 886 | 15.8 | FC | 11.5 | 1.11 | 0 | 0 | Existence | Existence | 53 | alkyl silicate | 15 | Spraying | very good |

(*1) F: Fracture facets existing, FC: Fracture facets and/or cracks existing, NO: No fracture facet and/or crack

TABLE 33

| | Zn-Alloy Particle Properties | | | | | | | | Coat Properties | | | | |
|---|---|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | Ratio of Metal Particle in Dry Coat (mass %) | Base Resin | Coat Thickness (μm) | Coating Method | Result of Corrosion Test |
| Inv. Example 887 | 19.5 | FC | 9.6 | 1.07 | 0 | 0.07 | Existence | Existence | 72 | alkyl silicate | 14 | Spraying | very good |
| Inv. Example 888 | 7.8 | FC | 8.5 | 1.42 | 0 | 0.02 | Existence | Existence | 77 | alkyl silicate | 18 | Spraying | very good |
| Inv. Example 889 | 4.9 | FC | 7.72 | 1.38 | 25.8 | 0.05 | Existence | Existence | 77 | urethane-based resin | 122 | Brushing | very good |
| Inv. Example 890 | 10.8 | FC | 8.32 | 1.22 | 22.1 | 0 | Existence | No | 43 | alkyl silicate | 54 | Spraying | very good |
| Inv. Example 891 | 3.8 | FC | 10.05 | 1.14 | 21.5 | 0.05 | Existence | No | 52 | alkali silicate | 19 | Spraying | very good |
| Inv. Example 892 | 22.6 | FC | 10.6 | 1.13 | 0.05 | 2.29 | Existence | No | 66 | alkyl silicate | 25 | Brushing | very good |
| Inv. Example 893 | 27.9 | FC | 5.7 | 1.02 | 0 | 0 | Existence | Existence | 72 | alkyl silicate | 58 | Spraying | very good |
| Inv. Example 894 | 24.8 | FC | 6.4 | 1.06 | 0 | 0 | Existence | No | 40 | alkyl silicate | 21 | Spraying | very good |
| Inv. Example 895 | 26.8 | FC | 3.2 | 1.05 | 0.07 | 0 | Existence | Existence | 36 | alkali silicate | 19 | Brushing | very good |
| Inv. Example 896 | 25.9 | FC | 4.5 | 1.24 | 0 | 0.07 | Existence | Existence | 32 | urethane-based resin | 56 | Spraying | very good |
| Inv. Example 897 | 9.8 | FC | 5.2 | 1.33 | 0 | 0.02 | Existence | Existence | 53 | alkyl silicate | 77 | Spraying | very good |
| Inv. Example 898 | 5.6 | FC | 1.9 | 1.27 | 22.1 | 0 | Existence | Existence | 67 | alkyl silicate | 54 | Spraying | very good |
| Inv. Example 899 | 12.3 | FC | 0.02 | 1.05 | 1.24 | 1.8 | Existence | Existence | 52 | alkali silicate | 2 | Spraying | very good |
| Inv. Example 900 | 0.8 | FC | 27.89 | 1.12 | 1.24 | 0.9 | Existence | Existence | 55 | alkali silicate | 20 | Spraying | very good |
| Inv. Example 901 | 1 | FC | 0.32 | 1.23 | 0.8 | 0.7 | Existence | No | 69 | alkali silicate | 5 | Spraying | very good |
| Inv. Example 902 | 2.3 | FC | 11.44 | 1.36 | 0 | 1.8 | Existence | Existence | 78 | alkyl silicate | 20 | Spraying | very good |
| Inv. Example 903 | 15.6 | FC | 1.05 | 1.11 | 1.1 | 2.41 | Existence | Existence | 42 | alkali silicate | 15 | Brushing | very good |
| Inv. Example 904 | 6.7 | FC | 36.47 | 1.07 | 1.8 | 0.08 | Existence | Existence | 32 | alkyl silicate | 57 | Brushing | very good |
| Inv. Example 905 | 7.5 | FC | 5.07 | 1.42 | 3.8 | 2.23 | Existence | No | 66 | alkali silicate | 13 | Brushing | very good |
| Inv. Example 906 | 8.4 | FC | 7.72 | 1.38 | 2.9 | 0.06 | Existence | Existence | 67 | alkyl silicate | 22 | Brushing | very good |
| Inv. Example 907 | 9.3 | FC | 8.32 | 1.22 | 10.5 | 0.02 | Existence | Existence | 64 | alkyl silicate | 20 | Spraying | very good |
| Inv. Example 908 | 10.4 | FC | 10.05 | 1.14 | 2.9 | 0.02 | Existence | Existence | 74 | alkyl silicate | 27 | Spraying | very good |
| Inv. Example 909 | 11.2 | FC | 6.08 | 1.13 | 16.8 | 1.37 | Existence | No | 82 | alkali silicate | 15 | Spraying | very good |
| Inv. Example 910 | 11.7 | FC | 17.89 | 1.02 | 0 | 2.43 | Existence | Existence | 37 | alkyl silicate | 35 | Spraying | very good |
| Inv. Example 911 | 21.5 | FC | 19.54 | 1.06 | 3.6 | 0.02 | Existence | Existence | 42 | alkali silicate | 34 | Brushing | very good |

(*1) F: Fracture facets existing, FC: Fracture facets and/or cracks existing, NO: No fracture facet and/or crack

TABLE 34

| | Zn-Alloy Particle Properties | | | | | | | Coat Properties | | | | |
|---|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | Ratio of Metal Particle in Dry Coat (mass %) | Base Resin | Coat Thickness (μm) | Coating Method | Result of Corrosion Test |
| Inv. Example 912 | 13.4 | FC | 21.08 | 1.05 | 2.1 | 1.5 | Existence | No | 66 | alkyl silicate | 45 | Brushing | very good |
| Inv. Example 913 | 14.6 | FC | 23.04 | 1.24 | 0.06 | 1.3 | Existence | Existence | 48 | alkali silicate | 52 | Brushing | very good |
| Inv. Example 914 | 25.8 | FC | 9.21 | 1.33 | 0.02 | 1.8 | Existence | Existence | 33 | alkyl silicate | 23 | Brushing | very good |
| Inv. Example 915 | 16.7 | FC | 0.12 | 1.27 | 1.6 | 0.9 | Existence | Existence | 75 | alkyl silicate | 5 | Spraying | very good |
| Inv. Example 916 | 17.3 | FC | 29.24 | 1.37 | 3.5 | 0 | Existence | Existence | 77 | alkyl silicate | 52 | Brushing | very good |
| Inv. Example 917 | 18.5 | FC | 128.74 | 1.10 | 9.8 | 1.8 | Existence | No | 66 | alkyl silicate | 150 | Brushing | very good |
| Inv. Example 918 | 19.3 | FC | 33.57 | 1.04 | 11.5 | 0.7 | Existence | Existence | 67 | alkyl silicate | 60 | Brushing | very good |
| Inv. Example 919 | 3.5 | FC | 3.04 | 1.02 | 0.4 | 1.5 | Existence | Existence | 45 | alkyl silicate | 15 | Spraying | very good |
| Inv. Example 920 | 22.5 | FC | 7.54 | 1.01 | 0.6 | 1.3 | Existence | Existence | 48 | alkyl silicate | 24 | Spraying | very good |
| Inv. Example 921 | 23.7 | FC | 6.81 | 1.08 | 10.6 | 1.8 | Existence | No | 68 | alkyl silicate | 34 | Spraying | very good |
| Inv. Example 922 | 24.2 | FC | 5.25 | 1.14 | 9.5 | 0 | Existence | Existence | 35 | alkyl silicate | 20 | Brushing | very good |
| Inv. Example 923 | 0.2 | FC | 194.23 | 1.23 | 11.04 | 0.7 | Existence | Existence | 37 | alkyl silicate | 200 | Brushing | very good |
| Inv. Example 924 | 27.1 | FC | 28.74 | 1.33 | 0.01 | 1.8 | Existence | Existence | 38 | alkyl silicate | 56 | Brushing | very good |
| Inv. Example 925 | 29.3 | FC | 13.57 | 1.37 | 0.07 | 0.7 | Existence | Existence | 41 | alkyl silicate | 34 | Spraying | very good |
| Inv. Example 926 | 0.5 | FC | 0.65 | 1.44 | 1.8 | 1.5 | Existence | Existence | 54 | alkyl silicate | 2 | Spraying | very good |
| Inv. Example 927 | 2.7 | FC | 4.12 | 1.21 | 0 | 1.3 | Existence | Existence | 57 | alkyl silicate | 15 | Spraying | very good |
| Inv. Example 928 | 28.4 | FC | 0.72 | 1.22 | 2.9 | 1.8 | Existence | Existence | 59 | alkyl silicate | 10 | Spraying | very good |
| Inv. Example 929 | 8.7 | FC | 117.54 | 1.23 | 10.5 | 0.9 | Existence | Existence | 64 | alkyl silicate | 125 | Brushing | very good |
| Inv. Example 930 | 9.2 | FC | 7.81 | 1.47 | 2.9 | 0.7 | Existence | Existence | 66 | alkyl silicate | 24 | Brushing | very good |
| Inv. Example 931 | 17.8 | FC | 80.25 | 1.01 | 16.8 | 1.8 | Existence | No | 67 | alkyl silicate | 110 | Brushing | very good |
| Inv. Example 932 | 20.2 | FC | 8.47 | 1.04 | 2.7 | 0.7 | Existence | Existence | 34 | alkyl silicate | 24 | Brushing | very good |
| Inv. Example 933 | 0.4 | FC | 0.87 | 1.05 | 0.04 | 0.7 | Existence | Existence | 54 | alkyl silicate | 2 | Spraying | very good |
| Inv. Example 934 | 13.7 | FC | 25.78 | 1.12 | 0 | 0.04 | Existence | Existence | 62 | alkyl silicate | 37 | Spraying | very good |
| Inv. Example 935 | 14.7 | FC | 93.45 | 1.11 | 1.24 | 0.05 | Existence | Existence | 66 | alkyl silicate | 113 | Brushing | very good |
| Inv. Example 936 | 2.4 | FC | 0.97 | 1.08 | 0.05 | 1.24 | Existence | Existence | 67 | alkali silicate | 2 | Spraying | very good |

(*1) F: Fracture facets existing, FC: Fracture facets and/or cracks existing, NO: No fracture facet and/or crack

TABLE 35

| | Zn-Alloy Particle Properties | | | | | | | | Coat Properties | | | | |
|---|---|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | Ratio of Metal Particle in Dry Coat (mass %) | Base Resin | Coat Thickness (μm) | Coating Method | Result of Corrosion Test |
| Inv. Example 937 | 4.5 | FC | 54.89 | 1.47 | 1.24 | 0.06 | Existence | Existence | 68 | alkyl silicate | 75 | Brushing | very good |
| Inv. Example 938 | 0.1 | FC | 10.81 | 1.50 | 1.24 | 0.07 | Existence | Existence | 33 | alkali silicate | 30 | Brushing | very good |
| Inv. Example 939 | 30.0 | FC | 18.24 | 1.13 | 0 | 0.75 | Existence | Existence | 35 | alkyl silicate | 34 | Brushing | very good |
| Inv. Example 940 | 24.5 | FC | 114.78 | 1.04 | 0.9 | 1.5 | Existence | Existence | 43 | epoxy-based resin | 124 | Brushing | very good |
| Inv. Example 941 | 27.6 | FC | 3.87 | 1.02 | 0.03 | 1.3 | Existence | Existence | 44 | acryl-based resin | 15 | Spraying | very good |
| Inv. Example 942 | 4.1 | FC | 11.94 | 1.08 | 10.5 | 1.8 | Existence | No | 43 | urethane-based resin | 23 | Spraying | very good |
| Inv. Example 943 | 3.2 | FC | 142.58 | 1.15 | 2.9 | 0.9 | Existence | Existence | 44 | polyester resin | 157 | Brushing | very good |
| Inv. Example 944 | 2.7 | FC | 12.5 | 1.34 | 16.8 | 0.7 | Existence | Existence | 54 | epoxy-based resin | 26 | Spraying | very good |
| Inv. Example 945 | 0.12 | FC | 31.24 | 1.25 | 2.7 | 1.8 | Existence | Existence | 79 | acryl-based resin | 38 | Spraying | very good |
| Inv. Example 946 | 0.22 | FC | 152.46 | 1.19 | 0.02 | 0.7 | Existence | Existence | 73 | urethane-based resin | 160 | Brushing | very good |
| Inv. Example 947 | 0.37 | FC | 13.4 | 1.18 | 0 | 1.5 | Existence | Existence | 69 | polyester resin | 27 | Brushing | very good |
| Inv. Example 948 | 1.4 | FC | 160.57 | 1.24 | 7.42 | 1.3 | Existence | Existence | 63 | epoxy-based resin | 180 | Brushing | very good |
| Inv. Example 949 | 4.2 | FC | 14.1 | 1.11 | 0.02 | 1.8 | Existence | Existence | 35 | acryl-based resin | 26 | Spraying | very good |
| Inv. Example 950 | 4.8 | FC | 167.55 | 1.27 | 0.04 | 0.9 | Existence | Existence | 35 | urethane-based resin | 180 | Brushing | very good |
| Inv. Example 951 | 8.1 | FC | 1.45 | 1.31 | 17.5 | 0 | Existence | Existence | 66 | polyester resin | 15 | Spraying | very good |
| Inv. Example 952 | 7.6 | FC | 0.15 | 1.26 | 0.01 | 1.8 | Existence | Existence | 67 | epoxy-based resin | 2 | Spraying | very good |
| Inv. Example 953 | 9.9 | FC | 13.1 | 1.14 | 0.02 | 0.7 | Existence | Existence | 68 | acryl-based resin | 28 | Spraying | very good |

TABLE 35-continued

| | Zn-Alloy Particle Properties | | | | | | | Coat Properties | | | | |
|---|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | Ratio of Metal Particle in Dry Coat (mass %) | Base Resin | Coat Thickness (μm) | Coating Method | Result of Corrosion Test |
| Inv. Example 954 | 14.8 | FC | 15.5 | 1.34 | 3.8 | 0 | Existence | Existence | 33 | urethane-based resin | 30 | Spraying | very good |
| Inv. Example 955 | 16.7 | FC | 0.67 | 1.16 | 2.9 | 0 | Existence | Existence | 35 | polyester resin | 2 | Spraying | very good |
| Inv. Example 956 | 17.9 | FC | 137.89 | 1.47 | 10.5 | 1.8 | Existence | Existence | 43 | epoxy-based resin | 157 | Brushing | very good |
| Inv. Example 957 | 19.5 | FC | 16.3 | 1.48 | 2.9 | 0.9 | Existence | Existence | 44 | acryl-based resin | 28 | Brushing | very good |
| Inv. Example 958 | 22.4 | FC | 110.38 | 1.49 | 16.8 | 0.7 | Existence | Existence | 42 | urethane-based resin | 130 | Brushing | very good |
| Inv. Example 959 | 0.17 | FC | 12.4 | 1.34 | 2.7 | 1.8 | Existence | Existence | 33 | polyester resin | 29 | Brushing | very good |
| Inv. Example 960 | 8.3 | FC | 17.2 | 1.29 | 0.02 | 0.7 | Existence | No | 30 | epoxy-based resin | 30 | Brushing | very good |
| Inv. Example 961 | 6.5 | FC | 105.23 | 1.18 | 0.02 | 0.7 | Existence | Existence | 35 | acryl-based resin | 120 | Brushing | very good |

(*1) F: Fracture facets existing, FC: Fracture facets and/or cracks existing, NO: No fracture facet and/or crack

TABLE 36

| | Zn-Alloy Particle Properties | | | | | | | Coat Properties | | | | |
|---|---|---|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | Ratio of Metal Particle in Dry Coat (mass %) | Base Resin | Coat Thickness (μm) | Coating Method | Result of Corrosion Test |
| Inv. Example 962 | 9.7 | FC | 177.89 | 1.23 | 0.04 | 0.02 | Existence | Existence | 37 | urethane-based resin | 187 | Brushing | very good |
| Inv. Example 963 | 11.4 | FC | 12.2 | 1.27 | 0.05 | 0.02 | Existence | Existence | 77 | polyester resin | 28 | Spraying | very good |
| Inv. Example 964 | 22.5 | FC | 1.84 | 1.17 | 1.24 | 1.37 | Existence | Existence | 41 | epoxy-based resin | 5 | Spraying | very good |
| Inv. Example 965 | 25.7 | FC | 16.02 | 1.16 | 0.05 | 0.02 | Existence | Existence | 35 | acryl-based resin | 35 | Spraying | very good |
| Inv. Example 966 | 17.8 | FC | 1.75 | 1.49 | 1.24 | 1.37 | Existence | Existence | 58 | urethane-based resin | 5 | Spraying | very good |
| Inv. Example 967 | 0.14 | FC | 198.78 | 1.34 | 1.24 | 1.37 | Existence | Existence | 37 | polyester resin | 200 | Brushing | very good |
| Inv. Example 968 | 6.7 | FC | 13.1 | 1.16 | 0.8 | 1.5 | Existence | Existence | 68 | alkali silicate | 25 | Spraying | very good |
| Inv. Example 969 | 7.5 | FC | 15.5 | 1.47 | 0.9 | 1.3 | Existence | Existence | 55 | alkali silicate | 15 | Spraying | very good |
| Inv. Example 970 | 8.4 | FC | 0.67 | 1.48 | 1.1 | 1.8 | Existence | No | 77 | alkyl silicate | 20 | Spraying | very good |
| Inv. Example 971 | 9.3 | FC | 12.2 | 1.49 | 1.8 | 0.9 | Existence | Existence | 43 | alkali silicate | 18 | Spraying | very good |
| Inv. Example 972 | 1.4 | FC | 1.84 | 1.34 | 3.8 | 0.7 | Existence | Existence | 45 | alkyl silicate | 22 | Spraying | very good |
| Inv. Example 973 | 4.2 | FC | 16.02 | 1.29 | 2.9 | 1.8 | Existence | Existence | 66 | alkali silicate | 19 | Spraying | very good |
| Inv. Example 974 | 4.8 | FC | 1.75 | 1.18 | 10.5 | 0.7 | Existence | Existence | 33 | alkyl silicate | 29 | Spraying | very good |
| Inv. Example 975 | 8.1 | FC | 12.4 | 1.23 | 2.9 | 1.5 | Existence | Existence | 66 | alkali silicate | 23 | Spraying | very good |
| Inv. Example 976 | 7.6 | FC | 17.2 | 1.27 | 16.8 | 1.3 | Existence | Existence | 55 | alkali silicate | 21 | Spraying | very good |
| Inv. Example 977 | 9.9 | FC | 13.1 | 1.17 | 2.7 | 1.8 | Existence | Existence | 49 | alkali silicate | 19 | Spraying | very good |
| Inv. Example 978 | 0.4 | FC | 29.9 | 1.16 | 3.6 | 0.9 | Existence | Existence | 77 | alkyl silicate | 15 | Spraying | very good |
| Inv. Example 979 | 10.5 | FC | 0.21 | 1.27 | 0 | 0.7 | Existence | Existence | 41 | alkali silicate | 18 | Spraying | very good |
| Inv. Example 980 | 0.4 | FC | 0.22 | 1.17 | 0.06 | 1.8 | Existence | Existence | 64 | alkyl silicate | 22 | Spraying | very good |
| Inv. Example 981 | 10.5 | FC | 29.5 | 1.27 | 0.02 | 0.7 | Existence | Existence | 58 | alkali silicate | 21 | Spraying | very good |
| Inv. Example 982 | 0.51 | FC | 29.9 | 1.18 | 1.6 | 1.5 | Existence | Existence | 33 | alkyl silicate | 29 | Spraying | very good |
| Inv. Example 983 | 9.8 | FC | 0.21 | 1.23 | 3.5 | 0 | Existence | Existence | 66 | alkali silicate | 23 | Spraying | very good |
| Inv. Example 984 | 0.52 | FC | 0.22 | 1.27 | 9.8 | 1.8 | Existence | Existence | 55 | alkali silicate | 21 | Spraying | very good |
| Inv. Example 985 | 9.9 | FC | 29.5 | 1.17 | 11.5 | 0.9 | Existence | No | 49 | alkali silicate | 19 | Spraying | very good |

(*1) F: Fracture facets existing, FC: Fracture facets and/or cracks existing, NO: No fracture facet and/or crack

TABLE 37

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ |
| Inv. Example 986 | 14.8 | FC | 16.02 | 1.48 | 0.4 | 0.7 | Existence | Existence |
| Inv. Example 987 | 16.7 | FC | 1.75 | 1.49 | 0.6 | 1.8 | Existence | Existence |
| Inv. Example 988 | 17.9 | FC | 12.4 | 1.34 | 10.6 | 0.7 | Existence | Existence |
| Inv. Example 989 | 19.5 | FC | 17.2 | 1.29 | 9.5 | 0.7 | Existence | Existence |
| Comp. Example 35 | 2.3 | FC | 205.6 | 1.23 | 0.07 | 0 | Existence | Existence |
| Comp. Example 36 | 2.3 | FC | 0.005 | 1.23 | 0 | 0.07 | Existence | Existence |
| Comp. Example 37 | 2.3 | FC | 205.6 | 1.23 | 0 | 0.02 | Existence | Existence |
| Comp. Example 38 | 2.3 | FC | 0.005 | 1.23 | 22.1 | 0 | Existence | Existence |
| Comp. Example 39 | 0.01 | FC | 0.4 | 1.24 | 1.2 | 0.5 | Existence | Existence |
| Comp. Example 40 | 0.8 | FC | 3.2 | 2.54 | 0.6 | 0.8 | Existence | Existence |
| Comp. Example 41 | 8.47 | NO | 0.67 | 1.25 | 2 | 1.9 | Existence | Existence |
| Comp. Example 42 | 24.5 | NO | 2.5 | 1.05 | 0.8 | 0.9 | Existence | Existence |
| Comp. Example 43 | 0.01 | FC | 0.4 | 1.24 | 0 | 0.02 | Existence | Existence |
| Comp. Example 44 | 0.8 | FC | 0.2 | 1.78 | 25.8 | 0.05 | Existence | Existence |
| Comp. Example 45 | 8.47 | NO | 0.67 | 1.25 | 22.1 | 0 | Existence | Existence |
| Comp. Example 46 | 24.5 | NO | 2.5 | 1.05 | 21.5 | 0.05 | Existence | Existence |
| Comp. Example 47 | 4.05 | NO | 0.02 | 1.23 | 0.05 | 2.29 | Existence | Existence |
| Comp. Example 48 | 6.78 | NO | 12.5 | 1.35 | 0 | 0 | Existence | Existence |
| Comp. Example 49 | 15.8 | NO | 23.3 | 1.14 | 0 | 0 | Existence | Existence |
| Comp. Example 50 | 4.5 | FC | 3.5 | 2.84 | 22.1 | 0 | Existence | Existence |
| Comp. Example 51 | 3.2 | FC | 6.7 | 1.75 | 0.05 | 2.29 | Existence | Existence |

| | Coat Properties | | | | |
|---|---|---|---|---|---|
| | Ratio of Metal Particle in Dry Coat (mass %) | Base Resin | Coat Thickness (μm) | Coating Method | Result of Corrosion Test |
| Inv. Example 986 | 77 | alkyl silicate | 21 | Spraying | very good |
| Inv. Example 987 | 43 | alkali silicate | 19 | Spraying | very good |
| Inv. Example 988 | 45 | alkali silicate | 15 | Spraying | very good |
| Inv. Example 989 | 66 | alkali silicate | 18 | Spraying | very good |
| Comp. Example 35 | 75 | alkyl silicate | 25 | Spraying | poor |
| Comp. Example 36 | 75 | alkyl silicate | 25 | Spraying | poor |
| Comp. Example 37 | 75 | alkyl silicate | 105 | Brushing | poor |
| Comp. Example 38 | 75 | alkyl silicate | 165 | Spraying | poor |
| Comp. Example 39 | 58 | acryl-based resin | 5 | Spraying | poor |
| Comp. Example 40 | 64 | urethane-based resin | 2 | Spraying | poor |
| Comp. Example 41 | 54 | polyester resin | 12 | Brushing | poor |
| Comp. Example 42 | 32 | epoxy-based resin | 15 | Brushing | poor |
| Comp. Example 43 | 57 | alkali silicate | 2 | Spraying | poor |
| Comp. Example 44 | 70 | alkyl silicate | 5 | Spraying | poor |
| Comp. Example 45 | 64 | alkali silicate | 12 | Brushing | poor |
| Comp. Example 46 | 42 | alkyl silicate | 15 | Brushing | poor |
| Comp. Example 47 | 38 | alkali silicate | 13 | Brushing | poor |
| Comp. Example 48 | 44 | alkyl silicate | 22 | Spraying | poor |
| Comp. Example 49 | 56 | alkali silicate | 34 | Spraying | poor |
| Comp. Example 50 | 76 | alkyl silicate | 15 | Brushing | poor |
| Comp. Example 51 | 65 | alkyl silicate | 15 | Spraying | poor |

(*1) F: Fracture facets existing, FC: Fracture facets and/or cracks existing, NO: No fracture facet and/or crack

TABLE 38

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, $MgZn$, or $Mg_7Zn_3$ |
| Inv. Example 2139 | 7.5 | FC | 5.07 | 1.42 | 0 | 0 | Existence | Existence |
| Inv. Example 2140 | 8.06 | FC | 7.72 | 1.38 | 0 | 0 | Existence | Existence |

TABLE 38-continued

| | | | | | | | | |
|---|---|---|---|---|---|---|---|---|
| Inv. Example 2141 | 9.3 | FC | 8.32 | 1.22 | 0 | 0 | Existence | No |
| Inv. Example 2142 | 3.5 | FC | 3.04 | 1.02 | 0 | 0 | Existence | Existence |
| Inv. Example 2143 | 2.7 | FC | 4.12 | 1.21 | 0 | 0 | Existence | No |
| Inv. Example 2144 | 9.2 | FC | 7.81 | 1.47 | 0 | 0 | Existence | Existence |
| Inv. Example 2145 | 8.1 | FC | 1.45 | 1.31 | 0 | 0 | Existence | No |
| Inv. Example 2146 | 7.5 | FC | 9.6 | 1.07 | 0 | 0 | Existence | Existence |
| Inv. Example 2147 | 4.5 | FC | 8.5 | 1.42 | 0 | 0 | Existence | No |
| Inv. Example 2148 | 3.6 | FC | 3.2 | 1.05 | 0 | 0 | Existence | No |
| Inv. Example 2149 | 4.2 | FC | 5.7 | 1.02 | 1.5 | 0 | Existence | Existence |
| Inv. Example 2150 | 4.3 | FC | 6.4 | 1.06 | 5.5 | 1.6 | Existence | No |
| Inv. Example 2151 | 4 | FC | 3.2 | 1.05 | 0 | 0 | Existence | Existence |
| Inv. Example 2152 | 6.4 | FC | 5.2 | 1.33 | 0 | 0 | Existence | Existence |
| Inv. Example 2153 | 9.8 | FC | 5.2 | 1.33 | 0 | 0 | Existence | No |
| Inv. Example 2154 | 7.5 | FC | 5.07 | 1.42 | 0 | 0 | Existence | No |
| Inv. Example 2155 | 8.4 | FC | 7.72 | 1.38 | 0.5 | 0 | Existence | Existence |
| Inv. Example 2156 | 2.7 | FC | 4.12 | 1.21 | 0 | 0 | Existence | No |
| Inv. Example 2157 | 2.64 | FC | 5.5 | 1.22 | 0 | 0 | Existence | No |
| Inv. Example 2158 | 1.59 | FC | 6.7 | 1.14 | 0 | 0 | Existence | Existence |
| Inv. Example 2159 | 2.58 | FC | 8.9 | 1.13 | 0 | 0 | Existence | Existence |
| Inv. Example 2160 | 7.55 | FC | 2.15 | 1.14 | 0 | 0 | Existence | Existence |
| Inv. Example 2161 | 8.01 | FC | 2.54 | 1.13 | 0 | 0 | Existence | No |
| Inv. Example 2162 | 1.06 | FC | 3.4 | 1.38 | 0 | 0 | Existence | Existence |
| Inv. Example 2163 | 2.64 | FC | 5.5 | 1.22 | 0 | 0 | Existence | Existence |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 2139 | 74 | alkali silicate | 24 | Brushing | very good |
| Inv. Example 2140 | 82 | alkyl silicate | 25 | Spraying | very good |
| Inv. Example 2141 | 37 | alkali silicate | 14 | Spraying | very good |
| Inv. Example 2142 | 48 | alkali silicate | 15 | Spraying | very good |
| Inv. Example 2143 | 32 | alkali silicate | 15 | Spraying | very good |
| Inv. Example 2144 | 45 | alkyl silicate | 15 | Brushing | very good |
| Inv. Example 2145 | 37 | epoxy-based resin | 5 | Spraying | good |
| Inv. Example 2146 | 72 | urethane-based resin | 150 | Spraying | very good |
| Inv. Example 2147 | 40 | alkali silicate | 18 | Spraying | very good |
| Inv. Example 2148 | 40 | alkali silicate | 18 | Spraying | very good |
| Inv. Example 2149 | 72 | alkyl silicate | 58 | Spraying | very good |
| Inv. Example 2150 | 40 | alkyl silicate | 21 | Spraying | very good |
| Inv. Example 2151 | 36 | alkali silicate | 19 | Brushing | very good |
| Inv. Example 2152 | 53 | alkyl silicate | 77 | Spraying | very good |
| Inv. Example 2153 | 53 | alkyl silicate | 77 | Spraying | very good |
| Inv. Example 2154 | 66 | alkali silicate | 13 | Brushing | very good |
| Inv. Example 2155 | 67 | alkyl silicate | 22 | Brushing | very good |
| Inv. Example 2156 | 57 | alkali silicate | 15 | Spraying | very good |
| Inv. Example 2157 | 43 | alkyl silicate | 16 | Spraying | very good |
| Inv. Example 2158 | 76 | alkyl silicate | 5 | Spraying | very good |
| Inv. Example 2159 | 49 | alkyl silicate | 22 | Spraying | very good |
| Inv. Example 2160 | 75 | alkyl silicate | 18 | Spraying | very good |
| Inv. Example 2161 | 73 | alkyl silicate | 16 | Spraying | very good |
| Inv. Example 2162 | 49 | alkyl silicate | 8 | Spraying | very good |
| Inv. Example 2163 | 43 | alkyl silicate | 16 | Spraying | very good |

(*1) F: Fracture facets existing, FC: Fracture facets and/or cracks existing, NO: No fracture facet and/or crack

TABLE 39

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, MgZn, or $Mg_7Zn_3$ |
| Inv. Example 2164 | 1.59 | FC | 6.7 | 1.14 | 0 | 0 | Existence | Existence |
| Inv. Example 2165 | 20.5 | FC | 2.15 | 1.14 | 1.5 | 0 | Existence | No |
| Inv. Example 2166 | 18.5 | FC | 2.54 | 1.13 | 5.5 | 1.6 | Existence | Existence |
| Inv. Example 2167 | 9.51 | FC | 2.77 | 1.38 | 4.5 | 0 | Existence | Existence |
| Inv. Example 2168 | 10.01 | FC | 3.68 | 1.22 | 0 | 1.6 | Existence | Existence |

TABLE 39-continued

| | | | | | | | | |
|---|---|---|---|---|---|---|---|---|
| Inv. Example 2169 | 3.54 | FC | 5.5 | 1.22 | 0 | 0 | Existence | No |
| Inv. Example 2170 | 4.05 | FC | 2.06 | 1.13 | 0 | 0 | Existence | Existence |
| Inv. Example 2171 | 8.57 | FC | 4.99 | 1.02 | 0 | 0 | Existence | Existence |
| Inv. Example 2172 | 0.01 | FC | 6.4 | 1.06 | 0 | 0 | Existence | No |
| Inv. Example 2173 | 25.5 | FC | 3.09 | 1.07 | 0 | 0 | Existence | Existence |
| Inv. Example 2174 | 2.36 | FC | 3.99 | 1.22 | 0 | 0 | Existence | No |
| Inv. Example 2175 | 0.05 | FC | 7.72 | 1.38 | 0 | 0 | Existence | Existence |
| Inv. Example 2176 | 0.04 | FC | 8.32 | 1.22 | 0 | 0 | Existence | No |
| Inv. Example 2177 | 5.22 | FC | 3.55 | 1.12 | 0 | 0 | Existence | Existence |
| Inv. Example 2178 | 4.01 | FC | 2.64 | 1.23 | 0 | 0 | Existence | Existence |
| Inv. Example 2179 | 0.05 | FC | 5.2 | 1.33 | 0 | 0 | Existence | Existence |
| Inv. Example 2180 | 0.04 | FC | 1.9 | 1.27 | 0 | 0 | Existence | Existence |
| Inv. Example 2181 | 0.05 | FC | 2.5 | 1.05 | 0 | 1.2 | Existence | No |
| Inv. Example 2182 | 0.07 | FC | 0.09 | 1.12 | 0 | 0.6 | Existence | No |
| Inv. Example 2183 | 2.64 | FC | 5.5 | 1.22 | 0 | 0.01 | Existence | No |
| Inv. Example 2184 | 0.08 | FC | 5.6 | 1.36 | 1.5 | 0 | Existence | Existence |
| Inv. Example 2185 | 0.09 | FC | 11.5 | 1.11 | 5.5 | 1.6 | Existence | No |
| Inv. Example 2186 | 0.05 | FC | 19.5 | 1.07 | 4.5 | 0 | Existence | Existence |
| Inv. Example 2187 | 1.59 | FC | 6.7 | 1.14 | 0 | 0.1 | Existence | Existence |
| Inv. Example 2188 | 2.58 | FC | 8.9 | 1.13 | 0.01 | 0 | Existence | Existence |

| | Coat Properties | | | |
|---|---|---|---|---|
| | Ratio of Metal Particle in Dry Coat (mass %) | Base Resin | Coat Thickness ($\mu m$) | Coating Method | Result of Corrosion Test |
| Inv. Example 2164 | 76 | alkyl silicate | 5 | Spraying | very good |
| Inv. Example 2165 | 75 | alkyl silicate | 18 | Spraying | very good |
| Inv. Example 2166 | 73 | alkyl silicate | 16 | Spraying | very good |
| Inv. Example 2167 | 55 | alkyl silicate | 5 | Spraying | very good |
| Inv. Example 2168 | 48 | alkyl silicate | 22 | Spraying | very good |
| Inv. Example 2169 | 78 | alkyl silicate | 18 | Spraying | very good |
| Inv. Example 2170 | 52 | alkyl silicate | 8 | Spraying | very good |
| Inv. Example 2171 | 61 | alkyl silicate | 16 | Spraying | very good |
| Inv. Example 2172 | 77 | polyester resin | 47 | Spraying | very good |
| Inv. Example 2173 | 49 | alkyl silicate | 22 | Spraying | very good |
| Inv. Example 2174 | 80 | alkyl silicate | 21 | Spraying | very good |
| Inv. Example 2175 | 36 | alkyl silicate | 19 | Brushing | very good |
| Inv. Example 2176 | 32 | alkyl silicate | 24 | Spraying | very good |
| Inv. Example 2177 | 55 | alkyl silicate | 19 | Spraying | very good |
| Inv. Example 2178 | 40 | alkyl silicate | 8 | Spraying | very good |
| Inv. Example 2179 | 53 | urethane-based resin | 20 | Brushing | very good |
| Inv. Example 2180 | 60 | polyester resin | 200 | Brushing | very good |
| Inv. Example 2181 | 38 | alkali silicate | 19 | Spraying | very good |
| Inv. Example 2182 | 49 | alkyl silicate | 11 | Spraying | very good |
| Inv. Example 2183 | 43 | alkyl silicate | 16 | Spraying | very good |
| Inv. Example 2184 | 66 | alkyl silicate | 16 | Brushing | very good |
| Inv. Example 2185 | 67 | alkali silicate | 33 | Brushing | very good |
| Inv. Example 2186 | 54 | alkyl silicate | 8 | Brushing | good |
| Inv. Example 2187 | 76 | alkyl silicate | 5 | Spraying | very good |
| Inv. Example 2188 | 49 | alkyl silicate | 22 | Spraying | very good |

(*1) F: Fracture facets existing, FC: Fracture facets and/or cracks existing, NO: No fracture facet and/or crack

TABLE 40

| | Zn-Alloy Particle Properties | | | | | | | |
|---|---|---|---|---|---|---|---|---|
| | Mg (mass %) | Fracture Facet &/or Cracks (*1) | Mean Size ($\mu m$) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, $MgZn$, or $Mg_7Zn_3$ |
| Inv. Example 2189 | 0.06 | FC | 8.32 | 1.22 | 3.2 | 0.9 | Existence | Existence |
| Inv. Example 2190 | 0.18 | FC | 10.05 | 1.14 | 0 | 0.5 | Existence | Existence |
| Inv. Example 2191 | 7.55 | FC | 2.15 | 1.14 | 0.2 | 0.1 | Existence | Existence |
| Inv. Example 2192 | 0.01 | FC | 0.06 | 1.23 | 1.2 | 0.6 | Existence | No |
| Inv. Example 2193 | 12.5 | FC | 2.54 | 1.13 | 0.5 | 0 | Existence | Existence |
| Inv. Example 2194 | 1.06 | FC | 3.4 | 1.38 | 1.5 | 0.9 | Existence | Existence |
| Inv. Example 2195 | 0.04 | FC | 8.5 | 1.42 | 0 | 1.2 | Existence | No |
| Inv. Example 2196 | 0.06 | FC | 7.72 | 1.38 | 0 | 0.6 | Existence | Existence |
| Inv. Example 2197 | 9.51 | FC | 2.77 | 1.38 | 0 | 0.01 | Existence | No |

TABLE 40-continued

| | | | | | | | | |
|---|---|---|---|---|---|---|---|---|
| Inv. Example 2198 | 15.5 | FC | 3.68 | 1.22 | 1.5 | 0 | Existence | Existence |
| Inv. Example 2199 | 0.05 | FC | 10.6 | 1.13 | 5.5 | 1.6 | Existence | No |
| Inv. Example 2200 | 0.07 | FC | 5.7 | 1.02 | 4.5 | 0 | Existence | No |
| Inv. Example 2201 | 3.54 | FC | 5.5 | 1.22 | 0 | 0.1 | Existence | Existence |
| Inv. Example 2202 | 0.08 | FC | 3.2 | 1.05 | 0.01 | 0 | Existence | Existence |
| Inv. Example 2203 | 0.07 | FC | 4.5 | 1.24 | 3.2 | 0.9 | Existence | Existence |
| Inv. Example 2204 | 15.5 | FC | 2.54 | 1.14 | 0 | 0.5 | Existence | No |
| Inv. Example 2205 | 4.05 | FC | 2.06 | 1.13 | 0.2 | 0.1 | Existence | Existence |
| Inv. Example 2206 | 8.57 | FC | 4.99 | 1.02 | 1.2 | 0.6 | Existence | No |
| Inv. Example 2207 | 0.01 | FC | 6.4 | 1.06 | 0.5 | 0 | Existence | Existence |
| Inv. Example 2208 | 4.59 | FC | 3.09 | 1.07 | 1.5 | 0.9 | Existence | No |
| Inv. Example 2209 | 9.88 | FC | 4.66 | 1.42 | 0 | 1.2 | Existence | No |
| Inv. Example 2210 | 4.55 | FC | 4.09 | 1.38 | 0 | 0.6 | Existence | Existence |
| Inv. Example 2211 | 2.36 | FC | 3.99 | 1.22 | 0 | 0.01 | Existence | No |
| Inv. Example 2212 | 0.05 | FC | 7.72 | 1.38 | 1.5 | 0 | Existence | Existence |
| Inv. Example 2213 | 0.04 | FC | 8.32 | 1.22 | 5.5 | 1.6 | Existence | Existence |

| | Coat Properties | | | | |
|---|---|---|---|---|---|
| | Ratio of Metal Particle in Dry Coat (mass %) | Base Resin | Coat Thickness (μm) | Coating Method | Result of Corrosion Test |
| Inv. Example 2189 | 32 | alkyl silicate | 23 | Spraying | very good |
| Inv. Example 2190 | 53 | epoxy-based resin | 30 | Spraying | very good |
| Inv. Example 2191 | 75 | alkyl silicate | 18 | Spraying | very good |
| Inv. Example 2192 | 75 | alkali silicate | 5 | Spraying | good |
| Inv. Example 2193 | 73 | alkyl silicate | 16 | Spraying | very good |
| Inv. Example 2194 | 49 | alkyl silicate | 8 | Spraying | very good |
| Inv. Example 2195 | 40 | alkali silicate | 2 | Spraying | very good |
| Inv. Example 2196 | 36 | alkyl silicate | 18 | Spraying | very good |
| Inv. Example 2197 | 55 | alkyl silicate | 5 | Spraying | very good |
| Inv. Example 2198 | 48 | alkyl silicate | 22 | Spraying | very good |
| Inv. Example 2199 | 67 | acryl-based resin | 77 | Brushing | very good |
| Inv. Example 2200 | 72 | urethane-based resin | 54 | Brushing | very good |
| Inv. Example 2201 | 78 | alkyl silicate | 18 | Spraying | very good |
| Inv. Example 2202 | 34 | epoxy-based resin | 43 | Spraying | very good |
| Inv. Example 2203 | 43 | acryl-based resin | 52 | Brushing | very good |
| Inv. Example 2204 | 45 | alkyl silicate | 19 | Spraying | very good |
| Inv. Example 2205 | 52 | alkyl silicate | 8 | Spraying | very good |
| Inv. Example 2206 | 61 | alkyl silicate | 16 | Spraying | very good |
| Inv. Example 2207 | 77 | polyester resin | 47 | Spraying | very good |
| Inv. Example 2208 | 49 | alkyl silicate | 22 | Spraying | very good |
| Inv. Example 2209 | 79 | alkyl silicate | 18 | Spraying | very good |
| Inv. Example 2210 | 76 | alkyl silicate | 18 | Spraying | very good |
| Inv. Example 2211 | 80 | alkyl silicate | 21 | Spraying | very good |
| Inv. Example 2212 | 36 | alkyl silicate | 19 | Brushing | very good |
| Inv. Example 2213 | 32 | alkyl silicate | 24 | Spraying | very good |

(*1) F: Fracture facets existing, FC: Fracture facets and/or cracks existing, NO: No fracture facet and/or crack

TABLE 41

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, $MgZn$, or $Mg_7Zn_3$ |
| Inv. Example 2214 | 2.64 | FC | 4.55 | 1.11 | 4.5 | 0 | Existence | No |
| Inv. Example 2215 | 0.06 | FC | 10.6 | 1.13 | 0 | 0.1 | Existence | No |
| Inv. Example 2216 | 0.18 | FC | 5.7 | 1.02 | 0.01 | 0 | Existence | Existence |
| Inv. Example 2217 | 6.31 | FC | 3.52 | 1.27 | 3.2 | 0.9 | Existence | No |
| Inv. Example 2218 | 5.22 | FC | 3.55 | 1.12 | 0 | 0.5 | Existence | No |
| Inv. Example 2219 | 28.5 | FC | 2.64 | 1.23 | 0.2 | 0.1 | Existence | Existence |
| Inv. Example 2220 | 3.52 | FC | 3.15 | 1.36 | 1.2 | 0.6 | Existence | Existence |
| Inv. Example 2221 | 0.05 | FC | 5.2 | 1.33 | 0.5 | 0 | Existence | Existence |
| Inv. Example 2222 | 0.04 | FC | 1.9 | 1.27 | 1.5 | 0.9 | Existence | No |
| Inv. Example 2223 | 0.06 | FC | 10.5 | 1.12 | 0 | 1.2 | Existence | Existence |
| Inv. Example 2224 | 0.05 | FC | 12.5 | 1.23 | 0 | 0.6 | Existence | Existence |
| Inv. Example 2225 | 0.07 | FC | 18.5 | 1.36 | 0 | 0.01 | Existence | Existence |
| Inv. Example 2226 | 0.01 | FC | 11.5 | 1.11 | 1.5 | 0 | Existence | No |
| Inv. Example 2227 | 0.08 | FC | 9.6 | 1.07 | 5.5 | 1.6 | Existence | Existence |
| Inv. Example 2228 | 0.03 | FC | 8.5 | 1.42 | 4.5 | 0 | Existence | Existence |

TABLE 41-continued

| | | | | | | | |
|---|---|---|---|---|---|---|---|
| Inv. Example 2229 | 4.25 | FC | 2.36 | 1.33 | 0 | 0.1 | Existence | Existence |
| Inv. Example 2230 | 0.04 | FC | 23.5 | 1.42 | 0.01 | 0 | Existence | No |
| Inv. Example 2231 | 0.06 | FC | 101.5 | 1.38 | 3.2 | 0.9 | Existence | Existence |
| Inv. Example 2232 | 0.06 | FC | 55.4 | 1.38 | 0 | 0.5 | Existence | Existence |
| Inv. Example 2233 | 0.07 | FC | 10.5 | 1.12 | 0.2 | 0.1 | Existence | No |
| Inv. Example 2234 | 0.01 | FC | 12.5 | 1.23 | 1.2 | 0.6 | Existence | Existence |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 2214 | 43 | alkyl silicate | 5 | Spraying | very good |
| Inv. Example 2215 | 67 | alkyl silicate | 7 | Spraying | very good |
| Inv. Example 2216 | 72 | epoxy-based resin | 100 | Spraying | very good |
| Inv. Example 2217 | 51 | alkyl silicate | 21 | Spraying | very good |
| Inv. Example 2218 | 55 | alkyl silicate | 19 | Spraying | very good |
| Inv. Example 2219 | 40 | alkyl silicate | 8 | Spraying | very good |
| Inv. Example 2220 | 51 | alkyl silicate | 16 | Spraying | very good |
| Inv. Example 2221 | 53 | urethane-based resin | 20 | Brushing | very good |
| Inv. Example 2222 | 60 | polyester resin | 200 | Brushing | very good |
| Inv. Example 2223 | 77 | alkyl silicate | 25 | Spraying | very good |
| Inv. Example 2224 | 43 | alkali silicate | 14 | Spraying | very good |
| Inv. Example 2225 | 52 | urethane-based resin | 112 | Spraying | very good |
| Inv. Example 2226 | 66 | alkali silicate | 24 | Spraying | very good |
| Inv. Example 2227 | 72 | urethane-based resin | 150 | Spraying | very good |
| Inv. Example 2228 | 40 | alkali silicate | 18 | Spraying | very good |
| Inv. Example 2229 | 44 | alkyl silicate | 18 | Spraying | very good |
| Inv. Example 2230 | 44 | alkali silicate | 38 | Spraying | very good |
| Inv. Example 2231 | 36 | alkyl silicate | 18 | Spraying | very good |
| Inv. Example 2232 | 76 | alkyl silicate | 10 | Spraying | very good |
| Inv. Example 2233 | 77 | alkyl silicate | 37 | Spraying | very good |
| Inv. Example 2234 | 43 | alkali silicate | 2 | Spraying | good |

(*1) F: Fracture facets existing, FC: Fracture facets and/or cracks existing, NO: No fracture facet and/or crack

TABLE 42

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, $MgZn$, or $Mg_7Zn_3$ |
| Inv. Example 2235 | 0.08 | FC | 18.5 | 1.36 | 0.5 | 0 | Existence | No |
| Inv. Example 2236 | 0.09 | FC | 11.5 | 1.11 | 1.5 | 0.9 | Existence | Existence |
| Inv. Example 2237 | 0.05 | FC | 9.6 | 1.07 | 0.5 | 0 | Existence | No |
| Inv. Example 2238 | 0.06 | FC | 10.05 | 1.14 | 1.5 | 0.9 | Existence | Existence |
| Inv. Example 2239 | 29.9 | FC | 10.5 | 1.36 | 0 | 0 | Existence | Existence |
| Inv. Example 2240 | 16.5 | FC | 7.5 | 1.11 | 0.01 | 0 | Existence | Existence |
| Inv. Example 2241 | 12.5 | FC | 2.6 | 1.07 | 3.2 | 0.9 | Existence | No |
| Inv. Example 2242 | 9.8 | FC | 3.5 | 1.42 | 0 | 0.5 | Existence | Existence |
| Inv. Example 2243 | 9.6 | FC | 4.5 | 1.33 | 0.2 | 0.1 | Existence | No |
| Inv. Example 2244 | 7.5 | FC | 1.6 | 1.42 | 0 | 0.5 | Existence | Existence |
| Inv. Example 2245 | 4.6 | FC | 2.5 | 1.12 | 5.8 | 0.1 | Existence | Existence |
| Inv. Example 2246 | 3.8 | FC | 23.5 | 1.23 | 1.2 | 0.6 | Existence | Existence |
| Inv. Example 2247 | 0.05 | FC | 9.8 | 1.27 | 15.5 | 0 | Existence | Existence |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 2235 | 52 | alkyl silicate | 160 | Brushing | very good |
| Inv. Example 2236 | 66 | alkali silicate | 5 | Brushing | very good |
| Inv. Example 2237 | 72 | alkyl silicate | 56 | Brushing | very good |

TABLE 42-continued

| | | | | | |
|---|---|---|---|---|---|
| Inv. Example 2238 | 53 | urethane-based resin | 99 | Spraying | very good |
| Inv. Example 2239 | 55 | urethane-based resin | 700 | Spraying | very good |
| Inv. Example 2240 | 47 | alkyl silicate | 554 | Spraying | very good |
| Inv. Example 2241 | 79 | urethane-based resin | 688 | Brushing | very good |
| Inv. Example 2242 | 42 | urethane-based resin | 421 | Spraying | very good |
| Inv. Example 2243 | 36 | urethane-based resin | 651 | Spraying | very good |
| Inv. Example 2244 | 53 | urethane-based resin | 402 | Brushing | very good |
| Inv. Example 2245 | 55 | alkali silicate | 354 | Spraying | very good |
| Inv. Example 2246 | 42 | urethane-based resin | 504 | Brushing | very good |
| Inv. Example 2247 | 76 | urethane-based resin | 666 | Spraying | very good |

(*1) F: Fracture facets existing, FC: Fracture facets and/or cracks existing, NO: No fracture facet and/or crack

Example 4

Zn alloy particles with the chemical ingredients shown in Tables 43 to 57 were prepared in the same way as in Example 1. The rest is the same as Example 3.

$MgZn_2$, $Mg_2Zn_{11}$, $Mg_2Zn_3$, $MgZn$, or, $Mg_7Zn_3$ were identified by analysis of the ratio of composition of the Mg and Zn at the physical fracture facets or crack surfaces by the X-ray diffraction method or by observation by a scanning electron microscopy with an energy dispersion type X-ray analyzer.

Further, the number of facets of the Zn alloy particles was measured by observing 50 to 100 randomly extracted particles by a scan type electron microscope.

From Tables 43 to 57, it is learned that due to the surfaces of the particles including fractured parts having, as intermetallic compounds, at least one type of compound of $MgZn_2$, $Mg_2Zn_{11}$, $Mg_2Zn_3$, $MgZn$, and $Mg_7Zn_3$ or due to the number of facets being two facets or more, the painting test pieces using the Zn alloy particles of the present invention are improved in corrosion resistance and rust protection regardless of the type of base resin, that is, both for inorganic-based and organic-based binders.

TABLE 43

Zn-Alloy Particle Properties

| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ | # of facets |
|---|---|---|---|---|---|---|---|---|---|
| Inv. Example 139 | 17.3 | F | 29.24 | 1.37 | 11.4 | 0.24 | Existence | No | 6 |
| Inv. Example 140 | 18.5 | F | 1.28 | 1.10 | 0.04 | 0.03 | Existence | No | 6 |
| Inv. Example 141 | 19.3 | F | 33.57 | 1.04 | 0.25 | 0.07 | Existence | No | 7 |
| Inv. Example 142 | 3.5 | F | 3.04 | 1.02 | 5.43 | 0.65 | Existence | No | 7 |
| Inv. Example 143 | 22.5 | F | 7.54 | 1.01 | 17.5 | 2.41 | Existence | No | 6 |
| Inv. Example 144 | 23.7 | F | 68.12 | 1.08 | 0.01 | 0.08 | Existence | No | 6 |
| Inv. Example 145 | 24.2 | F | 0.52 | 1.14 | 0.02 | 2.23 | Existence | No | 6 |
| Inv. Example 146 | 0.2 | F | 0.12 | 1.23 | 0.02 | 0.06 | Existence | No | 7 |
| Inv. Example 147 | 27.1 | F | 58.74 | 1.33 | 0.04 | 0.02 | Existence | No | 6 |
| Inv. Example 148 | 29.3 | F | 13.57 | 1.37 | 0.05 | 0.02 | Existence | No | 6 |
| Inv. Example 149 | 0.5 | F | 6.4 | 1.44 | 1.24 | 1.37 | Existence | No | 6 |
| Inv. Example 150 | 2.7 | F | 41.23 | 1.21 | 27.5 | 2.43 | Existence | No | 7 |
| Inv. Example 151 | 28.4 | F | 0.72 | 1.22 | 0.01 | 0.02 | Existence | No | 6 |
| Inv. Example 152 | 8.7 | F | 1.18 | 1.23 | 0.01 | 0.01 | Existence | No | 7 |
| Inv. Example 153 | 9.2 | F | 7.12 | 1.47 | 0.02 | 0.05 | Existence | No | 6 |
| Inv. Example 154 | 17.8 | F | 8.01 | 1.01 | 0.03 | 0.04 | Existence | No | 6 |
| Inv. Example 155 | 20.2 | F | 0.84 | 1.04 | 7.78 | 0.24 | Existence | No | 6 |
| Inv. Example 156 | 0.4 | F | 87.65 | 1.05 | 0.04 | 0.06 | Existence | No | 7 |
| Inv. Example 157 | 13.7 | F | 2.59 | 1.12 | 11.21 | 0.74 | Existence | No | 6 |
| Inv. Example 158 | 14.7 | F | 93.45 | 1.11 | 0.09 | 0.01 | Existence | No | 6 |
| Inv. Example 159 | 2.4 | F | 9.84 | 1.08 | 5.41 | 1.27 | Existence | No | 7 |
| Inv. Example 160 | 4.5 | F | 5.45 | 1.47 | 0.02 | 0.03 | Existence | No | 6 |
| Inv. Example 161 | 0.1 | F | 1.08 | 1.50 | 0.02 | 0.07 | Existence | No | 7 |
| Inv. Example 162 | 30.0 | F | 180.24 | 1.13 | 0.03 | 0.08 | Existence | Existence | 6 |
| Inv. Example 163 | 24.5 | F | 11.4 | 1.04 | 11.04 | 0.21 | Existence | Existence | 6 |
| Inv. Example 164 | 27.6 | F | 38.75 | 1.02 | 0.01 | 0.02 | Existence | Existence | 6 |

Coat Properties

| | Ratio of Metal Particle in Dry Coat (mass %) | Base Resin | Coat Thickness (μm) | Coating Method | Result of Corrosion Test |
|---|---|---|---|---|---|
| Inv. Example 139 | 30 | alkali silicate | 35 | Spraying | very good |
| Inv. Example 140 | 34 | alkyl silicate | 5 | Spraying | very good |

TABLE 43-continued

| | | | | | |
|---|---|---|---|---|---|
| Inv. Example 141 | 42 | alkali silicate | 43 | Spraying | very good |
| Inv. Example 142 | 51 | alkyl silicate | 15 | Spraying | very good |
| Inv. Example 143 | 33 | alkali silicate | 20 | Spraying | very good |
| Inv. Example 144 | 64 | alkyl silicate | 70 | Brushing | very good |
| Inv. Example 145 | 74 | alkali silicate | 2 | Brushing | very good |
| Inv. Example 146 | 82 | alkyl silicate | 3 | Brushing | very good |
| Inv. Example 147 | 37 | alkali silicate | 65 | Brushing | very good |
| Inv. Example 148 | 42 | alkyl silicate | 23 | Spraying | very good |
| Inv. Example 149 | 66 | alkali silicate | 15 | Spraying | very good |
| Inv. Example 150 | 48 | alkyl silicate | 55 | Brushing | very good |
| Inv. Example 151 | 33 | alkali silicate | 2 | Brushing | very good |
| Inv. Example 152 | 75 | alkyl silicate | 15 | Brushing | very good |
| Inv. Example 153 | 77 | alkali silicate | 20 | Spraying | very good |
| Inv. Example 154 | 68 | alkyl silicate | 22 | Spraying | very good |
| Inv. Example 155 | 61 | alkali silicate | 56 | Brushing | very good |
| Inv. Example 156 | 59 | alkyl silicate | 95 | Brushing | very good |
| Inv. Example 157 | 39 | alkali silicate | 13 | Spraying | very good |
| Inv. Example 158 | 42 | alkyl silicate | 100 | Brushing | very good |
| Inv. Example 159 | 48 | alkali silicate | 18 | Spraying | very good |
| Inv. Example 160 | 44 | alkyl silicate | 15 | Spraying | very good |
| Inv. Example 161 | 47 | alkali silicate | 12 | Spraying | very good |
| Inv. Example 162 | 52 | alkyl silicate | 5 | Spraying | very good |
| Inv. Example 163 | 55 | alkali silicate | 130 | Brushing | very good |
| Inv. Example 164 | 69 | alkyl silicate | 70 | Brushing | very good |

(*1) F: Fracture facets existing, FC: Fracture facets and/or cracks existing, NO: No fracture facet and/or crack

TABLE 44

Zn-Alloy Particle Properties

| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ | # of facets |
|---|---|---|---|---|---|---|---|---|---|
| Inv. Example 165 | 4.1 | F | 119.87 | 1.08 | 0.07 | 0.04 | Existence | Existence | 6 |
| Inv. Example 166 | 3.2 | F | 1.42 | 1.15 | 0.08 | 0.01 | Existence | Existence | 7 |
| Inv. Example 167 | 2.7 | F | 12.5 | 1.34 | 0.04 | 0.03 | Existence | Existence | 6 |
| Inv. Example 168 | 0.12 | F | 31.24 | 1.25 | 0.02 | 0.04 | Existence | Existence | 6 |
| Inv. Example 169 | 0.22 | F | 152.46 | 1.19 | 0.02 | 0.02 | Existence | Existence | 6 |
| Inv. Example 170 | 0.37 | F | 13.4 | 1.18 | 4.12 | 0.61 | Existence | Existence | 7 |
| Inv. Example 171 | 1.4 | F | 1.61 | 1.24 | 0.05 | 0.02 | Existence | Existence | 6 |
| Inv. Example 172 | 4.2 | F | 14.1 | 1.11 | 2.14 | 0.74 | Existence | Existence | 6 |
| Inv. Example 173 | 4.8 | F | 1.67 | 1.27 | 0.03 | 0.02 | Existence | Existence | 7 |
| Inv. Example 174 | 8.1 | F | 1.45 | 1.31 | 0.03 | 0.04 | Existence | Existence | 6 |
| Inv. Example 175 | 7.6 | F | 14.8 | 1.26 | 0.04 | 0.05 | Existence | Existence | 6 |
| Inv. Example 176 | 9.9 | F | 1.31 | 1.14 | 7.54 | 1.24 | Existence | Existence | 6 |
| Inv. Example 177 | 14.8 | F | 15.5 | 1.34 | 0.08 | 0.06 | Existence | Existence | 7 |
| Inv. Example 178 | 16.7 | F | 0.67 | 1.16 | 0.01 | 0.07 | Existence | Existence | 7 |
| Inv. Example 179 | 17.9 | F | 137.89 | 1.47 | 29.8 | 0.75 | Existence | Existence | 6 |
| Inv. Example 180 | 19.5 | F | 1.63 | 1.48 | 0.01 | 0.02 | Existence | Existence | 6 |
| Inv. Example 181 | 22.4 | F | 1.12 | 1.49 | 0.03 | 0.01 | Existence | Existence | 7 |
| Inv. Example 182 | 0.17 | F | 169.88 | 1.34 | 0.02 | 0.01 | Existence | Existence | 6 |
| Inv. Example 183 | 8.3 | F | 1.72 | 1.29 | 8.04 | 1.24 | Existence | Existence | 6 |
| Inv. Example 184 | 6.5 | F | 10.5 | 1.18 | 0.06 | 0.04 | Existence | Existence | 6 |
| Inv. Example 185 | 9.7 | F | 17.7 | 1.23 | 0.08 | 0.02 | Existence | Existence | 7 |
| Inv. Example 186 | 11.4 | F | 122.54 | 1.27 | 0.03 | 0.01 | Existence | Existence | 6 |
| Inv. Example 187 | 22.5 | F | 1.84 | 1.17 | 0.04 | 0.03 | Existence | Existence | 6 |
| Inv. Example 188 | 25.7 | F | 19.1 | 1.16 | 7.42 | 1.22 | Existence | Existence | 6 |
| Inv. Example 189 | 17.8 | F | 1.75 | 1.49 | 0.02 | 0.01 | Existence | Existence | 7 |
| Inv. Example 190 | 0.14 | F | 198.78 | 1.34 | 0.08 | 0.02 | Existence | Existence | 6 |

Coat Properties

| | Ratio of Metal Particle in Dry Coat (mass %) | Base Resin | Coat Thickness (μm) | Coating Method | Result of Corrosion Test |
|---|---|---|---|---|---|
| Inv. Example 165 | 78 | alkali silicate | 123 | Brushing | very good |
| Inv. Example 166 | 42 | alkyl silicate | 15 | Spraying | very good |
| Inv. Example 167 | 32 | alkali silicate | 25 | Spraying | very good |

TABLE 44-continued

| | | | | | |
|---|---|---|---|---|---|
| Inv. Example 168 | 66 | alkyl silicate | 66 | Brushing | very good |
| Inv. Example 169 | 67 | alkali silicate | 170 | Brushing | very good |
| Inv. Example 170 | 45 | alkyl silicate | 24 | Brushing | very good |
| Inv. Example 171 | 48 | alkali silicate | 15 | Brushing | very good |
| Inv. Example 172 | 68 | alkyl silicate | 20 | Spraying | very good |
| Inv. Example 173 | 35 | alkali silicate | 15 | Spraying | very good |
| Inv. Example 174 | 37 | alkyl silicate | 12 | Spraying | very good |
| Inv. Example 175 | 38 | alkali silicate | 12 | Spraying | very good |
| Inv. Example 176 | 41 | alkyl silicate | 15 | Brushing | very good |
| Inv. Example 177 | 54 | alkali silicate | 160 | Brushing | very good |
| Inv. Example 178 | 57 | alkyl silicate | 2 | Brushing | very good |
| Inv. Example 179 | 59 | epoxy-based resin | 140 | Brushing | very good |
| Inv. Example 180 | 64 | acryl-based resin | 15 | Spraying | very good |
| Inv. Example 181 | 66 | urethane-based resin | 170 | Brushing | very good |
| Inv. Example 182 | 67 | polyester resin | 20 | Brushing | very good |
| Inv. Example 183 | 75 | epoxy-based resin | 2 | Spraying | very good |
| Inv. Example 184 | 74 | acryl-based resin | 15 | Spraying | very good |
| Inv. Example 185 | 77 | urethane-based resin | 27 | Spraying | very good |
| Inv. Example 186 | 41 | polyester resin | 145 | Brushing | very good |
| Inv. Example 187 | 35 | epoxy-based resin | 5 | Spraying | very good |
| Inv. Example 188 | 58 | acryl-based resin | 15 | Spraying | very good |
| Inv. Example 189 | 78 | urethane-based resin | 20 | Brushing | very good |
| Inv. Example 190 | 66 | polyester resin | 200 | Brushing | very good |

(*1) F: Fracture facets existing, FC: Fracture facets and/or cracks existing, NO: No fracture facet and/or crack

TABLE 45

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | # of facets |
|---|---|---|---|---|---|---|---|---|---|
| Inv. Example 990 | 0.15 | FC | 0.02 | 1.05 | 0.1 | 0.07 | Existence | Existence | 6 |
| Inv. Example 991 | 0.19 | FC | 10.5 | 1.12 | 0.04 | 0.1 | Existence | Existence | 6 |
| Inv. Example 992 | 0.18 | FC | 12.5 | 1.23 | 30.0 | 0.01 | Existence | No | 7 |
| Inv. Example 993 | 0.11 | FC | 18.5 | 1.36 | 0.02 | 3 | Existence | Existence | 7 |
| Inv. Example 994 | 0.15 | FC | 11.5 | 1.11 | 0 | 0 | Existence | No | 6 |
| Inv. Example 995 | 0.24 | FC | 9.6 | 1.07 | 0 | 0 | Existence | Existence | 6 |
| Inv. Example 996 | 0.18 | FC | 8.5 | 1.42 | 10.4 | 0.57 | Existence | No | 6 |
| Inv. Example 997 | 0.12 | FC | 7.72 | 1.38 | 4.65 | 2.67 | Existence | Existence | 7 |
| Inv. Example 998 | 0.19 | FC | 8.32 | 1.22 | 24.8 | 2.4 | Existence | No | 6 |
| Inv. Example 999 | 0.18 | FC | 10.05 | 1.14 | 4.52 | 0.57 | Existence | No | 6 |
| Inv. Example 1000 | 0.21 | FC | 10.6 | 1.13 | 17.5 | 2.45 | Existence | Existence | 6 |
| Inv. Example 1001 | 0.76 | FC | 5.7 | 1.02 | 0 | 0 | Existence | No | 7 |
| Inv. Example 1002 | 0.11 | FC | 6.4 | 1.06 | 11.05 | 0.23 | Existence | Existence | 6 |
| Inv. Example 1003 | 0.14 | FC | 3.2 | 1.05 | 2.65 | 0.74 | Existence | Existence | 7 |
| Inv. Example 1004 | 15 | FC | 4.5 | 1.24 | 6.45 | 2.14 | Existence | No | 6 |
| Inv. Example 1005 | 14.5 | FC | 5.2 | 1.33 | 0 | 0 | Existence | No | 6 |
| Inv. Example 1006 | 18.5 | FC | 1.9 | 1.27 | 0 | 0 | Existence | Existence | 6 |
| Inv. Example 1007 | 15.1 | FC | 0.02 | 1.05 | 0.05 | 0.03 | Existence | No | 7 |
| Inv. Example 1008 | 15.6 | FC | 10.5 | 1.12 | 0 | 0.08 | Existence | No | 6 |
| Inv. Example 1009 | 12.5 | FC | 12.5 | 1.23 | 0.05 | 0 | Existence | Existence | 6 |
| Inv. Example 1010 | 18.7 | FC | 18.5 | 1.36 | 0.44 | 0.07 | Existence | Existence | 7 |
| Inv. Example 1011 | 14.5 | FC | 11.5 | 1.11 | 0.08 | 0.07 | Existence | Existence | 6 |
| Inv. Example 1012 | 7.5 | FC | 9.6 | 1.07 | 0.1 | 0.2 | Existence | No | 7 |
| Inv. Example 1013 | 4.5 | FC | 8.5 | 1.42 | 0 | 0 | Existence | Existence | 6 |
| Inv. Example 1014 | 1.5 | FC | 7.72 | 1.38 | 0 | 0 | Existence | Existence | 6 |

| | Coat Properties | | | | |
|---|---|---|---|---|---|
| | Ratio of Metal Particle in Dry Coat (mass %) | Base Resin | Coat Thickness (μm) | Coating Method | Result of Corrosion Test |
| Inv. Example 990 | 35 | alkali silicate | 2 | Spraying | very good |
| Inv. Example 991 | 77 | alkyl silicate | 37 | Spraying | very good |
| Inv. Example 992 | 43 | alkali silicate | 2 | Spraying | good |
| Inv. Example 993 | 52 | alkyl silicate | 160 | Brushing | very good |
| Inv. Example 994 | 66 | alkali silicate | 5 | Brushing | very good |

TABLE 45-continued

| | | | | |
|---|---|---|---|---|
| Inv. Example 995 | 72 | alkyl silicate | 56 | Brushing very good |
| Inv. Example 996 | 40 | alkali silicate | 2 | Spraying very good |
| Inv. Example 997 | 36 | alkyl silicate | 18 | Spraying very good |
| Inv. Example 998 | 32 | alkyl silicate | 23 | Spraying very good |
| Inv. Example 999 | 53 | epoxy-based resin | 30 | Brushing very good |
| Inv. Example 1000 | 67 | acryl-based resin | 77 | Brushing very good |
| Inv. Example 1001 | 72 | urethane-based resin | 54 | Brushing very good |
| Inv. Example 1002 | 77 | polyester resin | 47 | Spraying very good |
| Inv. Example 1003 | 34 | epoxy-based resin | 43 | Spraying very good |
| Inv. Example 1004 | 43 | acryl-based resin | 52 | Brushing very good |
| Inv. Example 1005 | 53 | urethane-based resin | 20 | Brushing very good |
| Inv. Example 1006 | 60 | polyester resin | 200 | Brushing very good |
| Inv. Example 1007 | 35 | alkali silicate | 22 | Spraying very good |
| Inv. Example 1008 | 77 | alkyl silicate | 25 | Spraying very good |
| Inv. Example 1009 | 43 | alkali silicate | 14 | Spraying very good |
| Inv. Example 1010 | 52 | urethane-based resin | 112 | Spraying very good |
| Inv. Example 1011 | 66 | alkali silicate | 24 | Spraying very good |
| Inv. Example 1012 | 72 | urethane-based resin | 150 | Spraying very good |
| Inv. Example 1013 | 40 | alkali silicate | 18 | Spraying very good |
| Inv. Example 1014 | 36 | alkyl silicate | 19 | Brushing very good |

(*1) F: Fracture facets existing, FC: Fracture facets and/or cracks existing, NO: No fracture facet and/or crack

TABLE 46

Zn-Alloy Particle Properties

| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ | # of facets |
|---|---|---|---|---|---|---|---|---|---|
| Inv. Example 1015 | 4.8 | FC | 8.32 | 1.22 | 0 | 0.07 | Existence | Existence | 6 |
| Inv. Example 1016 | 9.6 | FC | 10.05 | 1.14 | 0 | 0.02 | Existence | No | 6 |
| Inv. Example 1017 | 11.5 | FC | 10.6 | 1.13 | 25.8 | 0.05 | Existence | Existence | 7 |
| Inv. Example 1018 | 9.8 | FC | 5.7 | 1.02 | 22.1 | 0 | Existence | Existence | 6 |
| Inv. Example 1019 | 7.6 | FC | 6.4 | 1.06 | 21.5 | 0.05 | Existence | Existence | 6 |
| Inv. Example 1020 | 3.2 | FC | 3.2 | 1.05 | 0.05 | 2.29 | Existence | No | 6 |
| Inv. Example 1021 | 1.9 | FC | 4.5 | 1.24 | 0.05 | 0.03 | Existence | Existence | 7 |
| Inv. Example 1022 | 11.5 | FC | 5.2 | 1.33 | 0 | 0.08 | Existence | Existence | 6 |
| Inv. Example 1023 | 8.7 | FC | 1.9 | 1.27 | 0 | 0 | Existence | No | 6 |
| Inv. Example 1024 | 9.6 | FC | 0.02 | 1.05 | 0 | 0 | Existence | Existence | 7 |
| Inv. Example 1025 | 9.4 | FC | 10.5 | 1.12 | 0.08 | 0.07 | Existence | No | 6 |
| Inv. Example 1026 | 10.5 | FC | 12.5 | 1.23 | 0.1 | 0.2 | Existence | Existence | 6 |
| Inv. Example 1027 | 12.6 | FC | 18.5 | 1.36 | 0.05 | 0.2 | Existence | No | 6 |
| Inv. Example 1028 | 29.5 | FC | 11.5 | 1.11 | 0.07 | 0 | Existence | Existence | 7 |
| Inv. Example 1029 | 29.4 | FC | 9.6 | 1.07 | 0 | 0.07 | Existence | Existence | 7 |
| Inv. Example 1030 | 27.5 | FC | 8.5 | 1.42 | 0 | 0.02 | Existence | Existence | 6 |
| Inv. Example 1031 | 0.8 | FC | 7.72 | 1.38 | 25.8 | 0.05 | Existence | Existence | 6 |
| Inv. Example 1032 | 1.6 | FC | 8.32 | 1.22 | 22.1 | 0 | Existence | No | 7 |
| Inv. Example 1033 | 22.9 | FC | 10.05 | 1.14 | 21.5 | 0.05 | Existence | No | 6 |
| Inv. Example 1034 | 28.5 | FC | 10.6 | 1.13 | 0.05 | 2.29 | Existence | No | 6 |
| Inv. Example 1035 | 29.5 | FC | 5.7 | 1.02 | 0.1 | 0.2 | Existence | Existence | 6 |
| Inv. Example 1036 | 18.7 | FC | 6.4 | 1.06 | 0.05 | 0.2 | Existence | No | 7 |
| Inv. Example 1037 | 19.5 | FC | 3.2 | 1.05 | 0.07 | 0 | Existence | Existence | 6 |
| Inv. Example 1038 | 20.4 | FC | 4.5 | 1.24 | 0 | 0.07 | Existence | Existence | 6 |

Coat Properties

| | Ratio of Metal Particle in Dry Coat (mass %) | Base Resin | Coat Thickness (μm) | Coating Method | Result of Corrosion Test |
|---|---|---|---|---|---|
| Inv. Example 1015 | 32 | alkyl silicate | 24 | Spraying | very good |
| Inv. Example 1016 | 53 | urethane-based resin | 99 | Spraying | very good |
| Inv. Example 1017 | 67 | alkyl silicate | 7 | Spraying | very good |
| Inv. Example 1018 | 72 | epoxy-based resin | 100 | Spraying | very good |
| Inv. Example 1019 | 77 | alkyl silicate | 27 | Brushing | very good |
| Inv. Example 1020 | 34 | alkali silicate | 15 | Spraying | very good |
| Inv. Example 1021 | 43 | alkyl silicate | 14 | Spraying | very good |
| Inv. Example 1022 | 53 | urethane-based resin | 55 | Spraying | very good |
| Inv. Example 1023 | 35 | alkyl silicate | 8 | Spraying | very good |

TABLE 46-continued

|  |  |  |  |  |  |
|---|---|---|---|---|---|
| Inv. Example 1024 | 77 | urethane-based resin | 122 | Brushing | very good |
| Inv. Example 1025 | 43 | alkyl silicate | 54 | Spraying | very good |
| Inv. Example 1026 | 52 | alkali silicate | 19 | Spraying | very good |
| Inv. Example 1027 | 66 | alkyl silicate | 25 | Brushing | very good |
| Inv. Example 1028 | 72 | alkyl silicate | 58 | Spraying | very good |
| Inv. Example 1029 | 40 | alkyl silicate | 21 | Spraying | very good |
| Inv. Example 1030 | 36 | alkali silicate | 19 | Brushing | very good |
| Inv. Example 1031 | 32 | urethane-based resin | 56 | Spraying | very good |
| Inv. Example 1032 | 53 | alkyl silicate | 77 | Spraying | very good |
| Inv. Example 1033 | 67 | alkyl silicate | 54 | Spraying | very good |
| Inv. Example 1034 | 72 | alkyl silicate | 64 | Spraying | very good |
| Inv. Example 1035 | 77 | alkyl silicate | 34 | Brushing | very good |
| Inv. Example 1036 | 34 | alkali silicate | 28 | Spraying | very good |
| Inv. Example 1037 | 43 | urethane-based resin | 109 | Brushing | very good |
| Inv. Example 1038 | 53 | alkyl silicate | 15 | Spraying | very good |

(*1) F: Fracture facets existing, FC: Fracture facets and/or cracks existing, NO: No fracture facet and/or crack

TABLE 47

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ | # or facets |
| Inv. Example 1039 | 0.6 | FC | 5.2 | 1.33 | 0 | 0.02 | Existence | Existence | 6 |
| Inv. Example 1040 | 0.8 | FC | 1.9 | 1.27 | 22.1 | 0 | Existence | Existence | 7 |
| Inv. Example 1041 | 22.5 | FC | 0.02 | 1.05 | 0.1 | 0.07 | Existence | Existence | 6 |
| Inv. Example 1042 | 20.6 | FC | 10.5 | 1.12 | 0.04 | 0.1 | Existence | Existence | 6 |
| Inv. Example 1043 | 21.6 | FC | 12.5 | 1.23 | 30.0 | 0.01 | Existence | No | 7 |
| Inv. Example 1044 | 20.8 | FC | 7.72 | 1.38 | 0 | 0 | Existence | Existence | 7 |
| Inv. Example 1045 | 23.6 | FC | 8.32 | 1.22 | 0 | 0 | Existence | Existence | 6 |
| Inv. Example 1046 | 24.5 | FC | 10.05 | 1.14 | 4.52 | 0.57 | Existence | No | 6 |
| Inv. Example 1047 | 18.6 | FC | 10.6 | 1.13 | 17.5 | 2.45 | Existence | Existence | 7 |
| Inv. Example 1048 | 17.8 | FC | 5.2 | 1.33 | 27.6 | 2.4 | Existence | No | 6 |
| Inv. Example 1049 | 16.5 | FC | 1.9 | 1.27 | 4.32 | 1.07 | Existence | Existence | 6 |
| Inv. Example 1050 | 14.5 | FC | 0.02 | 1.05 | 0.05 | 0.03 | Existence | No | 7 |
| Inv. Example 1051 | 19 | FC | 10.5 | 1.12 | 0 | 0.08 | Existence | No | 6 |
| Inv. Example 1052 | 15 | FC | 12.5 | 1.23 | 0.05 | 0 | Existence | Existence | 6 |
| Inv. Example 1053 | 16.4 | FC | 18.5 | 1.36 | 0.44 | 0.07 | Existence | Existence | 7 |
| Inv. Example 1054 | 13.5 | FC | 11.5 | 1.11 | 0.08 | 0.07 | Existence | Existence | 6 |
| Inv. Example 1055 | 10.6 | FC | 11.5 | 1.11 | 8.02 | 2.04 | Existence | No | 6 |
| Inv. Example 1056 | 10.7 | FC | 9.6 | 1.07 | 15.6 | 1.27 | Existence | Existence | 6 |
| Inv. Example 1057 | 10.9 | FC | 8.5 | 1.42 | 10.4 | 0.57 | Existence | No | 6 |
| Inv. Example 1058 | 11.6 | FC | 7.72 | 1.38 | 4.65 | 2.67 | Existence | Existence | 7 |
| Inv. Example 1059 | 14.7 | FC | 8.32 | 1.22 | 24.8 | 2.4 | Existence | No | 6 |
| Inv. Example 1060 | 19.5 | FC | 10.05 | 1.14 | 4.52 | 0.57 | Existence | No | 6 |
| Inv. Example 1061 | 10.2 | FC | 10.6 | 1.13 | 0 | 0 | Existence | Existence | 6 |
| Inv. Example 1062 | 4 | FC | 5.7 | 1.02 | 0 | 0 | Existence | No | 7 |
| Inv. Example 1063 | 7.2 | FC | 6.4 | 1.06 | 11.05 | 0.23 | Existence | Existence | 6 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 1039 | 72 | alkyl silicate | 14 | Spraying | very good |
| Inv. Example 1040 | 77 | alkyl silicate | 18 | Spraying | very good |
| Inv. Example 1041 | 35 | alkali silicate | 2 | Spraying | very good |
| Inv. Example 1042 | 77 | alkyl silicate | 37 | Spraying | very good |
| Inv. Example 1043 | 43 | alkali silicate | 2 | Spraying | good |
| Inv. Example 1044 | 52 | alkyl silicate | 160 | Brushing | very good |
| Inv. Example 1045 | 66 | alkali silicate | 5 | Brushing | very good |
| Inv. Example 1046 | 72 | alkyl silicate | 56 | Brushing | very good |
| Inv. Example 1047 | 40 | alkali silicate | 2 | Spraying | very good |
| Inv. Example 1048 | 36 | alkyl silicate | 18 | Spraying | very good |
| Inv. Example 1049 | 32 | alkyl silicate | 23 | Spraying | very good |
| Inv. Example 1050 | 53 | epoxy-based resin | 30 | Brushing | very good |
| Inv. Example 1051 | 67 | acryl-based resin | 77 | Brushing | very good |

TABLE 47-continued

| | | | | | |
|---|---|---|---|---|---|
| Inv. Example 1052 | 72 | urethane-based resin | 54 | Brushing | very good |
| Inv. Example 1053 | 77 | polyester resin | 47 | Spraying | very good |
| Inv. Example 1054 | 34 | epoxy-based resin | 43 | Spraying | very good |
| Inv. Example 1055 | 43 | acryl-based resin | 52 | Brushing | very good |
| Inv. Example 1056 | 53 | urethane-based resin | 20 | Brushing | very good |
| Inv. Example 1057 | 60 | polyester resin | 200 | Brushing | very good |
| Inv. Example 1058 | 35 | alkali silicate | 22 | Spraying | very good |
| Inv. Example 1059 | 77 | alkyl silicate | 25 | Spraying | very good |
| Inv. Example 1060 | 43 | alkali silicate | 14 | Spraying | very good |
| Inv. Example 1061 | 52 | urethane-based resin | 112 | Spraying | very good |
| Inv. Example 1062 | 66 | alkali silicate | 24 | Spraying | very good |
| Inv. Example 1063 | 72 | urethane-based resin | 150 | Spraying | very good |

(*1) F: Fracture facets existing, FC: Fracture facets and/or cracks existing, NO: No fracture facet and/or crack

TABLE 48

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Zn_{11}$, $Mg_2Zn3$, MgZn, or Mg7Zn3 | # or facets |
|---|---|---|---|---|---|---|---|---|---|
| Inv. Example 1064 | 3.6 | FC | 3.2 | 1.05 | 2.65 | 0.74 | Existence | Existence | 7 |
| Inv. Example 1065 | 26.9 | FC | 4.5 | 1.24 | 6.45 | 2.14 | Existence | No | 6 |
| Inv. Example 1066 | 27.9 | FC | 5.2 | 1.33 | 27.6 | 2.4 | Existence | No | 6 |
| Inv. Example 1067 | 28.9 | FC | 1.9 | 1.27 | 4.32 | 1.07 | Existence | Existence | 6 |
| Inv. Example 1068 | 23.8 | FC | 0.02 | 1.05 | 0.05 | 0.03 | Existence | No | 7 |
| Inv. Example 1069 | 26.8 | FC | 10.5 | 1.12 | 0 | 0.08 | Existence | No | 6 |
| Inv. Example 1070 | 25.6 | FC | 12.5 | 1.23 | 0.05 | 0 | Existence | Existence | 6 |
| Inv. Example 1071 | 29.8 | FC | 18.5 | 1.36 | 0.44 | 0.07 | Existence | Existence | 7 |
| Inv. Example 1072 | 18.9 | FC | 11.5 | 1.11 | 0.08 | 0.07 | Existence | Existence | 6 |
| Inv. Example 1073 | 5.6 | FC | 9.6 | 1.07 | 0.1 | 0.2 | Existence | No | 7 |
| Inv. Example 1074 | 4.7 | FC | 8.5 | 1.42 | 0.05 | 0.2 | Existence | Existence | 6 |
| Inv. Example 1075 | 6.8 | FC | 7.72 | 1.38 | 0.07 | 0 | Existence | Existence | 6 |
| Inv. Example 1076 | 9 | FC | 8.32 | 1.22 | 0 | 0.07 | Existence | Existence | 6 |
| Inv. Example 1077 | 2.1 | FC | 10.05 | 1.14 | 0 | 0.02 | Existence | No | 6 |
| Inv. Example 1078 | 4.8 | FC | 10.6 | 1.13 | 0 | 0 | Existence | Existence | 7 |
| Inv. Example 1079 | 4.2 | FC | 5.7 | 1.02 | 0 | 0 | Existence | Existence | 6 |
| Inv. Example 1080 | 4.3 | FC | 6.4 | 1.06 | 21.5 | 0.05 | Existence | Existence | 6 |
| Inv. Example 1081 | 4 | FC | 3.2 | 1.05 | 0.05 | 2.29 | Existence | No | 6 |
| Inv. Example 1082 | 3.7 | FC | 4.5 | 1.24 | 0.05 | 0.03 | Existence | Existence | 7 |
| Inv. Example 1083 | 6.4 | FC | 5.2 | 1.33 | 0 | 0.08 | Existence | Existence | 6 |
| Inv. Example 1084 | 6.9 | FC | 1.9 | 1.27 | 0.05 | 0 | Existence | No | 6 |
| Inv. Example 1085 | 16.9 | FC | 0.02 | 1.05 | 0.44 | 0.07 | Existence | Existence | 7 |
| Inv. Example 1086 | 18.7 | FC | 10.5 | 1.12 | 0.08 | 0.07 | Existence | No | 6 |
| Inv. Example 1087 | 24.4 | FC | 12.5 | 1.23 | 0.1 | 0.2 | Existence | Existence | 6 |
| Inv. Example 1088 | 10.6 | FC | 18.5 | 1.36 | 0 | 0 | Existence | No | 6 |
| Inv. Example 1089 | 15.8 | FC | 11.5 | 1.11 | 0 | 0 | Existence | Existence | 7 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
|---|---|---|---|---|---|
| Inv. Example 1064 | 40 | alkali silicate | 18 | Spraying | very good |
| Inv. Example 1065 | 36 | alkyl silicate | 19 | Brushing | very good |
| Inv. Example 1066 | 32 | alkyl silicate | 24 | Spraying | very good |
| Inv. Example 1067 | 53 | urethane-based resin | 99 | Spraying | very good |
| Inv. Example 1068 | 67 | alkyl silicate | 7 | Spraying | very good |
| Inv. Example 1069 | 72 | epoxy-based resin | 100 | Spraying | very good |
| Inv. Example 1070 | 77 | alkyl silicate | 27 | Brushing | very good |
| Inv. Example 1071 | 34 | alkali silicate | 15 | Spraying | very good |
| Inv. Example 1072 | 43 | alkyl silicate | 14 | Spraying | very good |
| Inv. Example 1073 | 53 | urethane-based resin | 55 | Spraying | very good |
| Inv. Example 1074 | 35 | alkyl silicate | 8 | Spraying | very good |
| Inv. Example 1075 | 77 | urethane-based resin | 122 | Brushing | very good |
| Inv. Example 1076 | 43 | alkyl silicate | 54 | Spraying | very good |
| Inv. Example 1077 | 52 | alkali silicate | 19 | Spraying | very good |
| Inv. Example 1078 | 66 | alkyl silicate | 25 | Brushing | very good |

TABLE 48-continued

|  |  |  |  |  |  |
|---|---|---|---|---|---|
| Inv. Example 1079 | 72 | alkyl silicate | 58 | Spraying | very good |
| Inv. Example 1080 | 40 | alkyl silicate | 21 | Spraying | very good |
| Inv. Example 1081 | 36 | alkali silicate | 19 | Brushing | very good |
| Inv. Example 1082 | 32 | urethane-based resin | 56 | Spraying | very good |
| Inv. Example 1083 | 53 | alkyl silicate | 77 | Spraying | very good |
| Inv. Example 1084 | 67 | alkyl silicate | 54 | Spraying | very good |
| Inv. Example 1085 | 72 | alkyl silicate | 64 | Spraying | very good |
| Inv. Example 1086 | 77 | alkyl silicate | 34 | Brushing | very good |
| Inv. Example 1087 | 34 | alkali silicate | 28 | Spraying | very good |
| Inv. Example 1088 | 43 | urethane-based resin | 109 | Brushing | very good |
| Inv. Example 1089 | 53 | alkyl silicate | 15 | Spraying | very good |

(*1) F: Fracture facets existing, FC: Fracture facets and/or cracks existing, NO: No fracture facet and/or crack

TABLE 49

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn3$ $MgZn$, or $Mg7Zn3$ | # or facets |
| Inv. Example 1090 | 19.5 | FC | 9.6 | 1.07 | 0 | 0.07 | Existence | Existence | 7 |
| Inv. Example 1091 | 7.8 | FC | 8.5 | 1.42 | 0 | 0.02 | Existence | Existence | 6 |
| Inv. Example 1092 | 4.9 | FC | 7.72 | 1.38 | 25.8 | 0.05 | Existence | Existence | 6 |
| Inv. Example 1093 | 10.8 | FC | 8.32 | 1.22 | 22.1 | 0 | Existence | No | 7 |
| Inv. Example 1094 | 3.8 | FC | 10.05 | 1.14 | 21.5 | 0.05 | Existence | No | 6 |
| Inv. Example 1095 | 22.6 | FC | 10.6 | 1.13 | 0.05 | 2.29 | Existence | No | 6 |
| Inv. Example 1096 | 27.9 | FC | 5.7 | 1.02 | 0 | 0 | Existence | Existence | 6 |
| Inv. Example 1097 | 24.8 | FC | 6.4 | 1.06 | 0 | 0 | Existence | No | 7 |
| Inv. Example 1098 | 26.8 | FC | 3.2 | 1.05 | 0.07 | 0 | Existence | Existence | 6 |
| Inv. Example 1099 | 25.9 | FC | 4.5 | 1.24 | 0 | 0.07 | Existence | Existence | 6 |
| Inv. Example 1100 | 9.8 | FC | 5.2 | 1.33 | 0 | 0.02 | Existence | Existence | 6 |
| Inv. Example 1101 | 5.6 | FC | 1.9 | 1.27 | 22.1 | 0 | Existence | Existence | 7 |
| Inv. Example 1102 | 12.3 | FC | 0.02 | 1.05 | 1.24 | 1.8 | Existence | Existence | 7 |
| Inv. Example 1103 | 0.8 | FC | 27.89 | 1.12 | 1.24 | 0.9 | Existence | Existence | 6 |
| Inv. Example 1104 | 1 | FC | 0.32 | 1.23 | 0.8 | 0.7 | Existence | No | 7 |
| Inv. Example 1105 | 2.3 | FC | 11.44 | 1.36 | 0 | 1.8 | Existence | Existence | 6 |
| Inv. Example 1106 | 15.6 | FC | 1.05 | 1.11 | 1.1 | 2.41 | Existence | Existence | 6 |
| Inv. Example 1107 | 6.7 | FC | 36.47 | 1.07 | 1.8 | 0.08 | Existence | Existence | 6 |
| Inv. Example 1108 | 7.5 | FC | 5.07 | 1.42 | 3.8 | 2.23 | Existence | No | 6 |
| Inv. Example 1109 | 8.4 | FC | 7.72 | 1.38 | 2.9 | 0.06 | Existence | Existence | 7 |
| Inv. Example 1110 | 9.3 | FC | 8.32 | 1.22 | 10.5 | 0.02 | Existence | Existence | 6 |
| Inv. Example 1111 | 10.4 | FC | 10.05 | 1.14 | 2.9 | 0.02 | Existence | Existence | 6 |
| Inv. Example 1112 | 11.2 | FC | 6.08 | 1.13 | 16.8 | 1.37 | Existence | No | 7 |
| Inv. Example 1113 | 11.7 | FC | 17.89 | 1.02 | 0 | 2.43 | Existence | Existence | 6 |
| Inv. Example 1114 | 21.5 | FC | 19.54 | 1.06 | 3.6 | 0.02 | Existence | Existence | 6 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 1090 | 72 | alkyl silicate | 14 | Spraying | very good |
| Inv. Example 1091 | 77 | alkyl silicate | 18 | Spraying | very good |
| Inv. Example 1092 | 77 | urethane-based resin | 122 | Brushing | very good |
| Inv. Example 1093 | 43 | alkyl silicate | 54 | Spraying | very good |
| Inv. Example 1094 | 52 | alkali silicate | 19 | Spraying | very good |
| Inv. Example 1095 | 66 | alkyl silicate | 25 | Brushing | very good |
| Inv. Example 1096 | 72 | alkyl silicate | 58 | Spraying | very good |
| Inv. Example 1097 | 40 | alkyl silicate | 21 | Spraying | very good |
| Inv. Example 1098 | 36 | alkali silicate | 19 | Brushing | very good |
| Inv. Example 1099 | 32 | urethane-based resin | 56 | Spraying | very good |
| Inv. Example 1100 | 53 | alkyl silicate | 77 | Spraying | very good |
| Inv. Example 1101 | 67 | alkyl silicate | 54 | Spraying | very good |
| Inv. Example 1102 | 52 | alkali silicate | 2 | Spraying | very good |
| Inv. Example 1103 | 55 | alkali silicate | 20 | Spraying | very good |
| Inv. Example 1104 | 69 | alkali silicate | 5 | Spraying | very good |
| Inv. Example 1105 | 78 | alkyl silicate | 20 | Spraying | very good |
| Inv. Example 1106 | 42 | alkali silicate | 15 | Brushing | very good |

TABLE 49-continued

|  |  |  |  |  |  |
|---|---|---|---|---|---|
| Inv. Example 1107 | 32 | alkyl silicate | 57 | Brushing | very good |
| Inv. Example 1108 | 66 | alkali silicate | 13 | Brushing | very good |
| Inv. Example 1109 | 67 | alkyl silicate | 22 | Brushing | very good |
| Inv. Example 1110 | 64 | alkali silicate | 20 | Spraying | very good |
| Inv. Example 1111 | 74 | alkyl silicate | 27 | Spraying | very good |
| Inv. Example 1112 | 82 | alkali silicate | 15 | Spraying | very good |
| Inv. Example 1113 | 37 | alkyl silicate | 35 | Spraying | very good |
| Inv. Example 1114 | 42 | alkali silicate | 34 | Brushing | very good |

(*1) F: Fracture facets existing, FC: Fracture facets and/or cracks existing, NO: No fracture facet and/or crack

TABLE 50

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn3$ $MgZn$, or $Mg7Zn3$ | # or facets |
| Inv. Example 1115 | 13.4 | FC | 21.08 | 1.05 | 2.1 | 1.5 | Existence | No | 6 |
| Inv. Example 1116 | 14.6 | FC | 23.04 | 1.24 | 0.06 | 1.3 | Existence | Existence | 6 |
| Inv. Example 1117 | 25.8 | FC | 9.21 | 1.33 | 0.02 | 1.8 | Existence | Existence | 7 |
| Inv. Example 1118 | 16.7 | FC | 0.12 | 1.27 | 1.6 | 0.9 | Existence | Existence | 6 |
| Inv. Example 1119 | 17.3 | FC | 29.24 | 1.37 | 3.5 | 0 | Existence | Existence | 6 |
| Inv. Example 1120 | 18.5 | FC | 128.74 | 1.10 | 9.8 | 1.8 | Existence | No | 7 |
| Inv. Example 1121 | 19.3 | FC | 33.57 | 1.04 | 11.5 | 0.7 | Existence | Existence | 6 |
| Inv. Example 1122 | 3.5 | FC | 3.04 | 1.02 | 0.4 | 1.5 | Existence | Existence | 6 |
| Inv. Example 1123 | 22.5 | FC | 7.54 | 1.01 | 0.6 | 1.3 | Existence | Existence | 6 |
| Inv. Example 1124 | 23.7 | FC | 6.81 | 1.08 | 10.6 | 1.8 | Existence | No | 6 |
| Inv. Example 1125 | 24.2 | FC | 5.25 | 1.14 | 9.5 | 0 | Existence | Existence | 7 |
| Inv. Example 1126 | 0.2 | FC | 194.23 | 1.23 | 11.04 | 0.7 | Existence | Existence | 6 |
| Inv. Example 1127 | 27.1 | FC | 28.74 | 1.33 | 0.01 | 1.8 | Existence | Existence | 6 |
| Inv. Example 1128 | 29.3 | FC | 13.57 | 1.37 | 0.07 | 0.7 | Existence | Existence | 7 |
| Inv. Example 1129 | 0.5 | FC | 0.65 | 1.44 | 1.8 | 1.5 | Existence | Existence | 6 |
| Inv. Example 1130 | 2.7 | FC | 4.12 | 1.21 | 0 | 1.3 | Existence | Existence | 6 |
| Inv. Example 1131 | 28.4 | FC | 0.72 | 1.22 | 2.9 | 1.8 | Existence | Existence | 6 |
| Inv. Example 1132 | 8.7 | FC | 117.54 | 1.23 | 10.5 | 0.9 | Existence | Existence | 6 |
| Inv. Example 1133 | 9.2 | FC | 7.81 | 1.47 | 2.9 | 0.7 | Existence | Existence | 7 |
| Inv. Example 1134 | 17.8 | FC | 80.25 | 1.01 | 16.8 | 1.8 | Existence | No | 6 |
| Inv. Example 1135 | 20.2 | FC | 8.47 | 1.04 | 2.7 | 0.7 | Existence | Existence | 6 |
| Inv. Example 1136 | 0.4 | FC | 0.87 | 1.05 | 0.04 | 0.7 | Existence | Existence | 7 |
| Inv. Example 1137 | 13.7 | FC | 25.78 | 1.12 | 0 | 0.04 | Existence | Existence | 6 |
| Inv. Example 1138 | 14.7 | FC | 93.45 | 1.11 | 1.24 | 0.05 | Existence | Existence | 6 |
| Inv. Example 1139 | 2.4 | FC | 0.97 | 1.08 | 0.05 | 1.24 | Existence | Existence | 6 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 1115 | 66 | alkyl silicate | 45 | Brushing | very good |
| Inv. Example 1116 | 48 | alkali silicate | 52 | Brushing | very good |
| Inv. Example 1117 | 33 | alkyl silicate | 23 | Brushing | very good |
| Inv. Example 1118 | 75 | alkali silicate | 5 | Spraying | very good |
| Inv. Example 1119 | 77 | alkyl silicate | 52 | Brushing | very good |
| Inv. Example 1120 | 66 | alkali silicate | 150 | Brushing | very good |
| Inv. Example 1121 | 67 | alkyl silicate | 60 | Brushing | very good |
| Inv. Example 1122 | 45 | alkali silicate | 15 | Spraying | very good |
| Inv. Example 1123 | 48 | alkyl silicate | 24 | Spraying | very good |
| Inv. Example 1124 | 68 | alkali silicate | 34 | Spraying | very good |
| Inv. Example 1125 | 35 | alkyl silicate | 20 | Brushing | very good |
| Inv. Example 1126 | 37 | alkali silicate | 200 | Brushing | very good |
| Inv. Example 1127 | 38 | alkyl silicate | 56 | Brushing | very good |
| Inv. Example 1128 | 41 | alkali silicate | 34 | Spraying | very good |
| Inv. Example 1129 | 54 | alkyl silicate | 2 | Spraying | very good |
| Inv. Example 1130 | 57 | alkali silicate | 15 | Spraying | very good |
| Inv. Example 1131 | 59 | alkali silicate | 10 | Spraying | very good |
| Inv. Example 1132 | 64 | alkyl silicate | 125 | Brushing | very good |
| Inv. Example 1133 | 66 | alkali silicate | 24 | Brushing | very good |
| Inv. Example 1134 | 67 | alkyl silicate | 110 | Brushing | very good |

TABLE 50-continued

| | | | | | |
|---|---|---|---|---|---|
| Inv. Example 1135 | 34 | alkali silicate | 24 | Brushing | very good |
| Inv. Example 1136 | 54 | alkyl silicate | 2 | Spraying | very good |
| Inv. Example 1137 | 62 | alkali silicate | 37 | Spraying | very good |
| Inv. Example 1138 | 66 | alkyl silicate | 113 | Brushing | very good |
| Inv. Example 1139 | 67 | alkali silicate | 2 | Spraying | very good |

(*1) F: Fracture facets existing, FC: Fracture facets and/or cracks existing, NO: No fracture facet and/or crack

TABLE 51

Zn-Alloy Particle Properties

| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn3$ $MgZn$, or $Mg7Zn3$ | # or facets |
|---|---|---|---|---|---|---|---|---|---|
| Inv. Example 1140 | 4.5 | FC | 54.89 | 1.47 | 1.24 | 0.06 | Existence | Existence | 6 |
| Inv. Example 1141 | 0.1 | FC | 10.81 | 1.50 | 1.24 | 0.07 | Existence | Existence | 7 |
| Inv. Example 1142 | 30.0 | FC | 18.24 | 1.13 | 0 | 0.75 | Existence | Existence | 6 |
| Inv. Example 1143 | 24.5 | FC | 114.78 | 1.04 | 0.9 | 1.5 | Existence | Existence | 6 |
| Inv. Example 1144 | 27.6 | FC | 3.87 | 1.02 | 0.03 | 1.3 | Existence | Existence | 7 |
| Inv. Example 1145 | 4.1 | FC | 11.94 | 1.08 | 10.5 | 1.8 | Existence | No | 6 |
| Inv. Example 1146 | 3.2 | FC | 142.58 | 1.15 | 2.9 | 0.9 | Existence | Existence | 6 |
| Inv. Example 1147 | 2.7 | FC | 12.5 | 1.34 | 16.8 | 0.7 | Existence | Existence | 6 |
| Inv. Example 1148 | 0.12 | FC | 31.24 | 1.25 | 2.7 | 1.8 | Existence | Existence | 6 |
| Inv. Example 1149 | 0.22 | FC | 152.46 | 1.19 | 0.02 | 0.7 | Existence | Existence | 7 |
| Inv. Example 1150 | 0.37 | FC | 13.4 | 1.18 | 0 | 1.5 | Existence | Existence | 6 |
| Inv. Example 1151 | 1.4 | FC | 160.57 | 1.24 | 7.42 | 1.3 | Existence | Existence | 6 |
| Inv. Example 1152 | 4.2 | FC | 14.1 | 1.11 | 0.02 | 1.8 | Existence | Existence | 7 |
| Inv. Example 1153 | 4.8 | FC | 167.55 | 1.27 | 0.04 | 0.9 | Existence | Existence | 6 |
| Inv. Example 1154 | 8.1 | FC | 1.45 | 1.31 | 17.5 | 0 | Existence | Existence | 6 |
| Inv. Example 1155 | 7.6 | FC | 0.15 | 1.26 | 0.01 | 1.8 | Existence | Existence | 6 |
| Inv. Example 1156 | 9.9 | FC | 13.1 | 1.14 | 0.02 | 0.7 | Existence | Existence | 6 |
| Inv. Example 1157 | 14.8 | FC | 15.5 | 1.34 | 3.8 | 0 | Existence | Existence | 7 |
| Inv. Example 1158 | 16.7 | FC | 0.67 | 1.16 | 2.9 | 0 | Existence | Existence | 6 |
| Inv. Example 1159 | 17.9 | FC | 137.89 | 1.47 | 10.5 | 1.8 | Existence | Existence | 6 |
| Inv. Example 1160 | 19.5 | FC | 16.3 | 1.48 | 2.9 | 0.9 | Existence | Existence | 7 |
| Inv. Example 1161 | 22.4 | FC | 110.38 | 1.49 | 16.8 | 0.7 | Existence | Existence | 6 |
| Inv. Example 1162 | 0.17 | FC | 12.4 | 1.34 | 2.7 | 1.8 | Existence | Existence | 6 |
| Inv. Example 1163 | 8.3 | FC | 17.2 | 1.29 | 0.02 | 0.7 | Existence | No | 6 |
| Inv. Example 1164 | 6.5 | FC | 105.23 | 1.18 | 0.02 | 0.7 | Existence | Existence | 6 |

Coat Properties

| | Ratio of Metal Particle in Dry Coat (mass %) | Base Resin | Coat Thickness (μm) | Coating Method | Result of Corrosion Test |
|---|---|---|---|---|---|
| Inv. Example 1140 | 68 | alkyl silicate | 75 | Brushing | very good |
| Inv. Example 1141 | 33 | alkali silicate | 30 | Brushing | very good |
| Inv. Example 1142 | 35 | alkyl silicate | 34 | Brushing | very good |
| Inv. Example 1143 | 43 | epoxy-based resin | 124 | Brushing | very good |
| Inv. Example 1144 | 44 | acryl-based resin | 15 | Spraying | very good |
| Inv. Example 1145 | 43 | urethane-based resin | 23 | Spraying | very good |
| Inv. Example 1146 | 44 | polyester resin | 157 | Brushing | very good |
| Inv. Example 1147 | 54 | epoxy-based resin | 26 | Spraying | very good |
| Inv. Example 1148 | 79 | acryl-based resin | 38 | Spraying | very good |
| Inv. Example 1149 | 73 | urethane-based resin | 160 | Brushing | very good |
| Inv. Example 1150 | 69 | polyester resin | 27 | Brushing | very good |
| Inv. Example 1151 | 63 | epoxy-based resin | 180 | Brushing | very good |
| Inv. Example 1152 | 35 | acryl-based resin | 26 | Spraying | very good |
| Inv. Example 1153 | 35 | urethane-based resin | 180 | Brushing | very good |
| Inv. Example 1154 | 66 | polyester resin | 15 | Spraying | very good |
| Inv. Example 1155 | 67 | epoxy-based resin | 2 | Spraying | very good |
| Inv. Example 1156 | 68 | acryl-based resin | 28 | Spraying | very good |
| Inv. Example 1157 | 33 | urethane-based resin | 30 | Spraying | very good |
| Inv. Example 1158 | 35 | polyester resin | 2 | Spraying | very good |
| Inv. Example 1159 | 43 | epoxy-based resin | 157 | Brushing | very good |
| Inv. Example 1160 | 44 | acryl-based resin | 28 | Brushing | very good |

TABLE 51-continued

| | | | | | |
|---|---|---|---|---|---|
| Inv. Example 1161 | 42 | urethane-based resin | 130 | Brushing | very good |
| Inv. Example 1162 | 33 | polyester resin | 29 | Brushing | very good |
| Inv. Example 1163 | 30 | epoxy-based resin | 30 | Brushing | very good |
| Inv. Example 1164 | 35 | acryl-based resin | 120 | Brushing | very good |

(*1) F: Fracture facets existing, FC: Fracture facets and/or cracks existing, NO: No fracture facet and/or crack

TABLE 52

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn3$, MgZn, or Mg7Zn3 | # of facets |
|---|---|---|---|---|---|---|---|---|---|
| Inv. Example 1165 | 9.7 | FC | 177.89 | 1.23 | 0.04 | 0.02 | Existence | Existence | 7 |
| Inv. Example 1166 | 11.4 | FC | 12.2 | 1.27 | 0.05 | 0.02 | Existence | Existence | 6 |
| Inv. Example 1167 | 22.5 | FC | 1.84 | 1.17 | 1.24 | 1.37 | Existence | Existence | 6 |
| Inv. Example 1168 | 25.7 | FC | 16.02 | 1.16 | 0.05 | 0.02 | Existence | Existence | 7 |
| Inv. Example 1169 | 17.8 | FC | 1.75 | 1.49 | 1.24 | 1.37 | Existence | Existence | 6 |
| Inv. Example 1170 | 0.14 | FC | 198.78 | 1.34 | 1.24 | 1.37 | Existence | Existence | 6 |
| Inv. Example 1171 | 6.7 | FC | 13.1 | 1.16 | 0.8 | 1.5 | Existence | Existence | 6 |
| Inv. Example 1172 | 7.5 | FC | 15.5 | 1.47 | 0.9 | 1.3 | Existence | Existence | 6 |
| Inv. Example 1173 | 8.4 | FC | 0.67 | 1.48 | 1.1 | 1.8 | Existence | No | 7 |
| Inv. Example 1174 | 9.3 | FC | 12.2 | 1.49 | 1.8 | 0.9 | Existence | Existence | 6 |
| Inv. Example 1175 | 1.4 | FC | 1.84 | 1.34 | 3.8 | 0.7 | Existence | Existence | 6 |
| Inv. Example 1176 | 4.2 | FC | 16.02 | 1.29 | 2.9 | 1.8 | Existence | Existence | 7 |
| Inv. Example 1177 | 4.8 | FC | 1.75 | 1.18 | 10.5 | 0.7 | Existence | Existence | 6 |
| Inv. Example 1178 | 8.1 | FC | 12.4 | 1.23 | 2.9 | 1.5 | Existence | Existence | 6 |
| Inv. Example 1179 | 7.6 | FC | 17.2 | 1.27 | 16.8 | 1.3 | Existence | Existence | 6 |
| Inv. Example 1180 | 9.9 | FC | 13.1 | 1.17 | 2.7 | 1.8 | Existence | Existence | 6 |
| Inv. Example 1181 | 0.4 | FC | 29.9 | 1.16 | 3.6 | 0.9 | Existence | Existence | 7 |
| Inv. Example 1182 | 10.5 | FC | 0.21 | 1.27 | 0 | 0.7 | Existence | Existence | 6 |
| Inv. Example 1183 | 0.4 | FC | 0.22 | 1.17 | 0.06 | 1.8 | Existence | Existence | 7 |
| Inv. Example 1184 | 10.5 | FC | 29.5 | 1.27 | 0.02 | 0.7 | Existence | Existence | 6 |
| Inv. Example 1185 | 0.51 | FC | 29.9 | 1.18 | 1.6 | 1.5 | Existence | Existence | 6 |
| Inv. Example 1186 | 9.8 | FC | 0.21 | 1.23 | 3.5 | 0 | Existence | Existence | 6 |
| Inv. Example 1187 | 0.52 | FC | 0.22 | 1.27 | 9.8 | 1.8 | Existence | Existence | 6 |
| Inv. Example 1188 | 9.9 | FC | 29.5 | 1.17 | 11.5 | 0.9 | Existence | No | 7 |
| Inv. Example 1189 | 14.8 | FC | 16.02 | 1.48 | 0.4 | 0.7 | Existence | Existence | 6 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
|---|---|---|---|---|---|
| Inv. Example 1165 | 37 | urethane-based resin | 187 | Brushing | very good |
| Inv. Example 1166 | 77 | polyester resin | 28 | Spraying | very good |
| Inv. Example 1167 | 41 | epoxy-based resin | 5 | Spraying | very good |
| Inv. Example 1168 | 35 | acryl-based resin | 35 | Spraying | very good |
| Inv. Example 1169 | 58 | urethane-based resin | 5 | Spraying | very good |
| Inv. Example 1170 | 37 | polyester resin | 200 | Brushing | very good |
| Inv. Example 1171 | 68 | alkali silicate | 25 | Spraying | very good |
| Inv. Example 1172 | 55 | alkali silicate | 15 | Spraying | very good |
| Inv. Example 1173 | 77 | alkyl silicate | 20 | Spraying | very good |
| Inv. Example 1174 | 43 | alkali silicate | 18 | Spraying | very good |
| Inv. Example 1175 | 45 | alkyl silicate | 22 | Spraying | very good |
| Inv. Example 1176 | 66 | alkali silicate | 19 | Spraying | very good |
| Inv. Example 1177 | 33 | alkyl silicate | 29 | Spraying | very good |
| Inv. Example 1178 | 66 | alkali silicate | 23 | Spraying | very good |
| Inv. Example 1179 | 55 | alkyl silicate | 21 | Spraying | very good |
| Inv. Example 1180 | 49 | alkali silicate | 19 | Spraying | very good |
| Inv. Example 1181 | 77 | alkyl silicate | 15 | Spraying | very good |
| Inv. Example 1182 | 41 | alkali silicate | 18 | Spraying | very good |
| Inv. Example 1183 | 64 | alkyl silicate | 22 | Spraying | very good |
| Inv. Example 1184 | 58 | alkyl silicate | 21 | Spraying | very good |
| Inv. Example 1185 | 33 | alkyl silicate | 29 | Spraying | very good |
| Inv. Example 1186 | 66 | alkali silicate | 23 | Spraying | very good |

TABLE 52-continued

|  |  |  |  |  |  |
|---|---|---|---|---|---|
| Inv. Example 1187 | 55 | alkyl silicate | 21 | Spraying | very good |
| Inv. Example 1188 | 49 | alkali silicate | 19 | Spraying | very good |
| Inv. Example 1189 | 77 | alkyl silicate | 21 | Spraying | very good |

(*1) F: Fracture facets existing, FC: Fracture facets and/or cracks existing, NO: No fracture facet and/or crack

TABLE 53

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn3$, MgZn, or Mg7Zn3 | # of facets |
| Inv. Example 1190 | 16.7 | FC | 1.75 | 1.49 | 0.6 | 1.8 | Existence | Existence | 6 |
| Inv. Example 1191 | 17.9 | FC | 12.4 | 1.34 | 10.6 | 0.7 | Existence | Existence | 7 |
| Inv. Example 1192 | 19.5 | FC | 17.2 | 1.29 | 9.5 | 0.7 | Existence | Existence | 6 |
| Comp. Example 52 | 2.3 | FC | 205.6 | 1.23 | 0.07 | 0 | Existence | Existence | 6 |
| Comp. Example 53 | 2.3 | FC | 0.005 | 1.23 | 0 | 0.07 | Existence | Existence | 7 |
| Comp. Example 54 | 2.3 | FC | 205.6 | 1.23 | 0 | 0.02 | Existence | Existence | 6 |
| Comp. Example 55 | 2.3 | FC | 0.005 | 1.23 | 22.1 | 0 | Existence | Existence | 6 |
| Comp. Example 56 | 2.3 | FC | 205.6 | 1.23 | 0.07 | 0 | Existence | Existence | 7 |
| Comp. Example 57 | 2.3 | FC | 0.005 | 1.23 | 0 | 0.07 | Existence | Existence | 6 |
| Comp. Example 58 | 2.3 | FC | 205.6 | 1.23 | 0 | 0.02 | Existence | Existence | 7 |
| Comp. Example 59 | 2.3 | FC | 0.005 | 1.23 | 22.1 | 0 | Existence | Existence | 6 |
| Comp. Example 60 | 0.01 | FC | 0.4 | 1.24 | 1.2 | 0.5 | Existence | Existence | 6 |
| Comp. Example 61 | 0.8 | FC | 3.2 | 2.54 | 0.6 | 0.8 | Existence | Existence | 7 |
| Comp. Example 62 | 8.47 | NO | 0.67 | 1.25 | 2 | 1.9 | Existence | Existence | 6 |
| Comp. Example 63 | 24.5 | NO | 2.5 | 1.05 | 0.8 | 0.9 | Existence | Existence | 7 |
| Comp. Example 64 | 0.01 | FC | 0.4 | 1.24 | 0 | 0.02 | Existence | Existence | 6 |
| Comp. Example 65 | 0.8 | FC | 0.2 | 1.78 | 25.8 | 0.05 | Existence | Existence | 6 |
| Comp. Example 66 | 8.47 | NO | 0.67 | 1.25 | 22.1 | 0 | Existence | Existence | 7 |
| Comp. Example 67 | 24.5 | NO | 2.5 | 1.05 | 21.5 | 0.05 | Existence | Existence | 6 |
| Comp. Example 68 | 4.05 | NO | 0.02 | 1.23 | 0.05 | 2.29 | Existence | Existence | 7 |
| Comp. Example 69 | 6.78 | NO | 12.5 | 1.35 | 0 | 0 | Existence | Existence | 6 |
| Comp. Example 70 | 15.8 | NO | 23.3 | 1.14 | 0 | 0 | Existence | Existence | 6 |
| Comp. Example 71 | 4.5 | FC | 3.5 | 2.84 | 22.1 | 0 | Existence | Existence | 6 |
| Comp. Example 72 | 3.2 | FC | 6.7 | 1.75 | 0.05 | 2.29 | Existence | Existence | 6 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 1190 | 43 | alkali silicate | 19 | Spraying | very good |
| Inv. Example 1191 | 45 | alkyl silicate | 15 | Spraying | very good |
| Inv. Example 1192 | 66 | alkali silicate | 18 | Spraying | very good |
| Comp. Example 52 | 75 | alkyl silicate | 25 | Spraying | poor |
| Comp. Example 53 | 75 | alkyl silicate | 25 | Spraying | poor |
| Comp. Example 54 | 75 | alkyl silicate | 105 | Brushing | poor |
| Comp. Example 55 | 75 | alkyl silicate | 165 | Spraying | poor |
| Comp. Example 56 | 75 | alkyl silicate | 25 | Spraying | poor |
| Comp. Example 57 | 75 | alkyl silicate | 25 | Spraying | poor |
| Comp. Example 58 | 75 | alkyl silicate | 105 | Brushing | poor |
| Comp. Example 59 | 75 | alkyl silicate | 165 | Spraying | poor |
| Comp. Example 60 | 58 | acryl-based resin | 5 | Spraying | poor |
| Comp. Example 61 | 64 | urethane-based resin | 2 | Spraying | poor |
| Comp. Example 62 | 54 | polyester resin | 12 | Brushing | poor |
| Comp. Example 63 | 32 | epoxy-based resin | 15 | Brushing | poor |
| Comp. Example 64 | 57 | alkali silicate | 2 | Spraying | poor |
| Comp. Example 65 | 70 | alkyl silicate | 5 | Spraying | poor |
| Comp. Example 66 | 64 | alkali silicate | 12 | Brushing | poor |
| Comp. Example 67 | 42 | alkyl silicate | 15 | Brushing | poor |
| Comp. Example 68 | 38 | alkali silicate | 13 | Brushing | poor |
| Comp. Example 69 | 44 | alkyl silicate | 22 | Spraying | poor |
| Comp. Example 70 | 56 | alkali silicate | 34 | Spraying | poor |
| Comp. Example 71 | 76 | alkyl silicate | 15 | Brushing | poor |
| Comp. Example 72 | 65 | alkyl silicate | 15 | Spraying | poor |

(*1) F: Fracture facets existing, FC: Fracture facets and/or cracks existing, NO: No fracture facet and/or crack

TABLE 54

| | Zn-Alloy Particle Properties | | | | | | | | |
|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$, Mg$_2$Zn$_{11}$, Mg$_2$Zn3, MgZn, or Mg7Zn3 | # of facets |
| Inv. Example 2248 | 7.5 | FC | 5.07 | 1.42 | 0 | 0 | Existence | Existence | 2 |
| Inv. Example 2249 | 8.06 | FC | 7.72 | 1.38 | 0 | 0 | Existence | Existence | 2 |
| Inv. Example 2250 | 9.3 | FC | 8.32 | 1.22 | 0 | 0 | Existence | No | 2 |
| Inv. Example 2251 | 3.5 | FC | 3.04 | 1.02 | 0 | 0 | Existence | Existence | 2 |
| Inv. Example 2252 | 2.7 | FC | 4.12 | 1.21 | 0 | 0 | Existence | No | 6 |
| Inv. Example 2253 | 9.2 | FC | 7.81 | 1.47 | 0 | 0 | Existence | Existence | 6 |
| Inv. Example 2254 | 8.1 | FC | 1.45 | 1.31 | 0 | 0 | Existence | No | 7 |
| Inv. Example 2255 | 7.5 | FC | 9.6 | 1.07 | 0 | 0 | Existence | Existence | 6 |
| Inv. Example 2256 | 4.5 | FC | 8.5 | 1.42 | 0 | 0 | Existence | No | 2 |
| Inv. Example 2257 | 3.6 | FC | 3.2 | 1.05 | 0 | 0 | Existence | No | 7 |
| Inv. Example 2258 | 4.2 | FC | 5.7 | 1.02 | 1.5 | 0 | Existence | Existence | 2 |
| Inv. Example 2259 | 4.3 | FC | 6.4 | 1.06 | 5.5 | 1.6 | Existence | No | 6 |
| Inv. Example 2260 | 4 | FC | 3.2 | 1.05 | 0 | 0 | Existence | Existence | 6 |
| Inv. Example 2261 | 6.4 | FC | 5.2 | 1.33 | 0 | 0 | Existence | Existence | 2 |
| Inv. Example 2262 | 9.8 | FC | 5.2 | 1.33 | 0 | 0 | Existence | No | 2 |
| Inv. Example 2263 | 7.5 | FC | 5.07 | 1.42 | 0 | 0 | Existence | No | 7 |
| Inv. Example 2264 | 8.4 | FC | 7.72 | 1.38 | 0.5 | 0 | Existence | Existence | 6 |
| Inv. Example 2265 | 2.7 | FC | 4.12 | 1.21 | 0 | 0 | Existence | No | 7 |
| Inv. Example 2266 | 2.64 | FC | 5.5 | 1.22 | 0 | 0 | Existence | No | 2 |
| Inv. Example 2267 | 1.59 | FC | 6.7 | 1.14 | 0 | 0 | Existence | Existence | 7 |
| Inv. Example 2268 | 2.58 | FC | 8.9 | 1.13 | 0 | 0 | Existence | Existence | 6 |
| Inv. Example 2269 | 7.55 | FC | 2.15 | 1.14 | 0 | 0 | Existence | Existence | 7 |
| Inv. Example 2270 | 8.01 | FC | 2.54 | 1.13 | 0 | 0 | Existence | No | 6 |
| Inv. Example 2271 | 1.06 | FC | 3.4 | 1.38 | 0 | 0 | Existence | Existence | 7 |
| Inv. Example 2272 | 2.64 | FC | 5.5 | 1.22 | 0 | 0 | Existence | Existence | 6 |
| Inv. Example 2273 | 1.59 | FC | 6.7 | 1.14 | 0 | 0 | Existence | Existence | 2 |
| Inv. Example 2274 | 20.5 | FC | 2.15 | 1.14 | 1.5 | 0 | Existence | No | 7 |

| | Coat Properties | | | | |
|---|---|---|---|---|---|
| | Ratio of Metal Particle in Dry Coat (mass %) | Base Resin | Coat Thickness (μm) | Coating Method | Result of Corrosion Test |
| Inv. Example 2248 | 74 | alkali silicate | 24 | Brushing | very good |
| Inv. Example 2249 | 82 | alkyl silicate | 25 | Spraying | very good |
| Inv. Example 2250 | 37 | alkali silicate | 14 | Spraying | very good |
| Inv. Example 2251 | 48 | alkali silicate | 15 | Spraying | very good |
| Inv. Example 2252 | 32 | alkali silicate | 15 | Spraying | very good |
| Inv. Example 2253 | 45 | alkyl silicate | 15 | Brushing | very good |
| Inv. Example 2254 | 37 | epoxy-based resin | 5 | Spraying | good |
| Inv. Example 2255 | 72 | urethane-based resin | 150 | Spraying | very good |
| Inv. Example 2256 | 40 | alkali silicate | 18 | Spraying | very good |
| Inv. Example 2257 | 40 | alkali silicate | 18 | Spraying | very good |
| Inv. Example 2258 | 72 | alkyl silicate | 58 | Spraying | very good |
| Inv. Example 2259 | 40 | alkyl silicate | 21 | Spraying | very good |
| Inv. Example 2260 | 36 | alkali silicate | 19 | Brushing | very good |
| Inv. Example 2261 | 53 | alkyl silicate | 77 | Spraying | very good |
| Inv. Example 2262 | 53 | alkyl silicate | 77 | Spraying | very good |
| Inv. Example 2263 | 66 | alkali silicate | 13 | Brushing | very good |
| Inv. Example 2264 | 67 | alkyl silicate | 22 | Brushing | very good |
| Inv. Example 2265 | 57 | alkali silicate | 15 | Spraying | very good |
| Inv. Example 2266 | 43 | alkyl silicate | 16 | Spraying | very good |
| Inv. Example 2267 | 76 | alkyl silicate | 5 | Spraying | very good |
| Inv. Example 2268 | 49 | alkyl silicate | 22 | Spraying | very good |
| Inv. Example 2269 | 75 | alkyl silicate | 18 | Spraying | very good |
| Inv. Example 2270 | 73 | alkyl silicate | 16 | Spraying | very good |
| Inv. Example 2271 | 49 | alkyl silicate | 8 | Spraying | very good |
| Inv. Example 2272 | 43 | alkyl silicate | 16 | Spraying | very good |
| Inv. Example 2273 | 76 | alkyl silicate | 5 | Spraying | very good |
| Inv. Example 2274 | 75 | alkyl silicate | 18 | Spraying | very good |

(*1) F: Fracture facets existing, FC: Fracture facets and/or cracks existing, NO: No fracture facet and/or crack

TABLE 55

| | Zn-Alloy Particle Properties | | | | | | | | |
|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, $MgZn$, or $Mg_7Zn_3$ | # of facets |
| Inv. Example 2275 | 18.5 | FC | 2.54 | 1.13 | 5.5 | 1.6 | Existence | Existence | 6 |
| Inv. Example 2276 | 9.51 | FC | 2.77 | 1.38 | 4.5 | 0 | Existence | Existence | 6 |
| Inv. Example 2277 | 10.01 | FC | 3.68 | 1.22 | 0 | 1.6 | Existence | Existence | 6 |
| Inv. Example 2278 | 3.54 | FC | 5.5 | 1.22 | 0 | 0 | Existence | No | 2 |
| Inv. Example 2279 | 4.05 | FC | 2.06 | 1.13 | 0 | 0 | Existence | Existence | 6 |
| Inv. Example 2280 | 8.57 | FC | 4.99 | 1.02 | 0 | 0 | Existence | Existence | 7 |
| Inv. Example 2281 | 0.01 | FC | 6.4 | 1.06 | 0 | 0 | Existence | No | 2 |
| Inv. Example 2282 | 25.5 | FC | 3.09 | 1.07 | 0 | 0 | Existence | Existence | 6 |
| Inv. Example 2283 | 2.36 | FC | 3.99 | 1.22 | 0 | 0 | Existence | No | 2 |
| Inv. Example 2284 | 0.05 | FC | 7.72 | 1.38 | 0 | 0 | Existence | Existence | 6 |
| Inv. Example 2285 | 0.04 | FC | 8.32 | 1.22 | 0 | 0 | Existence | No | 7 |
| Inv. Example 2286 | 5.22 | FC | 3.55 | 1.12 | 0 | 0 | Existence | Existence | 7 |
| Inv. Example 2287 | 4.01 | FC | 2.64 | 1.23 | 0 | 0 | Existence | Existence | 2 |
| Inv. Example 2288 | 0.05 | FC | 5.2 | 1.33 | 0 | 0 | Existence | Existence | 2 |
| Inv. Example 2289 | 0.04 | FC | 1.9 | 1.27 | 0 | 0 | Existence | Existence | 6 |
| Inv. Example 2290 | 0.05 | FC | 2.5 | 1.05 | 0 | 1.2 | Existence | No | 7 |
| Inv. Example 2291 | 0.07 | FC | 0.09 | 1.12 | 0 | 0.6 | Existence | No | 6 |
| Inv. Example 2292 | 2.64 | FC | 5.5 | 1.22 | 0 | 0.01 | Existence | No | 7 |
| Inv. Example 2293 | 0.08 | FC | 5.6 | 1.36 | 1.5 | 0 | Existence | Existence | 6 |
| Inv. Example 2294 | 0.09 | FC | 11.5 | 1.11 | 5.5 | 1.6 | Existence | No | 2 |
| Inv. Example 2295 | 0.05 | FC | 19.5 | 1.07 | 4.5 | 0 | Existence | Existence | 2 |
| Inv. Example 2296 | 1.59 | FC | 6.7 | 1.14 | 0 | 0.1 | Existence | Existence | 6 |
| Inv. Example 2297 | 2.58 | FC | 8.9 | 1.13 | 0.01 | 0 | Existence | Existence | 7 |
| Inv. Example 2298 | 0.06 | FC | 8.32 | 1.22 | 3.2 | 0.9 | Existence | Existence | 6 |
| Inv. Example 2299 | 0.18 | FC | 10.05 | 1.14 | 0 | 0.5 | Existence | Existence | 6 |
| Inv. Example 2300 | 7.55 | FC | 2.15 | 1.14 | 0.2 | 0.1 | Existence | Existence | 2 |
| Inv. Example 2301 | 0.01 | FC | 0.06 | 1.23 | 1.2 | 0.6 | Existence | No | 7 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 2275 | 73 | alkyl silicate | 16 | Spraying | very good |
| Inv. Example 2276 | 55 | alkyl silicate | 5 | Spraying | very good |
| Inv. Example 2277 | 48 | alkyl silicate | 22 | Spraying | very good |
| Inv. Example 2278 | 78 | alkyl silicate | 18 | Spraying | very good |
| Inv. Example 2279 | 52 | alkyl silicate | 8 | Spraying | very good |
| Inv. Example 2280 | 61 | alkyl silicate | 16 | Spraying | very good |
| Inv. Example 2281 | 77 | polyester resin | 47 | Spraying | very good |
| Inv. Example 2282 | 49 | alkyl silicate | 22 | Spraying | very good |
| Inv. Example 2283 | 80 | alkyl silicate | 21 | Spraying | very good |
| Inv. Example 2284 | 36 | alkyl silicate | 19 | Brushing | very good |
| Inv. Example 2285 | 32 | alkyl silicate | 24 | Spraying | very good |
| Inv. Example 2286 | 55 | alkyl silicate | 19 | Spraying | very good |
| Inv. Example 2287 | 40 | alkyl silicate | 8 | Spraying | very good |
| Inv. Example 2288 | 53 | urethane-based resin | 20 | Brushing | very good |
| Inv. Example 2289 | 60 | polyester resin | 200 | Brushing | very good |
| Inv. Example 2290 | 38 | alkali silicate | 19 | Spraying | very good |
| Inv. Example 2291 | 49 | alkyl silicate | 11 | Spraying | very good |
| Inv. Example 2292 | 43 | alkyl silicate | 16 | Spraying | very good |
| Inv. Example 2293 | 66 | alkyl silicate | 16 | Brushing | very good |
| Inv. Example 2294 | 67 | alkali silicate | 33 | Brushing | very good |
| Inv. Example 2295 | 54 | alkyl silicate | 8 | Brushing | good |
| Inv. Example 2296 | 76 | alkyl silicate | 5 | Spraying | very good |
| Inv. Example 2297 | 49 | alkyl silicate | 22 | Spraying | very good |
| Inv. Example 2298 | 32 | alkyl silicate | 23 | Spraying | very good |
| Inv. Example 2299 | 53 | epoxy-based resin | 30 | Spraying | very good |
| Inv. Example 2300 | 75 | alkyl silicate | 18 | Spraying | very good |
| Inv. Example 2301 | 75 | alkali silicate | 5 | Spraying | good |

(*1) F: Fracture facets existing, FC: Fracture facets and/or cracks existing, NO: No fracture facet and/or crack

TABLE 56

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$, Mg$_2$Zn$_{11}$, Mg$_2$Zn3, MgZn, or Mg7Zn3 | # of facets |
| Inv. Example 2302 | 12.5 | FC | 2.54 | 1.13 | 0.5 | 0 | Existence | Existence | 2 |
| Inv. Example 2303 | 1.06 | FC | 3.4 | 1.38 | 1.5 | 0.9 | Existence | Existence | 2 |
| Inv. Example 2304 | 0.04 | FC | 8.5 | 1.42 | 0 | 1.2 | Existence | No | 6 |
| Inv. Example 2305 | 0.06 | FC | 7.72 | 1.38 | 0 | 0.6 | Existence | Existence | 7 |
| Inv. Example 2306 | 9.51 | FC | 2.77 | 1.38 | 0 | 0.01 | Existence | No | 7 |
| Inv. Example 2307 | 15.5 | FC | 3.68 | 1.22 | 1.5 | 0 | Existence | Existence | 6 |
| Inv. Example 2308 | 0.05 | FC | 10.6 | 1.13 | 5.5 | 1.6 | Existence | No | 7 |
| Inv. Example 2309 | 0.07 | FC | 5.7 | 1.02 | 4.5 | 0 | Existence | No | 7 |
| Inv. Example 2310 | 3.54 | FC | 5.5 | 1.22 | 0 | 0.1 | Existence | Existence | 6 |
| Inv. Example 2311 | 0.08 | FC | 3.2 | 1.05 | 0.01 | 0 | Existence | Existence | 7 |
| Inv. Example 2312 | 0.07 | FC | 4.5 | 1.24 | 3.2 | 0.9 | Existence | Existence | 2 |
| Inv. Example 2313 | 15.5 | FC | 2.54 | 1.14 | 0 | 0.5 | Existence | No | 7 |
| Inv. Example 2314 | 4.05 | FC | 2.06 | 1.13 | 0.2 | 0.1 | Existence | Existence | 7 |
| Inv. Example 2315 | 8.57 | FC | 4.99 | 1.02 | 1.2 | 0.6 | Existence | No | 2 |
| Inv. Example 2316 | 0.01 | FC | 6.4 | 1.06 | 0.5 | 0 | Existence | Existence | 6 |
| Inv. Example 2317 | 4.59 | FC | 3.09 | 1.07 | 1.5 | 0.9 | Existence | No | 6 |
| Inv. Example 2318 | 9.88 | FC | 4.66 | 1.42 | 0 | 1.2 | Existence | No | 7 |
| Inv. Example 2319 | 4.55 | FC | 4.09 | 1.38 | 0 | 0.6 | Existence | Existence | 7 |
| Inv. Example 2320 | 2.36 | FC | 3.99 | 1.22 | 0 | 0.01 | Existence | No | 6 |
| Inv. Example 2321 | 0.05 | FC | 7.72 | 1.38 | 1.5 | 0 | Existence | Existence | 7 |
| Inv. Example 2322 | 0.04 | FC | 8.32 | 1.22 | 5.5 | 1.6 | Existence | Existence | 2 |
| Inv. Example 2323 | 2.64 | FC | 4.55 | 1.11 | 4.5 | 0 | Existence | No | 2 |
| Inv. Example 2324 | 0.06 | FC | 10.6 | 1.13 | 0 | 0.1 | Existence | No | 6 |
| Inv. Example 2325 | 0.18 | FC | 5.7 | 1.02 | 0.01 | 0 | Existence | Existence | 7 |
| Inv. Example 2326 | 6.31 | FC | 3.52 | 1.27 | 3.2 | 0.9 | Existence | No | 6 |
| Inv. Example 2327 | 5.22 | FC | 3.55 | 1.12 | 0 | 0.5 | Existence | No | 2 |
| Inv. Example 2328 | 28.5 | FC | 2.64 | 1.23 | 0.2 | 0.1 | Existence | Existence | 2 |

| | Coat Properties | | | | |
|---|---|---|---|---|---|
| | Ratio of Metal Particle in Dry Coat (mass %) | Base Resin | Coat Thickness (μm) | Coating Method | Result of Corrosion Test |
| Inv. Example 2302 | 73 | alkyl silicate | 16 | Spraying | very good |
| Inv. Example 2303 | 49 | alkyl silicate | 8 | Spraying | very good |
| Inv. Example 2304 | 40 | alkali silicate | 2 | Spraying | very good |
| Inv. Example 2305 | 36 | alkyl silicate | 18 | Spraying | very good |
| Inv. Example 2306 | 55 | alkyl silicate | 5 | Spraying | very good |
| Inv. Example 2307 | 48 | alkyl silicate | 22 | Spraying | very good |
| Inv. Example 2308 | 67 | acryl-based resin | 77 | Brushing | very good |
| Inv. Example 2309 | 72 | urethane-based resin | 54 | Brushing | very good |
| Inv. Example 2310 | 78 | alkyl silicate | 18 | Spraying | very good |
| Inv. Example 2311 | 34 | epoxy-based resin | 43 | Spraying | very good |
| Inv. Example 2312 | 43 | acryl-based resin | 52 | Brushing | very good |
| Inv. Example 2313 | 45 | alkyl silicate | 19 | Spraying | very good |
| Inv. Example 2314 | 52 | alkyl silicate | 8 | Spraying | very good |
| Inv. Example 2315 | 61 | alkyl silicate | 16 | Spraying | very good |
| Inv. Example 2316 | 77 | polyester resin | 47 | Spraying | very good |
| Inv. Example 2317 | 49 | alkyl silicate | 22 | Spraying | very good |
| Inv. Example 2318 | 79 | alkyl silicate | 18 | Spraying | very good |
| Inv. Example 2319 | 76 | alkyl silicate | 18 | Spraying | very good |
| Inv. Example 2320 | 80 | alkyl silicate | 21 | Spraying | very good |
| Inv. Example 2321 | 36 | alkyl silicate | 19 | Brushing | very good |
| Inv. Example 2322 | 32 | alkyl silicate | 24 | Spraying | very good |
| Inv. Example 2323 | 43 | alkyl silicate | 5 | Spraying | very good |
| Inv. Example 2324 | 67 | alkyl silicate | 7 | Spraying | very good |
| Inv. Example 2325 | 72 | epoxy-based resin | 100 | Spraying | very good |
| Inv. Example 2326 | 51 | alkyl silicate | 21 | Spraying | very good |
| Inv. Example 2327 | 55 | alkyl silicate | 19 | Spraying | very good |
| Inv. Example 2328 | 40 | alkyl silicate | 8 | Spraying | very good |

(*1) F: Fracture facets existing, FC: Fracture facets and/or cracks existing, NO: No fracture facet and/or crack

TABLE 57

| | Zn-Alloy Particle Properties | | | | | | | | |
|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn3$, $MgZn$, or $Mg7Zn3$ | # of facets |
| Inv. Example 2329 | 3.52 | FC | 3.15 | 1.36 | 1.2 | 0.6 | Existence | Existence | 7 |
| Inv. Example 2330 | 0.05 | FC | 5.2 | 1.33 | 0.5 | 0 | Existence | Existence | 6 |
| Inv. Example 2331 | 0.04 | FC | 1.9 | 1.27 | 1.5 | 0.9 | Existence | No | 7 |
| Inv. Example 2332 | 0.06 | FC | 10.5 | 1.12 | 0 | 1.2 | Existence | Existence | 7 |
| Inv. Example 2333 | 0.05 | FC | 12.5 | 1.23 | 0 | 0.6 | Existence | Existence | 6 |
| Inv. Example 2334 | 0.07 | FC | 18.5 | 1.36 | 0 | 0.01 | Existence | Existence | 2 |
| Inv. Example 2335 | 0.01 | FC | 11.5 | 1.11 | 1.5 | 0 | Existence | No | 7 |
| Inv. Example 2336 | 0.08 | FC | 9.6 | 1.07 | 5.5 | 1.6 | Existence | Existence | 2 |
| Inv. Example 2337 | 0.03 | FC | 8.5 | 1.42 | 4.5 | 0 | Existence | Existence | 2 |
| Inv. Example 2338 | 4.25 | FC | 2.36 | 1.33 | 0 | 0.1 | Existence | Existence | 7 |
| Inv. Example 2339 | 0.04 | FC | 23.5 | 1.42 | 0.01 | 0 | Existence | No | 2 |
| Inv. Example 2340 | 0.06 | FC | 101.5 | 1.38 | 3.2 | 0.9 | Existence | Existence | 7 |
| Inv. Example 2341 | 0.06 | FC | 55.4 | 1.38 | 0 | 0.5 | Existence | Existence | 2 |
| Inv. Example 2342 | 0.07 | FC | 10.5 | 1.12 | 0.2 | 0.1 | Existence | No | 6 |
| Inv. Example 2343 | 0.01 | FC | 12.5 | 1.23 | 1.2 | 0.6 | Existence | Existence | 6 |
| Inv. Example 2344 | 0.08 | FC | 18.5 | 1.36 | 0.5 | 0 | Existence | No | 7 |
| Inv. Example 2345 | 0.09 | FC | 11.5 | 1.11 | 1.5 | 0.9 | Existence | Existence | 6 |
| Inv. Example 2346 | 0.05 | FC | 9.6 | 1.07 | 0.5 | 0 | Existence | No | 2 |
| Inv. Example 2347 | 0.06 | FC | 10.05 | 1.14 | 1.5 | 0.9 | Existence | Existence | 2 |
| Inv. Example 2348 | 29.9 | FC | 10.5 | 1.36 | 0 | 0 | Existence | Existence | 2 |
| Inv. Example 2349 | 16.5 | FC | 7.5 | 1.11 | 0.01 | 0 | Existence | Existence | 7 |
| Inv. Example 2350 | 12.5 | FC | 2.6 | 1.07 | 3.2 | 0.9 | Existence | No | 2 |
| Inv. Example 2351 | 9.8 | FC | 3.5 | 1.42 | 0 | 0.5 | Existence | Existence | 6 |
| Inv. Example 2352 | 9.6 | FC | 4.5 | 1.33 | 0.2 | 0.1 | Existence | No | 6 |
| Inv. Example 2353 | 7.5 | FC | 1.6 | 1.42 | 0 | 0.5 | Existence | Existence | 2 |
| Inv. Example 2354 | 4.6 | FC | 2.5 | 1.12 | 5.8 | 0.1 | Existence | Existence | 7 |
| Inv. Example 2355 | 3.8 | FC | 23.5 | 1.23 | 1.2 | 0.6 | Existence | Existence | 6 |
| Inv. Example 2356 | 0.05 | FC | 9.8 | 1.27 | 15.5 | 0 | Existence | Existence | 6 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 2329 | 51 | alkyl silicate | 16 | Spraying | very good |
| Inv. Example 2330 | 53 | urethane-based resin | 20 | Brushing | very good |
| Inv. Example 2331 | 60 | polyester resin | 200 | Brushing | very good |
| Inv. Example 2332 | 77 | alkyl silicate | 25 | Spraying | very good |
| Inv. Example 2333 | 43 | alkali silicate | 14 | Spraying | very good |
| Inv. Example 2334 | 52 | urethane-based resin | 112 | Spraying | very good |
| Inv. Example 2335 | 66 | alkali silicate | 24 | Spraying | very good |
| Inv. Example 2336 | 72 | urethane-based resin | 150 | Spraying | very good |
| Inv. Example 2337 | 40 | alkali silicate | 18 | Spraying | very good |
| Inv. Example 2338 | 44 | alkyl silicate | 18 | Spraying | very good |
| Inv. Example 2339 | 44 | alkali silicate | 38 | Spraying | very good |
| Inv. Example 2340 | 36 | alkyl silicate | 18 | Spraying | very good |
| Inv. Example 2341 | 76 | alkyl silicate | 10 | Spraying | very good |
| Inv. Example 2342 | 77 | alkyl silicate | 37 | Spraying | very good |
| Inv. Example 2343 | 43 | alkali silicate | 2 | Spraying | good |
| Inv. Example 2344 | 52 | alkyl silicate | 160 | Brushing | very good |
| Inv. Example 2345 | 66 | alkali silicate | 5 | Brushing | very good |
| Inv. Example 2346 | 72 | alkyl silicate | 56 | Brushing | very good |
| Inv. Example 2347 | 53 | urethane-based resin | 99 | Spraying | very good |
| Inv. Example 2348 | 55 | urethane-based resin | 700 | Spraying | very good |
| Inv. Example 2349 | 47 | alkyl silicate | 554 | Spraying | very good |
| Inv. Example 2350 | 79 | urethane-based resin | 688 | Brushing | very good |
| Inv. Example 2351 | 42 | urethane-based resin | 421 | Spraying | very good |
| Inv. Example 2352 | 36 | urethane-based resin | 651 | Spraying | very good |
| Inv. Example 2353 | 53 | urethane-based resin | 402 | Brushing | very good |
| Inv. Example 2354 | 55 | alkali silicate | 354 | Spraying | very good |
| Inv. Example 2355 | 42 | urethane-based resin | 504 | Brushing | very good |
| Inv. Example 2356 | 76 | urethane-based resin | 666 | Spraying | very good |

(*1) F: Fracture facets existing, FC: Fracture facets and/or cracks existing, NO: No fracture facet and/or crack

Example 5

Zn alloy particles with the chemical ingredients shown Tables 58 to 75 were produced in the same way as in Example 1. Zn metal particles of an average particle size 0.05 to 50 μm were mixed in the paints. The rest is the same as Example 1.

From Tables 58 to 75, it is learned that the painting test pieces using the Zn alloy particles and Zn metal particles of the present invention are improved in corrosion resistance and rust prevention regardless of the type of base resin, that is, both for inorganic-based and organic-based binders.

TABLE 58

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) | Mg Contents to Total Metal Particle (mass %) |
| Inv. Example 191 | 12.3 | F | 0.02 | 1.05 | 2.04 | 300:1 | 12.26 |
| Inv. Example 192 | 0.8 | F | 27.89 | 1.12 | 50.00 | 1:99 | 0.01 |
| Inv. Example 193 | 1 | F | 0.32 | 1.23 | 2.45 | 100:1 | 0.99 |
| Inv. Example 194 | 2.3 | F | 11.44 | 1.36 | 5.33 | 200:1 | 2.29 |
| Inv. Example 195 | 15.6 | F | 1.05 | 1.11 | 2.41 | 100:1 | 15.45 |
| Inv. Example 196 | 6.7 | F | 36.47 | 1.07 | 23.43 | 150:1 | 6.66 |
| Inv. Example 197 | 7.5 | F | 5.07 | 1.42 | 6.03 | 3:1 | 5.63 |
| Inv. Example 198 | 8.4 | F | 7.72 | 1.38 | 24.5 | 80:1 | 8.30 |
| Inv. Example 199 | 9.3 | F | 8.32 | 1.22 | 5.32 | 1:15 | 0.58 |
| Inv. Example 200 | 10.4 | F | 10.05 | 1.14 | 14.34 | 1:30 | 0.34 |
| Inv. Example 201 | 11.2 | F | 6.08 | 1.13 | 5.04 | 1:45 | 0.24 |
| Inv. Example 202 | 11.7 | F | 17.89 | 1.02 | 2.32 | 1:55 | 0.21 |
| Inv. Example 203 | 21.5 | F | 19.54 | 1.06 | 20.34 | 1:65 | 0.33 |
| Inv. Example 204 | 13.4 | F | 21.08 | 1.05 | 12.33 | 1:75 | 0.18 |
| Inv. Example 205 | 14.6 | F | 23.04 | 1.24 | 17.84 | 110:1 | 14.47 |
| Inv. Example 206 | 25.8 | F | 9.21 | 1.33 | 6.66 | 115:1 | 25.58 |
| Inv. Example 207 | 16.7 | F | 0.12 | 1.27 | 3.65 | 70:1 | 16.46 |
| Inv. Example 208 | 17.3 | F | 29.24 | 1.37 | 22.62 | 80:1 | 17.09 |
| Inv. Example 209 | 18.5 | F | 128.74 | 1.10 | 45.33 | 65:1 | 18.22 |
| Inv. Example 210 | 19.3 | F | 33.57 | 1.04 | 43.22 | 70:1 | 19.03 |
| Inv. Example 211 | 3.5 | F | 3.04 | 1.02 | 12.33 | 300:1 | 3.49 |
| Inv. Example 212 | 22.5 | F | 7.54 | 1.01 | 13.42 | 300:1 | 22.43 |
| Inv. Example 213 | 23.7 | F | 6.81 | 1.08 | 22.32 | 70:1 | 23.37 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 191 | 52 | alkali silicate | 2 | Spraying | very good |
| Inv. Example 192 | 55 | alkyl silicate | 33 | Spraying | very good |
| Inv. Example 193 | 69 | alkali silicate | 5 | Spraying | very good |
| Inv. Example 194 | 78 | alkyl silicate | 20 | Spraying | very good |
| Inv. Example 195 | 42 | alkali silicate | 15 | Brushing | very good |
| Inv. Example 196 | 32 | alkyl silicate | 57 | Brushing | very good |
| Inv. Example 197 | 66 | alkali silicate | 13 | Brushing | very good |
| Inv. Example 198 | 67 | alkyl silicate | 22 | Brushing | very good |
| Inv. Example 199 | 64 | alkali silicate | 20 | Spraying | very good |
| Inv. Example 200 | 74 | alkyl silicate | 27 | Spraying | very good |
| Inv. Example 201 | 82 | alkali silicate | 15 | Spraying | very good |
| Inv. Example 202 | 37 | alkyl silicate | 35 | Spraying | very good |
| Inv. Example 203 | 42 | alkali silicate | 34 | Brushing | very good |
| Inv. Example 204 | 66 | alkyl silicate | 45 | Brushing | very good |
| Inv. Example 205 | 48 | alkali silicate | 52 | Brushing | very good |
| Inv. Example 206 | 33 | alkyl silicate | 23 | Brushing | very good |
| Inv. Example 207 | 75 | alkali silicate | 5 | Spraying | very good |
| Inv. Example 208 | 77 | alkyl silicate | 52 | Brushing | very good |
| Inv. Example 209 | 66 | alkali silicate | 150 | Brushing | very good |
| Inv. Example 210 | 67 | alkyl silicate | 60 | Brushing | very good |
| Inv. Example 211 | 45 | alkali silicate | 15 | Spraying | very good |
| Inv. Example 212 | 48 | alkyl silicate | 24 | Spraying | very good |
| Inv. Example 213 | 68 | alkali silicate | 34 | Spraying | very good |

(*1) F: Fracture facets existing, FC: Fracture facets and/or cracks existing, NO: No fracture facet and/or crack

TABLE 59

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) | Mg Contents to Total Metal Particle (mass %) |
| Inv. Example 214 | 24.2 | F | 5.25 | 1.14 | 7.34 | 300:1 | 24.12 |
| Inv. Example 215 | 0.2 | F | 194.23 | 1.23 | 44.54 | 100:1 | 0.20 |
| Inv. Example 216 | 27.1 | F | 28.74 | 1.33 | 32.87 | 250:1 | 26.99 |
| Inv. Example 217 | 29.3 | F | 13.57 | 1.37 | 20.32 | 150:1 | 29.11 |
| Inv. Example 218 | 0.5 | F | 0.65 | 1.44 | 2.03 | 170:1 | 0.50 |
| Inv. Example 219 | 2.7 | F | 4.12 | 1.21 | 5.33 | 300:1 | 2.69 |
| Inv. Example 220 | 28.4 | F | 0.72 | 1.22 | 2.33 | 200:1 | 28.26 |
| Inv. Example 221 | 8.7 | F | 117.54 | 1.23 | 27.44 | 65:1 | 8.57 |
| Inv. Example 222 | 9.2 | F | 7.81 | 1.47 | 12.33 | 300:1 | 9.17 |
| Inv. Example 223 | 17.8 | F | 80.25 | 1.01 | 36.43 | 120:1 | 17.65 |
| Inv. Example 224 | 20.2 | F | 8.47 | 1.04 | 12.33 | 300:1 | 20.13 |
| Inv. Example 225 | 0.4 | F | 0.87 | 1.05 | 3.21 | 300:1 | 0.40 |
| Inv. Example 226 | 13.7 | F | 25.78 | 1.12 | 26.33 | 300:1 | 13.65 |
| Inv. Example 227 | 14.7 | F | 93.45 | 1.11 | 44.21 | 70:1 | 14.49 |
| Inv. Example 228 | 2.4 | F | 0.97 | 1.08 | 3.43 | 80:1 | 2.37 |
| Inv. Example 229 | 4.5 | F | 54.89 | 1.47 | 47.32 | 300:1 | 4.49 |
| Inv. Example 230 | 0.1 | F | 10.81 | 1.50 | 12.33 | 70:1 | 0.10 |
| Inv. Example 231 | 30.0 | F | 18.24 | 1.13 | 17.44 | 65:1 | 29.55 |
| Inv. Example 232 | 24.5 | F | 114.78 | 1.04 | 42.21 | 300:1 | 24.42 |
| Inv. Example 233 | 27.6 | F | 3.87 | 1.02 | 12.34 | 300:1 | 27.51 |
| Inv. Example 234 | 4.1 | F | 11.94 | 1.08 | 20.32 | 300:1 | 4.09 |
| Inv. Example 235 | 3.2 | F | 142.58 | 1.15 | 23.44 | 65:1 | 3.15 |
| Inv. Example 236 | 2.7 | F | 12.5 | 1.34 | 23.45 | 300:1 | 2.69 |

| | Coat Properties | | | | |
|---|---|---|---|---|---|
| | Ratio of Metal Particle in Dry Coat (mass %) | Base Resin | Coat Thickness (μm) | Coating Method | Result of Corrosion Test |
| Inv. Example 214 | 35 | alkyl silicate | 20 | Brushing | very good |
| Inv. Example 215 | 37 | alkali silicate | 200 | Brushing | very good |
| Inv. Example 216 | 38 | alkyl silicate | 56 | Brushing | very good |
| Inv. Example 217 | 41 | alkali silicate | 34 | Spraying | very good |
| Inv. Example 218 | 54 | alkyl silicate | 2 | Spraying | very good |
| Inv. Example 219 | 57 | alkali silicate | 15 | Spraying | very good |
| Inv. Example 220 | 59 | alkali silicate | 10 | Spraying | very good |
| Inv. Example 221 | 64 | alkyl silicate | 125 | Brushing | very good |
| Inv. Example 222 | 66 | alkali silicate | 24 | Brushing | very good |
| Inv. Example 223 | 67 | alkyl silicate | 110 | Brushing | very good |
| Inv. Example 224 | 34 | alkali silicate | 24 | Brushing | very good |
| Inv. Example 225 | 54 | alkyl silicate | 2 | Spraying | very good |
| Inv. Example 226 | 62 | alkali silicate | 37 | Spraying | very good |
| Inv. Example 227 | 66 | alkyl silicate | 113 | Brushing | very good |
| Inv. Example 228 | 67 | alkali silicate | 2 | Spraying | very good |
| Inv. Example 229 | 68 | alkyl silicate | 75 | Brushing | very good |
| Inv. Example 230 | 33 | alkali silicate | 30 | Brushing | very good |
| Inv. Example 231 | 35 | alkyl silicate | 34 | Brushing | very good |
| Inv. Example 232 | 43 | epoxy-based resin | 124 | Brushing | very good |
| Inv. Example 233 | 44 | acryl-based resin | 15 | Spraying | very good |
| Inv. Example 234 | 43 | urethane-based resin | 23 | Spraying | very good |
| Inv. Example 235 | 44 | polyester resin | 157 | Brushing | very good |
| Inv. Example 236 | 54 | epoxy-based resin | 26 | Spraying | very good |

(*1) F: Fracture facets existing, FC: Fracture facets and/or cracks existing, NO: No fracture facet and/or crack

TABLE 60

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) | Mg Contents to Total Metal Particle (mass %) |
| Inv. Example 237 | 0.12 | F | 31.24 | 1.25 | 23.21 | 150:1 | 0.12 |
| Inv. Example 238 | 0.22 | F | 152.46 | 1.19 | 39.44 | 300:1 | 0.22 |
| Inv. Example 239 | 0.37 | F | 13.4 | 1.18 | 12.34 | 65:1 | 0.36 |
| Inv. Example 240 | 1.4 | F | 160.57 | 1.24 | 29.99 | 300:1 | 1.40 |
| Inv. Example 241 | 4.2 | F | 14.1 | 1.11 | 15.21 | 300:1 | 4.19 |
| Inv. Example 242 | 4.8 | F | 167.55 | 1.27 | 23.34 | 65:1 | 4.73 |
| Inv. Example 243 | 8.1 | F | 1.45 | 1.31 | 2.32 | 300:1 | 8.07 |
| Inv. Example 244 | 7.6 | F | 0.15 | 1.26 | 4.21 | 65:1 | 7.48 |
| Inv. Example 245 | 9.9 | F | 13.1 | 1.14 | 12.22 | 300:1 | 9.87 |
| Inv. Example 246 | 14.8 | F | 15.5 | 1.34 | 13.45 | 150:1 | 14.70 |
| Inv. Example 247 | 16.7 | F | 0.67 | 1.16 | 2.34 | 300:1 | 16.64 |
| Inv. Example 248 | 17.9 | F | 137.89 | 1.47 | 28.34 | 65:1 | 17.63 |
| Inv. Example 249 | 19.5 | F | 16.3 | 1.48 | 19.87 | 300:1 | 19.44 |
| Inv. Example 250 | 22.4 | F | 110.38 | 1.49 | 39.74 | 150:1 | 22.25 |
| Inv. Example 251 | 0.17 | F | 12.4 | 1.34 | 24.32 | 300:1 | 0.17 |
| Inv. Example 252 | 8.3 | F | 17.2 | 1.29 | 22.33 | 65:1 | 8.17 |
| Inv. Example 253 | 6.5 | F | 105.23 | 1.18 | 48.54 | 300:1 | 6.48 |
| Inv. Example 254 | 9.7 | F | 177.89 | 1.23 | 23.75 | 300:1 | 9.67 |
| Inv. Example 255 | 11.4 | F | 12.2 | 1.27 | 15.62 | 65:1 | 11.23 |
| Inv. Example 256 | 22.5 | F | 1.84 | 1.17 | 2.34 | 300:1 | 22.43 |
| Inv. Example 257 | 25.7 | F | 16.02 | 1.16 | 23.04 | 300:1 | 25.61 |
| Inv. Example 258 | 17.8 | F | 1.75 | 1.49 | 3.05 | 150:1 | 17.68 |
| Inv. Example 259 | 0.14 | F | 198.78 | 1.34 | 43.23 | 300:1 | 0.14 |

| | Coat Properties | | | | |
|---|---|---|---|---|---|
| | Ratio of Metal Particle in Dry Coat (mass %) | Base Resin | Coat Thickness (μm) | Coating Method | Result of Corrosion Test |
| Inv. Example 237 | 79 | acryl-based resin | 38 | Spraying | very good |
| Inv. Example 238 | 73 | urethane-based resin | 160 | Brushing | very good |
| Inv. Example 239 | 69 | polyester resin | 27 | Brushing | very good |
| Inv. Example 240 | 63 | epoxy-based resin | 180 | Brushing | very good |
| Inv. Example 241 | 35 | acryl-based resin | 26 | Spraying | very good |
| Inv. Example 242 | 35 | urethane based resin | 180 | Brushing | very good |
| Inv. Example 243 | 66 | polyester resin | 15 | Spraying | very good |
| Inv. Example 244 | 67 | epoxy-based resin | 2 | Spraying | very good |
| Inv. Example 245 | 68 | acryl-based resin | 28 | Spraying | very good |
| Inv. Example 246 | 33 | urethane-based resin | 30 | Spraying | very good |
| Inv. Example 247 | 35 | polyester resin | 2 | Spraying | very good |
| Inv. Example 248 | 43 | epoxy-based resin | 157 | Brushing | very good |
| Inv. Example 249 | 44 | acryl-based resin | 28 | Brushing | very good |
| Inv. Example 250 | 42 | urethane-based resin | 130 | Brushing | very good |
| Inv. Example 251 | 33 | polyester resin | 29 | Brushing | very good |
| Inv. Example 252 | 30 | epoxy-based resin | 30 | Brushing | very good |
| Inv. Example 253 | 35 | acryl-based resin | 120 | Brushing | very good |
| Inv. Example 254 | 37 | urethane-based resin | 187 | Brushing | very good |
| Inv. Example 255 | 77 | polyester resin | 28 | Spraying | very good |
| Inv. Example 256 | 41 | epoxy-based resin | 5 | Spraying | very good |
| Inv. Example 257 | 35 | acryl-based resin | 35 | Spraying | very good |
| Inv. Example 258 | 58 | urethane-based resin | 5 | Spraying | very good |
| Inv. Example 259 | 37 | polyester resin | 200 | Brushing | very good |

(*1) F: Fracture facets existing, FC: Fracture facets and/or cracks existing, NO: No fracture facet and/or crack

TABLE 61

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) | Mg Contents to Total Metal Particle (mass %) |
| Inv. Example 1193 | 0.15 | FC | 0.02 | 1.05 | 2.04 | 5:2 | 0.11 |
| Inv. Example 1194 | 0.19 | FC | 10.5 | 1.12 | 50.00 | 7:1 | 0.17 |
| Inv. Example 1195 | 0.18 | FC | 12.5 | 1.23 | 2.45 | 68:1 | 0.18 |
| Inv. Example 1196 | 0.11 | FC | 18.5 | 1.36 | 5.33 | 10:1 | 0.10 |
| Inv. Example 1197 | 0.15 | FC | 11.5 | 1.11 | 2.41 | 25:7 | 0.12 |
| Inv. Example 1198 | 0.24 | FC | 9.6 | 1.07 | 23.43 | 300:9 | 0.23 |
| Inv. Example 1199 | 0.18 | FC | 8.5 | 1.42 | 6.03 | 180:1 | 0.18 |
| Inv. Example 1200 | 0.12 | FC | 7.72 | 1.38 | 24.5 | 23:1 | 0.12 |
| Inv. Example 1201 | 0.19 | FC | 8.32 | 1.22 | 5.32 | 165:1 | 0.19 |
| Inv. Example 1202 | 0.18 | FC | 10.05 | 1.14 | 14.34 | 300:1 | 0.18 |
| Inv. Example 1203 | 0.21 | FC | 10.6 | 1.13 | 5.04 | 120:1 | 0.21 |
| Inv. Example 1204 | 0.76 | FC | 5.7 | 1.02 | 2.32 | 2:9 | 0.14 |
| Inv. Example 1205 | 0.11 | FC | 6.4 | 1.06 | 20.34 | 119:3 | 0.11 |
| Inv. Example 1206 | 0.14 | FC | 3.2 | 1.05 | 12.33 | 233:1 | 0.14 |
| Inv. Example 1207 | 15 | FC | 4.5 | 1.24 | 17.84 | 1:132 | 0.11 |
| Inv. Example 1208 | 14.5 | FC | 5.2 | 1.33 | 6.66 | 1:55 | 10.24 |
| Inv. Example 1209 | 18.5 | FC | 1.9 | 1.27 | 3.65 | 1:23 | 0.77 |
| Inv. Example 1210 | 15.1 | FC | 0.02 | 1.05 | 22.62 | 200:1 | 15.02 |
| Inv. Example 1211 | 15.6 | FC | 10.5 | 1.12 | 45.33 | 1:15 | 0.98 |
| Inv. Example 1212 | 12.5 | FC | 12.5 | 1.23 | 43.22 | 1:10 | 1.14 |
| Inv. Example 1213 | 18.7 | FC | 18.5 | 1.36 | 12.33 | 1:6 | 2.67 |
| Inv. Example 1214 | 14.5 | FC | 11.5 | 1.11 | 13.42 | 1:45 | 0.32 |
| Inv. Example 1215 | 7.5 | FC | 9.6 | 1.07 | 22.32 | 1:50 | 0.15 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 1193 | 35 | alkali silicate | 2 | Spraying | very good |
| Inv. Example 1194 | 77 | alkyl silicate | 37 | Spraying | very good |
| Inv. Example 1195 | 43 | alkali silicate | 2 | Spraying | good |
| Inv. Example 1196 | 52 | alkyl silicate | 160 | Brushing | very good |
| Inv. Example 1197 | 66 | alkali silicate | 5 | Brushing | very good |
| Inv. Example 1198 | 72 | alkyl silicate | 56 | Brushing | very good |
| Inv. Example 1199 | 40 | alkali silicate | 2 | Spraying | very good |
| Inv. Example 1200 | 36 | alkyl silicate | 18 | Spraying | very good |
| Inv. Example 1201 | 32 | alkyl silicate | 23 | Spraying | very good |
| Inv. Example 1202 | 53 | epoxy-based resin | 30 | Brushing | very good |
| Inv. Example 1203 | 67 | acryl-based resin | 77 | Brushing | very good |
| Inv. Example 1204 | 72 | urethane-based resin | 54 | Brushing | very good |
| Inv. Example 1205 | 77 | polyester resin | 47 | Spraying | very good |
| Inv. Example 1206 | 34 | epoxy-based resin | 43 | Spraying | very good |
| Inv. Example 1207 | 43 | acryl-based resin | 52 | Brushing | very good |
| Inv. Example 1208 | 53 | urethane-based resin | 20 | Brushing | very good |
| Inv. Example 1209 | 60 | polyester resin | 200 | Brushing | very good |
| Inv. Example 1210 | 35 | alkali silicate | 22 | Spraying | very good |
| Inv. Example 1211 | 77 | alkyl silicate | 25 | Spraying | very good |
| Inv. Example 1212 | 43 | alkali silicate | 14 | Spraying | very good |
| Inv. Example 1213 | 52 | urethane-based resin | 112 | Spraying | very good |
| Inv. Example 1214 | 66 | alkali silicate | 24 | Spraying | very good |
| Inv. Example 1215 | 72 | urethane-based resin | 150 | Spraying | very good |

(*1) F: Fracture facets existing, FC: Fracture facets and/or cracks existing, NO: No fracture facet and/or crack

TABLE 62

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) | Mg Contents to Total Metal Particle (mass %) |
| Inv. Example 1216 | 4.5 | FC | 8.5 | 1.42 | 7.34 | 1:9 | 0.45 |
| Inv. Example 1217 | 1.5 | FC | 7.72 | 1.38 | 44.54 | 1:7 | 0.19 |

TABLE 62-continued

| | | | | | | | |
|---|---|---|---|---|---|---|---|
| Inv. Example 1218 | 4.8 | FC | 8.32 | 1.22 | 32.87 | 1:4 | 0.96 |
| Inv. Example 1219 | 9.6 | FC | 10.05 | 1.14 | 20.32 | 1:14 | 0.64 |
| Inv. Example 1220 | 11.5 | FC | 10.6 | 1.13 | 2.03 | 1:11 | 0.96 |
| Inv. Example 1221 | 9.8 | FC | 5.7 | 1.02 | 5.33 | 1:28 | 0.34 |
| Inv. Example 1222 | 7.6 | FC | 6.4 | 1.06 | 2.33 | 1:4 | 1.52 |
| Inv. Example 1223 | 3.2 | FC | 3.2 | 1.05 | 27.44 | 250:1 | 3.19 |
| Inv. Example 1224 | 1.9 | FC | 4.5 | 1.24 | 12.33 | 1:1 | 0.95 |
| Inv. Example 1225 | 11.5 | FC | 5.2 | 1.33 | 36.43 | 1:4 | 2.30 |
| Inv. Example 1226 | 8.7 | FC | 1.9 | 1.27 | 12.33 | 1:12 | 0.67 |
| Inv. Example 1227 | 9.6 | FC | 0.02 | 1.05 | 3.21 | 70:1 | 9.46 |
| Inv. Example 1228 | 9.4 | FC | 10.5 | 1.12 | 26.33 | 1:3 | 2.35 |
| Inv. Example 1229 | 10.5 | FC | 12.5 | 1.23 | 44.21 | 1:24 | 0.42 |
| Inv. Example 1230 | 12.6 | FC | 18.5 | 1.36 | 3.43 | 1:10 | 1.15 |
| Inv. Example 1231 | 29.5 | FC | 11.5 | 1.11 | 47.32 | 300:1 | 29.40 |
| Inv. Example 1232 | 29.4 | FC | 9.6 | 1.07 | 12.33 | 1:66 | 0.44 |
| Inv. Example 1233 | 27.5 | FC | 8.5 | 1.42 | 17.44 | 120:1 | 27.27 |
| Inv. Example 1234 | 0.8 | FC | 7.72 | 1.38 | 42.21 | 6:5 | 0.44 |
| Inv. Example 1235 | 1.6 | FC | 8.32 | 1.22 | 12.34 | 1:1 | 0.80 |
| Inv. Example 1236 | 22.9 | FC | 10.05 | 1.14 | 20.32 | 1:1 | 11.45 |
| Inv. Example 1237 | 28.5 | FC | 10.6 | 1.13 | 23.44 | 1:76 | 0.37 |
| Inv. Example 1238 | 29.5 | FC | 5.7 | 1.02 | 23.45 | 1:6 | 4.21 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 1216 | 40 | alkali silicate | 18 | Spraying | very good |
| Inv. Example 1217 | 36 | alkyl silicate | 19 | Brushing | very good |
| Inv. Example 1218 | 32 | alkyl silicate | 24 | Spraying | very good |
| Inv. Example 1219 | 53 | urethane-based resin | 99 | Spraying | very good |
| Inv. Example 1220 | 67 | alkyl silicate | 7 | Spraying | very good |
| Inv. Example 1221 | 72 | epoxy-based resin | 100 | Spraying | very good |
| Inv. Example 1222 | 77 | alkyl silicate | 27 | Brushing | very good |
| Inv. Example 1223 | 34 | alkali silicate | 15 | Spraying | very good |
| Inv. Example 1224 | 43 | alkyl silicate | 14 | Spraying | very good |
| Inv. Example 1225 | 53 | urethane-based resin | 55 | Spraying | very good |
| Inv. Example 1226 | 35 | alkyl silicate | 8 | Spraying | very good |
| Inv. Example 1227 | 77 | urethane-based resin | 122 | Brushing | very good |
| Inv. Example 1228 | 43 | alkyl silicate | 54 | Spraying | very good |
| Inv. Example 1229 | 52 | alkali silicate | 19 | Spraying | very good |
| Inv. Example 1230 | 66 | alkyl silicate | 25 | Brushing | very good |
| Inv. Example 1231 | 72 | alkyl silicate | 58 | Spraying | very good |
| Inv. Example 1232 | 40 | alkyl silicate | 21 | Spraying | very good |
| Inv. Example 1233 | 36 | alkali silicate | 19 | Brushing | very good |
| Inv. Example 1234 | 32 | urethane-based resin | 56 | Spraying | very good |
| Inv. Example 1235 | 53 | alkyl silicate | 77 | Spraying | very good |
| Inv. Example 1236 | 67 | alkyl silicate | 54 | Spraying | very good |
| Inv. Example 1237 | 72 | alkyl silicate | 64 | Spraying | very good |
| Inv. Example 1238 | 77 | alkyl silicate | 34 | Brushing | very good |

(*1) F: Fracture facets existing, FC: Fracture facets and/or cracks existing, NO: No fracture facet and/or crack

TABLE 63

| | Zn-Alloy Particle Properties | | | | Mean Size of Zn Metallic particle (μm) | Blend Ratio (Zn Alloy particle:Zn Metal Particle) | Mg Contents to Total Metal Particle (mass %) |
|---|---|---|---|---|---|---|---|
| | Mg (mass %) | Fracture Facet &/or Cracks (*1) | Mean Size (μm) | Average Value of Aspect Ratio | | | |
| Inv. Example 1239 | 18.7 | FC | 6.4 | 1.06 | 23.21 | 1:35 | 0.52 |
| Inv. Example 1240 | 19.5 | FC | 3.2 | 1.05 | 39.44 | 1:5 | 3.25 |
| Inv. Example 1241 | 20.4 | FC | 4.5 | 1.24 | 12.34 | 1:62 | 0.32 |
| Inv. Example 1242 | 0.6 | FC | 5.2 | 1.33 | 29.99 | 1:4 | 0.12 |
| Inv. Example 1243 | 0.8 | FC | 1.9 | 1.27 | 15.21 | 5:9 | 0.29 |
| Inv. Example 1244 | 22.5 | FC | 0.02 | 1.05 | 23.34 | 1:220 | 0.10 |
| Inv. Example 1245 | 20.6 | FC | 10.5 | 1.12 | 2.32 | 1:80 | 0.25 |
| Inv. Example 1246 | 21.6 | FC | 12.5 | 1.23 | 4.21 | 1:50 | 0.42 |
| Inv. Example 1247 | 20.8 | FC | 7.72 | 1.38 | 15.21 | 1:10 | 1.89 |
| Inv. Example 1248 | 23.6 | FC | 8.32 | 1.22 | 23.34 | 1:1 | 11.80 |

TABLE 63-continued

| | | | | | | | |
|---|---|---|---|---|---|---|---|
| Inv. Example 1249 | 24.5 | FC | 10.05 | 1.14 | 2.32 | 1:78 | 0.31 |
| Inv. Example 1250 | 18.6 | FC | 10.6 | 1.13 | 4.21 | 1:10 | 1.69 |
| Inv. Example 1251 | 17.8 | FC | 5.2 | 1.33 | 29.99 | 1:50 | 0.35 |
| Inv. Example 1252 | 16.5 | FC | 1.9 | 1.27 | 15.21 | 1:10 | 1.50 |
| Inv. Example 1253 | 14.5 | FC | 0.02 | 1.05 | 23.34 | 1:1 | 7.25 |
| Inv. Example 1254 | 19 | FC | 10.5 | 1.12 | 2.32 | 1:3 | 4.75 |
| Inv. Example 1255 | 15 | FC | 12.5 | 1.23 | 4.21 | 1:7 | 1.88 |
| Inv. Example 1256 | 16.4 | FC | 18.5 | 1.36 | 15.21 | 1:50 | 0.32 |
| Inv. Example 1257 | 13.5 | FC | 11.5 | 1.11 | 23.34 | 1:10 | 1.23 |
| Inv. Example 1258 | 10.6 | FC | 11.5 | 1.11 | 13.45 | 1:3 | 2.65 |
| Inv. Example 1259 | 10.7 | FC | 9.6 | 1.07 | 2.34 | 1:10 | 0.97 |
| Inv. Example 1260 | 10.9 | FC | 8.5 | 1.42 | 28.34 | 1:5 | 1.82 |
| Inv. Example 1261 | 11.6 | FC | 7.72 | 1.38 | 19.87 | 200:1 | 11.54 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 1239 | 34 | alkali silicate | 28 | Spraying | very good |
| Inv. Example 1240 | 43 | urethane-based resin | 109 | Brushing | very good |
| Inv. Example 1241 | 53 | alkyl silicate | 15 | Spraying | very good |
| Inv. Example 1242 | 72 | alkyl silicate | 14 | Spraying | very good |
| Inv. Example 1243 | 77 | alkyl silicate | 18 | Spraying | very good |
| Inv. Example 1244 | 35 | alkali silicate | 2 | Spraying | very good |
| Inv. Example 1245 | 77 | alkyl silicate | 37 | Spraying | very good |
| Inv. Example 1246 | 43 | alkali silicate | 2 | Spraying | good |
| Inv. Example 1247 | 52 | alkyl silicate | 160 | Brushing | very good |
| Inv. Example 1248 | 66 | alkali silicate | 5 | Brushing | very good |
| Inv. Example 1249 | 72 | alkyl silicate | 56 | Brushing | very good |
| Inv. Example 1250 | 40 | alkali silicate | 2 | Spraying | very good |
| Inv. Example 1251 | 36 | alkyl silicate | 18 | Spraying | very good |
| Inv. Example 1252 | 32 | alkyl silicate | 23 | Spraying | very good |
| Inv. Example 1253 | 53 | epoxy-based resin | 30 | Brushing | very good |
| Inv. Example 1254 | 67 | acryl-based resin | 77 | Brushing | very good |
| Inv. Example 1255 | 72 | urethane-based resin | 54 | Brushing | very good |
| Inv. Example 1256 | 77 | polyester resin | 47 | Spraying | very good |
| Inv. Example 1257 | 34 | epoxy-based resin | 43 | Spraying | very good |
| Inv. Example 1258 | 43 | acryl-based resin | 52 | Brushing | very good |
| Inv. Example 1259 | 53 | urethane-based resin | 20 | Brushing | very good |
| Inv. Example 1260 | 60 | polyester resin | 200 | Brushing | very good |
| Inv. Example 1261 | 35 | alkali silicate | 22 | Spraying | very good |

(*1) F: Fracture facets existing, FC: Fracture facets and/or cracks existing, NO: No fracture facet and/or crack

TABLE 64

| | Zn-Alloy Particle Properties | | | | | |
|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) | Mg Contents to Total Metal Particle (mass %) |
| Inv. Example 1262 | 14.7 | FC | 8.32 | 1.22 | 39.74 | 1:8 | 1.63 |
| Inv. Example 1263 | 19.5 | FC | 10.05 | 1.14 | 24.32 | 1:1 | 9.75 |
| Inv. Example 1264 | 10.2 | FC | 10.6 | 1.13 | 22.33 | 1:7 | 1.28 |
| Inv. Example 1265 | 4 | FC | 5.7 | 1.02 | 48.54 | 1:3 | 1.00 |
| Inv. Example 1266 | 7.2 | FC | 6.4 | 1.06 | 23.75 | 1:7 | 0.90 |
| Inv. Example 1267 | 3.6 | FC | 3.2 | 1.05 | 15.62 | 1:2 | 1.20 |
| Inv. Example 1268 | 26.9 | FC | 4.5 | 1.24 | 2.34 | 117:1 | 26.67 |
| Inv. Example 1269 | 27.9 | FC | 5.2 | 1.33 | 23.04 | 1:270 | 0.10 |
| Inv. Example 1270 | 28.9 | FC | 1.9 | 1.27 | 3.05 | 1:117 | 0.24 |
| Inv. Example 1271 | 23.8 | FC | 0.02 | 1.05 | 43.23 | 1:66 | 0.36 |
| Inv. Example 1272 | 26.8 | FC | 10.5 | 1.12 | 2.04 | 1:109 | 0.24 |
| Inv. Example 1273 | 25.6 | FC | 12.5 | 1.23 | 50.00 | 250:1 | 25.50 |
| Inv. Example 1274 | 29.8 | FC | 18.5 | 1.36 | 2.45 | 70:1 | 29.38 |
| Inv. Example 1275 | 18.9 | FC | 11.5 | 1.11 | 5.33 | 1:15 | 1.18 |
| Inv. Example 1276 | 5.6 | FC | 9.6 | 1.07 | 2.41 | 1:5 | 0.93 |
| Inv. Example 1277 | 4.7 | FC | 8.5 | 1.42 | 23.43 | 2:3 | 1.88 |
| Inv. Example 1278 | 6.8 | FC | 7.72 | 1.38 | 6.03 | 1:9 | 0.68 |
| Inv. Example 1279 | 9 | FC | 8.32 | 1.22 | 24.5 | 1:10 | 0.82 |
| Inv. Example 1280 | 2.1 | FC | 10.05 | 1.14 | 5.32 | 1:14 | 0.14 |

TABLE 64-continued

| | | | | | | | |
|---|---|---|---|---|---|---|---|
| Inv. Example 1281 | 4.8 | FC | 10.6 | 1.13 | 14.34 | 1:7 | 0.60 |
| Inv. Example 1282 | 4.2 | FC | 5.7 | 1.02 | 5.04 | 1:12 | 0.32 |
| Inv. Example 1283 | 4.3 | FC | 6.4 | 1.06 | 2.32 | 1:3 | 1.08 |
| Inv. Example 1284 | 4 | FC | 3.2 | 1.05 | 20.34 | 1:7 | 0.50 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 1262 | 77 | alkyl silicate | 25 | Spraying | very good |
| Inv. Example 1263 | 43 | alkali silicate | 14 | Spraying | very good |
| Inv. Example 1264 | 52 | urethane-based resin | 112 | Spraying | very good |
| Inv. Example 1265 | 66 | alkali silicate | 24 | Spraying | very good |
| Inv. Example 1266 | 72 | urethane-based resin | 150 | Spraying | very good |
| Inv. Example 1267 | 40 | alkali silicate | 18 | Spraying | very good |
| Inv. Example 1268 | 36 | alkyl silicate | 19 | Brushing | very good |
| Inv. Example 1269 | 32 | alkyl silicate | 24 | Spraying | very good |
| Inv. Example 1270 | 53 | urethane-based resin | 99 | Spraying | very good |
| Inv. Example 1271 | 67 | alkyl silicate | 7 | Spraying | very good |
| Inv. Example 1272 | 72 | epoxy-based resin | 100 | Spraying | very good |
| Inv. Example 1273 | 77 | alkyl silicate | 27 | Brushing | very good |
| Inv. Example 1274 | 34 | alkali silicate | 15 | Spraying | very good |
| Inv. Example 1275 | 43 | alkyl silicate | 14 | Spraying | very good |
| Inv. Example 1276 | 53 | urethane-based resin | 55 | Spraying | very good |
| Inv. Example 1277 | 35 | alkyl silicate | 8 | Spraying | very good |
| Inv. Example 1278 | 77 | urethane-based resin | 122 | Brushing | very good |
| Inv. Example 1279 | 43 | alkyl silicate | 54 | Spraying | very good |
| Inv. Example 1280 | 52 | alkali silicate | 19 | Spraying | very good |
| Inv. Example 1281 | 66 | alkyl silicate | 25 | Brushing | very good |
| Inv. Example 1282 | 72 | alkyl silicate | 58 | Spraying | very good |
| Inv. Example 1283 | 40 | alkyl silicate | 21 | Spraying | very good |
| Inv. Example 1284 | 36 | alkali silicate | 19 | Brushing | very good |

(*1) F: Fracture facets existing, FC: Fracture facets and/or cracks existing, NO: No fracture facet and/or crack

TABLE 65

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) | Mg Contents to Total Metal Particle (mass %) |
| Inv. Example 1285 | 3.7 | FC | 4.5 | 1.24 | 12.33 | 1:10 | 0.34 |
| Inv. Example 1286 | 6.4 | FC | 5.2 | 1.33 | 17.84 | 1:1 | 3.20 |
| Inv. Example 1287 | 6.9 | FC | 1.9 | 1.27 | 6.66 | 1:3 | 1.73 |
| Inv. Example 1288 | 16.9 | FC | 0.02 | 1.05 | 3.65 | 2:3 | 6.76 |
| Inv. Example 1289 | 18.7 | FC | 10.5 | 1.12 | 22.62 | 1:2 | 6.23 |
| Inv. Example 1290 | 24.4 | FC | 12.5 | 1.23 | 45.33 | 1:4 | 4.88 |
| Inv. Example 1291 | 10.6 | FC | 18.5 | 1.36 | 43.22 | 1:6 | 1.51 |
| Inv. Example 1292 | 15.8 | FC | 11.5 | 1.11 | 12.33 | 1:115 | 0.14 |
| Inv. Example 1293 | 19.5 | FC | 9.6 | 1.07 | 13.42 | 1:23 | 0.81 |
| Inv. Example 1294 | 7.8 | FC | 8.5 | 1.42 | 22.32 | 1:12 | 0.60 |
| Inv. Example 1295 | 4.9 | FC | 7.72 | 1.38 | 7.34 | 1:10 | 0.45 |
| Inv. Example 1296 | 10.8 | FC | 8.32 | 1.22 | 44.54 | 1:3 | 2.70 |
| Inv. Example 1297 | 3.8 | FC | 10.05 | 1.14 | 32.87 | 1:5 | 0.63 |
| Inv. Example 1298 | 22.6 | FC | 10.6 | 1.13 | 20.32 | 1:25 | 0.87 |
| Inv. Example 1299 | 27.9 | FC | 5.7 | 1.02 | 2.03 | 4:5 | 12.40 |
| Inv. Example 1300 | 24.8 | FC | 6.4 | 1.06 | 5.33 | 3:8 | 6.76 |
| Inv. Example 1301 | 26.8 | FC | 3.2 | 1.05 | 2.33 | 9:34 | 5.61 |
| Inv. Example 1302 | 25.9 | FC | 4.5 | 1.24 | 27.44 | 7:8 | 12.09 |
| Inv. Example 1303 | 9.8 | FC | 5.2 | 1.33 | 12.33 | 9:17 | 3.39 |
| Inv. Example 1304 | 5.6 | FC | 1.9 | 1.27 | 36.43 | 1:1 | 2.80 |
| Inv. Example 1305 | 12.3 | FC | 0.02 | 1.05 | 11.9 | 1:31 | 0.38 |

TABLE 65-continued

| | | | | | | |
|---|---|---|---|---|---|---|
| Inv. Example 1306 | 0.8 | FC | 27.89 | 1.12 | 10.5 | 1:4 | 0.16 |
| Inv. Example 1307 | 1 | FC | 0.32 | 1.23 | 9.8 | 1:1 | 0.50 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 1285 | 32 | urethane-based resin | 56 | Spraying | very good |
| Inv. Example 1286 | 53 | alkyl silicate | 77 | Spraying | very good |
| Inv. Example 1287 | 67 | alkyl silicate | 54 | Spraying | very good |
| Inv. Example 1288 | 72 | alkyl silicate | 64 | Spraying | very good |
| Inv. Example 1289 | 77 | alkyl silicate | 34 | Brushing | very good |
| Inv. Example 1290 | 34 | alkali silicate | 28 | Spraying | very good |
| Inv. Example 1291 | 43 | urethane-based resin | 109 | Brushing | very good |
| Inv. Example 1292 | 53 | alkyl silicate | 15 | Spraying | very good |
| Inv. Example 1293 | 72 | alkyl silicate | 14 | Spraying | very good |
| Inv. Example 1294 | 77 | alkyl silicate | 18 | Spraying | very good |
| Inv. Example 1295 | 77 | urethane-based resin | 122 | Brushing | very good |
| Inv. Example 1296 | 43 | alkyl silicate | 54 | Spraying | very good |
| Inv. Example 1297 | 52 | alkali silicate | 19 | Spraying | very good |
| Inv. Example 1298 | 66 | alkyl silicate | 25 | Brushing | very good |
| Inv. Example 1299 | 72 | alkyl silicate | 58 | Spraying | very good |
| Inv. Example 1300 | 40 | alkyl silicate | 21 | Spraying | very good |
| Inv. Example 1301 | 36 | alkali silicate | 19 | Brushing | very good |
| Inv. Example 1302 | 32 | urethane-based resin | 56 | Spraying | very good |
| Inv. Example 1303 | 53 | alkyl silicate | 77 | Spraying | very good |
| Inv. Example 1304 | 67 | alkyl silicate | 54 | Spraying | very good |
| Inv. Example 1305 | 52 | alkali silicate | 2 | Spraying | very good |
| Inv. Example 1306 | 55 | alkali silicate | 20 | Spraying | very good |
| Inv. Example 1307 | 69 | alkali silicate | 5 | Spraying | very good |

(*1) F: Fracture facets existing, FC: Fracture facets and/or cracks existing, NO: No fracture facet and/or crack

TABLE 66

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) | Mg Contents to Total Metal Particle (mass %) |
| Inv. Example 1308 | 2.3 | FC | 11.44 | 1.36 | 7.9 | 1:7 | 0.29 |
| Inv. Example 1309 | 15.6 | FC | 1.05 | 1.11 | 11.6 | 1:11 | 1.30 |
| Inv. Example 1310 | 6.7 | FC | 36.47 | 1.07 | 16.9 | 1:2 | 2.23 |
| Inv. Example 1311 | 7.5 | FC | 5.07 | 1.42 | 20.34 | 1:7 | 0.94 |
| Inv. Example 1312 | 8.4 | FC | 7.72 | 1.38 | 8.9 | 1:4 | 1.68 |
| Inv. Example 1313 | 9.3 | FC | 8.32 | 1.22 | 7.5 | 1:5 | 1.55 |
| Inv. Example 1314 | 10.4 | FC | 10.05 | 1.14 | 10.9 | 1:10 | 0.95 |
| Inv. Example 1315 | 11.2 | FC | 6.08 | 1.13 | 20.34 | 1:9 | 1.12 |
| Inv. Example 1316 | 11.7 | FC | 17.89 | 1.02 | 6.7 | 240:1 | 11.65 |
| Inv. Example 1317 | 21.5 | FC | 19.54 | 1.06 | 7.9 | 1:120 | 0.18 |
| Inv. Example 1318 | 13.4 | FC | 21.08 | 1.05 | 5.6 | 99:1 | 13.27 |
| Inv. Example 1319 | 14.6 | FC | 23.04 | 1.24 | 11.5 | 1:99 | 0.15 |
| Inv. Example 1320 | 25.8 | FC | 9.21 | 1.33 | 20.34 | 1:242 | 0.11 |
| Inv. Example 1321 | 16.7 | FC | 0.12 | 1.27 | 10.5 | 1:6 | 2.39 |
| Inv. Example 1322 | 17.3 | FC | 29.24 | 1.37 | 7.6 | 1:1 | 8.65 |
| Inv. Example 1323 | 18.5 | FC | 128.74 | 1.10 | 8.2 | 1:7 | 2.31 |
| Inv. Example 1324 | 19.3 | FC | 33.57 | 1.04 | 9.1 | 1:5 | 3.22 |
| Inv. Example 1325 | 3.5 | FC | 3.04 | 1.02 | 10.6 | 1:2 | 1.17 |
| Inv. Example 1326 | 22.5 | FC | 7.54 | 1.01 | 8.4 | 1:221 | 0.10 |
| Inv. Example 1327 | 23.7 | FC | 6.81 | 1.08 | 5.3 | 1:31 | 0.74 |
| Inv. Example 1328 | 24.2 | FC | 5.25 | 1.14 | 20.34 | 1:4 | 4.84 |

TABLE 66-continued

| | | | | | | | |
|---|---|---|---|---|---|---|---|
| Inv. Example 1329 | 0.2 | FC | 194.23 | 1.23 | 7.8 | 1:1 | 0.10 |
| Inv. Example 1330 | 27.1 | FC | 28.74 | 1.33 | 10.5 | 1:7 | 3.39 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 1308 | 78 | alkyl silicate | 20 | Spraying | very good |
| Inv. Example 1309 | 42 | alkali silicate | 15 | Brushing | very good |
| Inv. Example 1310 | 32 | alkali silicate | 57 | Brushing | very good |
| Inv. Example 1311 | 66 | alkali silicate | 13 | Brushing | very good |
| Inv. Example 1312 | 67 | alkyl silicate | 22 | Brushing | very good |
| Inv. Example 1313 | 64 | alkali silicate | 20 | Spraying | very good |
| Inv. Example 1314 | 74 | alkyl silicate | 27 | Spraying | very good |
| Inv. Example 1315 | 82 | alkali silicate | 15 | Spraying | very good |
| Inv. Example 1316 | 37 | alkyl silicate | 35 | Spraying | very good |
| Inv. Example 1317 | 42 | alkali silicate | 34 | Brushing | very good |
| Inv. Example 1318 | 66 | alkyl silicate | 45 | Brushing | very good |
| Inv. Example 1319 | 48 | alkali silicate | 52 | Brushing | very good |
| Inv. Example 1320 | 33 | alkyl silicate | 23 | Brushing | very good |
| Inv. Example 1321 | 75 | alkali silicate | 5 | Spraying | very good |
| Inv. Example 1322 | 77 | alkyl silicate | 52 | Brushing | very good |
| Inv. Example 1323 | 66 | alkali silicate | 150 | Brushing | very good |
| Inv. Example 1324 | 67 | alkyl silicate | 60 | Brushing | very good |
| Inv. Example 1325 | 45 | alkali silicate | 15 | Spraying | very good |
| Inv. Example 1326 | 48 | alkyl silicate | 24 | Spraying | very good |
| Inv. Example 1327 | 68 | alkali silicate | 34 | Spraying | very good |
| Inv. Example 1328 | 35 | alkyl silicate | 20 | Brushing | very good |
| Inv. Example 1329 | 37 | alkali silicate | 200 | Brushing | very good |
| Inv. Example 1330 | 38 | alkyl silicate | 56 | Brushing | very good |

(*1) F: Fracture facets existing, FC: Fracture facets and/or cracks existing, NO: No fracture facet and/or crack

TABLE 67

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) | Mg Contents to Total Metal Particle (mass %) |
| Inv. Example 1331 | 29.3 | FC | 13.57 | 1.37 | 20.34 | 400:1 | 29.23 |
| Inv. Example 1332 | 0.5 | FC | 0.65 | 1.44 | 7.9 | 1:2 | 0.17 |
| Inv. Example 1333 | 2.7 | FC | 4.12 | 1.21 | 11.6 | 1:300 | 0.01 |
| Inv. Example 1334 | 28.4 | FC | 0.72 | 1.22 | 16.9 | 1:4 | 5.68 |
| Inv. Example 1335 | 8.7 | FC | 117.54 | 1.23 | 10.5 | 1:5 | 1.45 |
| Inv. Example 1336 | 9.2 | FC | 7.81 | 1.47 | 8.9 | 1:10 | 0.84 |
| Inv. Example 1337 | 17.8 | FC | 80.25 | 1.01 | 7.5 | 1:9 | 1.78 |
| Inv. Example 1338 | 20.2 | FC | 8.47 | 1.04 | 10.9 | 1:1 | 10.10 |
| Inv. Example 1339 | 0.4 | FC | 0.87 | 1.05 | 20.34 | 130:1 | 0.40 |
| Inv. Example 1340 | 13.7 | FC | 25.78 | 1.12 | 6.7 | 130:1 | 13.60 |
| Inv. Example 1341 | 14.7 | FC | 93.45 | 1.11 | 7.9 | 1:31 | 0.46 |
| Inv. Example 1342 | 2.4 | FC | 0.97 | 1.08 | 5.6 | 1:1 | 1.20 |
| Inv. Example 1343 | 4.5 | FC | 54.89 | 1.47 | 20.34 | 2:1 | 3.00 |
| Inv. Example 1344 | 0.1 | FC | 10.81 | 1.50 | 9.9 | 300:1 | 0.10 |
| Inv. Example 1345 | 30.0 | FC | 18.24 | 1.13 | 10.5 | 1:270 | 0.11 |
| Inv. Example 1346 | 24.5 | FC | 114.78 | 1.04 | 7.6 | 1:115 | 0.21 |
| Inv. Example 1347 | 27.6 | FC | 3.87 | 1.02 | 45.33 | 1:29 | 0.92 |
| Inv. Example 1348 | 4.1 | FC | 11.94 | 1.08 | 43.22 | 1:3 | 1.03 |
| Inv. Example 1349 | 3.2 | FC | 142.58 | 1.15 | 10.6 | 1:9 | 0.32 |
| Inv. Example 1350 | 2.7 | FC | 12.5 | 1.34 | 20.34 | 1:5 | 0.45 |
| Inv. Example 1351 | 0.12 | FC | 31.24 | 1.25 | 5.3 | 100:1 | 0.12 |
| Inv. Example 1352 | 0.22 | FC | 152.46 | 1.19 | 10.9 | 1:1 | 0.11 |
| Inv. Example 1353 | 0.37 | FC | 13.4 | 1.18 | 7.8 | 99:1 | 0.37 |

| | Coat Properties | | | | |
|---|---|---|---|---|---|
| | Ratio of Metal Particle in Dry Coat (mass %) | Base Resin | Coat Thickness (μm) | Coating Method | Result of Corrosion Test |
| Inv. Example 1331 | 41 | alkali silicate | 34 | Spraying | very good |
| Inv. Example 1332 | 54 | alkyl silicate | 2 | Spraying | very good |

TABLE 67-continued

| | | | | | |
|---|---|---|---|---|---|
| Inv. Example 1333 | 57 | alkali silicate | 15 | Spraying | very good |
| Inv. Example 1334 | 59 | alkali silicate | 10 | Spraying | very good |
| Inv. Example 1335 | 64 | alkyl silicate | 125 | Brushing | very good |
| Inv. Example 1336 | 66 | alkali silicate | 24 | Brushing | very good |
| Inv. Example 1337 | 67 | alkyl silicate | 110 | Brushing | very good |
| Inv. Example 1338 | 34 | alkali silicate | 24 | Brushing | very good |
| Inv. Example 1339 | 54 | alkyl silicate | 2 | Spraying | very good |
| Inv. Example 1340 | 62 | alkali silicate | 37 | Spraying | very good |
| Inv. Example 1341 | 66 | alkyl silicate | 113 | Brushing | very good |
| Inv. Example 1342 | 67 | alkali silicate | 2 | Spraying | very good |
| Inv. Example 1343 | 68 | alkyl silicate | 75 | Brushing | very good |
| Inv. Example 1344 | 33 | alkali silicate | 30 | Brushing | very good |
| Inv. Example 1345 | 35 | alkyl silicate | 34 | Brushing | very good |
| Inv. Example 1346 | 43 | epoxy-based resin | 124 | Brushing | very good |
| Inv. Example 1347 | 44 | acryl-based resin | 15 | Spraying | very good |
| Inv. Example 1348 | 43 | urethane-based resin | 23 | Spraying | very good |
| Inv. Example 1349 | 44 | polyester resin | 157 | Brushing | very good |
| Inv. Example 1350 | 54 | epoxy-based resin | 26 | Spraying | very good |
| Inv. Example 1351 | 79 | acryl-based resin | 38 | Spraying | very good |
| Inv. Example 1352 | 73 | urethane-based resin | 160 | Brushing | very good |
| Inv. Example 1353 | 69 | polyester resin | 27 | Brushing | very good |

(*1) F: Fracture facets existing, FC: Fracture facets and/or cracks existing, NO: No fracture facet and/or crack

TABLE 68

| | Zn-Alloy Particle Properties | | | | | |
|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) | Mg Contents to Total Metal Particle (mass %) |
| Inv. Example 1354 | 1.4 | FC | 160.57 | 1.24 | 10.5 | 1:6 | 0.20 |
| Inv. Example 1355 | 4.2 | FC | 14.1 | 1.11 | 20.34 | 1:12 | 0.32 |
| Inv. Example 1356 | 4.8 | FC | 167.55 | 1.27 | 7.9 | 1:5 | 0.80 |
| Inv. Example 1357 | 8.1 | FC | 1.45 | 1.31 | 11.6 | 1:33 | 0.24 |
| Inv. Example 1358 | 7.6 | FC | 0.15 | 1.26 | 16.9 | 1:9 | 0.76 |
| Inv. Example 1359 | 9.9 | FC | 13.1 | 1.14 | 10.5 | 1:18 | 0.52 |
| Inv. Example 1360 | 14.8 | FC | 15.5 | 1.34 | 8.9 | 1:38 | 0.38 |
| Inv. Example 1361 | 16.7 | FC | 0.67 | 1.16 | 7.5 | 1:117 | 0.14 |
| Inv. Example 1362 | 17.9 | FC | 137.89 | 1.47 | 20.34 | 1:42 | 0.42 |
| Inv. Example 1363 | 19.5 | FC | 16.3 | 1.48 | 9.8 | 1:1 | 9.75 |
| Inv. Example 1364 | 22.4 | FC | 110.38 | 1.49 | 6.7 | 1:121 | 0.18 |
| Inv. Example 1365 | 0.17 | FC | 12.4 | 1.34 | 45.33 | 120:1 | 0.17 |
| Inv. Example 1366 | 8.3 | FC | 17.2 | 1.29 | 43.22 | 1:145 | 0.06 |
| Inv. Example 1367 | 6.5 | FC | 105.23 | 1.18 | 11.5 | 1:31 | 0.20 |
| Inv. Example 1368 | 9.7 | FC | 177.89 | 1.23 | 9.9 | 1:95 | 0.10 |
| Inv. Example 1369 | 11.4 | FC | 12.2 | 1.27 | 10.5 | 1:33 | 0.34 |
| Inv. Example 1370 | 22.5 | FC | 1.84 | 1.17 | 7.6 | 120:1 | 22.31 |
| Inv. Example 1371 | 25.7 | FC | 16.02 | 1.16 | 8.2 | 1:28 | 0.89 |
| Inv. Example 1372 | 17.8 | FC | 1.75 | 1.49 | 9.1 | 1:33 | 0.52 |
| Inv. Example 1373 | 0.14 | FC | 198.78 | 1.34 | 10.6 | 200:1 | 0.14 |
| Inv. Example 1374 | 6.7 | FC | 13.1 | 1.16 | 8.4 | 1:4 | 1.34 |
| Inv. Example 1375 | 7.5 | FC | 15.5 | 1.47 | 5.3 | 1:18 | 0.39 |
| Inv. Example 1376 | 8.4 | FC | 0.67 | 1.48 | 10.9 | 1:7 | 1.05 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 1354 | 63 | epoxy-based resin | 180 | Brushing | very good |
| Inv. Example 1355 | 35 | acryl-based resin | 26 | Spraying | very good |
| Inv. Example 1356 | 35 | urethane-based resin | 180 | Brushing | very good |
| Inv. Example 1357 | 66 | polyester resin | 15 | Spraying | very good |
| Inv. Example 1358 | 67 | epoxy-based resin | 2 | Spraying | very good |
| Inv. Example 1359 | 68 | acryl-based resin | 28 | Spraying | very good |
| Inv. Example 1360 | 33 | urethane-based resin | 30 | Spraying | very good |
| Inv. Example 1361 | 35 | polyester resin | 2 | Spraying | very good |
| Inv. Example 1362 | 43 | epoxy-based resin | 157 | Brushing | very good |
| Inv. Example 1363 | 44 | acryl-based resin | 28 | Brushing | very good |

TABLE 68-continued

| | | | | | |
|---|---|---|---|---|---|
| Inv. Example 1364 | 42 | urethane-based resin | 130 | Brushing | very good |
| Inv. Example 1365 | 33 | polyester resin | 29 | Brushing | very good |
| Inv. Example 1366 | 30 | epoxy-based resin | 30 | Brushing | very good |
| Inv. Example 1367 | 35 | acryl-based resin | 120 | Brushing | very good |
| Inv. Example 1368 | 37 | urethane-based resin | 187 | Brushing | very good |
| Inv. Example 1369 | 77 | polyester resin | 28 | Spraying | very good |
| Inv. Example 1370 | 41 | epoxy-based resin | 5 | Spraying | very good |
| Inv. Example 1371 | 35 | acryl-based resin | 35 | Spraying | very good |
| Inv. Example 1372 | 58 | urethane-based resin | 5 | Spraying | very good |
| Inv. Example 1373 | 37 | polyester resin | 200 | Brushing | very good |
| Inv. Example 1374 | 68 | alkali silicate | 25 | Spraying | very good |
| Inv. Example 1375 | 55 | alkali silicate | 15 | Spraying | very good |
| Inv. Example 1376 | 77 | alkyl silicate | 20 | Spraying | very good |

(*1) F: Fracture facets existing, FC: Fracture facets and/or cracks existing, NO: No fracture facet and/or crack

TABLE 69

| | Zn-Alloy Particle Properties | | | | | |
|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) |
| Inv. Example 1377 | 9.3 | FC | 12.2 | 1.49 | 7.8 | 1:11 |
| Inv. Example 1378 | 1.4 | FC | 1.84 | 1.34 | 8.9 | 1:2 |
| Inv. Example 1379 | 4.2 | FC | 16.02 | 1.29 | 7.5 | 1:7 |
| Inv. Example 1380 | 4.8 | FC | 1.75 | 1.18 | 10.9 | 1:2 |
| Inv. Example 1381 | 8.1 | FC | 12.4 | 1.23 | 9.8 | 1:5 |
| Inv. Example 1382 | 7.6 | FC | 17.2 | 1.27 | 45.33 | 1:10 |
| Inv. Example 1383 | 9.9 | FC | 13.1 | 1.17 | 43.22 | 1:9 |
| Inv. Example 1384 | 0.4 | FC | 29.9 | 1.16 | 5.6 | 240:1 |
| Inv. Example 1385 | 10.5 | FC | 0.21 | 1.27 | 11.5 | 120:1 |
| Inv. Example 1386 | 0.4 | FC | 0.22 | 1.17 | 9.9 | 99:1 |
| Inv. Example 1387 | 10.5 | FC | 29.5 | 1.27 | 10.5 | 1:99 |
| Inv. Example 1388 | 0.51 | FC | 29.9 | 1.18 | 7.6 | 1:3 |
| Inv. Example 1389 | 9.8 | FC | 0.21 | 1.23 | 8.2 | 1:6 |
| Inv. Example 1390 | 0.52 | FC | 0.22 | 1.27 | 9.1 | 1:1 |
| Inv. Example 1391 | 9.9 | FC | 29.5 | 1.17 | 10.6 | 1:7 |
| Inv. Example 1392 | 14.8 | FC | 16.02 | 1.48 | 8.4 | 1:5 |
| Inv. Example 1393 | 19.9 | FC | 1.75 | 1.49 | 5.3 | 1:150 |
| Inv. Example 1394 | 17.9 | FC | 12.4 | 1.34 | 10.9 | 1:55 |
| Inv. Example 1395 | 19.5 | FC | 17.2 | 1.29 | 7.8 | 1:121 |

| | Coat Properties | | | | |
|---|---|---|---|---|---|
| | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 1377 | 0.78 | 43 | alkali silicate | 18 | Spraying | very good |
| Inv. Example 1378 | 0.47 | 45 | alkyl silicate | 22 | Spraying | very good |
| Inv. Example 1379 | 0.53 | 66 | alkali silicate | 19 | Spraying | very good |
| Inv. Example 1380 | 2.40 | 33 | alkyl silicate | 29 | Spraying | very good |
| Inv. Example 1381 | 1.35 | 66 | alkali silicate | 23 | Spraying | very good |
| Inv. Example 1382 | 0.69 | 55 | alkyl silicate | 21 | Spraying | very good |
| Inv. Example 1383 | 0.99 | 49 | alkali silicate | 19 | Spraying | very good |
| Inv. Example 1384 | 0.40 | 77 | alkyl silicate | 15 | Spraying | very good |
| Inv. Example 1385 | 10.41 | 41 | alkali silicate | 18 | Spraying | very good |
| Inv. Example 1386 | 0.40 | 64 | alkyl silicate | 22 | Spraying | very good |
| Inv. Example 1387 | 0.11 | 58 | alkyl silicate | 21 | Spraying | very good |
| Inv. Example 1388 | 0.13 | 33 | alkyl silicate | 29 | Spraying | very good |
| Inv. Example 1389 | 1.40 | 66 | alkali silicate | 23 | Spraying | very good |
| Inv. Example 1390 | 0.26 | 55 | alkyl silicate | 21 | Spraying | very good |
| Inv. Example 1391 | 1.24 | 49 | alkali silicate | 19 | Spraying | very good |
| Inv. Example 1392 | 2.47 | 77 | alkyl silicate | 21 | Spraying | very good |
| Inv. Example 1393 | 0.13 | 43 | alkali silicate | 19 | Spraying | very good |
| Inv. Example 1394 | 0.32 | 45 | alkyl silicate | 15 | Spraying | very good |
| Inv. Example 1395 | 0.16 | 66 | alkali silicate | 18 | Spraying | very good |

(*1) F: Fracture facets existing, FC: Fracture facets and/or cracks existing, NO: No fracture facet and/or crack

TABLE 70

| | Zn-Alloy Particle Properties | | | | | |
|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) |
| Comp. Example 73 | 2.3 | FC | 205.6 | 1.23 | 10.5 | 1:5 |
| Comp. Example 74 | 12.5 | FC | 0.005 | 1.36 | 12.6 | 1:3 |
| Comp. Example 75 | 18.9 | FC | 205.6 | 1.11 | 7.8 | 1:19 |
| Comp. Example 76 | 29.5 | FC | 0.005 | 1.07 | 16.8 | 1:100 |
| Comp. Example 77 | 14.5 | FC | 205.6 | 1.42 | 10.5 | 1:260 |
| Comp. Example 78 | 12.5 | FC | 0.005 | 1.38 | 12.6 | 1:3 |
| Comp. Example 79 | 18.9 | FC | 205.6 | 1.22 | 7.8 | 1:19 |
| Comp. Example 80 | 29.5 | FC | 0.005 | 1.14 | 16.8 | 1:100 |
| Comp. Example 81 | 2.3 | FC | 10.6 | 1.13 | 10.5 | 1:256 |
| Comp. Example 82 | 12.5 | FC | 5.7 | 1.02 | 12.6 | 1:200 |
| Comp. Example 83 | 0.5 | FC | 6.4 | 1.06 | 7.8 | 1:167 |
| Comp. Example 84 | 29.5 | FC | 3.2 | 1.23 | 16.8 | 1:300 |
| Comp. Example 85 | 14.5 | FC | 4.5 | 1.36 | 10.5 | 1:260 |
| Comp. Example 86 | 9.8 | FC | 5.2 | 1.11 | 12.6 | 1:100 |
| Comp. Example 87 | 4.6 | FC | 1.9 | 1.07 | 7.8 | 1:47 |
| Comp. Example 88 | 3.2 | FC | 18.5 | 1.42 | 16.8 | 1:32 |
| Comp. Example 89 | 29.9 | FC | 12.5 | 1.38 | 12.6 | 1:345 |
| Comp. Example 90 | 7.6 | FC | 9.8 | 1.22 | 7.8 | 1:390 |
| Comp. Example 91 | 29.9 | FC | 7.6 | 1.14 | 16.8 | 1:301 |
| Comp. Example 92 | 0.6 | FC | 6.9 | 1.13 | 10.5 | 1:333 |
| Comp. Example 93 | 4.5 | FC | 10.5 | 1.02 | 12.6 | 1:325 |
| Comp. Example 94 | 3.7 | FC | 12.6 | 1.06 | 7.8 | 1:456 |

| | Coat Properties | | | | |
|---|---|---|---|---|---|
| | Mg Contents to Total Metal Particle (mass %) | Ratio of Metal Particle in Dry Coat (mass %) | Base Resin | Coat Thickness (μm) | Coating Method | Result of Corrosion Test |
| Comp. Example 73 | 0.38 | 77 | alkyl silicate | 25 | Spraying | poor |
| Comp. Example 74 | 3.13 | 77 | urethane-based resin | 25 | Spraying | poor |
| Comp. Example 75 | 0.95 | 43 | alkyl silicate | 105 | Brushing | poor |
| Comp. Example 76 | 0.29 | 52 | alkali silicate | 165 | Spraying | poor |
| Comp. Example 77 | 0.06 | 66 | alkyl silicate | 25 | Spraying | poor |
| Comp. Example 78 | 3.13 | 72 | alkyl silicate | 25 | Spraying | poor |
| Comp. Example 79 | 0.95 | 40 | alkyl silicate | 105 | Brushing | poor |
| Comp. Example 80 | 0.29 | 36 | alkali silicate | 165 | Spraying | poor |
| Comp. Example 81 | 0.01 | 32 | alkyl silicate | 25 | Spraying | poor |
| Comp. Example 82 | 0.06 | 53 | alkyl silicate | 25 | Spraying | poor |
| Comp. Example 83 | 0.00 | 67 | alkyl silicate | 105 | Brushing | poor |
| Comp. Example 84 | 0.10 | 53 | urethane-based resin | 165 | Spraying | poor |
| Comp. Example 85 | 0.06 | 67 | alkyl silicate | 25 | Spraying | poor |
| Comp. Example 86 | 0.10 | 72 | alkyl silicate | 25 | Spraying | poor |
| Comp. Example 87 | 0.10 | 77 | alkyl silicate | 105 | Brushing | poor |
| Comp. Example 88 | 0.10 | 34 | urethane-based resin | 55 | Spraying | poor |
| Comp. Example 89 | 0.09 | 43 | alkyl silicate | 28 | Spraying | poor |
| Comp. Example 90 | 0.02 | 52 | alkyl silicate | 15 | Spraying | poor |
| Comp. Example 91 | 0.10 | 66 | alkyl silicate | 14 | Spraying | poor |
| Comp. Example 92 | 0.00 | 72 | urethane-based resin | 118 | Brushing | poor |
| Comp. Example 93 | 0.01 | 40 | alkyl silicate | 22 | Spraying | poor |
| Comp. Example 94 | 0.01 | 36 | alkyl silicate | 54 | Spraying | poor |

(*1) F: Fracture facets existing, FC: Fracture facets and/or cracks existing, NO: No fracture facet and/or crack

TABLE 71

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) | Mg Contents to Total Metal Particle (mass %) |
| Inv. Example 2357 | 7.5 | FC | 5.07 | 1.42 | 23.43 | 0.65 | 10.5 |
| Inv. Example 2358 | 8.06 | FC | 7.72 | 1.38 | 5.96 | 0.60 | 12.5 |
| Inv. Example 2359 | 9.3 | FC | 8.32 | 1.22 | 10.64 | 3.72 | 1.5 |

TABLE 71-continued

| | | | | | | | |
|---|---|---|---|---|---|---|---|
| Inv. Example 2360 | 3.5 | FC | 3.04 | 1.02 | 16.5 | 1.84 | 0.9 |
| Inv. Example 2361 | 2.7 | FC | 4.12 | 1.21 | 7.95 | 0.23 | 10.5 |
| Inv. Example 2362 | 9.2 | FC | 7.81 | 1.47 | 7.95 | 0.03 | 299.5 |
| Inv. Example 2363 | 8.1 | FC | 1.45 | 1.31 | 9.64 | 5.40 | 0.5 |
| Inv. Example 2364 | 7.5 | FC | 9.6 | 1.07 | 0.96 | 5.95 | 0.26 |
| Inv. Example 2365 | 4.5 | FC | 8.5 | 1.42 | 5.26 | 3.46 | 0.3 |
| Inv. Example 2366 | 3.6 | FC | 3.2 | 1.05 | 13.5 | 0.90 | 3 |
| Inv. Example 2367 | 4.2 | FC | 5.7 | 1.02 | 13.5 | 0.20 | 20.5 |
| Inv. Example 2368 | 4.3 | FC | 6.4 | 1.06 | 9.64 | 0.83 | 4.2 |
| Inv. Example 2369 | 4 | FC | 3.2 | 1.05 | 16.5 | 1.60 | 1.5 |
| Inv. Example 2370 | 6.4 | FC | 5.2 | 1.33 | 20.59 | 1.07 | 5 |
| Inv. Example 2371 | 9.8 | FC | 5.2 | 1.33 | 0.96 | 0.59 | 15.6 |
| Inv. Example 2372 | 7.5 | FC | 5.07 | 1.42 | 6.54 | 5.00 | 0.5 |
| Inv. Example 2373 | 8.4 | FC | 7.72 | 1.38 | 5.26 | 2.90 | 1.9 |
| Inv. Example 2374 | 2.7 | FC | 4.12 | 1.21 | 10.64 | 1.04 | 1.6 |
| Inv. Example 2375 | 2.64 | FC | 5.5 | 1.22 | 9.64 | 0.75 | 2.5 |
| Inv. Example 2376 | 1.59 | FC | 6.7 | 1.14 | 6.9 | 1.06 | 0.5 |
| Inv. Example 2377 | 2.58 | FC | 8.9 | 1.13 | 10.5 | 0.43 | 5 |
| Inv. Example 2378 | 7.55 | FC | 2.15 | 1.14 | 13.5 | 3.43 | 1.2 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 2357 | 74 | alkali silicate | 24 | Brushing | very good |
| Inv. Example 2358 | 82 | alkyl silicate | 25 | Spraying | very good |
| Inv. Example 2359 | 37 | alkali silicate | 14 | Spraying | very good |
| Inv. Example 2360 | 48 | alkali silicate | 15 | Spraying | very good |
| Inv. Example 2361 | 32 | alkali silicate | 15 | Spraying | very good |
| Inv. Example 2362 | 45 | alkyl silicate | 15 | Brushing | very good |
| Inv. Example 2363 | 37 | epoxy-based resin | 5 | Spraying | good |
| Inv. Example 2364 | 72 | urethane-based resin | 150 | Spraying | very good |
| Inv. Example 2365 | 40 | alkali silicate | 18 | Spraying | very good |
| Inv. Example 2366 | 40 | alkali silicate | 18 | Spraying | very good |
| Inv. Example 2367 | 72 | alkyl silicate | 58 | Spraying | very good |
| Inv. Example 2368 | 40 | alkyl silicate | 21 | Spraying | very good |
| Inv. Example 2369 | 36 | alkali silicate | 19 | Brushing | very good |
| Inv. Example 2370 | 53 | alkyl silicate | 77 | Spraying | very good |
| Inv. Example 2371 | 53 | alkyl silicate | 77 | Spraying | very good |
| Inv. Example 2372 | 66 | alkali silicate | 13 | Brushing | very good |
| Inv. Example 2373 | 67 | alkyl silicate | 22 | Brushing | very good |
| Inv. Example 2374 | 57 | alkali silicate | 15 | Spraying | very good |
| Inv. Example 2375 | 43 | alkyl silicate | 16 | Spraying | very good |
| Inv. Example 2376 | 76 | alkyl silicate | 5 | Spraying | very good |
| Inv. Example 2377 | 49 | alkyl silicate | 22 | Spraying | very good |
| Inv. Example 2378 | 75 | alkyl silicate | 18 | Spraying | very good |

(*1) F: Fracture facets existing, FC: Fracture facets and/or cracks existing, NO: No fracture facet and/or crack

TABLE 72

| | Zn-Alloy Particle Properties | | | | Mean Size of Zn Metallic particle (μm) | Blend Ratio (Zn Alloy particle:Zn Metal Particle) |
|---|---|---|---|---|---|---|
| | Mg (mass %) | Fracture Facet &/or Cracks (*1) | Mean Size (μm) | Average Value of Aspect Ratio | | |
| Inv. Example 2379 | 8.01 | FC | 2.54 | 1.13 | 20.59 | 0.84 |
| Inv. Example 2380 | 1.06 | FC | 3.4 | 1.38 | 7.82 | 0.34 |
| Inv. Example 2381 | 2.64 | FC | 5.5 | 1.22 | 5.26 | 2.11 |
| Inv. Example 2382 | 1.59 | FC | 6.7 | 1.14 | 7.06 | 0.80 |
| Inv. Example 2383 | 20.5 | FC | 2.15 | 1.14 | 0.64 | 5.86 |
| Inv. Example 2384 | 18.5 | FC | 2.54 | 1.13 | 46.8 | 3.08 |
| Inv. Example 2385 | 9.51 | FC | 2.77 | 1.38 | 16.5 | 1.46 |
| Inv. Example 2386 | 10.01 | FC | 3.68 | 1.22 | 13.5 | 1.33 |
| Inv. Example 2387 | 3.54 | FC | 5.5 | 1.22 | 0.96 | 1.42 |
| Inv. Example 2388 | 4.05 | FC | 2.06 | 1.13 | 0.96 | 0.68 |
| Inv. Example 2389 | 8.57 | FC | 4.99 | 1.02 | 8.45 | 1.30 |
| Inv. Example 2390 | 0.02 | FC | 6.4 | 1.06 | 2.9 | 0.02 |
| Inv. Example 2391 | 25.5 | FC | 3.09 | 1.07 | 5.4 | 2.22 |
| Inv. Example 2392 | 2.36 | FC | 3.99 | 1.22 | 10.6 | 1.57 |
| Inv. Example 2393 | 0.05 | FC | 7.72 | 1.38 | 2.32 | 0.03 |
| Inv. Example 2394 | 0.04 | FC | 8.32 | 1.22 | 7.8 | 0.03 |

TABLE 72-continued

| | | | | | | |
|---|---|---|---|---|---|---|
| Inv. Example 2395 | 5.22 | FC | 3.55 | 1.12 | 7.95 | 0.45 |
| Inv. Example 2396 | 4.01 | FC | 2.64 | 1.23 | 20.59 | 2.86 |
| Inv. Example 2397 | 0.05 | FC | 5.2 | 1.33 | 22.5 | 0.03 |
| Inv. Example 2398 | 10.5 | FC | 1.9 | 1.27 | 4.6 | 2.33 |
| Inv. Example 2399 | 0.05 | FC | 2.5 | 1.05 | 4.9 | 0.05 |
| Inv. Example 2400 | 10.5 | FC | 0.09 | 1.12 | 10.5 | 2.33 |
| Inv. Example 2401 | 2.64 | FC | 5.5 | 1.22 | 8.45 | 0.88 |

| | Coat Properties | | | | |
|---|---|---|---|---|---|
| | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 2379 | 8.5 | 73 | alkyl silicate | 16 | Spraying | very good |
| Inv. Example 2380 | 2.1 | 49 | alkyl silicate | 8 | Spraying | very good |
| Inv. Example 2381 | 0.25 | 43 | alkyl silicate | 16 | Spraying | very good |
| Inv. Example 2382 | 1 | 76 | alkyl silicate | 5 | Spraying | very good |
| Inv. Example 2383 | 2.5 | 75 | alkyl silicate | 18 | Spraying | very good |
| Inv. Example 2384 | 5 | 73 | alkyl silicate | 16 | Spraying | very good |
| Inv. Example 2385 | 5.5 | 55 | alkyl silicate | 5 | Spraying | very good |
| Inv. Example 2386 | 6.5 | 48 | alkyl silicate | 22 | Spraying | very good |
| Inv. Example 2387 | 1.5 | 78 | alkyl silicate | 18 | Spraying | very good |
| Inv. Example 2388 | 5 | 52 | alkyl silicate | 8 | Spraying | very good |
| Inv. Example 2389 | 5.6 | 61 | alkyl silicate | 16 | Spraying | very good |
| Inv. Example 2390 | 0.05 | 77 | polyester resin | 47 | Spraying | very good |
| Inv. Example 2391 | 10.5 | 49 | alkyl silicate | 22 | Spraying | very good |
| Inv. Example 2392 | 0.5 | 80 | alkyl silicate | 21 | Spraying | very good |
| Inv. Example 2393 | 0.75 | 36 | alkyl silicate | 19 | Brushing | very good |
| Inv. Example 2394 | 0.2 | 32 | alkyl silicate | 24 | Spraying | very good |
| Inv. Example 2395 | 10.5 | 55 | alkyl silicate | 19 | Spraying | very good |
| Inv. Example 2396 | 0.4 | 40 | alkyl silicate | 8 | Spraying | very good |
| Inv. Example 2397 | 0.9 | 53 | urethane-based resin | 20 | Brushing | very good |
| Inv. Example 2398 | 3.5 | 60 | polyester resin | 200 | Brushing | very good |
| Inv. Example 2399 | 0.01 | 38 | alkali silicate | 19 | Spraying | very good |
| Inv. Example 2400 | 3.5 | 49 | alkyl silicate | 11 | Spraying | very good |
| Inv. Example 2401 | 2 | 43 | alkyl silicate | 16 | Spraying | very good |

(*1) F: Fracture facets existing, FC: Fracture facets and/or cracks existing, NO: No fracture facet and/or crack

TABLE 73

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) | Mg Contents to Total Metal Particle (mass %) |
| Inv. Example 2402 | 0.08 | FC | 5.6 | 1.36 | 30.5 | 0.08 | 0.04 |
| Inv. Example 2403 | 0.09 | FC | 11.5 | 1.11 | 49.5 | 0.05 | 1 |
| Inv. Example 2404 | 0.05 | FC | 19.5 | 1.07 | 5.9 | 0.03 | 0.5 |
| Inv. Example 2405 | 1.59 | FC | 6.7 | 1.14 | 4.52 | 0.27 | 5 |
| Inv. Example 2406 | 2.58 | FC | 8.9 | 1.13 | 5.96 | 0.23 | 10 |
| Inv. Example 2407 | 9.8 | FC | 8.32 | 1.22 | 5.5 | 2.18 | 3.5 |
| Inv. Example 2408 | 0.18 | FC | 10.05 | 1.14 | 3.6 | 0.09 | 0.9 |
| Inv. Example 2409 | 7.55 | FC | 2.15 | 1.14 | 16.5 | 1.68 | 3.5 |
| Inv. Example 2410 | 0.01 | FC | 0.06 | 1.23 | 12.5 | 0.01 | 0.0005 |
| Inv. Example 2411 | 12.5 | FC | 2.54 | 1.13 | 16.5 | 0.06 | 205.7 |
| Inv. Example 2412 | 1.06 | FC | 3.4 | 1.38 | 10.9 | 0.71 | 0.5 |
| Inv. Example 2413 | 0.04 | FC | 8.5 | 1.42 | 5.6 | 0.02 | 1.2 |
| Inv. Example 2414 | 0.06 | FC | 7.72 | 1.38 | 22.6 | 0.06 | 0.02 |
| Inv. Example 2415 | 9.51 | FC | 2.77 | 1.38 | 20.59 | 0.81 | 10.8 |
| Inv. Example 2416 | 15.5 | FC | 3.68 | 1.22 | 20.59 | 0.10 | 152.3 |
| Inv. Example 2417 | 0.05 | FC | 10.6 | 1.13 | 9.56 | 0.03 | 0.5 |
| Inv. Example 2418 | 8.8 | FC | 5.7 | 1.02 | 5.9 | 2.51 | 2.5 |
| Inv. Example 2419 | 3.54 | FC | 5.5 | 1.22 | 6.54 | 0.59 | 5 |
| Inv. Example 2420 | 10.5 | FC | 3.2 | 1.05 | 21.4 | 1.05 | 9 |
| Inv. Example 2421 | 0.07 | FC | 4.5 | 1.24 | 9.8 | 0.06 | 0.1 |
| Inv. Example 2422 | 15.5 | FC | 2.54 | 1.14 | 6.59 | 8.16 | 0.9 |

TABLE 73-continued

| | | | | | | | |
|---|---|---|---|---|---|---|---|
| Inv. Example 2423 | 4.05 | FC | 2.06 | 1.13 | 6.54 | 0.36 | 10.2 |
| Inv. Example 2424 | 8.57 | FC | 4.99 | 1.02 | 16.5 | 0.07 | 120.5 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 2402 | 66 | alkyl silicate | 16 | Brushing | very good |
| Inv. Example 2403 | 67 | alkali silicate | 33 | Brushing | very good |
| Inv. Example 2404 | 54 | alkyl silicate | 8 | Brushing | good |
| Inv. Example 2405 | 76 | alkyl silicate | 5 | Spraying | very good |
| Inv. Example 2406 | 49 | alkyl silicate | 22 | Spraying | very good |
| Inv. Example 2407 | 32 | alkyl silicate | 23 | Spraying | very good |
| Inv. Example 2408 | 53 | epoxy-based resin | 30 | Spraying | very good |
| Inv. Example 2409 | 75 | alkyl silicate | 18 | Spraying | very good |
| Inv. Example 2410 | 75 | alkali silicate | 5 | Spraying | good |
| Inv. Example 2411 | 73 | alkyl silicate | 16 | Spraying | very good |
| Inv. Example 2412 | 49 | alkyl silicate | 8 | Spraying | very good |
| Inv. Example 2413 | 40 | alkali silicate | 2 | Spraying | very good |
| Inv. Example 2414 | 36 | alkyl silicate | 18 | Spraying | very good |
| Inv. Example 2415 | 55 | alkyl silicate | 5 | Spraying | very good |
| Inv. Example 2416 | 48 | alkyl silicate | 22 | Spraying | very good |
| Inv. Example 2417 | 67 | acryl-based resin | 77 | Brushing | very good |
| Inv. Example 2418 | 72 | urethane-based resin | 54 | Brushing | very good |
| Inv. Example 2419 | 78 | alkyl silicate | 18 | Spraying | very good |
| Inv. Example 2420 | 34 | epoxy-based resin | 43 | Spraying | very good |
| Inv. Example 2421 | 43 | acryl-based resin | 52 | Brushing | very good |
| Inv. Example 2422 | 45 | alkyl silicate | 19 | Spraying | very good |
| Inv. Example 2423 | 52 | polyester resin | 8 | Spraying | very good |
| Inv. Example 2424 | 61 | polyester resin | 16 | Spraying | very good |

(*1) F: Fracture facets existing, FC: Fracture facets and/or cracks existing, NO: No fracture facet and/or crack

TABLE 74

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) | Mg Contents to Total Metal Particle (mass %) |
| Inv. Example 2425 | 5.8 | FC | 6.4 | 1.06 | 7.8 | 1.66 | 2.5 |
| Inv. Example 2426 | 4.59 | FC | 3.09 | 1.07 | 16.5 | 0.62 | 6.4 |
| Inv. Example 2427 | 9.88 | FC | 4.66 | 1.42 | 6.54 | 0.46 | 20.4 |
| Inv. Example 2428 | 4.55 | FC | 4.09 | 1.38 | 8.45 | 0.48 | 8.5 |
| Inv. Example 2429 | 2.36 | FC | 3.99 | 1.22 | 8.5 | 1.18 | 1 |
| Inv. Example 2430 | 0.05 | FC | 7.72 | 1.38 | 13.6 | 0.05 | 0.07 |
| Inv. Example 2431 | 0.04 | FC | 8.32 | 1.22 | 12.33 | 0.02 | 1.1 |
| Inv. Example 2432 | 2.64 | FC | 4.55 | 1.11 | 16.5 | 0.48 | 4.5 |
| Inv. Example 2433 | 0.06 | FC | 10.6 | 1.13 | 7.9 | 0.04 | 0.5 |
| Inv. Example 2434 | 0.18 | FC | 5.7 | 1.02 | 10.5 | 0.11 | 0.7 |
| Inv. Example 2435 | 6.31 | FC | 3.52 | 1.27 | 16.5 | 4.21 | 0.5 |
| Inv. Example 2436 | 5.22 | FC | 3.55 | 1.12 | 10.64 | 1.49 | 2.5 |
| Inv. Example 2437 | 28.5 | FC | 2.64 | 1.23 | 10.5 | 0.90 | 30.5 |
| Inv. Example 2438 | 3.52 | FC | 3.15 | 1.36 | 20.59 | 2.82 | 0.25 |
| Inv. Example 2439 | 9.5 | FC | 5.2 | 1.33 | 8.5 | 2.79 | 2.4 |
| Inv. Example 2440 | 0.04 | FC | 1.9 | 1.27 | 0.5 | 0.00 | 7.5 |
| Inv. Example 2441 | 0.06 | FC | 10.5 | 1.12 | 10.5 | 0.01 | 3.5 |
| Inv. Example 2442 | 0.05 | FC | 12.5 | 1.23 | 11.5 | 0.01 | 3.9 |
| Inv. Example 2443 | 5.6 | FC | 18.5 | 1.36 | 36.5 | 1.60 | 2.5 |
| Inv. Example 2444 | 0.01 | FC | 11.5 | 1.11 | 1.5 | 0.01 | 0.7 |
| Inv. Example 2445 | 0.08 | FC | 9.6 | 1.07 | 8.7 | 0.03 | 1.9 |
| Inv. Example 2446 | 0.03 | FC | 8.5 | 1.42 | 7.8 | 0.01 | 4.5 |
| Inv. Example 2447 | 4.25 | FC | 2.36 | 1.33 | 5.96 | 3.27 | 0.3 |

| | Coat Properties | | | |
|---|---|---|---|---|
| | Ratio of Metal Particle in Dry Coat (mass %) | Base Resin | Coat Thickness (μm) | Coating Method | Result of Corrosion Test |
| Inv. Example 2425 | 77 | alkyl silicate | 20 | Spraying | very good |
| Inv. Example 2426 | 49 | alkyl silicate | 22 | Spraying | very good |

TABLE 74-continued

|  |  |  |  |  |  |
|---|---|---|---|---|---|
| Inv. Example 2427 | 79 | alkyl silicate | 18 | Spraying | very good |
| Inv. Example 2428 | 76 | alkyl silicate | 18 | Spraying | very good |
| Inv. Example 2429 | 80 | alkyl silicate | 21 | Spraying | very good |
| Inv. Example 2430 | 36 | alkyl silicate | 19 | Brushing | very good |
| Inv. Example 2431 | 32 | alkyl silicate | 24 | Spraying | very good |
| Inv. Example 2432 | 43 | alkyl silicate | 5 | Spraying | very good |
| Inv. Example 2433 | 67 | alkyl silicate | 7 | Spraying | very good |
| Inv. Example 2434 | 72 | epoxy-based resin | 100 | Spraying | very good |
| Inv. Example 2435 | 51 | alkyl silicate | 21 | Spraying | very good |
| Inv. Example 2436 | 55 | alkyl silicate | 19 | Spraying | very good |
| Inv. Example 2437 | 40 | alkyl silicate | 8 | Spraying | very good |
| Inv. Example 2438 | 51 | alkyl silicate | 16 | Spraying | very good |
| Inv. Example 2439 | 53 | alkyl silicate | 20 | Brushing | very good |
| Inv. Example 2440 | 60 | polyester resin | 200 | Brushing | very good |
| Inv. Example 2441 | 77 | alkyl silicate | 25 | Spraying | very good |
| Inv. Example 2442 | 43 | alkali silicate | 14 | Spraying | very good |
| Inv. Example 2443 | 52 | urethane-based resin | 112 | Spraying | very good |
| Inv. Example 2444 | 66 | alkali silicate | 24 | Spraying | very good |
| Inv. Example 2445 | 72 | urethane-based resin | 150 | Spraying | very good |
| Inv. Example 2446 | 40 | alkali silicate | 18 | Spraying | very good |
| Inv. Example 2447 | 44 | alkyl silicate | 18 | Spraying | very good |

(*1) F: Fracture facets existing, FC: Fracture facets and/or cracks existing, NO: No fracture facet and/or crack

TABLE 75

| | Zn-Alloy Particle Properties | | | | | |
|---|---|---|---|---|---|---|
| | Mg (mass %) | Fracture Facet &/or Cracks (*1) | Mean Size (μm) | Average Value of Aspect Ratio | Mean Size of Zn Metallic particle (μm) | Blend Ratio (Zn Alloy particle:Zn Metal Particle) |
| Inv. Example 2448 | 0.04 | FC | 23.5 | 1.42 | 0.06 | 0.04 |
| Inv. Example 2449 | 0.06 | FC | 101.5 | 1.38 | 0.9 | 0.06 |
| Inv. Example 2450 | 0.06 | FC | 55.4 | 1.38 | 3.6 | 0.06 |
| Inv. Example 2451 | 0.07 | FC | 10.5 | 1.12 | 10.5 | 0.02 |
| Inv. Example 2452 | 0.01 | FC | 12.5 | 1.23 | 0.05 | 0.01 |
| Inv. Example 2453 | 0.08 | FC | 18.5 | 1.36 | 2.32 | 0.04 |
| Inv. Example 2454 | 0.09 | FC | 11.5 | 1.11 | 20.4 | 0.08 |
| Inv. Example 2455 | 0.05 | FC | 9.6 | 1.07 | 7.34 | 0.01 |
| Inv. Example 2456 | 0.06 | FC | 10.05 | 1.14 | 9.4 | 0.02 |
| Inv. Example 2457 | 29.9 | FC | 10.5 | 1.36 | 16.5 | 0.15 |
| Inv. Example 2458 | 16.5 | FC | 7.5 | 1.11 | 7.9 | 1.03 |
| Inv. Example 2459 | 12.5 | FC | 2.6 | 1.07 | 10.5 | 2.08 |
| Inv. Example 2460 | 9.8 | FC | 3.5 | 1.42 | 16.5 | 3.92 |
| Inv. Example 2461 | 9.6 | FC | 4.5 | 1.33 | 8.5 | 0.12 |
| Inv. Example 2462 | 7.5 | FC | 1.6 | 1.42 | 10.5 | 1.25 |
| Inv. Example 2463 | 4.6 | FC | 2.5 | 1.12 | 5.8 | 0.40 |
| Inv. Example 2464 | 3.8 | FC | 23.5 | 1.23 | 1.2 | 1.09 |
| Inv. Example 2465 | 0.05 | FC | 9.8 | 1.27 | 15.5 | 0.03 |

| | | | Coat Properties | | |
|---|---|---|---|---|---|
| | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 2448 | 0.08 | 44 | alkali silicate | 38 | Spraying | very good |
| Inv. Example 2449 | 0.05 | 36 | alkyl silicate | 18 | Spraying | very good |
| Inv. Example 2450 | 0.005 | 76 | alkyl silicate | 10 | Spraying | very good |
| Inv. Example 2451 | 2.8 | 77 | alkyl silicate | 37 | Spraying | very good |
| Inv. Example 2452 | 0.6 | 43 | alkali silicate | 2 | Spraying | good |
| Inv. Example 2453 | 1 | 52 | alkyl silicate | 160 | Brushing | very good |
| Inv. Example 2454 | 0.09 | 66 | alkali silicate | 5 | Brushing | very good |
| Inv. Example 2455 | 3.4 | 72 | alkyl silicate | 56 | Brushing | very good |
| Inv. Example 2456 | 1.5 | 53 | urethane-based resin | 99 | Spraying | very good |
| Inv. Example 2457 | 200 | 55 | urethane-based resin | 700 | Spraying | very good |
| Inv. Example 2458 | 15 | 47 | alkyl silicate | 554 | Spraying | very good |
| Inv. Example 2459 | 5 | 79 | urethane-based resin | 688 | Brushing | very good |
| Inv. Example 2460 | 1.5 | 42 | urethane-based resin | 421 | Spraying | very good |

TABLE 75-continued

| | | | | | | |
|---|---|---|---|---|---|---|
| Inv. Example 2461 | 78 | 36 | urethane-based resin | 651 | Spraying | very good |
| Inv. Example 2462 | 5 | 53 | urethane-based resin | 402 | Brushing | very good |
| Inv. Example 2463 | 10.5 | 55 | alkali silicate | 354 | Spraying | very good |
| Inv. Example 2464 | 2.5 | 42 | urethane-based resin | 504 | Brushing | very good |
| Inv. Example 2465 | 1 | 76 | urethane-based resin | 666 | Spraying | very good |

(*1) F: Fracture facets existing, FC: Fracture facets and/or cracks existing, NO: No fracture facet and/or crack

Example 6

Zn alloy particles further containing one or both of Al and Si as shown by the chemical ingredients in Tables 76 to 91 were produced. The rest is the same as Example 5.

From Tables 76 to 91, it is learned that the painting test pieces using the Zn alloy particles of the present invention exhibit superior corrosion resistance regardless of the type of base resin, that is, both for inorganic-based and organic-based binders.

TABLE 76

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Inv. Example 260 | 12.3 | F | 0.02 | 1.05 | 0.1 | 0.07 | 2.02 | 300:1 |
| Inv. Example 261 | 0.8 | F | 27.89 | 1.12 | 0.04 | 0.1 | 48.05 | 100:1 |
| Inv. Example 262 | 1.0 | F | 0.32 | 1.23 | 30.0 | 0.01 | 5.41 | 250:1 |
| Inv. Example 263 | 2.3 | F | 158.96 | 1.36 | 0.02 | 3 | 49.87 | 150:1 |
| Inv. Example 264 | 15.6 | F | 1.05 | 1.11 | 8.02 | 2.04 | 5.04 | 170:1 |
| Inv. Example 265 | 6.7 | F | 36.47 | 1.07 | 15.6 | 1.27 | 34.14 | 80:1 |
| Inv. Example 266 | 7.5 | F | 0.51 | 1.42 | 10.4 | 0.57 | 2.25 | 1:15 |
| Inv. Example 267 | 8.4 | F | 7.72 | 1.38 | 4.65 | 2.67 | 10.54 | 200:1 |
| Inv. Example 268 | 9.3 | F | 8.32 | 1.22 | 24.8 | 2.4 | 11.25 | 65:1 |
| Inv. Example 269 | 10.4 | F | 10.05 | 1.14 | 4.52 | 0.57 | 13.25 | 300:1 |
| Inv. Example 270 | 11.2 | F | 60.08 | 1.13 | 17.5 | 2.45 | 39.87 | 70:1 |
| Inv. Example 271 | 11.7 | F | 17.89 | 1.02 | 745 | 1.75 | 24.25 | 65:1 |
| Inv. Example 272 | 21.5 | F | 19.54 | 1.06 | 11.05 | 0.23 | 10.22 | 65:1 |
| Inv. Example 273 | 13.4 | F | 21.08 | 1.05 | 2.65 | 0.74 | 5.87 | 300:1 |
| Inv. Example 274 | 14.6 | F | 23.04 | 1.24 | 6.45 | 2.14 | 19.54 | 150:1 |
| Inv. Example 275 | 25.8 | F | 9.02 | 1.33 | 27.6 | 2.4 | 15.87 | 300:1 |
| Inv. Example 276 | 16.7 | F | 194.23 | 1.27 | 4.32 | 1.07 | 48.67 | 65:1 |

| | Coat Properties | | | | | |
|---|---|---|---|---|---|---|
| | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 260 | 12.26 | 40 | alkali silicate | 2 | Spraying | very good |
| Inv. Example 261 | 0.79 | 36 | alkyl silicate | 35 | Spraying | very good |
| Inv. Example 262 | 1.00 | 32 | alkali silicate | 15 | Spraying | very good |
| Inv. Example 263 | 2.28 | 53 | alkyl silicate | 160 | Brushing | very good |
| Inv. Example 264 | 15.51 | 67 | alkali silicate | 12 | Brushing | very good |
| Inv. Example 265 | 6.62 | 35 | alkyl silicate | 54 | Brushing | very good |
| Inv. Example 266 | 0.47 | 77 | alkali silicate | 4 | Spraying | very good |
| Inv. Example 267 | 8.36 | 43 | alkyl silicate | 16 | Spraying | very good |
| Inv. Example 268 | 9.16 | 52 | alkyl silicate | 24 | Spraying | very good |
| Inv. Example 269 | 10.37 | 34 | epoxy-based resin | 15 | Brushing | very good |
| Inv. Example 270 | 11.04 | 43 | acryl-based resin | 78 | Brushing | very good |
| Inv. Example 271 | 11.52 | 53 | urethane-based resin | 22 | Brushing | very good |
| Inv. Example 272 | 21.17 | 60 | polyester resin | 28 | Spraying | very good |
| Inv. Example 273 | 13.36 | 37 | epoxy-based resin | 32 | Spraying | very good |
| Inv. Example 274 | 14.50 | 42 | acryl-based resin | 42 | Spraying | very good |
| Inv. Example 275 | 25.71 | 58 | urethane-based resin | 15 | Brushing | very good |
| Inv. Example 276 | 16.45 | 32 | polyester resin | 200 | Brushing | very good |

(*1) F: Fracture facets existing, FC: Fracture facets and/or cracks existing, NO: No fracture facet and/or crack

TABLE 77

| | | Zn-Alloy Particle Properties | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Inv. Example 1396 | 0.15 | FC | 0.02 | 1.05 | 0.1 | 0.07 | 2.04 | 5:2 |
| Inv. Example 1397 | 0.19 | FC | 10.5 | 1.12 | 0.04 | 0.1 | 50.00 | 7:1 |
| Inv. Example 1398 | 0.18 | FC | 12.5 | 1.23 | 30.0 | 0.01 | 2.45 | 68:1 |
| Inv. Example 1399 | 0.11 | FC | 18.5 | 1.36 | 0.02 | 3 | 5.33 | 10:1 |
| Inv. Example 1400 | 0.15 | FC | 11.5 | 1.11 | 0 | 0 | 2.41 | 25:7 |
| Inv. Example 1401 | 0.24 | FC | 9.6 | 1.07 | 0 | 0 | 23.43 | 300:9 |
| Inv. Example 1402 | 0.18 | FC | 8.5 | 1.42 | 10.4 | 0.57 | 6.03 | 180:1 |
| Inv. Example 1403 | 0.12 | FC | 7.72 | 1.38 | 4.65 | 2.67 | 24.5 | 23:1 |
| Inv. Example 1404 | 0.19 | FC | 8.32 | 1.22 | 24.8 | 2.4 | 5.32 | 165:1 |
| Inv. Example 1405 | 0.18 | FC | 10.05 | 1.14 | 4.52 | 0.57 | 14.34 | 300:1 |
| Inv. Example 1406 | 0.21 | FC | 10.6 | 1.13 | 17.5 | 2.45 | 5.04 | 120:1 |
| Inv. Example 1407 | 0.76 | FC | 5.7 | 1.02 | 0 | 0 | 2.32 | 2:9 |
| Inv. Example 1408 | 0.11 | FC | 6.4 | 1.06 | 11.05 | 0.23 | 20.34 | 119:3 |
| Inv. Example 1409 | 0.14 | FC | 3.2 | 1.05 | 2.65 | 0.74 | 12.33 | 233:1 |
| Inv. Example 1410 | 15 | FC | 4.5 | 1.24 | 6.45 | 2.14 | 17.84 | 1:132 |
| Inv. Example 1411 | 14.5 | FC | 5.2 | 1.33 | 0 | 0 | 6.66 | 1:55 |
| Inv. Example 1412 | 18.5 | FC | 1.9 | 1.27 | 0 | 0 | 3.65 | 1:23 |
| Inv. Example 1413 | 15.1 | FC | 0.02 | 1.05 | 0.05 | 0.03 | 22.62 | 200:1 |
| Inv. Example 1414 | 15.6 | FC | 10.5 | 1.12 | 0 | 0.08 | 45.33 | 1:15 |
| Inv. Example 1415 | 12.5 | FC | 12.5 | 1.23 | 0.05 | 0 | 43.22 | 1:10 |
| Inv. Example 1416 | 18.7 | FC | 18.5 | 1.36 | 0.44 | 0.07 | 12.33 | 1:6 |
| Inv. Example 1417 | 14.5 | FC | 11.5 | 1.11 | 0.08 | 0.07 | 13.42 | 1:45 |
| Inv. Example 1418 | 7.5 | FC | 9.6 | 1.07 | 0.1 | 0.2 | 22.32 | 1:50 |

| | Coat Properties | | | | |
|---|---|---|---|---|---|
| | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 1396 | 0.11 | 35 | alkali silicate | 2 | Spraying | very good |
| Inv. Example 1397 | 0.17 | 77 | alkyl silicate | 37 | Spraying | very good |
| Inv. Example 1398 | 0.18 | 43 | alkali silicate | 2 | Spraying | good |
| Inv. Example 1399 | 0.10 | 52 | alkyl silicate | 160 | Brushing | very good |
| Inv. Example 1400 | 0.12 | 66 | alkali silicate | 5 | Brushing | very good |
| Inv. Example 1401 | 0.23 | 72 | alkyl silicate | 56 | Brushing | very good |
| Inv. Example 1402 | 0.18 | 40 | alkali silicate | 2 | Spraying | very good |
| Inv. Example 1403 | 0.12 | 36 | alkyl silicate | 18 | Spraying | very good |
| Inv. Example 1404 | 0.19 | 32 | alkyl silicate | 23 | Spraying | very good |
| Inv. Example 1405 | 0.18 | 53 | epoxy-based resin | 30 | Brushing | very good |
| Inv. Example 1406 | 0.21 | 67 | acryl-based resin | 77 | Brushing | very good |
| Inv. Example 1407 | 0.14 | 72 | urethane-based resin | 54 | Brushing | very good |
| Inv. Example 1408 | 0.11 | 77 | polyester resin | 47 | Spraying | very good |
| Inv. Example 1409 | 0.14 | 34 | epoxy-based resin | 43 | Spraying | very good |
| Inv. Example 1410 | 0.11 | 43 | acryl-based resin | 52 | Brushing | very good |
| Inv. Example 1411 | 10.24 | 53 | urethane-based resin | 20 | Brushing | very good |
| Inv. Example 1412 | 0.77 | 60 | polyester resin | 200 | Brushing | very good |
| Inv. Example 1413 | 15.02 | 35 | alkali silicate | 22 | Spraying | very good |
| Inv. Example 1414 | 0.98 | 77 | alkyl silicate | 25 | Spraying | very good |
| Inv. Example 1415 | 1.14 | 43 | alkali silicate | 14 | Spraying | very good |
| Inv. Example 1416 | 2.67 | 52 | urethane-based resin | 112 | Spraying | very good |
| Inv. Example 1417 | 0.32 | 66 | alkali silicate | 24 | Spraying | very good |
| Inv. Example 1418 | 0.15 | 72 | urethane-based resin | 150 | Spraying | very good |

(*1) F: Fracture facets existing, FC: Fracture facets and/or cracks existing, NO: No fracture facet and/or crack

TABLE 78

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Inv. Example 1419 | 4.5 | FC | 8.5 | 1.42 | 0 | 0 | 7.34 | 1:9 |
| Inv. Example 1420 | 1.5 | FC | 7.72 | 1.38 | 0 | 0 | 44.54 | 1:7 |

TABLE 78-continued

| | | | | | | | | |
|---|---|---|---|---|---|---|---|---|
| Inv. Example 1421 | 4.8 | FC | 8.32 | 1.22 | 0 | 0.07 | 32.87 | 1:4 |
| Inv. Example 1422 | 9.6 | FC | 10.05 | 1.14 | 0 | 0.02 | 20.32 | 1:14 |
| Inv. Example 1423 | 11.5 | FC | 10.6 | 1.13 | 25.8 | 0.05 | 2.03 | 1:11 |
| Inv. Example 1424 | 9.8 | FC | 5.7 | 1.02 | 22.1 | 0 | 5.33 | 1:28 |
| Inv. Example 1425 | 7.6 | FC | 6.4 | 1.06 | 21.5 | 0.05 | 2.33 | 1:4 |
| Inv. Example 1426 | 3.2 | FC | 3.2 | 1.05 | 0.05 | 2.29 | 27.44 | 250:1 |
| Inv. Example 1427 | 1.9 | FC | 4.5 | 1.24 | 0.05 | 0.03 | 12.33 | 1:1 |
| Inv. Example 1428 | 11.5 | FC | 5.2 | 1.33 | 0 | 0.08 | 36.43 | 1:4 |
| Inv. Example 1429 | 8.7 | FC | 1.9 | 1.27 | 0 | 0 | 12.33 | 1:12 |
| Inv. Example 1430 | 9.6 | FC | 0.02 | 1.05 | 0 | 0 | 3.21 | 70:1 |
| Inv. Example 1431 | 9.4 | FC | 10.5 | 1.12 | 0.08 | 0.07 | 26.33 | 1:3 |
| Inv. Example 1432 | 10.5 | FC | 12.5 | 1.23 | 0.1 | 0.2 | 44.21 | 1:24 |
| Inv. Example 1433 | 12.6 | FC | 18.5 | 1.36 | 0.05 | 0.2 | 3.43 | 1:10 |
| Inv. Example 1434 | 29.5 | FC | 11.5 | 1.11 | 0.07 | 0 | 47.32 | 300:1 |
| Inv. Example 1435 | 29.4 | FC | 9.6 | 1.07 | 0 | 0.07 | 12.33 | 1:66 |
| Inv. Example 1436 | 27.5 | FC | 8.5 | 1.42 | 0 | 0.02 | 17.44 | 120:1 |
| Inv. Example 1437 | 0.8 | FC | 7.72 | 1.38 | 25.8 | 0.05 | 42.21 | 6:5 |
| Inv. Example 1438 | 1.6 | FC | 8.32 | 1.22 | 22.1 | 0 | 12.34 | 1:1 |
| Inv. Example 1439 | 22.9 | FC | 10.05 | 1.14 | 21.5 | 0.05 | 20.32 | 1:1 |
| Inv. Example 1440 | 28.5 | FC | 10.6 | 1.13 | 0.05 | 2.29 | 23.44 | 1:76 |
| Inv. Example 1441 | 29.5 | FC | 5.7 | 1.02 | 0.1 | 0.2 | 23.45 | 1:6 |

| | Coat Properties | | | | |
|---|---|---|---|---|---|
| | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 1419 | 0.45 | 40 | alkali silicate | 18 | Spraying | very good |
| Inv. Example 1420 | 0.19 | 36 | alkyl silicate | 19 | Brushing | very good |
| Inv. Example 1421 | 0.96 | 32 | alkyl silicate | 24 | Spraying | very good |
| Inv. Example 1422 | 0.64 | 53 | urethane-based resin | 99 | Spraying | very good |
| Inv. Example 1423 | 0.96 | 67 | alkyl silicate | 7 | Spraying | very good |
| Inv. Example 1424 | 0.34 | 72 | epoxy-based resin | 100 | Spraying | very good |
| Inv. Example 1425 | 1.52 | 77 | alkyl silicate | 27 | Brushing | very good |
| Inv. Example 1426 | 3.19 | 34 | alkali silicate | 15 | Spraying | very good |
| Inv. Example 1427 | 0.95 | 43 | alkyl silicate | 14 | Spraying | very good |
| Inv. Example 1428 | 2.30 | 53 | urethane-based resin | 55 | Spraying | very good |
| Inv. Example 1429 | 0.67 | 35 | alkyl silicate | 8 | Spraying | very good |
| Inv. Example 1430 | 9.46 | 77 | urethane-based resin | 122 | Brushing | very good |
| Inv. Example 1431 | 2.35 | 43 | alkyl silicate | 54 | Spraying | very good |
| Inv. Example 1432 | 0.42 | 52 | alkali silicate | 19 | Spraying | very good |
| Inv. Example 1433 | 1.15 | 66 | alkyl silicate | 25 | Brushing | very good |
| Inv. Example 1434 | 29.40 | 72 | alkyl silicate | 58 | Spraying | very good |
| Inv. Example 1435 | 0.44 | 40 | alkyl silicate | 21 | Spraying | very good |
| Inv. Example 1436 | 27.27 | 36 | alkali silicate | 19 | Brushing | very good |
| Inv. Example 1437 | 0.44 | 32 | urethane-based resin | 56 | Spraying | very good |
| Inv. Example 1438 | 0.80 | 53 | alkyl silicate | 77 | Spraying | very good |
| Inv. Example 1439 | 11.45 | 67 | alkyl silicate | 54 | Spraying | very good |
| Inv. Example 1440 | 0.37 | 72 | alkyl silicate | 64 | Spraying | very good |
| Inv. Example 1441 | 4.21 | 77 | alkyl silicate | 34 | Brushing | very good |

(*1) F: Fracture facets existing, FC: Fracture facets and/or cracks existing, NO: No fracture facet and/or crack

TABLE 79

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Inv. Example 1442 | 18.7 | FC | 6.4 | 1.06 | 0.05 | 0.2 | 23.21 | 1:35 |
| Inv. Example 1443 | 19.5 | FC | 3.2 | 1.05 | 0.07 | 0 | 39.44 | 1:5 |
| Inv. Example 1444 | 20.4 | FC | 4.5 | 1.24 | 0 | 0.07 | 12.34 | 1:62 |
| Inv. Example 1445 | 0.6 | FC | 5.2 | 1.33 | 0 | 0.02 | 29.99 | 1:4 |
| Inv. Example 1446 | 0.8 | FC | 1.9 | 1.27 | 22.1 | 0 | 15.21 | 5:9 |
| Inv. Example 1447 | 22.5 | FC | 0.02 | 1.05 | 0.1 | 0.07 | 23.34 | 1:220 |
| Inv. Example 1448 | 20.6 | FC | 10.5 | 1.12 | 0.04 | 0.1 | 2.32 | 1:80 |
| Inv. Example 1449 | 21.6 | FC | 12.5 | 1.23 | 30.0 | 0.01 | 4.21 | 1:50 |
| Inv. Example 1450 | 20.8 | FC | 7.72 | 1.38 | 0 | 0 | 15.21 | 1:10 |
| Inv. Example 1451 | 23.6 | FC | 8.32 | 1.22 | 0 | 0 | 23.34 | 1:1 |

TABLE 79-continued

| | | | | | | | | |
|---|---|---|---|---|---|---|---|---|
| Inv. Example 1452 | 24.5 | FC | 10.05 | 1.14 | 4.52 | 0.57 | 2.32 | 1:78 |
| Inv. Example 1453 | 18.6 | FC | 10.6 | 1.13 | 17.5 | 2.45 | 4.21 | 1:10 |
| Inv. Example 1454 | 17.8 | FC | 5.2 | 1.33 | 27.6 | 2.4 | 29.99 | 1:50 |
| Inv. Example 1455 | 16.5 | FC | 1.9 | 1.27 | 4.32 | 1.07 | 15.21 | 1:10 |
| Inv. Example 1456 | 14.5 | FC | 0.02 | 1.05 | 0.05 | 0.03 | 23.34 | 1:1 |
| Inv. Example 1457 | 19 | FC | 10.5 | 1.12 | 0 | 0.08 | 2.32 | 1:3 |
| Inv. Example 1458 | 15 | FC | 12.5 | 1.23 | 0.05 | 0 | 4.21 | 1:7 |
| Inv. Example 1459 | 16.4 | FC | 18.5 | 1.36 | 0.44 | 0.07 | 15.21 | 1:50 |
| Inv. Example 1460 | 13.5 | FC | 11.5 | 1.11 | 0.08 | 0.07 | 23.34 | 1:10 |
| Inv. Example 1461 | 10.6 | FC | 11.5 | 1.11 | 8.02 | 2.04 | 13.45 | 1:3 |
| Inv. Example 1462 | 10.7 | FC | 9.6 | 1.07 | 15.6 | 1.27 | 2.34 | 1:10 |
| Inv. Example 1463 | 10.9 | FC | 8.5 | 1.42 | 10.4 | 0.57 | 28.34 | 1:5 |
| Inv. Example 1464 | 11.6 | FC | 7.72 | 1.38 | 4.65 | 2.67 | 19.87 | 200:1 |

| | Coat Properties | | | | |
|---|---|---|---|---|---|
| | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 1442 | 0.52 | 34 | alkali silicate | 28 | Spraying | very good |
| Inv. Example 1443 | 3.25 | 43 | urethane-based resin | 109 | Brushing | very good |
| Inv. Example 1444 | 0.32 | 53 | alkyl silicate | 15 | Spraying | very good |
| Inv. Example 1445 | 0.12 | 72 | alkyl silicate | 14 | Spraying | very good |
| Inv. Example 1446 | 0.29 | 77 | alkyl silicate | 18 | Spraying | very good |
| Inv. Example 1447 | 0.10 | 35 | alkali silicate | 2 | Spraying | very good |
| Inv. Example 1448 | 0.25 | 77 | alkyl silicate | 37 | Spraying | very good |
| Inv. Example 1449 | 0.42 | 43 | alkali silicate | 2 | Spraying | good |
| Inv. Example 1450 | 1.89 | 52 | alkyl silicate | 160 | Brushing | very good |
| Inv. Example 1451 | 11.80 | 66 | alkali silicate | 5 | Brushing | very good |
| Inv. Example 1452 | 0.31 | 72 | alkyl silicate | 56 | Brushing | very good |
| Inv. Example 1453 | 1.69 | 40 | alkali silicate | 2 | Spraying | very good |
| Inv. Example 1454 | 0.35 | 36 | alkyl silicate | 18 | Spraying | very good |
| Inv. Example 1455 | 1.50 | 32 | alkyl silicate | 23 | Spraying | very good |
| Inv. Example 1456 | 7.25 | 53 | epoxy-based resin | 30 | Brushing | very good |
| Inv. Example 1457 | 4.75 | 67 | acryl-based resin | 77 | Brushing | very good |
| Inv. Example 1458 | 1.88 | 72 | urethane-based resin | 54 | Brushing | very good |
| Inv. Example 1459 | 0.32 | 77 | polyester resin | 47 | Spraying | very good |
| Inv. Example 1460 | 1.23 | 34 | epoxy-based resin | 43 | Spraying | very good |
| Inv. Example 1461 | 2.65 | 43 | acryl-based resin | 52 | Brushing | very good |
| Inv. Example 1462 | 0.97 | 53 | urethane-based resin | 20 | Brushing | very good |
| Inv. Example 1463 | 1.82 | 60 | polyester resin | 200 | Brushing | very good |
| Inv. Example 1464 | 11.54 | 35 | alkali silicate | 22 | Spraying | very good |

(*1) F: Fracture facets existing, FC: Fracture facets and/or cracks existing, NO: No fracture facet and/or crack

TABLE 80

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Inv. Example 1465 | 14.7 | FC | 8.32 | 1.22 | 24.8 | 2.4 | 39.74 | 1:8 |
| Inv. Example 1466 | 19.5 | FC | 10.05 | 1.14 | 4.52 | 0.57 | 24.32 | 1:1 |
| Inv. Example 1467 | 10.2 | FC | 10.6 | 1.13 | 0 | 0 | 22.33 | 1:7 |
| Inv. Example 1468 | 4 | FC | 5.7 | 1.02 | 0 | 0 | 48.54 | 1:3 |
| Inv. Example 1469 | 7.2 | FC | 6.4 | 1.06 | 11.05 | 0.23 | 23.75 | 1:7 |
| Inv. Example 1470 | 3.6 | FC | 3.2 | 1.05 | 2.65 | 0.74 | 15.62 | 1:2 |
| Inv. Example 1471 | 26.9 | FC | 4.5 | 1.24 | 6.45 | 2.14 | 2.34 | 117:1 |
| Inv. Example 1472 | 27.9 | FC | 5.2 | 1.33 | 27.6 | 2.4 | 23.04 | 1:270 |
| Inv. Example 1473 | 28.9 | FC | 1.9 | 1.27 | 4.32 | 1.07 | 3.05 | 1:117 |
| Inv. Example 1474 | 23.8 | FC | 0.02 | 1.05 | 0.05 | 0.03 | 43.23 | 1:66 |
| Inv. Example 1475 | 26.8 | FC | 10.5 | 1.12 | 0 | 0.08 | 2.04 | 1:109 |
| Inv. Example 1476 | 25.6 | FC | 12.5 | 1.23 | 0.05 | 0 | 50.00 | 250:1 |
| Inv. Example 1477 | 29.8 | FC | 18.5 | 1.36 | 0.44 | 0.07 | 2.45 | 70:1 |
| Inv. Example 1478 | 18.9 | FC | 11.5 | 1.11 | 0.08 | 0.07 | 5.33 | 1:15 |
| Inv. Example 1479 | 5.6 | FC | 9.6 | 1.07 | 0.1 | 0.2 | 2.41 | 1:5 |
| Inv. Example 1480 | 4.7 | FC | 8.5 | 1.42 | 0.05 | 0.2 | 23.43 | 2:3 |
| Inv. Example 1481 | 6.8 | FC | 7.72 | 1.38 | 0.07 | 0 | 6.03 | 1:9 |
| Inv. Example 1482 | 9 | FC | 8.32 | 1.22 | 0 | 0.07 | 24.5 | 1:10 |
| Inv. Example 1483 | 2.1 | FC | 10.05 | 1.14 | 0 | 0.02 | 5.32 | 1:14 |

TABLE 80-continued

| | | | | | | | | |
|---|---|---|---|---|---|---|---|---|
| Inv. Example 1484 | 4.8 | FC | 10.6 | 1.13 | 0 | 0 | 14.34 | 1:7 |
| Inv. Example 1485 | 4.2 | FC | 5.7 | 1.02 | 0 | 0 | 5.04 | 1:12 |
| Inv. Example 1486 | 4.3 | FC | 6.4 | 1.06 | 21.5 | 0.05 | 2.32 | 1:3 |
| Inv. Example 1487 | 4 | FC | 3.2 | 1.05 | 0.05 | 2.29 | 20.34 | 1:7 |

| | Coat Properties | | | | |
|---|---|---|---|---|---|
| | Mg Contents to Total Metal Particle (mass %) | Ratio of Metal Particle in Dry Coat (mass %) | Base Resin | Coat Thickness (μm) | Coating Method | Result of Corrosion Test |
|---|---|---|---|---|---|---|
| Inv. Example 1465 | 1.63 | 77 | alkyl silicate | 25 | Spraying | very good |
| Inv. Example 1466 | 9.75 | 43 | alkali silicate | 14 | Spraying | very good |
| Inv. Example 1467 | 1.28 | 52 | urethane-based resin | 112 | Spraying | very good |
| Inv. Example 1468 | 1.00 | 66 | alkali silicate | 24 | Spraying | very good |
| Inv. Example 1469 | 0.90 | 72 | urethane-based resin | 150 | Spraying | very good |
| Inv. Example 1470 | 1.20 | 40 | alkali silicate | 18 | Spraying | very good |
| Inv. Example 1471 | 26.67 | 36 | alkyl silicate | 19 | Brushing | very good |
| Inv. Example 1472 | 0.10 | 32 | alkyl silicate | 24 | Spraying | very good |
| Inv. Example 1473 | 0.24 | 53 | urethane-based resin | 99 | Spraying | very good |
| Inv. Example 1474 | 0.36 | 67 | alkyl silicate | 7 | Spraying | very good |
| Inv. Example 1475 | 0.24 | 72 | epoxy-based resin | 100 | Spraying | very good |
| Inv. Example 1476 | 25.50 | 77 | alkyl silicate | 27 | Brushing | very good |
| Inv. Example 1477 | 29.38 | 34 | alkali silicate | 15 | Spraying | very good |
| Inv. Example 1478 | 1.18 | 43 | alkyl silicate | 14 | Spraying | very good |
| Inv. Example 1479 | 0.93 | 53 | urethane-based resin | 55 | Spraying | very good |
| Inv. Example 1480 | 1.88 | 35 | alkyl silicate | 8 | Spraying | very good |
| Inv. Example 1481 | 0.68 | 77 | urethane-based resin | 122 | Brushing | very good |
| Inv. Example 1482 | 0.82 | 43 | alkyl silicate | 54 | Spraying | very good |
| Inv. Example 1483 | 0.14 | 52 | alkali silicate | 19 | Spraying | very good |
| Inv. Example 1484 | 0.60 | 66 | alkyl silicate | 25 | Brushing | very good |
| Inv. Example 1485 | 0.32 | 72 | alkyl silicate | 58 | Spraying | very good |
| Inv. Example 1486 | 1.08 | 40 | alkyl silicate | 21 | Spraying | very good |
| Inv. Example 1487 | 0.50 | 36 | alkali silicate | 19 | Brushing | very good |

(*1) F: Fracture facets existing, FC: Fracture facets and/or cracks existing, NO: No fracture facet and/or crack

TABLE 81

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
|---|---|---|---|---|---|---|---|---|
| Inv. Example 1488 | 3.7 | FC | 4.5 | 1.24 | 0.05 | 0.03 | 12.33 | 1:10 |
| Inv. Example 1489 | 6.4 | FC | 5.2 | 1.33 | 0 | 0.08 | 17.84 | 1:1 |
| Inv. Example 1490 | 6.9 | FC | 1.9 | 1.27 | 0.05 | 0 | 6.66 | 1:3 |
| Inv. Example 1491 | 16.9 | FC | 0.02 | 1.05 | 0.44 | 0.07 | 3.65 | 2:3 |
| Inv. Example 1492 | 18.7 | FC | 10.5 | 1.12 | 0.08 | 0.07 | 22.62 | 1:2 |
| Inv. Example 1493 | 24.4 | FC | 12.5 | 1.23 | 0.1 | 0.2 | 45.33 | 1:4 |
| Inv. Example 1494 | 10.6 | FC | 18.5 | 1.36 | 0 | 0 | 43.22 | 1:6 |
| Inv. Example 1495 | 15.8 | FC | 11.5 | 1.11 | 0 | 0 | 12.33 | 1:115 |
| Inv. Example 1496 | 19.5 | FC | 9.6 | 1.07 | 0 | 0.07 | 13.42 | 1:23 |
| Inv. Example 1497 | 7.8 | FC | 8.5 | 1.42 | 0 | 0.02 | 22.32 | 1:12 |
| Inv. Example 1498 | 4.9 | FC | 7.72 | 1.38 | 25.8 | 0.05 | 7.34 | 1:10 |
| Inv. Example 1499 | 10.8 | FC | 8.32 | 1.22 | 22.1 | 0 | 44.54 | 1:3 |
| Inv. Example 1500 | 3.8 | FC | 10.05 | 1.14 | 21.5 | 0.05 | 32.87 | 1:5 |
| Inv. Example 1501 | 22.6 | FC | 10.6 | 1.13 | 0.05 | 2.29 | 20.32 | 1:25 |
| Inv. Example 1502 | 27.9 | FC | 5.7 | 1.02 | 0 | 0 | 2.03 | 4:5 |
| Inv. Example 1503 | 24.8 | FC | 6.4 | 1.06 | 0 | 0 | 5.33 | 3:8 |
| Inv. Example 1504 | 26.8 | FC | 3.2 | 1.05 | 0.07 | 0 | 2.33 | 9:34 |
| Inv. Example 1505 | 25.9 | FC | 4.5 | 1.24 | 0 | 0.07 | 27.44 | 7:8 |
| Inv. Example 1506 | 9.8 | FC | 5.2 | 1.33 | 0 | 0.02 | 12.33 | 9:17 |
| Inv. Example 1507 | 5.6 | FC | 1.9 | 1.27 | 22.1 | 0 | 36.43 | 1:1 |
| Inv. Example 1508 | 12.3 | FC | 0.02 | 1.05 | 1.24 | 1.8 | 11.9 | 1:31 |

TABLE 81-continued

| | | | | | | | |
|---|---|---|---|---|---|---|---|
| Inv. Example 1509 | 0.8 | FC | 27.89 | 1.12 | 1.24 | 0.9 | 10.5 | 1:4 |
| Inv. Example 1510 | 1 | FC | 0.32 | 1.23 | 0.8 | 0.7 | 9.8 | 1:1 |

| | Coat Properties | | | | |
|---|---|---|---|---|---|
| | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 1488 | 0.34 | 32 | urethane-based resin | 56 | Spraying | very good |
| Inv. Example 1489 | 3.20 | 53 | alkyl silicate | 77 | Spraying | very good |
| Inv. Example 1490 | 1.73 | 67 | alkyl silicate | 54 | Spraying | very good |
| Inv. Example 1491 | 6.76 | 72 | alkyl silicate | 64 | Spraying | very good |
| Inv. Example 1492 | 6.23 | 77 | alkyl silicate | 34 | Brushing | very good |
| Inv. Example 1493 | 4.88 | 34 | alkali silicate | 28 | Spraying | very good |
| Inv. Example 1494 | 1.51 | 43 | urethane-based resin | 109 | Brushing | very good |
| Inv. Example 1495 | 0.14 | 53 | alkyl silicate | 15 | Spraying | very good |
| Inv. Example 1496 | 0.81 | 72 | alkyl silicate | 14 | Spraying | very good |
| Inv. Example 1497 | 0.60 | 77 | alkyl silicate | 18 | Spraying | very good |
| Inv. Example 1498 | 0.45 | 77 | urethane-based resin | 122 | Brushing | very good |
| Inv. Example 1499 | 2.70 | 43 | alkyl silicate | 54 | Spraying | very good |
| Inv. Example 1500 | 0.63 | 52 | alkali silicate | 19 | Spraying | very good |
| Inv. Example 1501 | 0.87 | 66 | alkyl silicate | 25 | Brushing | very good |
| Inv. Example 1502 | 12.40 | 72 | alkyl silicate | 58 | Spraying | very good |
| Inv. Example 1503 | 6.76 | 40 | alkyl silicate | 21 | Spraying | very good |
| Inv. Example 1504 | 5.61 | 36 | alkali silicate | 19 | Brushing | very good |
| Inv. Example 1505 | 12.09 | 32 | urethane-based resin | 56 | Spraying | very good |
| Inv. Example 1506 | 3.39 | 53 | alkyl silicate | 77 | Spraying | very good |
| Inv. Example 1507 | 2.80 | 67 | alkyl silicate | 54 | Spraying | very good |
| Inv. Example 1508 | 0.384375 | 52 | alkali silicate | 2 | Spraying | very good |
| Inv. Example 1509 | 0.16 | 55 | alkali silicate | 20 | Spraying | very good |
| Inv. Example 1510 | 0.5 | 69 | alkali silicate | 5 | Spraying | very good |

(*1) F: Fracture facets existing, FC: Fracture facets and/or cracks existing, NO: No fracture facet and/or crack

TABLE 82

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Inv. Example 1511 | 2.3 | FC | 11.44 | 1.36 | 0 | 1.8 | 7.9 | 1:7 |
| Inv. Example 1512 | 15.6 | FC | 1.05 | 1.11 | 1.1 | 2.41 | 11.6 | 1:11 |
| Inv. Example 1513 | 6.7 | FC | 36.47 | 1.07 | 1.8 | 0.08 | 16.9 | 1:2 |
| Inv. Example 1514 | 7.5 | FC | 5.07 | 1.42 | 3.8 | 2.23 | 20.34 | 1:7 |
| Inv. Example 1515 | 8.4 | FC | 7.72 | 1.38 | 2.9 | 0.06 | 8.9 | 1:4 |
| Inv. Example 1516 | 9.3 | FC | 8.32 | 1.22 | 10.5 | 0.02 | 7.5 | 1:5 |
| Inv. Example 1517 | 10.4 | FC | 10.05 | 1.14 | 2.9 | 0.02 | 10.9 | 1:10 |
| Inv. Example 1518 | 11.2 | FC | 6.08 | 1.13 | 16.8 | 1.37 | 20.34 | 1:9 |
| Inv. Example 1519 | 11.7 | FC | 17.89 | 1.02 | 0 | 2.43 | 6.7 | 240:1 |
| Inv. Example 1520 | 21.5 | FC | 19.54 | 1.06 | 3.6 | 0.02 | 7.9 | 1:120 |
| Inv. Example 1521 | 13.4 | FC | 21.08 | 1.05 | 2.1 | 1.5 | 5.6 | 99:1 |
| Inv. Example 1522 | 14.6 | FC | 23.04 | 1.24 | 0.06 | 1.3 | 11.5 | 1:99 |
| Inv. Example 1523 | 25.8 | FC | 9.21 | 1.33 | 0.02 | 1.8 | 20.34 | 1:242 |
| Inv. Example 1524 | 16.7 | FC | 0.12 | 1.27 | 1.6 | 0.9 | 10.5 | 1:6 |
| Inv. Example 1525 | 17.3 | FC | 29.24 | 1.37 | 3.5 | 0 | 7.6 | 1:1 |
| Inv. Example 1526 | 18.5 | FC | 128.74 | 1.10 | 9.8 | 1.8 | 8.2 | 1:7 |
| Inv. Example 1527 | 19.3 | FC | 33.57 | 1.04 | 11.5 | 0.7 | 9.1 | 1:5 |
| Inv. Example 1528 | 3.5 | FC | 3.04 | 1.02 | 0.4 | 1.5 | 10.6 | 1:2 |
| Inv. Example 1529 | 22.5 | FC | 7.54 | 1.01 | 0.6 | 1.3 | 8.4 | 1:221 |
| Inv. Example 1530 | 23.7 | FC | 6.81 | 1.08 | 10.6 | 1.8 | 5.3 | 1:31 |

TABLE 82-continued

| | | | | | | | | |
|---|---|---|---|---|---|---|---|---|
| Inv. Example 1531 | 24.2 | FC | 5.25 | 1.14 | 9.5 | 0 | 20.34 | 1:4 |
| Inv. Example 1532 | 0.2 | FC | 194.23 | 1.23 | 11.04 | 0.7 | 7.8 | 1:1 |

| | Coat Properties | | | | |
|---|---|---|---|---|---|
| | Mg Contents to Total Metal Particle (mass %) | Ratio of Metal Particle in Dry Coat (mass %) | Base resin | Coat Thickness (μm) | Coating Method | Result of Corrosion Test |
| Inv. Example 1511 | 0.2875 | 78 | alkyl silicate | 20 | Spraying | very good |
| Inv. Example 1512 | 1.3 | 42 | alkali silicate | 15 | Brushing | very good |
| Inv. Example 1513 | 2.233333333 | 32 | alkyl silicate | 57 | Brushing | very good |
| Inv. Example 1514 | 0.9375 | 66 | alkali silicate | 13 | Brushing | very good |
| Inv. Example 1515 | 1.68 | 67 | alkyl silicate | 22 | Brushing | very good |
| Inv. Example 1516 | 1.55 | 64 | alkali silicate | 20 | Spraying | very good |
| Inv. Example 1517 | 0.945454545 | 74 | alkyl silicate | 27 | Spraying | very good |
| Inv. Example 1518 | 1.12 | 82 | alkali silicate | 15 | Spraying | very good |
| Inv. Example 1519 | 11.65145228 | 37 | alkyl silicate | 35 | Spraying | very good |
| Inv. Example 1520 | 0.17768595 | 42 | alkali silicate | 34 | Brushing | very good |
| Inv. Example 1521 | 13.266 | 66 | alkyl silicate | 45 | Brushing | very good |
| Inv. Example 1522 | 0.146 | 48 | alkali silicate | 52 | Brushing | very good |
| Inv. Example 1523 | 0.10617284 | 33 | alkyl silicate | 23 | Brushing | very good |
| Inv. Example 1524 | 2.385714286 | 75 | alkali silicate | 5 | Spraying | very good |
| Inv. Example 1525 | 8.65 | 77 | alkyl silicate | 52 | Brushing | very good |
| Inv. Example 1526 | 2.3125 | 66 | alkali silicate | 150 | Brushing | very good |
| Inv. Example 1527 | 3.216666667 | 67 | alkyl silicate | 60 | Brushing | very good |
| Inv. Example 1528 | 1.166666667 | 45 | alkali silicate | 15 | Spraying | very good |
| Inv. Example 1529 | 0.101351351 | 48 | alkyl silicate | 24 | Spraying | very good |
| Inv. Example 1530 | 0.740625 | 68 | alkali silicate | 34 | Spraying | very good |
| Inv. Example 1531 | 4.84 | 35 | alkyl silicate | 20 | Brushing | very good |
| Inv. Example 1532 | 0.1 | 37 | alkali silicate | 200 | Brushing | very good |

(*1) F: Fracture facets existing, FC: Fracture facets and/or cracks existing, NO: No fracture facet and/or crack

TABLE 83

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Inv. Example 1533 | 27.1 | FC | 28.74 | 1.33 | 0.01 | 1.8 | 10.5 | 1:7 |
| Inv. Example 1534 | 29.3 | FC | 13.57 | 1.37 | 0.07 | 0.7 | 20.34 | 400:1 |
| Inv. Example 1535 | 0.5 | FC | 0.65 | 1.44 | 1.8 | 1.5 | 7.9 | 1:2 |
| Inv. Example 1536 | 2.7 | FC | 4.12 | 1.21 | 0 | 1.3 | 11.6 | 1:300 |
| Inv. Example 1537 | 28.4 | FC | 0.72 | 1.22 | 2.9 | 1.8 | 16.9 | 1:4 |
| Inv. Example 1538 | 8.7 | FC | 117.54 | 1.23 | 10.5 | 0.9 | 10.5 | 1:5 |
| Inv. Example 1539 | 9.2 | FC | 7.81 | 1.47 | 2.9 | 0.7 | 8.9 | 1:10 |
| Inv. Example 1540 | 17.8 | FC | 80.25 | 1.01 | 16.8 | 1.8 | 7.5 | 1:9 |
| Inv. Example 1541 | 20.2 | FC | 8.47 | 1.04 | 2.7 | 0.7 | 10.9 | 1:1 |
| Inv. Example 1542 | 0.4 | FC | 0.87 | 1.05 | 0.04 | 0.7 | 20.34 | 130:1 |
| Inv. Example 1543 | 13.7 | FC | 25.78 | 1.12 | 0 | 0.04 | 6.7 | 130:1 |
| Inv. Example 1544 | 14.7 | FC | 93.45 | 1.11 | 1.24 | 0.05 | 7.9 | 1:31 |
| Inv. Example 1545 | 2.4 | FC | 0.97 | 1.08 | 0.05 | 1.24 | 5.6 | 1:1 |
| Inv. Example 1546 | 4.5 | FC | 54.89 | 1.47 | 1.24 | 0.06 | 20.34 | 2:1 |
| Inv. Example 1547 | 0.1 | FC | 10.81 | 1.50 | 1.24 | 0.07 | 9.9 | 300:1 |
| Inv. Example 1548 | 30.0 | FC | 18.24 | 1.13 | 0 | 0.75 | 10.5 | 1:270 |
| Inv. Example 1549 | 24.5 | FC | 114.78 | 1.04 | 0.9 | 1.5 | 7.6 | 1:115 |
| Inv. Example 1550 | 27.6 | FC | 3.87 | 1.02 | 0.03 | 1.3 | 45.33 | 1:29 |
| Inv. Example 1551 | 4.1 | FC | 11.94 | 1.08 | 10.5 | 1.8 | 43.22 | 1:3 |
| Inv. Example 1552 | 3.2 | FC | 142.58 | 1.15 | 2.9 | 0.9 | 10.6 | 1:9 |
| Inv. Example 1553 | 2.7 | FC | 12.5 | 1.34 | 16.8 | 0.7 | 20.34 | 1:5 |
| Inv. Example 1554 | 0.12 | FC | 31.24 | 1.25 | 2.7 | 1.8 | 5.3 | 100:1 |

| | Coat Properties | | | | |
|---|---|---|---|---|---|
| | Mg Contents to Total Metal Particle (mass %) | Ratio of Metal Particle in Dry Coat (mass %) | Base resin | Coat Thickness (μm) | Coating Method | Result of Corrosion Test |
| Inv. Example 1533 | 3.3875 | 38 | alkyl silicate | 56 | Brushing | very good |
| Inv. Example 1534 | 29.22693267 | 41 | alkali silicate | 34 | Spraying | very good |
| Inv. Example 1535 | 0.166666667 | 54 | alkyl silicate | 2 | Spraying | very good |
| Inv. Example 1536 | 0.0089701 | 57 | alkali silicate | 15 | Spraying | very good |

TABLE 83-continued

|  | | | | | |
|---|---|---|---|---|---|
| Inv. Example 1537 | 5.68 | 59 | alkali silicate | 10 | Spraying | very good |
| Inv. Example 1538 | 1.45 | 64 | alkyl silicate | 125 | Brushing | very good |
| Inv. Example 1539 | 0.836363636 | 66 | alkali silicate | 24 | Brushing | very good |
| Inv. Example 1540 | 1.78 | 67 | alkyl silicate | 110 | Brushing | very good |
| Inv. Example 1541 | 10.1 | 34 | alkali silicate | 24 | Brushing | very good |
| Inv. Example 1542 | 0.396946565 | 54 | alkyl silicate | 2 | Spraying | very good |
| Inv. Example 1543 | 13.59541985 | 62 | alkali silicate | 37 | Spraying | very good |
| Inv. Example 1544 | 0.459375 | 66 | alkyl silicate | 113 | Brushing | very good |
| Inv. Example 1545 | 1.2 | 67 | alkali silicate | 2 | Spraying | very good |
| Inv. Example 1546 | 3 | 68 | alkyl silicate | 75 | Brushing | very good |
| Inv. Example 1547 | 0.099667774 | 33 | alkali silicate | 30 | Brushing | very good |
| Inv. Example 1548 | 0.110701107 | 35 | alkyl silicate | 34 | Brushing | very good |
| Inv. Example 1549 | 0.211206897 | 43 | epoxy-based resin | 124 | Brushing | very good |
| Inv. Example 1550 | 0.92 | 44 | acryl-based resin | 15 | Spraying | very good |
| Inv. Example 1551 | 1.025 | 43 | urethane-based resin | 23 | Spraying | very good |
| Inv. Example 1552 | 0.32 | 44 | polyester resin | 157 | Brushing | very good |
| Inv. Example 1553 | 0.45 | 54 | epoxy-based resin | 26 | Spraying | very good |
| Inv. Example 1554 | 0.118811881 | 79 | acryl-based resin | 38 | Spraying | very good |

(*1) F: Fracture facets existing, FC: Fracture facets and/or cracks existing, NO: No fracture facet and/or crack

TABLE 84

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Inv. Example 1555 | 0.22 | FC | 152.46 | 1.19 | 0.02 | 0.7 | 10.9 | 1:1 |
| Inv. Example 1556 | 0.37 | FC | 13.4 | 1.18 | 0 | 1.5 | 7.8 | 99:1 |
| Inv. Example 1557 | 1.4 | FC | 160.57 | 1.24 | 7.42 | 1.3 | 10.5 | 1:6 |
| Inv. Example 1558 | 4.2 | FC | 14.1 | 1.11 | 0.02 | 1.8 | 20.34 | 1:12 |
| Inv. Example 1559 | 4.8 | FC | 167.55 | 1.27 | 0.04 | 0.9 | 7.9 | 1:5 |
| Inv. Example 1560 | 8.1 | FC | 1.45 | 1.31 | 17.5 | 0 | 11.6 | 1:33 |
| Inv. Example 1561 | 7.6 | FC | 0.15 | 1.26 | 0.01 | 1.8 | 16.9 | 1:9 |
| Inv. Example 1562 | 9.9 | FC | 13.1 | 1.14 | 0.02 | 0.7 | 10.5 | 1:18 |
| Inv. Example 1563 | 14.8 | FC | 15.5 | 1.34 | 3.8 | 0 | 8.9 | 1:38 |
| Inv. Example 1564 | 16.7 | FC | 0.67 | 1.16 | 2.9 | 0 | 7.5 | 1:117 |
| Inv. Example 1565 | 17.9 | FC | 137.89 | 1.47 | 10.5 | 1.8 | 20.34 | 1:42 |
| Inv. Example 1566 | 19.5 | FC | 16.3 | 1.48 | 2.9 | 0.9 | 9.8 | 1:1 |
| Inv. Example 1567 | 22.4 | FC | 110.38 | 1.49 | 16.8 | 0.7 | 6.7 | 1:121 |
| Inv. Example 1568 | 0.17 | FC | 12.4 | 1.34 | 2.7 | 1.8 | 45.33 | 120:1 |
| Inv. Example 1569 | 8.3 | FC | 17.2 | 1.29 | 0.02 | 0.7 | 43.22 | 1:145 |
| Inv. Example 1570 | 6.5 | FC | 105.23 | 1.18 | 0.02 | 0.7 | 11.5 | 1:31 |
| Inv. Example 1571 | 9.7 | FC | 177.89 | 1.23 | 0.04 | 0.02 | 9.9 | 1:95 |
| Inv. Example 1572 | 11.4 | FC | 12.2 | 1.27 | 0.05 | 0.02 | 10.5 | 1:33 |
| Inv. Example 1573 | 22.5 | FC | 1.84 | 1.17 | 1.24 | 1.37 | 7.6 | 120:1 |
| Inv. Example 1574 | 25.7 | FC | 16.02 | 1.16 | 0.05 | 0.02 | 8.2 | 1:28 |
| Inv. Example 1575 | 17.8 | FC | 1.75 | 1.49 | 1.24 | 1.37 | 9.1 | 1:33 |
| Inv. Example 1576 | 0.14 | FC | 198.78 | 1.34 | 1.24 | 1.37 | 10.6 | 200:1 |

| | Coat Properties | | | | |
|---|---|---|---|---|---|
| | Mg Contents to Total Metal Particle (mass %) | Ratio of Metal Particle in Dry Coat (mass %) | Base resin | Coat Thickness (μm) | Coating Method | Result of Corrosion Test |
| Inv. Example 1555 | 0.11 | 73 | urethane-based resin | 160 | Brushing | very good |
| Inv. Example 1556 | 0.3663 | 69 | polyester resin | 27 | Brushing | very good |
| Inv. Example 1557 | 0.2 | 63 | epoxy-based resin | 180 | Brushing | very good |
| Inv. Example 1558 | 0.323076923 | 35 | acryl-based resin | 26 | Spraying | very good |
| Inv. Example 1559 | 0.8 | 35 | urethane-based resin | 180 | Brushing | very good |
| Inv. Example 1560 | 0.238235294 | 66 | polyester resin | 15 | Spraying | very good |
| Inv. Example 1561 | 0.76 | 67 | epoxy-based resin | 2 | Spraying | very good |
| Inv. Example 1562 | 0.521052632 | 68 | acryl-based resin | 28 | Spraying | very good |
| Inv. Example 1563 | 0.379487179 | 33 | urethane-based resin | 30 | Spraying | very good |
| Inv. Example 1564 | 0.141525424 | 35 | polyester resin | 2 | Spraying | very good |
| Inv. Example 1565 | 0.41627907 | 43 | epoxy-based resin | 157 | Brushing | very good |
| Inv. Example 1566 | 9.75 | 44 | acryl-based resin | 28 | Brushing | very good |
| Inv. Example 1567 | 0.183606557 | 42 | urethane-based resin | 130 | Brushing | very good |

TABLE 84-continued

|  |  |  |  |  |  |
|---|---|---|---|---|---|
| Inv. Example 1568 | 0.168595041 | 33 | polyester resin | 29 | Brushing very good |
| Inv. Example 1569 | 0.056849315 | 30 | epoxy-based resin | 30 | Brushing very good |
| Inv. Example 1570 | 0.203125 | 35 | acryl-based resin | 120 | Brushing very good |
| Inv. Example 1571 | 0.101041667 | 37 | urethane-based resin | 187 | Brushing very good |
| Inv. Example 1572 | 0.335294118 | 77 | polyester resin | 28 | Spraying very good |
| Inv. Example 1573 | 22.31404959 | 41 | epoxy-based resin | 5 | Spraying very good |
| Inv. Example 1574 | 0.886206897 | 35 | acryl-based resin | 35 | Spraying very good |
| Inv. Example 1575 | 0.523529412 | 58 | urethane-based resin | 5 | Spraying very good |
| Inv. Example 1576 | 0.139303483 | 37 | polyester resin | 200 | Brushing very good |

(*1) F: Fracture facets existing, FC: Fracture facets and/or cracks existing, NO: No fracture facet and/or crack

TABLE 85

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Inv. Example 1577 | 6.7 | FC | 13.1 | 1.16 | 0.8 | 1.5 | 8.4 | 1:4 |
| Inv. Example 1578 | 7.5 | FC | 15.5 | 1.47 | 0.9 | 1.3 | 5.3 | 1:18 |
| Inv. Example 1579 | 8.4 | FC | 0.67 | 1.48 | 1.1 | 1.8 | 10.9 | 1:7 |
| Inv. Example 1580 | 9.3 | FC | 12.2 | 1.49 | 1.8 | 0.9 | 7.8 | 1:11 |
| Inv. Example 1581 | 1.4 | FC | 1.84 | 1.34 | 3.8 | 0.7 | 8.9 | 1:2 |
| Inv. Example 1582 | 4.2 | FC | 16.02 | 1.29 | 2.9 | 1.8 | 7.5 | 1:7 |
| Inv. Example 1583 | 4.8 | FC | 1.75 | 1.18 | 10.5 | 0.7 | 10.9 | 1:2 |
| Inv. Example 1584 | 8.1 | FC | 12.4 | 1.23 | 2.9 | 1.5 | 9.8 | 1:5 |
| Inv. Example 1585 | 7.6 | FC | 17.2 | 1.27 | 16.8 | 1.3 | 45.33 | 1:10 |
| Inv. Example 1586 | 9.9 | FC | 13.1 | 1.17 | 2.7 | 1.8 | 43.22 | 1:9 |
| Inv. Example 1587 | 0.4 | FC | 29.9 | 1.16 | 3.6 | 0.9 | 5.6 | 240:1 |
| Inv. Example 1588 | 10.5 | FC | 0.21 | 1.27 | 0 | 0.7 | 11.5 | 120:1 |
| Inv. Example 1589 | 0.4 | FC | 0.22 | 1.17 | 0.06 | 1.8 | 9.9 | 99:1 |
| Inv. Example 1590 | 10.5 | FC | 29.5 | 1.27 | 0.02 | 0.7 | 10.5 | 1:99 |
| Inv. Example 1591 | 0.51 | FC | 29.9 | 1.18 | 1.6 | 1.5 | 7.6 | 1:3 |
| Inv. Example 1592 | 9.8 | FC | 0.21 | 1.23 | 3.5 | 0 | 8.2 | 1:6 |
| Inv. Example 1593 | 0.52 | FC | 0.22 | 1.27 | 9.8 | 1.8 | 9.1 | 1:1 |
| Inv. Example 1594 | 9.9 | FC | 29.5 | 1.17 | 11.5 | 0.9 | 10.6 | 1:7 |
| Inv. Example 1595 | 14.8 | FC | 16.02 | 1.48 | 0.4 | 0.7 | 8.4 | 1:5 |
| Inv. Example 1596 | 19.9 | FC | 1.75 | 1.49 | 0.6 | 1.8 | 5.3 | 1:150 |
| Inv. Example 1597 | 17.9 | FC | 12.4 | 1.34 | 10.6 | 0.7 | 10.9 | 1:55 |
| Inv. Example 1598 | 19.5 | FC | 17.2 | 1.29 | 9.5 | 0.7 | 7.8 | 1:121 |

| | Coat Properties | | | | |
|---|---|---|---|---|---|
| | Mg Contents to Total Metal Particle (mass %) | Ratio of Metal Particle in Dry Coat (mass %) | Base resin | Coat Thickness (μm) | Coating Method | Result of Corrosion Test |
| Inv. Example 1577 | 1.34 | 68 | alkali silicate | 25 | Spraying | very good |
| Inv. Example 1578 | 0.394736842 | 55 | alkali silicate | 15 | Spraying | very good |
| Inv. Example 1579 | 1.05 | 77 | alkyl silicate | 20 | Spraying | very good |
| Inv. Example 1580 | 0.775 | 43 | alkali silicate | 18 | Spraying | very good |
| Inv. Example 1581 | 0.466666667 | 45 | alkyl silicate | 22 | Spraying | very good |
| Inv. Example 1582 | 0.525 | 66 | alkali silicate | 19 | Spraying | very good |
| Inv. Example 1583 | 2.4 | 33 | alkali silicate | 29 | Spraying | very good |
| Inv. Example 1584 | 1.35 | 66 | alkali silicate | 23 | Spraying | very good |
| Inv. Example 1585 | 0.690909091 | 55 | alkyl silicate | 21 | Spraying | very good |
| Inv. Example 1586 | 0.99 | 49 | alkali silicate | 19 | Spraying | very good |
| Inv. Example 1587 | 0.398340249 | 77 | alkyl silicate | 15 | Spraying | very good |
| Inv. Example 1588 | 10.41322314 | 41 | alkali silicate | 18 | Spraying | very good |
| Inv. Example 1589 | 0.396 | 64 | alkyl silicate | 22 | Spraying | very good |
| Inv. Example 1590 | 0.105 | 58 | alkyl silicate | 21 | Spraying | very good |
| Inv. Example 1591 | 0.1275 | 33 | alkali silicate | 29 | Spraying | very good |
| Inv. Example 1592 | 1.4 | 66 | alkali silicate | 23 | Spraying | very good |
| Inv. Example 1593 | 0.26 | 55 | alkyl silicate | 21 | Spraying | very good |
| Inv. Example 1594 | 1.2375 | 49 | alkali silicate | 19 | Spraying | very good |
| Inv. Example 1595 | 2.466666667 | 77 | alkyl silicate | 21 | Spraying | very good |
| Inv. Example 1596 | 0.131788079 | 43 | alkali silicate | 19 | Spraying | very good |
| Inv. Example 1597 | 0.319642857 | 45 | alkyl silicate | 15 | Spraying | very good |
| Inv. Example 1598 | 0.159836066 | 66 | alkali silicate | 18 | Spraying | very good |

(*1) F: Fracture facets existing, FC: Fracture facets and/or cracks existing, NO: No fracture facet and/or crack

TABLE 86

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Comp. Example 95 | 2.3 | FC | 205.6 | 1.23 | 12.5 | 0.05 | 10.5 | 1:5 |
| Comp. Example 96 | 12.5 | FC | 0.005 | 1.36 | 2.1 | 0 | 12.6 | 1:3 |
| Comp. Example 97 | 18.9 | FC | 205.6 | 1.11 | 1.5 | 0.05 | 7.8 | 1:19 |
| Comp. Example 98 | 29.5 | FC | 0.005 | 1.07 | 0.05 | 2.29 | 16.8 | 1:100 |
| Comp. Example 99 | 14.5 | FC | 205.6 | 1.42 | 0 | 0 | 10.5 | 1:260 |
| Comp. Example 100 | 12.5 | FC | 0.005 | 1.38 | 0 | 0 | 12.6 | 1:3 |
| Comp. Example 101 | 18.9 | NO | 205.6 | 1.22 | 0.07 | 0 | 7.8 | 1:19 |
| Comp. Example 102 | 29.5 | NO | 0.005 | 1.14 | 0 | 0.07 | 16.8 | 1:100 |
| Comp. Example 103 | 2.3 | FC | 10.6 | 1.13 | 0 | 0.02 | 10.5 | 1:256 |
| Comp. Example 104 | 12.5 | FC | 5.7 | 1.02 | 22.1 | 0 | 12.6 | 1:200 |
| Comp. Example 105 | 0.5 | NO | 6.4 | 1.06 | 25.8 | 0.05 | 7.8 | 1:167 |
| Comp. Example 106 | 29.5 | NO | 3.2 | 1.23 | 22.1 | 0 | 16.8 | 1:300 |
| Comp. Example 107 | 14.5 | NO | 4.5 | 1.36 | 21.5 | 0.05 | 10.5 | 1:260 |
| Comp. Example 108 | 9.8 | NO | 5.2 | 1.11 | 0.05 | 2.29 | 12.6 | 1:100 |
| Comp. Example 109 | 4.6 | NO | 1.9 | 1.07 | 0 | 0 | 7.8 | 1:47 |
| Comp. Example 110 | 3.2 | FC | 18.5 | 1.42 | 0 | 0 | 16.8 | 1:32 |
| Comp. Example 111 | 29.9 | FC | 12.5 | 1.38 | 0.07 | 0 | 12.6 | 1:345 |
| Comp. Example 112 | 7.6 | FC | 9.8 | 1.22 | 0 | 0.07 | 7.8 | 1:390 |
| Comp. Example 113 | 29.9 | FC | 7.6 | 1.14 | 0 | 0.007 | 16.8 | 1:301 |
| Comp. Example 114 | 0.6 | FC | 6.9 | 1.13 | 36.5 | 3.25 | 10.5 | 1:333 |
| Comp. Example 115 | 4.5 | FC | 10.5 | 1.02 | 0.005 | 0 | 12.6 | 1:325 |
| Comp. Example 116 | 3.7 | FC | 12.6 | 1.06 | 22.1 | 0 | 7.8 | 1:456 |

| | Coat Properties | | | | | |
|---|---|---|---|---|---|---|
| | Mg Contents to Total Metal Particle (mass %) | Ratio of Metal Particle in Dry Coat (mass %) | Base resin | Coat Thickness (μm) | Coating Method | Result of Corrosion Test |
| Comp. Example 95 | 0.383 | 77 | alkyl silicate | 25 | Spraying | poor |
| Comp. Example 96 | 3.125 | 77 | urethane-based resin | 25 | Spraying | poor |
| Comp. Example 97 | 0.945 | 43 | alkyl silicate | 105 | Brushing | poor |
| Comp. Example 98 | 0.292 | 52 | alkali silicate | 165 | Spraying | poor |
| Comp. Example 99 | 0.056 | 66 | alkyl silicate | 25 | Spraying | poor |
| Comp. Example 100 | 3.125 | 72 | alkyl silicate | 25 | Spraying | poor |
| Comp. Example 101 | 0.945 | 40 | alkyl silicate | 105 | Brushing | poor |
| Comp. Example 102 | 0.292 | 36 | alkali silicate | 165 | Spraying | poor |
| Comp. Example 103 | 0.009 | 32 | alkyl silicate | 25 | Spraying | poor |
| Comp. Example 104 | 0.062 | 53 | alkyl silicate | 25 | Spraying | poor |
| Comp. Example 105 | 0.003 | 67 | alkyl silicate | 105 | Brushing | poor |
| Comp. Example 106 | 0.098 | 53 | urethane-based resin | 165 | Spraying | poor |
| Comp. Example 107 | 0.056 | 67 | alkyl silicate | 25 | Spraying | poor |
| Comp. Example 108 | 0.097 | 72 | alkyl silicate | 25 | Spraying | poor |
| Comp. Example 109 | 0.096 | 77 | alkyl silicate | 105 | Brushing | poor |
| Comp. Example 110 | 0.097 | 34 | urethane-based resin | 55 | Spraying | poor |
| Comp. Example 111 | 0.086 | 43 | alkyl silicate | 28 | Spraying | poor |
| Comp. Example 112 | 0.019 | 52 | alkyl silicate | 15 | Spraying | poor |
| Comp. Example 113 | 0.099 | 66 | alkyl silicate | 14 | Spraying | poor |
| Comp. Example 114 | 0.002 | 72 | urethane-based resin | 118 | Brushing | poor |
| Comp. Example 115 | 0.014 | 40 | alkyl silicate | 22 | Spraying | poor |
| Comp. Example 116 | 0.008 | 36 | alkyl silicate | 54 | Spraying | poor |

(*1) F: Fracture facets existing, FC: Fracture facets and/or cracks existing, NO: No fracture facet and/or crack

TABLE 87

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Inv. Example 2467 | 7.5 | FC | 5.07 | 1.42 | 0 | 0 | 23.43 | 0.65 |
| Inv. Example 2468 | 8.06 | FC | 7.72 | 1.38 | 0 | 0 | 5.96 | 0.60 |
| Inv. Example 2469 | 9.3 | FC | 8.32 | 1.22 | 0 | 0 | 10.64 | 3.72 |

TABLE 87-continued

| | | | | | | | | |
|---|---|---|---|---|---|---|---|---|
| Inv. Example 2470 | 3.5 | FC | 3.04 | 1.02 | 0 | 0 | 16.5 | 1.84 |
| Inv. Example 2471 | 2.7 | FC | 4.12 | 1.21 | 0 | 0 | 7.95 | 0.23 |
| Inv. Example 2472 | 9.2 | FC | 7.81 | 1.47 | 0 | 0 | 7.95 | 0.03 |
| Inv. Example 2473 | 8.1 | FC | 1.45 | 1.31 | 0 | 0 | 9.64 | 5.40 |
| Inv. Example 2474 | 7.5 | FC | 9.6 | 1.07 | 0 | 0 | 0.96 | 5.95 |
| Inv. Example 2475 | 4.5 | FC | 8.5 | 1.42 | 0 | 0 | 5.26 | 3.46 |
| Inv. Example 2476 | 3.6 | FC | 3.2 | 1.05 | 0 | 0 | 13.5 | 0.90 |
| Inv. Example 2477 | 4.2 | FC | 5.7 | 1.02 | 1.5 | 0 | 13.5 | 0.20 |
| Inv. Example 2478 | 4.3 | FC | 6.4 | 1.06 | 5.5 | 1.6 | 9.64 | 0.83 |
| Inv. Example 2479 | 4 | FC | 3.2 | 1.05 | 0 | 0 | 16.5 | 1.60 |
| Inv. Example 2480 | 6.4 | FC | 5.2 | 1.33 | 0 | 0 | 20.59 | 1.07 |
| Inv. Example 2481 | 9.8 | FC | 5.2 | 1.33 | 0 | 0 | 0.96 | 0.59 |
| Inv. Example 2482 | 7.5 | FC | 5.07 | 1.42 | 0 | 0 | 6.54 | 5.00 |
| Inv. Example 2483 | 8.4 | FC | 7.72 | 1.38 | 0.5 | 0 | 5.26 | 2.90 |
| Inv. Example 2484 | 2.7 | FC | 4.12 | 1.21 | 0 | 0 | 10.64 | 1.04 |
| Inv. Example 2485 | 2.64 | FC | 5.5 | 1.22 | 0 | 0 | 9.64 | 0.75 |
| Inv. Example 2486 | 1.59 | FC | 6.7 | 1.14 | 0 | 0 | 6.9 | 1.06 |
| Inv. Example 2487 | 2.58 | FC | 8.9 | 1.13 | 0 | 0 | 10.5 | 0.43 |
| Inv. Example 2488 | 7.55 | FC | 2.15 | 1.14 | 0 | 0 | 13.5 | 3.43 |

| | Coat Properties | | | | |
|---|---|---|---|---|---|
| | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 2467 | 10.5 | 74 | alkali silicate | 24 | Brushing | very good |
| Inv. Example 2468 | 12.5 | 82 | alkyl silicate | 25 | Spraying | very good |
| Inv. Example 2469 | 1.5 | 37 | alkali silicate | 14 | Spraying | very good |
| Inv. Example 2470 | 0.9 | 48 | alkali silicate | 15 | Spraying | very good |
| Inv. Example 2471 | 10.5 | 32 | alkali silicate | 15 | Spraying | very good |
| Inv. Example 2472 | 299.5 | 45 | alkyl silicate | 15 | Brushing | very good |
| Inv. Example 2473 | 0.5 | 37 | epoxy-based resin | 5 | Spraying | good |
| Inv. Example 2474 | 0.26 | 72 | urethane-based resin | 150 | Spraying | very good |
| Inv. Example 2475 | 0.3 | 40 | alkali silicate | 18 | Spraying | very good |
| Inv. Example 2476 | 3 | 40 | alkali silicate | 18 | Spraying | very good |
| Inv. Example 2477 | 20.5 | 72 | alkyl silicate | 58 | Spraying | very good |
| Inv. Example 2478 | 4.2 | 40 | alkyl silicate | 21 | Spraying | very good |
| Inv. Example 2479 | 1.5 | 36 | alkali silicate | 19 | Brushing | very good |
| Inv. Example 2480 | 5 | 53 | alkyl silicate | 77 | Spraying | very good |
| Inv. Example 2481 | 15.6 | 53 | alkyl silicate | 77 | Spraying | very good |
| Inv. Example 2482 | 0.5 | 66 | alkali silicate | 13 | Brushing | very good |
| Inv. Example 2483 | 1.9 | 67 | alkyl silicate | 22 | Brushing | very good |
| Inv. Example 2484 | 1.6 | 57 | alkali silicate | 15 | Spraying | very good |
| Inv. Example 2485 | 2.5 | 43 | alkyl silicate | 16 | Spraying | very good |
| Inv. Example 2486 | 0.5 | 76 | alkyl silicate | 5 | Spraying | very good |
| Inv. Example 2487 | 5 | 49 | alkyl silicate | 22 | Spraying | very good |
| Inv. Example 2488 | 1.2 | 75 | alkyl silicate | 18 | Spraying | very good |

(*1) F: Fracture facets existing, FC: Fracture facets and/or cracks existing, NO: No fracture facet and/or crack

TABLE 88

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Inv. Example 2489 | 8.01 | FC | 2.54 | 1.13 | 0 | 0 | 20.59 | 0.84 |
| Inv. Example 2490 | 1.06 | FC | 3.4 | 1.38 | 0 | 0 | 7.82 | 0.34 |
| Inv. Example 2491 | 2.64 | FC | 5.5 | 1.22 | 0 | 0 | 5.26 | 2.11 |
| Inv. Example 2492 | 1.59 | FC | 6.7 | 1.14 | 0 | 0 | 7.06 | 0.80 |
| Inv. Example 2493 | 20.5 | FC | 2.15 | 1.14 | 1.5 | 0 | 0.64 | 5.86 |
| Inv. Example 2494 | 18.5 | FC | 2.54 | 1.13 | 5.5 | 1.6 | 46.8 | 3.08 |
| Inv. Example 2495 | 9.51 | FC | 2.77 | 1.38 | 4.5 | 0 | 16.5 | 1.46 |
| Inv. Example 2496 | 10.01 | FC | 3.68 | 1.22 | 0 | 1.6 | 13.5 | 1.33 |
| Inv. Example 2497 | 3.54 | FC | 5.5 | 1.22 | 0 | 0 | 0.96 | 1.42 |
| Inv. Example 2498 | 4.05 | FC | 2.06 | 1.13 | 0 | 0 | 0.96 | 0.68 |
| Inv. Example 2499 | 8.57 | FC | 4.99 | 1.02 | 0 | 0 | 8.45 | 1.30 |
| Inv. Example 2500 | 0.02 | FC | 6.4 | 1.06 | 1.2 | 0.6 | 2.9 | 0.02 |
| Inv. Example 2501 | 25.5 | FC | 3.09 | 1.07 | 0 | 0 | 5.4 | 2.22 |
| Inv. Example 2502 | 2.36 | FC | 3.99 | 1.22 | 0 | 0 | 10.6 | 1.57 |
| Inv. Example 2503 | 0.05 | FC | 7.72 | 1.38 | 4.5 | 0 | 2.32 | 0.03 |
| Inv. Example 2504 | 0.04 | FC | 8.32 | 1.22 | 0.01 | 0 | 7.8 | 0.03 |

TABLE 88-continued

| | | | | | | | | |
|---|---|---|---|---|---|---|---|---|
| Inv. Example 2505 | 5.22 | FC | 3.55 | 1.12 | 0 | 0 | 7.95 | 0.45 |
| Inv. Example 2506 | 4.01 | FC | 2.64 | 1.23 | 0 | 0 | 20.59 | 2.86 |
| Inv. Example 2507 | 0.05 | FC | 5.2 | 1.33 | 0 | 0.6 | 22.5 | 0.03 |
| Inv. Example 2508 | 10.5 | FC | 1.9 | 1.27 | 0 | 1.2 | 4.6 | 2.33 |
| Inv. Example 2509 | 0.05 | FC | 2.5 | 1.05 | 5.5 | 1.6 | 4.9 | 0.05 |
| Inv. Example 2510 | 10.5 | FC | 0.09 | 1.12 | 0 | 0.01 | 10.5 | 2.33 |
| Inv. Example 2511 | 2.64 | FC | 5.5 | 1.22 | 0 | 0.01 | 8.45 | 0.88 |

| | Mg Contents to Total Metal Particle (mass %) | Coat Properties | | | |
|---|---|---|---|---|---|
| | | Ratio of Metal Particle in Dry Coat (mass %) | Base Resin | Coat Thickness (μm) | Coating Method | Result of Corrosion Test |
| Inv. Example 2489 | 8.5 | 73 | alkyl silicate | 16 | Spraying | very good |
| Inv. Example 2490 | 2.1 | 49 | alkyl silicate | 8 | Spraying | very good |
| Inv. Example 2491 | 0.25 | 43 | alkyl silicate | 16 | Spraying | very good |
| Inv. Example 2492 | 1 | 76 | alkyl silicate | 5 | Spraying | very good |
| Inv. Example 2493 | 2.5 | 75 | alkyl silicate | 18 | Spraying | very good |
| Inv. Example 2494 | 5 | 73 | alkyl silicate | 16 | Spraying | very good |
| Inv. Example 2495 | 5.5 | 55 | alkyl silicate | 5 | Spraying | very good |
| Inv. Example 2496 | 6.5 | 48 | alkyl silicate | 22 | Spraying | very good |
| Inv. Example 2497 | 1.5 | 78 | alkyl silicate | 18 | Spraying | very good |
| Inv. Example 2498 | 5 | 52 | alkyl silicate | 8 | Spraying | very good |
| Inv. Example 2499 | 5.6 | 61 | alkyl silicate | 16 | Spraying | very good |
| Inv. Example 2500 | 0.05 | 77 | polyester resin | 47 | Spraying | very good |
| Inv. Example 2501 | 10.5 | 49 | alkyl silicate | 22 | Spraying | very good |
| Inv. Example 2502 | 0.5 | 80 | alkyl silicate | 21 | Spraying | very good |
| Inv. Example 2503 | 0.75 | 36 | alkyl silicate | 19 | Brushing | very good |
| Inv. Example 2504 | 0.2 | 32 | alkyl silicate | 24 | Spraying | very good |
| Inv. Example 2505 | 10.5 | 55 | alkyl silicate | 19 | Spraying | very good |
| Inv. Example 2506 | 0.4 | 40 | alkyl silicate | 8 | Spraying | very good |
| Inv. Example 2507 | 0.9 | 53 | urethane-based resin | 20 | Brushing | very good |
| Inv. Example 2508 | 3.5 | 60 | polyester resin | 200 | Brushing | very good |
| Inv. Example 2509 | 0.01 | 38 | alkali silicate | 19 | Spraying | very good |
| Inv. Example 2510 | 3.5 | 49 | alkyl silicate | 11 | Spraying | very good |
| Inv. Example 2511 | 2 | 43 | alkyl silicate | 16 | Spraying | very good |

(*1) F: Fracture facets existing, FC: Fracture facets and/or cracks existing, NO: No fracture facet and/or crack

TABLE 89

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Inv. Example 2512 | 0.08 | FC | 5.6 | 1.36 | 0.5 | 0 | 30.5 | 0.08 |
| Inv. Example 2513 | 0.09 | FC | 11.5 | 1.11 | 5.5 | 1.6 | 49.5 | 0.05 |
| Inv. Example 2514 | 0.05 | FC | 19.5 | 1.07 | 0.5 | 0 | 5.9 | 0.03 |
| Inv. Example 2515 | 1.59 | FC | 6.7 | 1.14 | 0 | 0.1 | 4.52 | 0.27 |
| Inv. Example 2516 | 2.58 | FC | 8.9 | 1.13 | 0.01 | 0 | 5.96 | 0.23 |
| Inv. Example 2517 | 9.8 | FC | 8.32 | 1.22 | 3.2 | 0.9 | 5.5 | 2.18 |
| Inv. Example 2518 | 0.18 | FC | 10.05 | 1.14 | 0 | 0.5 | 3.6 | 0.09 |
| Inv. Example 2519 | 7.55 | FC | 2.15 | 1.14 | 0.2 | 0.1 | 16.5 | 1.68 |
| Inv. Example 2520 | 0.01 | FC | 0.06 | 1.23 | 1.5 | 0 | 12.5 | 0.01 |
| Inv. Example 2521 | 12.5 | FC | 2.54 | 1.13 | 0.5 | 0 | 16.5 | 0.06 |
| Inv. Example 2522 | 1.06 | FC | 3.4 | 1.38 | 1.5 | 0.9 | 10.9 | 0.71 |
| Inv. Example 2523 | 0.04 | FC | 8.5 | 1.42 | 0 | 0 | 5.6 | 0.02 |
| Inv. Example 2524 | 0.06 | FC | 7.72 | 1.38 | 0 | 0.5 | 22.6 | 0.06 |
| Inv. Example 2525 | 9.51 | FC | 2.77 | 1.38 | 0 | 0.01 | 20.59 | 0.81 |
| Inv. Example 2526 | 15.5 | FC | 3.68 | 1.22 | 1.5 | 0 | 20.59 | 0.10 |
| Inv. Example 2527 | 0.05 | FC | 10.6 | 1.13 | 0 | 0 | 9.56 | 0.03 |
| Inv. Example 2528 | 8.8 | FC | 5.7 | 1.02 | 0.2 | 0.1 | 5.9 | 2.51 |
| Inv. Example 2529 | 3.54 | FC | 5.5 | 1.22 | 0 | 0.1 | 6.54 | 0.59 |
| Inv. Example 2530 | 10.5 | FC | 3.2 | 1.05 | 5.5 | 1.6 | 21.4 | 1.05 |
| Inv. Example 2531 | 0.07 | FC | 4.5 | 1.24 | 4.5 | 0 | 9.8 | 0.06 |

TABLE 89-continued

| | | | | | | | | |
|---|---|---|---|---|---|---|---|---|
| Inv. Example 2532 | 15.5 | FC | 2.54 | 1.14 | 0 | 0.5 | 6.59 | 8.16 |
| Inv. Example 2533 | 4.05 | FC | 2.06 | 1.13 | 0.2 | 0.1 | 6.54 | 0.36 |

| | Coat Properties | | | | |
|---|---|---|---|---|---|
| | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 2512 | 0.04 | 66 | alkyl silicate | 16 | Brushing | very good |
| Inv. Example 2513 | 1 | 67 | alkali silicate | 33 | Brushing | very good |
| Inv. Example 2514 | 0.5 | 54 | alkyl silicate | 8 | Brushing | good |
| Inv. Example 2515 | 5 | 76 | alkyl silicate | 5 | Spraying | very good |
| Inv. Example 2516 | 10 | 49 | alkyl silicate | 22 | Spraying | very good |
| Inv. Example 2517 | 3.5 | 32 | alkyl silicate | 23 | Spraying | very good |
| Inv. Example 2518 | 0.9 | 53 | epoxy-based resin | 30 | Spraying | very good |
| Inv. Example 2519 | 3.5 | 75 | alkyl silicate | 18 | Spraying | very good |
| Inv. Example 2520 | 0.0005 | 75 | alkali silicate | 5 | Spraying | good |
| Inv. Example 2521 | 205.7 | 73 | alkyl silicate | 16 | Spraying | very good |
| Inv. Example 2522 | 0.5 | 49 | alkyl silicate | 8 | Spraying | very good |
| Inv. Example 2523 | 1.2 | 40 | alkali silicate | 2 | Spraying | very good |
| Inv. Example 2524 | 0.02 | 36 | alkyl silicate | 18 | Spraying | very good |
| Inv. Example 2525 | 10.8 | 55 | alkyl silicate | 5 | Spraying | very good |
| Inv. Example 2526 | 152.3 | 48 | alkyl silicate | 22 | Spraying | very good |
| Inv. Example 2527 | 0.5 | 67 | acryl-based resin | 77 | Brushing | very good |
| Inv. Example 2528 | 2.5 | 72 | urethane-based resin | 54 | Brushing | very good |
| Inv. Example 2529 | 5 | 78 | alkyl silicate | 18 | Spraying | very good |
| Inv. Example 2530 | 9 | 34 | epoxy-based resin | 43 | Spraying | very good |
| Inv. Example 2531 | 0.1 | 43 | acryl-based resin | 52 | Brushing | very good |
| Inv. Example 2532 | 0.9 | 45 | alkyl silicate | 19 | Spraying | very good |
| Inv. Example 2533 | 10.2 | 52 | polyester resin | 8 | Spraying | very good |

(*1) F: Fracture facets existing, FC: Fracture facets and/or cracks existing, NO: No fracture facet and/or crack

TABLE 90

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Inv. Example 2534 | 8.57 | FC | 4.99 | 1.02 | 1.2 | 0.6 | 16.5 | 0.07 |
| Inv. Example 2535 | 5.8 | FC | 6.4 | 1.06 | 0 | 0 | 7.8 | 1.66 |
| Inv. Example 2536 | 4.59 | FC | 3.09 | 1.07 | 1.5 | 0.9 | 16.5 | 0.62 |
| Inv. Example 2537 | 9.88 | FC | 4.66 | 1.42 | 0 | 1.2 | 6.54 | 0.46 |
| Inv. Example 2538 | 4.55 | FC | 4.09 | 1.38 | 0 | 0.6 | 8.45 | 0.48 |
| Inv. Example 2539 | 2.36 | FC | 3.99 | 1.22 | 0 | 0.01 | 8.5 | 1.18 |
| Inv. Example 2540 | 0.05 | FC | 7.72 | 1.38 | 1.5 | 0 | 13.6 | 0.05 |
| Inv. Example 2541 | 0.04 | FC | 8.32 | 1.22 | 5.5 | 1.6 | 12.33 | 0.02 |
| Inv. Example 2542 | 2.64 | FC | 4.55 | 1.11 | 4.5 | 0 | 16.5 | 0.48 |
| Inv. Example 2543 | 0.06 | FC | 10.6 | 1.13 | 0 | 0.1 | 7.9 | 0.04 |
| Inv. Example 2544 | 0.18 | FC | 5.7 | 1.02 | 0.01 | 0 | 10.5 | 0.11 |
| Inv. Example 2545 | 6.31 | FC | 3.52 | 1.27 | 3.2 | 0.9 | 16.5 | 4.21 |
| Inv. Example 2546 | 5.22 | FC | 3.55 | 1.12 | 0 | 0.5 | 10.64 | 1.49 |
| Inv. Example 2547 | 28.5 | FC | 2.64 | 1.23 | 0.2 | 0.1 | 10.5 | 0.90 |
| Inv. Example 2548 | 3.52 | FC | 3.15 | 1.36 | 1.2 | 0.6 | 20.59 | 2.82 |
| Inv. Example 2549 | 9.5 | FC | 5.2 | 1.33 | 0 | 0 | 8.5 | 2.79 |
| Inv. Example 2550 | 0.04 | FC | 1.9 | 1.27 | 0 | 0 | 0.5 | 0.00 |
| Inv. Example 2551 | 0.06 | FC | 10.5 | 1.12 | 0 | 1.2 | 10.5 | 0.01 |
| Inv. Example 2552 | 0.05 | FC | 12.5 | 1.23 | 0.5 | 0 | 11.5 | 0.01 |
| Inv. Example 2553 | 5.6 | FC | 18.5 | 1.36 | 3.2 | 0.9 | 36.5 | 1.60 |
| Inv. Example 2554 | 0.01 | FC | 11.5 | 1.11 | 0.5 | 0 | 1.5 | 0.01 |
| Inv. Example 2555 | 0.08 | FC | 9.6 | 1.07 | 1.5 | 0 | 8.7 | 0.03 |

| | Coat Properties | | | | |
|---|---|---|---|---|---|
| | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 2534 | 120.5 | 61 | polyester resin | 16 | Spraying | very good |
| Inv. Example 2535 | 2.5 | 77 | alkyl silicate | 20 | Spraying | very good |
| Inv. Example 2536 | 6.4 | 49 | alkyl silicate | 22 | Spraying | very good |

TABLE 90-continued

| | | | | | | |
|---|---|---|---|---|---|---|
| Inv. Example 2537 | 20.4 | 79 | alkyl silicate | 18 | Spraying | very good |
| Inv. Example 2538 | 8.5 | 76 | alkyl silicate | 18 | Spraying | very good |
| Inv. Example 2539 | 1 | 80 | alkyl silicate | 21 | Spraying | very good |
| Inv. Example 2540 | 0.07 | 36 | alkyl silicate | 19 | Brushing | very good |
| Inv. Example 2541 | 1.1 | 32 | alkyl silicate | 24 | Spraying | very good |
| Inv. Example 2542 | 4.5 | 43 | alkyl silicate | 5 | Spraying | very good |
| Inv. Example 2543 | 0.5 | 67 | alkyl silicate | 7 | Spraying | very good |
| Inv. Example 2544 | 0.7 | 72 | epoxy-based resin | 100 | Spraying | very good |
| Inv. Example 2545 | 0.5 | 51 | alkyl silicate | 21 | Spraying | very good |
| Inv. Example 2546 | 2.5 | 55 | alkyl silicate | 19 | Spraying | very good |
| Inv. Example 2547 | 30.5 | 40 | alkyl silicate | 8 | Spraying | very good |
| Inv. Example 2548 | 0.25 | 51 | alkyl silicate | 16 | Spraying | very good |
| Inv. Example 2549 | 2.4 | 53 | alkyl silicate | 20 | Brushing | very good |
| Inv. Example 2550 | 7.5 | 60 | polyester resin | 200 | Brushing | very good |
| Inv. Example 2551 | 3.5 | 77 | alkyl silicate | 25 | Spraying | very good |
| Inv. Example 2552 | 3.9 | 43 | alkali silicate | 14 | Spraying | very good |
| Inv. Example 2553 | 2.5 | 52 | urethane-based resin | 112 | Spraying | very good |
| Inv. Example 2554 | 0.7 | 66 | alkali silicate | 24 | Spraying | very good |
| Inv. Example 2555 | 1.9 | 72 | urethane-based resin | 150 | Spraying | very good |

(*1) F: Fracture facets existing, FC: Fracture facets and/or cracks existing, NO: No fracture facet and/or crack

TABLE 91

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mean Size of Zn Metallic particle (μm) | Blend Ratio (Zn Alloy particle:Zn Metal Particle) |
| Inv. Example 2556 | 0.03 | FC | 8.5 | 1.42 | 4.5 | 0 | 7.8 | 0.01 |
| Inv. Example 2557 | 4.25 | FC | 2.36 | 1.33 | 0 | 0.1 | 5.96 | 3.27 |
| Inv. Example 2558 | 0.04 | FC | 23.5 | 1.42 | 1.5 | 0.9 | 0.06 | 0.04 |
| Inv. Example 2559 | 0.06 | FC | 101.5 | 1.38 | 1.5 | 0.9 | 0.9 | 0.06 |
| Inv. Example 2560 | 0.06 | FC | 55.4 | 1.38 | 3.2 | 0.9 | 3.6 | 0.06 |
| Inv. Example 2561 | 0.07 | FC | 10.5 | 1.12 | 0 | 0.6 | 10.5 | 0.02 |
| Inv. Example 2562 | 0.01 | FC | 12.5 | 1.23 | 1.2 | 0.6 | 0.05 | 0.01 |
| Inv. Example 2563 | 0.08 | FC | 18.5 | 1.36 | 0.01 | 0 | 2.32 | 0.04 |
| Inv. Example 2564 | 0.09 | FC | 11.5 | 1.11 | 1.5 | 0.9 | 20.4 | 0.08 |
| Inv. Example 2565 | 0.05 | FC | 9.6 | 1.07 | 0 | 1.2 | 7.34 | 0.01 |
| Inv. Example 2566 | 0.06 | FC | 10.05 | 1.14 | 0 | 0.6 | 9.4 | 0.02 |
| Inv. Example 2567 | 29.9 | FC | 10.5 | 1.36 | 0 | 0 | 16.5 | 0.15 |
| Inv. Example 2568 | 16.5 | FC | 7.5 | 1.11 | 0.01 | 0 | 7.9 | 1.03 |
| Inv. Example 2569 | 12.5 | FC | 2.6 | 1.07 | 3.2 | 0.9 | 10.5 | 2.08 |
| Inv. Example 2570 | 9.8 | FC | 3.5 | 1.42 | 0 | 0.5 | 16.5 | 3.92 |
| Inv. Example 2571 | 9.6 | FC | 4.5 | 1.33 | 0.2 | 0.1 | 8.5 | 0.12 |
| Inv. Example 2572 | 7.5 | FC | 1.6 | 1.42 | 0 | 0.5 | 10.5 | 1.25 |
| Inv. Example 2573 | 4.6 | FC | 2.5 | 1.12 | 5.8 | 0.1 | 5.8 | 0.40 |
| Inv. Example 2574 | 3.8 | FC | 23.5 | 1.23 | 1.2 | 0.6 | 1.2 | 1.09 |
| Inv. Example 2575 | 0.05 | FC | 9.8 | 1.27 | 15.5 | 0 | 15.5 | 0.03 |

| | Coat Properties | | | | |
|---|---|---|---|---|---|
| | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 2556 | 4.5 | 40 | alkali silicate | 18 | Spraying | very good |
| Inv. Example 2557 | 0.3 | 44 | alkyl silicate | 18 | Spraying | very good |
| Inv. Example 2558 | 0.08 | 44 | alkali silicate | 38 | Spraying | very good |
| Inv. Example 2559 | 0.05 | 36 | alkyl silicate | 18 | Spraying | very good |
| Inv. Example 2560 | 0.005 | 76 | alkyl silicate | 10 | Spraying | very good |
| Inv. Example 2561 | 2.8 | 77 | alkyl silicate | 37 | Spraying | very good |
| Inv. Example 2562 | 0.6 | 43 | alkali silicate | 2 | Spraying | good |
| Inv. Example 2563 | 1 | 52 | alkyl silicate | 160 | Brushing | very good |
| Inv. Example 2564 | 0.09 | 66 | alkali silicate | 5 | Brushing | very good |
| Inv. Example 2565 | 3.4 | 72 | alkyl silicate | 56 | Brushing | very good |
| Inv. Example 2566 | 1.5 | 53 | urethane-based resin | 99 | Spraying | very good |
| Inv. Example 2567 | 200 | 55 | urethane-based resin | 700 | Spraying | very good |
| Inv. Example 2568 | 15 | 47 | alkyl silicate | 554 | Spraying | very good |
| Inv. Example 2569 | 5 | 79 | urethane-based resin | 688 | Brushing | very good |

TABLE 91-continued

| | | | | | | |
|---|---|---|---|---|---|---|
| Inv. Example 2570 | 1.5 | 42 | urethane-based resin | 421 | Spraying | very good |
| Inv. Example 2571 | 78 | 36 | urethane-based resin | 651 | Spraying | very good |
| Inv. Example 2572 | 5 | 53 | urethane-based resin | 402 | Brushing | very good |
| Inv. Example 2573 | 10.5 | 55 | alkali silicate | 354 | Spraying | very good |
| Inv. Example 2574 | 2.5 | 42 | urethane-based resin | 504 | Brushing | very good |
| Inv. Example 2575 | 1 | 76 | urethane-based resin | 666 | Spraying | very good |

(*1) F: Fracture facets existing, FC: Fracture facets and/or cracks existing, NO: No fracture facet and/or crack

Example 7

Zn alloy particles with the chemical ingredients shown in Tables 92 to 108 were produced in the same way as in Example 5. At the time of preparing the paint, four commercially available organic-based binders were used. The rest is the same as Example 5.

The Mg solid solution phase was identified by the X-ray diffraction method. The Zn—Mg intermetallic compounds were identified by analysis of the ratio of composition of the Mg and Zn at the physical fracture facets or crack surfaces by the X-ray diffraction method or by observation by a scanning electron microscopy with an energy dispersion type X-ray analyzer. The composition was $MgZn_2$, $Mg_2Zn_{11}$, $Mg_2Zn_3$, $MgZn$, or $Mg_7Zn_3$.

From Tables 92 to 108, it is learned that due to the surfaces of the particles including fractured parts and/or cracks having a Mg solid solution phase and Zn—Mg intermetallic compounds, the painting test pieces using the Zn alloy particles of the present invention are improved in corrosion resistance and rust protection.

TABLE 92

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ |
| Inv. Example 277 | 17.3 | F | 29.24 | 1.37 | 11.4 | 0.24 | Existence | No |
| Inv. Example 278 | 18.5 | F | 1.28 | 1.10 | 0.04 | 0.03 | Existence | No |
| Inv. Example 279 | 19.3 | F | 33.57 | 1.04 | 0.25 | 0.07 | Existence | No |
| Inv. Example 280 | 3.5 | F | 3.04 | 1.02 | 5.43 | 0.65 | Existence | No |
| Inv. Example 281 | 22.5 | F | 7.54 | 1.01 | 17.5 | 2.41 | Existence | No |
| Inv. Example 282 | 23.7 | F | 68.12 | 1.08 | 0.01 | 0.08 | Existence | No |
| Inv. Example 283 | 24.2 | F | 0.52 | 1.14 | 0.02 | 2.23 | Existence | No |
| Inv. Example 284 | 0.2 | F | 0.12 | 1.23 | 0.02 | 0.06 | Existence | No |
| Inv. Example 285 | 27.1 | F | 58.74 | 1.33 | 0.04 | 0.02 | Existence | No |
| Inv. Example 286 | 29.3 | F | 13.57 | 1.37 | 0.05 | 0.02 | Existence | No |
| Inv. Example 287 | 0.5 | F | 6.4 | 1.44 | 1.24 | 1.37 | Existence | No |
| Inv. Example 288 | 2.7 | F | 41.23 | 1.21 | 27.5 | 2.43 | Existence | No |
| Inv. Example 289 | 28.4 | F | 0.72 | 1.22 | 0.01 | 0.02 | Existence | No |
| Inv. Example 290 | 8.7 | F | 1.18 | 1.23 | 0.01 | 0.01 | Existence | No |
| Inv. Example 291 | 9.2 | F | 7.12 | 1.47 | 0.02 | 0.05 | Existence | No |
| Inv. Example 292 | 17.8 | F | 8.01 | 1.01 | 0.03 | 0.04 | Existence | No |
| Inv. Example 293 | 20.2 | F | 0.84 | 1.04 | 7.78 | 0.24 | Existence | No |
| Inv. Example 294 | 0.4 | F | 87.65 | 1.05 | 0.04 | 0.06 | Existence | No |
| Inv. Example 295 | 13.7 | F | 2.59 | 1.12 | 11.21 | 0.74 | Existence | No |
| Inv. Example 296 | 14.7 | F | 93.45 | 1.11 | 0.09 | 0.01 | Existence | No |
| Inv. Example 297 | 2.4 | F | 9.84 | 1.08 | 5.41 | 1.27 | Existence | No |
| Inv. Example 298 | 4.5 | F | 5.45 | 1.47 | 0.02 | 0.03 | Existence | No |
| Inv. Example 299 | 0.1 | F | 1.08 | 1.50 | 0.02 | 0.07 | Existence | No |
| Inv. Example 300 | 30.0 | F | 180.24 | 1.13 | 0.03 | 0.08 | Existence | Existence |
| Inv. Example 301 | 24.5 | F | 11.4 | 1.04 | 11.04 | 0.21 | Existence | Existence |

| | Coat Properties | | | | | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 277 | 37.45 | 300:1 | 17.24 | 44 | alkali silicate | 35 | Spraying | very good |
| Inv. Example 278 | 2.56 | 65:1 | 18.22 | 54 | alkyl silicate | 15 | Spraying | very good |

TABLE 92-continued

| | | | | | | | | |
|---|---|---|---|---|---|---|---|---|
| Inv. Example 279 | 17.87 | 300:1 | 19.24 | 79 | alkali silicate | 45 | Spraying | very good |
| Inv. Example 280 | 6.87 | 65:1 | 3.49 | 73 | alkyl silicate | 12 | Spraying | very good |
| Inv. Example 281 | 22.54 | 300:1 | 22.43 | 69 | alkali silicate | 16 | Brushing | very good |
| Inv. Example 282 | 29.54 | 150:1 | 23.54 | 63 | alkyl silicate | 70 | Brushing | very good |
| Inv. Example 283 | 3.89 | 300:1 | 24.12 | 35 | alkali silicate | 2 | Brushing | very good |
| Inv. Example 284 | 4.56 | 65:1 | 0.20 | 35 | alkyl silicate | 65 | Brushing | very good |
| Inv. Example 285 | 35.64 | 300:1 | 27.01 | 72 | alkali silicate | 29 | Spraying | very good |
| Inv. Example 286 | 26.41 | 150:1 | 29.11 | 46 | alkyl silicate | 28 | Spraying | very good |
| Inv. Example 287 | 7.89 | 300:1 | 0.50 | 34 | alkali silicate | 14 | Spraying | very good |
| Inv. Example 288 | 17.54 | 70:1 | 2.66 | 66 | alkyl silicate | 62 | Brushing | very good |
| Inv. Example 289 | 7.78 | 300:1 | 28.31 | 72 | alkali silicate | 4 | Brushing | very good |
| Inv. Example 290 | 6.54 | 100:1 | 8.61 | 40 | alkyl silicate | 6 | Brushing | very good |
| Inv. Example 291 | 10.28 | 250:1 | 9.16 | 36 | alkali silicate | 15 | Spraying | very good |
| Inv. Example 292 | 9.98 | 150:1 | 17.68 | 32 | alkyl silicate | 17 | Spraying | very good |
| Inv. Example 293 | 5.64 | 170:1 | 20.08 | 53 | alkali silicate | 2 | Spraying | very good |
| Inv. Example 294 | 31.24 | 300:1 | 0.40 | 67 | alkyl silicate | 90 | Brushing | very good |
| Inv. Example 295 | 18.54 | 200:1 | 13.63 | 72 | alkali silicate | 12 | Brushing | very good |
| Inv. Example 296 | 16.78 | 300:1 | 14.65 | 77 | alkyl silicate | 110 | Brushing | very good |
| Inv. Example 297 | 3.65 | 150:1 | 2.38 | 54 | alkali silicate | 27 | Spraying | very good |
| Inv. Example 298 | 8.54 | 300:1 | 4.49 | 62 | alkyl silicate | 16 | Spraying | very good |
| Inv. Example 299 | 3.45 | 65:1 | 0.10 | 66 | alkali silicate | 15 | Spraying | very good |
| Inv. Example 300 | 34.87 | 80:1 | 29.63 | 67 | alkyl silicate | 198 | Brushing | very good |
| Inv. Example 301 | 22.14 | 1:15 | 1.53 | 68 | alkali silicate | 25 | Brushing | very good |

(*1) F: Fracture facets existing, FC: Fracture facets and/or cracks existing, NO: No fracture facet and/or crack

TABLE 93

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ |
|---|---|---|---|---|---|---|---|---|
| Inv. Example 302 | 27.6 | F | 38.75 | 1.02 | 0.01 | 0.02 | Existence | Existence |
| Inv. Example 303 | 4.1 | F | 119.87 | 1.08 | 0.07 | 0.04 | Existence | Existence |
| Inv. Example 304 | 3.2 | F | 1.42 | 1.15 | 0.08 | 0.01 | Existence | Existence |
| Inv. Example 305 | 2.7 | F | 12.5 | 1.34 | 0.04 | 0.03 | Existence | Existence |
| Inv. Example 306 | 0.12 | F | 31.24 | 1.25 | 0.02 | 0.04 | Existence | Existence |
| Inv. Example 307 | 0.22 | F | 152.46 | 1.19 | 0.02 | 0.02 | Existence | Existence |
| Inv. Example 308 | 0.37 | F | 13.4 | 1.18 | 4.12 | 0.61 | Existence | Existence |
| Inv. Example 309 | 1.4 | F | 1.61 | 1.24 | 0.05 | 0.02 | Existence | Existence |
| Inv. Example 310 | 4.2 | F | 14.1 | 1.11 | 2.14 | 0.74 | Existence | Existence |
| Inv. Example 311 | 4.8 | F | 1.67 | 1.27 | 0.03 | 0.02 | Existence | Existence |
| Inv. Example 312 | 8.1 | F | 1.45 | 1.31 | 0.03 | 0.04 | Existence | Existence |
| Inv. Example 313 | 7.6 | F | 14.8 | 1.26 | 0.04 | 0.05 | Existence | Existence |
| Inv. Example 314 | 9.9 | F | 1.31 | 1.14 | 7.54 | 1.24 | Existence | Existence |
| Inv. Example 315 | 14.8 | F | 15.5 | 1.34 | 0.08 | 0.06 | Existence | Existence |
| Inv. Example 316 | 16.7 | F | 0.67 | 1.16 | 0.01 | 0.07 | Existence | Existence |
| Inv. Example 317 | 17.9 | F | 137.89 | 1.47 | 29.8 | 0.75 | Existence | Existence |
| Inv. Example 318 | 19.5 | F | 1.63 | 1.48 | 0.01 | 0.02 | Existence | Existence |
| Inv. Example 319 | 22.4 | F | 1.12 | 1.49 | 0.03 | 0.01 | Existence | Existence |

TABLE 93-continued

| | | | | | | | |
|---|---|---|---|---|---|---|---|
| Inv. Example 320 | 0.17 | F | 169.88 | 1.34 | 0.02 | 0.01 | Existence | Existence |
| Inv. Example 321 | 8.3 | F | 1.72 | 1.29 | 8.04 | 1.24 | Existence | Existence |
| Inv. Example 322 | 6.5 | F | 10.5 | 1.18 | 0.06 | 0.04 | Existence | Existence |
| Inv. Example 323 | 9.7 | F | 17.7 | 1.23 | 0.08 | 0.02 | Existence | Existence |
| Inv. Example 324 | 11.4 | F | 122.54 | 1.27 | 0.03 | 0.01 | Existence | Existence |
| Inv. Example 325 | 22.5 | F | 1.84 | 1.17 | 0.04 | 0.03 | Existence | Existence |
| Inv. Example 326 | 25.7 | F | 19.1 | 1.16 | 7.42 | 1.22 | Existence | Existence |
| Inv. Example 327 | 17.8 | F | 1.75 | 1.49 | 0.02 | 0.01 | Existence | Existence |
| Inv. Example 328 | 0.14 | F | 198.78 | 1.34 | 0.08 | 0.02 | Existence | Existence |

| | | | | | Coat Properties | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 302 | 25.87 | 200:1 | 27.46 | 33 | alkyl silicate | 45 | Brushing | very good |
| Inv. Example 303 | 38.74 | 65:1 | 4.04 | 35 | epoxy-based resin | 130 | Brushing | very good |
| Inv. Example 304 | 3.64 | 300:1 | 3.19 | 43 | acryl-based resin | 15 | Spraying | very good |
| Inv. Example 305 | 24.5 | 70:1 | 2.66 | 44 | urethane-based resin | 18 | Spraying | very good |
| Inv. Example 306 | 38.5 | 65:1 | 0.12 | 42 | polyester resin | 41 | Spraying | very good |
| Inv. Example 307 | 38.42 | 65:1 | 0.22 | 33 | epoxy-based resin | 170 | Brushing | very good |
| Inv. Example 308 | 5.87 | 50:1 | 0.36 | 30 | acryl-based resin | 22 | Brushing | very good |
| Inv. Example 309 | 3.46 | 30:1 | 1.35 | 35 | urethane-based resin | 6 | Brushing | very good |
| Inv. Example 310 | 17.45 | 20:1 | 4.00 | 37 | polyester resin | 21 | Spraying | very good |
| Inv. Example 311 | 3.66 | 100:1 | 4.75 | 30 | epoxy-based resin | 7 | Spraying | very good |
| Inv. Example 312 | 6.45 | 80:1 | 8.00 | 80 | acryl-based resin | 5 | Spraying | very good |
| Inv. Example 313 | 21.7 | 200:1 | 7.56 | 35 | urethane-based resin | 21 | Spraying | very good |
| Inv. Example 314 | 7.74 | 150:1 | 9.83 | 43 | polyester resin | 12 | Spraying | very good |
| Inv. Example 315 | 2.45 | 85:1 | 14.63 | 55 | epoxy-based resin | 24 | Spraying | very good |
| Inv. Example 316 | 8.59 | 70:1 | 16.46 | 76 | acryl-based resin | 2 | Spraying | very good |
| Inv. Example 317 | 24.78 | 1:99 | 0.18 | 65 | urethane-based resin | 154 | Brushing | very good |
| Inv. Example 318 | 3.78 | 1:60 | 0.32 | 73 | polyester resin | 12 | Brushing | very good |
| Inv. Example 319 | 6.54 | 1:15 | 1.40 | 54 | epoxy-based resin | 8 | Brushing | very good |
| Inv. Example 320 | 33.78 | 90:1 | 0.17 | 62 | acryl-based resin | 180 | Brushing | very good |
| Inv. Example 321 | 3.25 | 120:1 | 8.23 | 68 | urethane-based resin | 5 | Spraying | very good |
| Inv. Example 322 | 19.84 | 100:1 | 6.44 | 35 | polyester resin | 23 | Spraying | very good |
| Inv. Example 323 | 26.78 | 1:60 | 0.16 | 37 | epoxy-based resin | 35 | Spraying | very good |
| Inv. Example 324 | 37.54 | 130:1 | 11.31 | 38 | acryl-based resin | 138 | Brushing | very good |
| Inv. Example 325 | 5.47 | 160:1 | 22.36 | 41 | urethane-based resin | 5 | Spraying | very good |
| Inv. Example 326 | 24.51 | 100:1 | 25.45 | 54 | polyester resin | 28 | Spraying | very good |
| Inv. Example 327 | 5.55 | 50:1 | 17.45 | 57 | epoxy-based resin | 7 | Brushing | very good |
| Inv. Example 328 | 38.47 | 1:80 | 0.00 | 33 | acryl-based resin | 199 | Brushing | very good |

(*1) F: Fracture facets existing, FC: Fracture facets and/or cracks existing, NO: No fracture facet and/or crack

TABLE 94

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ |
| Inv. Example 1599 | 0.15 | FC | 0.02 | 1.05 | 0.1 | 0.07 | Existence | Existence |
| Inv. Example 1600 | 0.19 | FC | 10.5 | 1.12 | 0.04 | 0.1 | Existence | Existence |
| Inv. Example 1601 | 0.18 | FC | 12.5 | 1.23 | 30.0 | 0.01 | Existence | No |
| Inv. Example 1602 | 0.11 | FC | 18.5 | 1.36 | 0.02 | 3 | Existence | Existence |
| Inv. Example 1603 | 0.15 | FC | 11.5 | 1.11 | 0 | 0 | Existence | No |
| Inv. Example 1604 | 0.24 | FC | 9.6 | 1.07 | 0 | 0 | Existence | Existence |
| Inv. Example 1605 | 0.18 | FC | 8.5 | 1.42 | 10.4 | 0.57 | Existence | No |
| Inv. Example 1606 | 0.12 | FC | 7.72 | 1.38 | 4.65 | 2.67 | Existence | Existence |
| Inv. Example 1607 | 0.19 | FC | 8.32 | 1.22 | 24.8 | 2.4 | Existence | No |
| Inv. Example 1608 | 0.18 | FC | 10.05 | 1.14 | 4.52 | 0.57 | Existence | No |
| Inv. Example 1609 | 0.21 | FC | 10.6 | 1.13 | 17.5 | 2.45 | Existence | Existence |
| Inv. Example 1610 | 0.76 | FC | 5.7 | 1.02 | 0 | 0 | Existence | No |
| Inv. Example 1611 | 0.11 | FC | 6.4 | 1.06 | 11.05 | 0.23 | Existence | Existence |
| Inv. Example 1612 | 0.14 | FC | 3.2 | 1.05 | 2.65 | 0.74 | Existence | Existence |
| Inv. Example 1613 | 15 | FC | 4.5 | 1.24 | 6.45 | 2.14 | Existence | No |
| Inv. Example 1614 | 14.5 | FC | 5.2 | 1.33 | 0 | 0 | Existence | No |
| Inv. Example 1615 | 18.5 | FC | 1.9 | 1.27 | 0 | 0 | Existence | Existence |
| Inv. Example 1616 | 15.1 | FC | 0.02 | 1.05 | 0.05 | 0.03 | Existence | No |
| Inv. Example 1617 | 15.6 | FC | 10.5 | 1.12 | 0 | 0.08 | Existence | No |
| Inv. Example 1618 | 12.5 | FC | 12.5 | 1.23 | 0.05 | 0 | Existence | Existence |
| Inv. Example 1619 | 18.7 | FC | 18.5 | 1.36 | 0.44 | 0.07 | Existence | Existence |
| Inv. Example 1620 | 14.5 | FC | 11.5 | 1.11 | 0.08 | 0.07 | Existence | Existence |

| | Coat Properties | | | | | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 1599 | 2.04 | 5:2 | 0.11 | 35 | alkali silicate | 2 | Spraying | very good |
| Inv. Example 1600 | 50.00 | 7:1 | 0.17 | 77 | alkyl silicate | 37 | Spraying | very good |
| Inv. Example 1601 | 2.45 | 68:1 | 0.16 | 43 | alkali silicate | 2 | Spraying | good |
| Inv. Example 1602 | 5.33 | 10:1 | 0.10 | 52 | alkyl silicate | 160 | Brushing | very good |
| Inv. Example 1603 | 2.41 | 25:7 | 0.12 | 66 | alkali silicate | 5 | Brushing | very good |
| Inv. Example 1604 | 23.43 | 300:9 | 0.23 | 72 | alkyl silicate | 56 | Brushing | very good |
| Inv. Example 1605 | 6.03 | 180:1 | 0.18 | 40 | alkali silicate | 2 | Spraying | very good |
| Inv. Example 1606 | 24.5 | 23:1 | 0.12 | 36 | alkyl silicate | 18 | Spraying | very good |
| Inv. Example 1607 | 5.32 | 165:1 | 0.19 | 32 | alkyl silicate | 23 | Spraying | very good |
| Inv. Example 1608 | 14.34 | 300:1 | 0.18 | 53 | epoxy-based resin | 30 | Brushing | very good |
| Inv. Example 1609 | 5.04 | 120:1 | 0.21 | 67 | acryl-based resin | 77 | Brushing | very good |
| Inv. Example 1610 | 2.32 | 2:9 | 0.14 | 72 | urethane-based resin | 54 | Brushing | very good |
| Inv. Example 1611 | 20.34 | 119:3 | 0.11 | 77 | polyester resin | 47 | Spraying | very good |
| Inv. Example 1612 | 12.33 | 233:1 | 0.14 | 34 | epoxy-based resin | 43 | Spraying | very good |
| Inv. Example 1613 | 17.84 | 1:132 | 0.11 | 43 | acryl-based resin | 52 | Brushing | very good |
| Inv. Example 1614 | 6.66 | 1:55 | 10.24 | 53 | urethane-based resin | 20 | Brushing | very good |
| Inv. Example 1615 | 3.65 | 1:23 | 0.77 | 60 | polyester resin | 200 | Brushing | very good |
| Inv. Example 1616 | 22.62 | 200:1 | 15.02 | 35 | alkali silicate | 22 | Spraying | very good |
| Inv. Example 1617 | 45.33 | 1:15 | 0.98 | 77 | alkyl silicate | 25 | Spraying | very good |
| Inv. Example 1618 | 43.22 | 1:10 | 1.14 | 43 | alkali silicate | 14 | Spraying | very good |

TABLE 94-continued

| | 12.33 | 1:6 | 2.67 | 52 | urethane-based resin | 112 | Spraying | very good |
|---|---|---|---|---|---|---|---|---|
| Inv. Example 1619 | | | | | | | | |
| | 13.42 | 1:45 | 0.32 | 66 | alkali silicate | 24 | Spraying | very good |
| Inv. Example 1620 | | | | | | | | |

(*1) F: Fracture facets existing, FC: Fracture facets and/or cracks existing, NO: No fracture facet and/or crack

TABLE 95

Zn-Alloy Particle Properties

| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ |
|---|---|---|---|---|---|---|---|---|
| Inv. Example 1621 | 7.5 | FC | 9.6 | 1.07 | 0.1 | 0.2 | Existence | No |
| Inv. Example 1622 | 4.5 | FC | 8.5 | 1.42 | 0 | 0 | Existence | Existence |
| Inv. Example 1623 | 1.5 | FC | 7.72 | 1.38 | 0 | 0 | Existence | Existence |
| Inv. Example 1624 | 4.8 | FC | 8.32 | 1.22 | 0 | 0.07 | Existence | Existence |
| Inv. Example 1625 | 9.6 | FC | 10.05 | 1.14 | 0 | 0.02 | Existence | No |
| Inv. Example 1626 | 11.5 | FC | 10.6 | 1.13 | 25.8 | 0.05 | Existence | Existence |
| Inv. Example 1627 | 9.8 | FC | 5.7 | 1.02 | 22.1 | 0 | Existence | Existence |
| Inv. Example 1628 | 7.6 | FC | 6.4 | 1.06 | 21.5 | 0.05 | Existence | Existence |
| Inv. Example 1629 | 3.2 | FC | 3.2 | 1.05 | 0.05 | 2.29 | Existence | No |
| Inv. Example 1630 | 1.9 | FC | 4.5 | 1.24 | 0.05 | 0.03 | Existence | Existence |
| Inv. Example 1631 | 11.5 | FC | 5.2 | 1.33 | 0 | 0.08 | Existence | Existence |
| Inv. Example 1632 | 8.7 | FC | 1.9 | 1.27 | 0 | 0 | Existence | No |
| Inv. Example 1633 | 9.6 | FC | 0.02 | 1.05 | 0 | 0 | Existence | Existence |
| Inv. Example 1634 | 9.4 | FC | 10.5 | 1.12 | 0.08 | 0.07 | Existence | No |
| Inv. Example 1635 | 10.5 | FC | 12.5 | 1.23 | 0.1 | 0.2 | Existence | Existence |
| Inv. Example 1636 | 12.6 | FC | 18.5 | 1.36 | 0.05 | 0.2 | Existence | No |
| Inv. Example 1637 | 29.5 | FC | 11.5 | 1.11 | 0.07 | 0 | Existence | Existence |
| Inv. Example 1638 | 29.4 | FC | 9.6 | 1.07 | 0 | 0.07 | Existence | Existence |
| Inv. Example 1639 | 27.5 | FC | 8.5 | 1.42 | 0 | 0.02 | Existence | Existence |
| Inv. Example 1640 | 0.8 | FC | 7.72 | 1.38 | 25.8 | 0.05 | Existence | Existence |
| Inv. Example 1641 | 1.6 | FC | 8.32 | 1.22 | 22.1 | 0 | Existence | No |
| Inv. Example 1642 | 22.9 | FC | 10.05 | 1.14 | 21.5 | 0.05 | Existence | No |

Coat Properties

| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
|---|---|---|---|---|---|---|---|---|
| Inv. Example 1621 | 22.32 | 1:50 | 0.15 | 72 | urethane-based resin | 150 | Spraying | very good |
| Inv. Example 1622 | 7.34 | 1:9 | 0.45 | 40 | alkali silicate | 18 | Spraying | very good |
| Inv. Example 1623 | 44.54 | 1:7 | 0.19 | 36 | alkyl silicate | 19 | Brushing | very good |
| Inv. Example 1624 | 32.87 | 1:4 | 0.96 | 32 | alkyl silicate | 24 | Spraying | very good |
| Inv. Example 1625 | 20.32 | 1:14 | 0.64 | 53 | urethane-based resin | 99 | Spraying | very good |
| Inv. Example 1626 | 2.03 | 1:11 | 0.96 | 67 | alkyl silicate | 7 | Spraying | very good |
| Inv. Example 1627 | 5.33 | 1:28 | 0.34 | 72 | epoxy-based resin | 100 | Spraying | very good |
| Inv. Example 1628 | 2.33 | 1:4 | 1.52 | 77 | alkyl silicate | 27 | Brushing | very good |
| Inv. Example 1629 | 27.44 | 250:1 | 3.19 | 34 | alkali silicate | 15 | Spraying | very good |
| Inv. Example 1630 | 12.33 | 1:1 | 0.95 | 43 | alkyl silicate | 14 | Spraying | very good |
| Inv. Example 1631 | 36.43 | 1:4 | 2.30 | 53 | urethane-based resin | 55 | Spraying | very good |
| Inv. Example 1632 | 12.33 | 1:12 | 0.67 | 35 | alkyl silicate | 8 | Spraying | very good |
| Inv. Example 1633 | 3.21 | 70:1 | 9.46 | 77 | urethane-based resin | 122 | Brushing | very good |
| Inv. Example 1634 | 26.33 | 1:3 | 2.35 | 43 | alkyl silicate | 54 | Spraying | very good |

TABLE 95-continued

| | | | | | | | | |
|---|---|---|---|---|---|---|---|---|
| Inv. Example 1635 | 44.21 | 1:24 | 0.42 | 52 | alkali silicate | 19 | Spraying | very good |
| Inv. Example 1636 | 3.43 | 1:10 | 1.15 | 66 | alkyl silicate | 25 | Brushing | very good |
| Inv. Example 1637 | 47.32 | 300:1 | 29.40 | 72 | alkyl silicate | 58 | Spraying | very good |
| Inv. Example 1638 | 12.33 | 1:66 | 0.44 | 40 | alkyl silicate | 21 | Spraying | very good |
| Inv. Example 1639 | 17.44 | 120:1 | 27.27 | 36 | alkali silicate | 19 | Brushing | very good |
| Inv. Example 1640 | 42.21 | 6:5 | 0.44 | 32 | urethane-based resin | 56 | Spraying | very good |
| Inv. Example 1641 | 12.34 | 1:1 | 0.80 | 53 | alkyl silicate | 77 | Spraying | very good |
| Inv. Example 1642 | 20.32 | 1:1 | 11.45 | 67 | alkyl silicate | 54 | Spraying | very good |

(*1) F: Fracture facets existing, FC: Fracture facets and/or cracks existing, NO: No fracture facet and/or crack

TABLE 96

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ |
| Inv. Example 1643 | 28.5 | FC | 10.6 | 1.13 | 0.05 | 2.29 | Existence | No |
| Inv. Example 1644 | 29.5 | FC | 5.7 | 1.02 | 0.1 | 0.2 | Existence | Existence |
| Inv. Example 1645 | 18.7 | FC | 6.4 | 1.06 | 0.05 | 0.2 | Existence | No |
| Inv. Example 1646 | 19.5 | FC | 3.2 | 1.05 | 0.07 | 0 | Existence | Existence |
| Inv. Example 1647 | 20.4 | FC | 4.5 | 1.24 | 0 | 0.07 | Existence | Existence |
| Inv. Example 1648 | 0.6 | FC | 5.2 | 1.33 | 0 | 0.02 | Existence | Existence |
| Inv. Example 1649 | 0.8 | FC | 1.9 | 1.27 | 22.1 | 0 | Existence | Existence |
| Inv. Example 1650 | 22.5 | FC | 0.02 | 1.05 | 0.1 | 0.07 | Existence | Existence |
| Inv. Example 1651 | 20.6 | FC | 10.5 | 1.12 | 0.04 | 0.1 | Existence | Existence |
| Inv. Example 1652 | 21.6 | FC | 12.5 | 1.23 | 30.0 | 0.01 | Existence | No |
| Inv. Example 1653 | 20.8 | FC | 7.72 | 1.38 | 0 | 0 | Existence | Existence |
| Inv. Example 1654 | 23.6 | FC | 8.32 | 1.22 | 0 | 0 | Existence | Existence |
| Inv. Example 1655 | 24.5 | FC | 10.05 | 1.14 | 4.52 | 0.57 | Existence | No |
| Inv. Example 1656 | 18.6 | FC | 10.6 | 1.13 | 17.5 | 2.45 | Existence | Existence |
| Inv. Example 1657 | 17.8 | FC | 5.2 | 1.33 | 27.6 | 2.4 | Existence | No |
| Inv. Example 1658 | 16.5 | FC | 1.9 | 1.27 | 4.32 | 1.07 | Existence | Existence |
| Inv. Example 1659 | 14.5 | FC | 0.02 | 1.05 | 0.05 | 0.03 | Existence | No |
| Inv. Example 1660 | 19 | FC | 10.5 | 1.12 | 0 | 0.08 | Existence | No |
| Inv. Example 1661 | 15 | FC | 12.5 | 1.23 | 0.05 | 0 | Existence | Existence |
| Inv. Example 1662 | 16.4 | FC | 18.5 | 1.36 | 0.44 | 0.07 | Existence | Existence |
| Inv. Example 1663 | 13.5 | FC | 11.5 | 1.11 | 0.08 | 0.07 | Existence | Existence |
| Inv. Example 1664 | 10.6 | FC | 11.5 | 1.11 | 8.02 | 2.04 | Existence | No |

| | Mean Size of Zn Metallic particle (μm) | Blend Ratio (Zn Alloy particle:Zn Metal Particle) | Mg Contents to Total Metal Particle (mass %) | Coat Properties | | | |
|---|---|---|---|---|---|---|---|
| | | | | Ratio of Metal Particle in Dry Coat (mass %) | Base Resin | Coat Thickness (μm) | Coating Method | Result of Corrosion Test |
| Inv. Example 1643 | 23.44 | 1:76 | 0.37 | 72 | alkyl silicate | 64 | Spraying | very good |
| Inv. Example 1644 | 23.45 | 1:6 | 4.21 | 77 | alkyl silicate | 34 | Brushing | very good |
| Inv. Example 1645 | 23.21 | 1:35 | 0.52 | 34 | alkali silicate | 28 | Spraying | very good |
| Inv. Example 1646 | 39.44 | 1:5 | 3.25 | 43 | urethane-based resin | 109 | Brushing | very good |
| Inv. Example 1647 | 12.34 | 1:62 | 0.32 | 53 | alkyl silicate | 15 | Spraying | very good |
| Inv. Example 1648 | 29.99 | 1:4 | 0.12 | 72 | alkyl silicate | 14 | Spraying | very good |
| Inv. Example 1649 | 15.21 | 5:9 | 0.29 | 77 | alkyl silicate | 18 | Spraying | very good |
| Inv. Example 1650 | 23.34 | 1:220 | 0.10 | 35 | alkali silicate | 2 | Spraying | very good |

TABLE 96-continued

| | | | | | | | | |
|---|---|---|---|---|---|---|---|---|
| Inv. Example 1651 | 2.32 | 1:80 | 0.25 | 77 | alkyl silicate | 37 | Spraying | very good |
| Inv. Example 1652 | 4.21 | 1:50 | 0.42 | 43 | alkali silicate | 2 | Spraying | good |
| Inv. Example 1653 | 15.21 | 1:10 | 1.89 | 52 | alkyl silicate | 160 | Brushing | very good |
| Inv. Example 1654 | 23.34 | 1:1 | 11.80 | 66 | alkali silicate | 5 | Brushing | very good |
| Inv. Example 1655 | 2.32 | 1:78 | 0.31 | 72 | alkyl silicate | 56 | Brushing | very good |
| Inv. Example 1656 | 4.21 | 1:10 | 1.69 | 40 | alkali silicate | 2 | Spraying | very good |
| Inv. Example 1657 | 29.99 | 1:50 | 0.35 | 36 | alkyl silicate | 18 | Spraying | very good |
| Inv. Example 1658 | 15.21 | 1:10 | 1.50 | 32 | alkyl silicate | 23 | Spraying | very good |
| Inv. Example 1659 | 23.34 | 1:1 | 7.25 | 53 | epoxy-based resin | 30 | Brushing | very good |
| Inv. Example 1660 | 2.32 | 1:3 | 4.75 | 67 | acryl-based resin | 77 | Brushing | very good |
| Inv. Example 1661 | 4.21 | 1:7 | 1.88 | 72 | urethane-based resin | 54 | Brushing | very good |
| Inv. Example 1662 | 15.21 | 1:50 | 0.32 | 77 | polyester resin | 47 | Spraying | very good |
| Inv. Example 1663 | 23.34 | 1:10 | 1.23 | 34 | epoxy-based resin | 43 | Spraying | very good |
| Inv. Example 1664 | 13.45 | 1:3 | 2.65 | 43 | acryl-based resin | 52 | Brushing | very good |

(*1) F: Fracture facets existing, FC: Fracture facets and/or cracks existing, NO: No fracture facet and/or crack

TABLE 97

| | Zn-Alloy Particle Properties | | | | | | |
|---|---|---|---|---|---|---|---|
| | Mg (mass %) | Fracture Facet &/or Cracks (*1) | Mean Size (µm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ |
|---|---|---|---|---|---|---|---|---|
| Inv. Example 1665 | 10.7 | FC | 9.6 | 1.07 | 15.6 | 1.27 | Existence | Existence |
| Inv. Example 1666 | 10.9 | FC | 8.5 | 1.42 | 10.4 | 0.57 | Existence | No |
| Inv. Example 1667 | 11.6 | FC | 7.72 | 1.38 | 4.65 | 2.67 | Existence | Existence |
| Inv. Example 1668 | 14.7 | FC | 8.32 | 1.22 | 24.8 | 2.4 | Existence | No |
| Inv. Example 1669 | 19.5 | FC | 10.05 | 1.14 | 4.52 | 0.57 | Existence | No |
| Inv. Example 1670 | 10.2 | FC | 10.6 | 1.13 | 0 | 0 | Existence | Existence |
| Inv. Example 1671 | 4 | FC | 5.7 | 1.02 | 0 | 0 | Existence | No |
| Inv. Example 1672 | 7.2 | FC | 6.4 | 1.06 | 11.05 | 0.23 | Existence | Existence |
| Inv. Example 1673 | 3.6 | FC | 3.2 | 1.05 | 2.65 | 0.74 | Existence | Existence |
| Inv. Example 1674 | 26.9 | FC | 4.5 | 1.24 | 6.45 | 2.14 | Existence | No |
| Inv. Example 1675 | 27.9 | FC | 5.2 | 1.33 | 27.6 | 2.4 | Existence | No |
| Inv. Example 1676 | 28.9 | FC | 1.9 | 1.27 | 4.32 | 1.07 | Existence | Existence |
| Inv. Example 1677 | 23.8 | FC | 0.02 | 1.05 | 0.05 | 0.03 | Existence | No |
| Inv. Example 1678 | 26.8 | FC | 10.5 | 1.12 | 0 | 0.08 | Existence | No |
| Inv. Example 1679 | 25.6 | FC | 12.5 | 1.23 | 0.05 | 0 | Existence | Existence |
| Inv. Example 1680 | 29.8 | FC | 18.5 | 1.36 | 0.44 | 0.07 | Existence | Existence |
| Inv. Example 1681 | 18.9 | FC | 11.5 | 1.11 | 0.08 | 0.07 | Existence | Existence |
| Inv. Example 1682 | 5.6 | FC | 9.6 | 1.07 | 0.1 | 0.2 | Existence | No |
| Inv. Example 1683 | 4.7 | FC | 8.5 | 1.42 | 0.05 | 0.2 | Existence | Existence |
| Inv. Example 1684 | 6.8 | FC | 7.72 | 1.38 | 0.07 | 0 | Existence | Existence |
| Inv. Example 1685 | 9 | FC | 8.32 | 1.22 | 0 | 0.07 | Existence | Existence |
| Inv. Example 1686 | 2.1 | FC | 10.05 | 1.14 | 0 | 0.02 | Existence | No |

| | | | | Coat Properties | | | |
|---|---|---|---|---|---|---|---|
| | Mean Size of Zn Metallic particle (µm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (µm) | Coating Method | Result of Corrosion Test |
|---|---|---|---|---|---|---|---|---|
| Inv. Example 1665 | 2.34 | 1:10 | 0.97 | 53 | urethane-based resin | 20 | Brushing | very good |
| Inv. Example 1666 | 28.34 | 1:5 | 1.82 | 60 | polyester resin | 200 | Brushing | very good |

TABLE 97-continued

| | | | | | | | | |
|---|---|---|---|---|---|---|---|---|
| Inv. Example 1667 | 19.87 | 200:1 | 11.54 | 35 | alkali silicate | 22 | Spraying | very good |
| Inv. Example 1668 | 39.74 | 1:8 | 1.63 | 77 | alkyl silicate | 25 | Spraying | very good |
| Inv. Example 1669 | 24.32 | 1:1 | 9.75 | 43 | alkali silicate | 14 | Spraying | very good |
| Inv. Example 1670 | 22.33 | 1:7 | 1.28 | 52 | urethane-based resin | 112 | Spraying | very good |
| Inv. Example 1671 | 48.54 | 1:3 | 1.00 | 66 | alkali silicate | 24 | Spraying | very good |
| Inv. Example 1672 | 23.75 | 1:7 | 0.90 | 72 | urethane-based resin | 150 | Spraying | very good |
| Inv. Example 1673 | 15.62 | 1:2 | 1.20 | 40 | alkali silicate | 18 | Spraying | very good |
| Inv. Example 1674 | 2.34 | 117:1 | 26.67 | 36 | alkyl silicate | 19 | Brushing | very good |
| Inv. Example 1675 | 23.04 | 1:270 | 0.10 | 32 | alkyl silicate | 24 | Spraying | very good |
| Inv. Example 1676 | 3.05 | 1:117 | 0.24 | 53 | urethane-based resin | 99 | Spraying | very good |
| Inv. Example 1677 | 43.23 | 1:66 | 0.36 | 67 | alkyl silicate | 7 | Spraying | very good |
| Inv. Example 1678 | 2.04 | 1:109 | 0.24 | 72 | epoxy-based resin | 100 | Spraying | very good |
| Inv. Example 1679 | 50.00 | 250:1 | 25.50 | 77 | alkyl silicate | 27 | Brushing | very good |
| Inv. Example 1680 | 2.45 | 70:1 | 29.38 | 34 | alkali silicate | 15 | Spraying | very good |
| Inv. Example 1681 | 5.33 | 1:15 | 1.18 | 43 | alkyl silicate | 14 | Spraying | very good |
| Inv. Example 1682 | 2.41 | 1:5 | 0.93 | 53 | urethane-based resin | 55 | Spraying | very good |
| Inv. Example 1683 | 23.43 | 2:3 | 1.88 | 35 | alkyl silicate | 8 | Spraying | very good |
| Inv. Example 1684 | 6.03 | 1:9 | 0.68 | 77 | urethane-based resin | 122 | Brushing | very good |
| Inv. Example 1685 | 24.5 | 1:10 | 0.82 | 43 | alkyl silicate | 54 | Spraying | very good |
| Inv. Example 1686 | 5.32 | 1:14 | 0.14 | 52 | alkali silicate | 19 | Spraying | very good |

(*1) F: Fracture facets existing, FC: Fracture facets and/or cracks existing, NO: No fracture facet and/or crack

TABLE 98

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ |
|---|---|---|---|---|---|---|---|---|
| Inv. Example 1687 | 4.8 | FC | 10.6 | 1.13 | 0 | 0 | Existence | Existence |
| Inv. Example 1688 | 4.2 | FC | 5.7 | 1.02 | 0 | 0 | Existence | Existence |
| Inv. Example 1689 | 4.3 | FC | 6.4 | 1.06 | 21.5 | 0.05 | Existence | Existence |
| Inv. Example 1690 | 4 | FC | 3.2 | 1.05 | 0.05 | 2.29 | Existence | No |
| Inv. Example 1691 | 3.7 | FC | 4.5 | 1.24 | 0.05 | 0.03 | Existence | Existence |
| Inv. Example 1692 | 6.4 | FC | 5.2 | 1.33 | 0 | 0.08 | Existence | Existence |
| Inv. Example 1693 | 6.9 | FC | 1.9 | 1.27 | 0.05 | 0 | Existence | No |
| Inv. Example 1694 | 16.9 | FC | 0.02 | 1.05 | 0.44 | 0.07 | Existence | Existence |
| Inv. Example 1695 | 18.7 | FC | 10.5 | 1.12 | 0.08 | 0.07 | Existence | No |
| Inv. Example 1696 | 24.4 | FC | 12.5 | 1.23 | 0.1 | 0.2 | Existence | Existence |
| Inv. Example 1697 | 10.6 | FC | 18.5 | 1.36 | 0 | 0 | Existence | No |
| Inv. Example 1698 | 15.8 | FC | 11.5 | 1.11 | 0 | 0 | Existence | Existence |
| Inv. Example 1699 | 19.5 | FC | 9.6 | 1.07 | 0 | 0.07 | Existence | Existence |
| Inv. Example 1700 | 7.8 | FC | 8.5 | 1.42 | 0 | 0.02 | Existence | Existence |
| Inv. Example 1701 | 4.9 | FC | 7.72 | 1.38 | 25.8 | 0.05 | Existence | Existence |
| Inv. Example 1702 | 10.8 | FC | 8.32 | 1.22 | 22.1 | 0 | Existence | No |
| Inv. Example 1703 | 3.8 | FC | 10.05 | 1.14 | 21.5 | 0.05 | Existence | No |
| Inv. Example 1704 | 22.6 | FC | 10.6 | 1.13 | 0.05 | 2.29 | Existence | No |
| Inv. Example 1705 | 27.9 | FC | 5.7 | 1.02 | 0 | 0 | Existence | Existence |
| Inv. Example 1706 | 24.8 | FC | 6.4 | 1.06 | 0 | 0 | Existence | No |
| Inv. Example 1707 | 26.8 | FC | 3.2 | 1.05 | 0.07 | 0 | Existence | Existence |
| Inv. Example 1708 | 25.9 | FC | 4.5 | 1.24 | 0 | 0.07 | Existence | Existence |
| Inv. Example 1709 | 9.8 | FC | 5.2 | 1.33 | 0 | 0.02 | Existence | Existence |

TABLE 98-continued

|  | Mean Size of Zn Metallic particle (μm) | Blend Ratio (Zn Alloy particle:Zn Metal Particle) | Mg Contents to Total Metal Particle (mass %) | Coat Properties | | | | |
|---|---|---|---|---|---|---|---|---|
|  |  |  |  | Ratio of Metal Particle in Dry Coat (mass %) | Base Resin | Coat Thickness (μm) | Coating Method | Result of Corrosion Test |
| Inv. Example 1687 | 14.34 | 1:7 | 0.60 | 66 | alkyl silicate | 25 | Brushing | very good |
| Inv. Example 1688 | 5.04 | 1:12 | 0.32 | 72 | alkyl silicate | 58 | Spraying | very good |
| Inv. Example 1689 | 2.32 | 1:3 | 1.08 | 40 | alkyl silicate | 21 | Spraying | very good |
| Inv. Example 1690 | 20.34 | 1:7 | 0.50 | 36 | alkali silicate | 19 | Brushing | very good |
| Inv. Example 1691 | 12.33 | 1:10 | 0.34 | 32 | urethane-based resin | 56 | Spraying | very good |
| Inv. Example 1692 | 17.84 | 1:1 | 3.20 | 53 | alkyl silicate | 77 | Spraying | very good |
| Inv. Example 1693 | 6.66 | 1:3 | 1.73 | 67 | alkyl silicate | 54 | Spraying | very good |
| Inv. Example 1694 | 3.65 | 2:3 | 6.76 | 72 | alkyl silicate | 64 | Spraying | very good |
| Inv. Example 1695 | 22.62 | 1:2 | 6.23 | 77 | alkyl silicate | 34 | Brushing | very good |
| Inv. Example 1696 | 45.33 | 1:4 | 4.88 | 34 | alkali silicate | 28 | Spraying | very good |
| Inv. Example 1697 | 43.22 | 1:6 | 1.51 | 43 | urethane-based resin | 109 | Brushing | very good |
| Inv. Example 1698 | 12.33 | 1:115 | 0.14 | 53 | alkyl silicate | 15 | Spraying | very good |
| Inv. Example 1699 | 13.42 | 1:23 | 0.81 | 72 | alkyl silicate | 14 | Spraying | very good |
| Inv. Example 1700 | 22.32 | 1:12 | 0.60 | 77 | alkyl silicate | 18 | Spraying | very good |
| Inv. Example 1701 | 7.34 | 1:10 | 0.45 | 77 | urethane-based resin | 122 | Brushing | very good |
| Inv. Example 1702 | 44.54 | 1:3 | 2.70 | 43 | alkyl silicate | 54 | Spraying | very good |
| Inv. Example 1703 | 32.87 | 1:5 | 0.63 | 52 | alkali silicate | 19 | Spraying | very good |
| Inv. Example 1704 | 20.32 | 1:25 | 0.87 | 66 | alkyl silicate | 25 | Brushing | very good |
| Inv. Example 1705 | 2.03 | 4:5 | 12.40 | 72 | alkyl silicate | 58 | Spraying | very good |
| Inv. Example 1706 | 5.33 | 3:8 | 6.76 | 40 | alkyl silicate | 21 | Spraying | very good |
| Inv. Example 1707 | 2.33 | 9:34 | 5.61 | 36 | alkali silicate | 19 | Brushing | very good |
| Inv. Example 1708 | 27.44 | 7:8 | 12.09 | 32 | urethane-based resin | 56 | Spraying | very good |
| Inv. Example 1709 | 12.33 | 9:17 | 3.39 | 53 | alkyl silicate | 77 | Spraying | very good |

(*1) F: Fracture facets existing, FC: Fracture facets and/or cracks existing, NO: No fracture facet and/or crack

TABLE 99

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ |
| Inv. Example 1710 | 5.6 | FC | 1.9 | 1.27 | 22.1 | 0 | Existence | Existence |
| Inv. Example 1711 | 12.3 | FC | 0.02 | 1.05 | 1.24 | 1.8 | Existence | Existence |
| Inv. Example 1712 | 0.8 | FC | 27.89 | 1.12 | 1.24 | 0.9 | Existence | Existence |
| Inv. Example 1713 | 1 | FC | 0.32 | 1.23 | 0.8 | 0.7 | Existence | No |
| Inv. Example 1714 | 2.3 | FC | 11.44 | 1.36 | 0 | 1.8 | Existence | Existence |
| Inv. Example 1715 | 15.6 | FC | 1.05 | 1.11 | 1.1 | 2.41 | Existence | Existence |
| Inv. Example 1716 | 6.7 | FC | 36.47 | 1.07 | 1.8 | 0.08 | Existence | Existence |
| Inv. Example 1717 | 7.5 | FC | 5.07 | 1.42 | 3.8 | 2.23 | Existence | No |
| Inv. Example 1718 | 8.4 | FC | 7.72 | 1.38 | 2.9 | 0.06 | Existence | Existence |
| Inv. Example 1719 | 9.3 | FC | 8.32 | 1.22 | 10.5 | 0.02 | Existence | Existence |

TABLE 99-continued

| | | | | | | | | |
|---|---|---|---|---|---|---|---|---|
| Inv. Example 1720 | 10.4 | FC | 10.05 | 1.14 | 2.9 | 0.02 | Existence | Existence |
| Inv. Example 1721 | 11.2 | FC | 6.08 | 1.13 | 16.8 | 1.37 | Existence | No |
| Inv. Example 1722 | 11.7 | FC | 17.89 | 1.02 | 0 | 2.43 | Existence | Existence |
| Inv. Example 1723 | 21.5 | FC | 19.54 | 1.06 | 3.6 | 0.02 | Existence | Existence |
| Inv. Example 1724 | 13.4 | FC | 21.08 | 1.05 | 2.1 | 1.5 | Existence | No |
| Inv. Example 1725 | 14.6 | FC | 23.04 | 1.24 | 0.06 | 1.3 | Existence | Existence |
| Inv. Example 1726 | 25.8 | FC | 9.21 | 1.33 | 0.02 | 1.8 | Existence | Existence |
| Inv. Example 1727 | 16.7 | FC | 0.12 | 1.27 | 1.6 | 0.9 | Existence | Existence |
| Inv. Example 1728 | 17.3 | FC | 29.24 | 1.37 | 3.5 | 0 | Existence | Existence |
| Inv. Example 1729 | 18.5 | FC | 128.74 | 1.10 | 9.8 | 1.8 | Existence | No |
| Inv. Example 1730 | 19.3 | FC | 33.57 | 1.04 | 11.5 | 0.7 | Existence | Existence |
| Inv. Example 1731 | 3.5 | FC | 3.04 | 1.02 | 0.4 | 1.5 | Existence | Existence |
| Inv. Example 1732 | 22.5 | FC | 7.54 | 1.01 | 0.6 | 1.3 | Existence | Existence |

| | Mean Size of Zn Metallic particle (μm) | Blend Ratio (Zn Alloy particle:Zn Metal Particle) | Mg Contents to Total Metal Particle (mass %) | Coat Properties | | | |
|---|---|---|---|---|---|---|---|
| | | | | Ratio of Metal Particle in Dry Coat (mass %) | Base Resin | Coat Thickness (μm) | Coating Method | Result of Corrosion Test |
| Inv. Example 1710 | 36.43 | 1:1 | 2.80 | 67 | alkyl silicate | 54 | Spraying | very good |
| Inv. Example 1711 | 11.9 | 1:31 | 0.38 | 52 | alkali silicate | 2 | Spraying | very good |
| Inv. Example 1712 | 10.5 | 1:4 | 0.16 | 55 | alkali silicate | 20 | Spraying | very good |
| Inv. Example 1713 | 9.8 | 1:1 | 0.50 | 69 | alkali silicate | 5 | Spraying | very good |
| Inv. Example 1714 | 7.9 | 1:7 | 0.29 | 78 | alkyl silicate | 20 | Spraying | very good |
| Inv. Example 1715 | 11.6 | 1:11 | 1.30 | 42 | alkali silicate | 15 | Brushing | very good |
| Inv. Example 1716 | 16.9 | 1:2 | 2.23 | 32 | alkyl silicate | 57 | Brushing | very good |
| Inv. Example 1717 | 20.34 | 1:7 | 0.94 | 66 | alkali silicate | 13 | Brushing | very good |
| Inv. Example 1718 | 8.9 | 1:4 | 1.68 | 67 | alkyl silicate | 22 | Brushing | very good |
| Inv. Example 1719 | 7.5 | 1:5 | 1.55 | 64 | alkali silicate | 20 | Spraying | very good |
| Inv. Example 1720 | 10.9 | 1:10 | 0.95 | 74 | alkyl silicate | 27 | Spraying | very good |
| Inv. Example 1721 | 20.34 | 1:9 | 1.12 | 82 | alkali silicate | 15 | Spraying | very good |
| Inv. Example 1722 | 6.7 | 240:1 | 11.65 | 37 | alkyl silicate | 35 | Spraying | very good |
| Inv. Example 1723 | 7.9 | 1:120 | 0.18 | 42 | alkali silicate | 34 | Brushing | very good |
| Inv. Example 1724 | 5.6 | 99:1 | 13.27 | 66 | alkyl silicate | 45 | Brushing | very good |
| Inv. Example 1725 | 11.5 | 1:99 | 0.15 | 48 | alkali silicate | 52 | Brushing | very good |
| Inv. Example 1726 | 20.34 | 1:242 | 0.11 | 33 | alkyl silicate | 23 | Brushing | very good |
| Inv. Example 1727 | 10.5 | 1:6 | 2.39 | 75 | alkali silicate | 5 | Spraying | very good |
| Inv. Example 1728 | 7.6 | 1:1 | 8.65 | 77 | alkyl silicate | 52 | Brushing | very good |
| Inv. Example 1729 | 8.2 | 1:7 | 2.31 | 66 | alkali silicate | 150 | Brushing | very good |
| Inv. Example 1730 | 9.1 | 1:5 | 3.22 | 67 | alkyl silicate | 60 | Brushing | very good |
| Inv. Example 1731 | 10.6 | 1:2 | 1.17 | 45 | alkali silicate | 15 | Spraying | very good |
| Inv. Example 1732 | 8.4 | 1:221 | 0.10 | 48 | alkyl silicate | 24 | Spraying | very good |

(*1) F: Fracture facets existing, FC: Fracture facets and/or cracks existing, NO: No fracture facet and/or crack

TABLE 100

| | Zn-Alloy Particle Properties |||||||  |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ |
| Inv. Example 1733 | 23.7 | FC | 6.81 | 1.08 | 10.6 | 1.8 | Existence | No |
| Inv. Example 1734 | 24.2 | FC | 5.25 | 1.14 | 9.5 | 0 | Existence | Existence |
| Inv. Example 1735 | 0.2 | FC | 194.23 | 1.23 | 11.04 | 0.7 | Existence | Existence |
| Inv. Example 1736 | 27.1 | FC | 28.74 | 1.33 | 0.01 | 1.8 | Existence | Existence |
| Inv. Example 1737 | 29.3 | FC | 13.57 | 1.37 | 0.07 | 0.7 | Existence | Existence |
| Inv. Example 1738 | 0.5 | FC | 0.65 | 1.44 | 1.8 | 1.5 | Existence | Existence |
| Inv. Example 1739 | 2.7 | FC | 4.12 | 1.21 | 0 | 1.3 | Existence | Existence |
| Inv. Example 1740 | 28.4 | FC | 0.72 | 1.22 | 2.9 | 1.8 | Existence | Existence |
| Inv. Example 1741 | 8.7 | FC | 117.54 | 1.23 | 10.5 | 0.9 | Existence | Existence |
| Inv. Example 1742 | 9.2 | FC | 7.81 | 1.47 | 2.9 | 0.7 | Existence | Existence |
| Inv. Example 1743 | 17.8 | FC | 80.25 | 1.01 | 16.8 | 1.8 | Existence | No |
| Inv. Example 1744 | 20.2 | FC | 8.47 | 1.04 | 2.7 | 0.7 | Existence | Existence |
| Inv. Example 1745 | 0.4 | FC | 0.87 | 1.05 | 0.04 | 0.7 | Existence | Existence |
| Inv. Example 1746 | 13.7 | FC | 25.78 | 1.12 | 0 | 0.04 | Existence | Existence |
| Inv. Example 1747 | 14.7 | FC | 93.45 | 1.11 | 1.24 | 0.05 | Existence | Existence |
| Inv. Example 1748 | 2.4 | FC | 0.97 | 1.08 | 0.05 | 1.24 | Existence | Existence |
| Inv. Example 1749 | 4.5 | FC | 54.89 | 1.47 | 1.24 | 0.06 | Existence | Existence |
| Inv. Example 1750 | 0.1 | FC | 10.81 | 1.50 | 1.24 | 0.07 | Existence | Existence |
| Inv. Example 1751 | 30.0 | FC | 18.24 | 1.13 | 0 | 0.75 | Existence | Existence |
| Inv. Example 1752 | 24.5 | FC | 114.78 | 1.04 | 0.9 | 1.5 | Existence | Existence |
| Inv. Example 1753 | 27.6 | FC | 3.87 | 1.02 | 0.03 | 1.3 | Existence | Existence |
| Inv. Example 1754 | 4.1 | FC | 11.94 | 1.08 | 10.5 | 1.8 | Existence | No |
| Inv. Example 1755 | 3.2 | FC | 142.58 | 1.15 | 2.9 | 0.9 | Existence | Existence |

| | | | | Coat Properties |||| |
|---|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 1733 | 5.3 | 1:31 | 0.74 | 68 | alkali silicate | 34 | Spraying | very good |
| Inv. Example 1734 | 20.34 | 1:4 | 4.84 | 35 | alkyl silicate | 20 | Brushing | very good |
| Inv. Example 1735 | 7.8 | 1:1 | 0.10 | 37 | alkali silicate | 200 | Brushing | very good |
| Inv. Example 1736 | 10.5 | 1:7 | 3.39 | 38 | alkyl silicate | 56 | Brushing | very good |
| Inv. Example 1737 | 20.34 | 400:1 | 29.23 | 41 | alkali silicate | 34 | Spraying | very good |
| Inv. Example 1738 | 7.9 | 1:2 | 0.17 | 54 | alkyl silicate | 2 | Spraying | very good |
| Inv. Example 1739 | 11.6 | 1:300 | 0.01 | 57 | alkali silicate | 15 | Spraying | very good |
| Inv. Example 1740 | 16.9 | 1:4 | 5.68 | 59 | alkali silicate | 10 | Spraying | very good |
| Inv. Example 1741 | 10.5 | 1:5 | 1.45 | 64 | alkyl silicate | 125 | Brushing | very good |
| Inv. Example 1742 | 8.9 | 1:10 | 0.84 | 66 | alkali silicate | 24 | Brushing | very good |
| Inv. Example 1743 | 7.5 | 1:9 | 1.78 | 67 | alkyl silicate | 110 | Brushing | very good |
| Inv. Example 1744 | 10.9 | 1:1 | 10.10 | 34 | alkali silicate | 24 | Brushing | very good |
| Inv. Example 1745 | 20.34 | 130:1 | 0.40 | 54 | alkyl silicate | 2 | Spraying | very good |
| Inv. Example 1746 | 6.7 | 130:1 | 13.60 | 62 | alkali silicate | 37 | Spraying | very good |
| Inv. Example 1747 | 7.9 | 1:31 | 0.46 | 66 | alkyl silicate | 113 | Brushing | very good |
| Inv. Example 1748 | 5.6 | 1:1 | 1.20 | 67 | alkali silicate | 2 | Spraying | very good |
| Inv. Example 1749 | 20.34 | 2:1 | 3.00 | 68 | alkyl silicate | 75 | Brushing | very good |
| Inv. Example 1750 | 9.9 | 300:1 | 0.10 | 33 | alkali silicate | 30 | Brushing | very good |
| Inv. Example 1751 | 10.5 | 1:270 | 0.11 | 35 | alkyl silicate | 34 | Brushing | very good |

TABLE 100-continued

| | | | | | | | |
|---|---|---|---|---|---|---|---|
| Inv. Example 1752 | 7.6 | 1:115 | 0.21 | 43 | epoxy-based resin | 124 | Brushing | very good |
| Inv. Example 1753 | 45.33 | 1:29 | 0.92 | 44 | acryl-based resin | 15 | Spraying | very good |
| Inv. Example 1754 | 43.22 | 1:3 | 1.03 | 43 | urethane-based resin | 23 | Spraying | very good |
| Inv. Example 1755 | 10.6 | 1:9 | 0.32 | 44 | polyester resin | 157 | Brushing | very good |

(*1) F: Fracture facets existing, FC: Fracture facets and/or cracks existing, NO: No fracture facet and/or crack

TABLE 101

| | Zn-Alloy Particle Properties | | | | | | | |
|---|---|---|---|---|---|---|---|---|
| | Mg (mass %) | Fracture Facet &/or Cracks (*1) | Mean Size (μm) | Average value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ |
| Inv. Example 1756 | 2.7 | FC | 12.5 | 1.34 | 16.8 | 0.7 | Existence | Existence |
| Inv. Example 1757 | 0.12 | FC | 31.24 | 1.25 | 2.7 | 1.8 | Existence | Existence |
| Inv. Example 1758 | 0.22 | FC | 152.46 | 1.19 | 0.02 | 0.7 | Existence | Existence |
| Inv. Example 1759 | 0.37 | FC | 13.4 | 1.18 | 0 | 1.5 | Existence | Existence |
| Inv. Example 1760 | 1.4 | FC | 160.57 | 1.24 | 7.42 | 1.3 | Existence | Existence |
| Inv. Example 1761 | 4.2 | FC | 14.1 | 1.11 | 0.02 | 1.8 | Existence | Existence |
| Inv. Example 1762 | 4.8 | FC | 167.55 | 1.27 | 0.04 | 0.9 | Existence | Existence |
| Inv. Example 1763 | 8.1 | FC | 1.45 | 1.31 | 17.5 | 0 | Existence | Existence |
| Inv. Example 1764 | 7.6 | FC | 0.15 | 1.26 | 0.01 | 1.8 | Existence | Existence |
| Inv. Example 1765 | 9.9 | FC | 13.1 | 1.14 | 0.02 | 0.7 | Existence | Existence |
| Inv. Example 1766 | 14.8 | FC | 15.5 | 1.34 | 3.8 | 0 | Existence | Existence |
| Inv. Example 1767 | 16.7 | FC | 0.67 | 1.16 | 2.9 | 0 | Existence | Existence |
| Inv. Example 1768 | 17.9 | FC | 137.89 | 1.47 | 10.5 | 1.8 | Existence | Existence |
| Inv. Example 1769 | 19.5 | FC | 16.3 | 1.48 | 2.9 | 0.9 | Existence | Existence |
| Inv. Example 1770 | 22.4 | FC | 110.38 | 1.49 | 16.8 | 0.7 | Existence | Existence |
| Inv. Example 1771 | 0.17 | FC | 12.4 | 1.34 | 2.7 | 1.8 | Existence | Existence |
| Inv. Example 1772 | 8.3 | FC | 17.2 | 1.29 | 0.02 | 0.7 | Existence | No |
| Inv. Example 1773 | 6.5 | FC | 105.23 | 1.18 | 0.02 | 0.7 | Existence | Existence |
| Inv. Example 1774 | 9.7 | FC | 177.89 | 1.23 | 0.04 | 0.02 | Existence | Existence |
| Inv. Example 1775 | 11.4 | FC | 12.2 | 1.27 | 0.05 | 0.02 | Existence | Existence |
| Inv. Example 1776 | 22.5 | FC | 1.84 | 1.17 | 1.24 | 1.37 | Existence | Existence |
| Inv. Example 1777 | 25.7 | FC | 16.02 | 1.16 | 0.05 | 0.02 | Existence | Existence |
| Inv. Example 1778 | 17.8 | FC | 1.75 | 1.49 | 1.24 | 1.37 | Existence | Existence |

| | Coat Properties | | | | | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 1756 | 20.34 | 1:5 | 0.45 | 54 | epoxy-based resin | 26 | Spraying | very good |
| Inv. Example 1757 | 5.3 | 100:1 | 0.12 | 79 | acryl-based resin | 38 | Spraying | very good |
| Inv. Example 1758 | 10.9 | 1:1 | 0.11 | 73 | urethane-based resin | 160 | Brushing | very good |
| Inv. Example 1759 | 7.8 | 99:1 | 0.37 | 69 | polyester resin | 27 | Brushing | very good |
| Inv. Example 1760 | 10.5 | 1:6 | 0.20 | 63 | epoxy-based resin | 180 | Brushing | very good |
| Inv. Example 1761 | 20.34 | 1:12 | 0.32 | 35 | acryl-based resin | 26 | Spraying | very good |
| Inv. Example 1762 | 7.9 | 1:5 | 0.80 | 35 | urethane-based resin | 180 | Brushing | very good |
| Inv. Example 1763 | 11.6 | 1:33 | 0.24 | 66 | polyester resin | 15 | Spraying | very good |
| Inv. Example 1764 | 16.9 | 1:9 | 0.76 | 67 | epoxy-based resin | 2 | Spraying | very good |
| Inv. Example 1765 | 10.5 | 1:18 | 0.52 | 68 | acryl-based resin | 28 | Spraying | very good |
| Inv. Example 1766 | 8.9 | 1:38 | 0.38 | 33 | urethane-based resin | 30 | Spraying | very good |
| Inv. Example 1767 | 7.5 | 1:117 | 0.14 | 35 | polyester resin | 2 | Spraying | very good |

TABLE 101-continued

| | | | | | | | | |
|---|---|---|---|---|---|---|---|---|
| Inv. Example 1768 | 20.34 | 1:42 | 0.42 | 43 | epoxy-based resin | 157 | Brushing | very good |
| Inv. Example 1769 | 9.8 | 1:1 | 9.75 | 44 | acryl-based resin | 28 | Brushing | very good |
| Inv. Example 1770 | 6.7 | 1:121 | 0.18 | 42 | urethane-based resin | 130 | Brushing | very good |
| Inv. Example 1771 | 45.33 | 120:1 | 0.17 | 33 | polyester resin | 29 | Brushing | very good |
| Inv. Example 1772 | 43.22 | 1:145 | 0.06 | 30 | epoxy-based resin | 30 | Brushing | very good |
| Inv. Example 1773 | 11.5 | 1:31 | 0.20 | 35 | acryl-based resin | 120 | Brushing | very good |
| Inv. Example 1774 | 9.9 | 1:95 | 0.10 | 37 | urethane-based resin | 187 | Brushing | very good |
| Inv. Example 1775 | 10.5 | 1:33 | 0.34 | 77 | polyester resin | 28 | Spraying | very good |
| Inv. Example 1776 | 7.6 | 120:1 | 22.31 | 41 | epoxy-based resin | 5 | Spraying | very good |
| Inv. Example 1777 | 8.2 | 1:28 | 0.89 | 35 | acryl-based resin | 35 | Spraying | very good |
| Inv. Example 1778 | 9.1 | 1:33 | 0.52 | 58 | urethane-based resin | 5 | Spraying | very good |

(*1) F: Fracture facets existing, FC: Fracture facets and/or cracks existing, NO: No fracture facet and/or crack

TABLE 102

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ |
| Inv. Example 1779 | 0.14 | FC | 198.78 | 1.34 | 1.24 | 1.37 | Existence | Existence |
| Inv. Example 1780 | 6.7 | FC | 13.1 | 1.16 | 0.8 | 1.5 | Existence | Existence |
| Inv. Example 1781 | 7.5 | FC | 15.5 | 1.47 | 0.9 | 1.3 | Existence | Existence |
| Inv. Example 1782 | 8.4 | FC | 0.67 | 1.48 | 1.1 | 1.8 | Existence | No |
| Inv. Example 1783 | 9.3 | FC | 12.2 | 1.49 | 1.8 | 0.9 | Existence | Existence |
| Inv. Example 1784 | 1.4 | FC | 1.84 | 1.34 | 3.8 | 0.7 | Existence | Existence |
| Inv. Example 1785 | 4.2 | FC | 16.02 | 1.29 | 2.9 | 1.8 | Existence | Existence |
| Inv. Example 1786 | 4.8 | FC | 1.75 | 1.18 | 10.5 | 0.7 | Existence | Existence |
| Inv. Example 1787 | 8.1 | FC | 12.4 | 1.23 | 2.9 | 1.5 | Existence | Existence |
| Inv. Example 1788 | 7.6 | FC | 17.2 | 1.27 | 16.8 | 1.3 | Existence | Existence |
| Inv. Example 1789 | 9.9 | FC | 13.1 | 1.17 | 2.7 | 1.8 | Existence | Existence |
| Inv. Example 1790 | 0.4 | FC | 29.9 | 1.16 | 3.6 | 0.9 | Existence | Existence |
| Inv. Example 1791 | 10.5 | FC | 0.21 | 1.27 | 0 | 0.7 | Existence | Existence |
| Inv. Example 1792 | 0.4 | FC | 0.22 | 1.17 | 0.06 | 1.8 | Existence | Existence |
| Inv. Example 1793 | 10.5 | FC | 29.5 | 1.27 | 0.02 | 0.7 | Existence | Existence |
| Inv. Example 1794 | 0.51 | FC | 29.9 | 1.18 | 1.6 | 1.5 | Existence | Existence |
| Inv. Example 1795 | 9.8 | FC | 0.21 | 1.23 | 3.5 | 0 | Existence | Existence |
| Inv. Example 1796 | 0.52 | FC | 0.22 | 1.27 | 9.8 | 1.8 | Existence | Existence |
| Inv. Example 1797 | 9.9 | FC | 29.5 | 1.17 | 11.5 | 0.9 | Existence | No |
| Inv. Example 1798 | 14.8 | FC | 16.02 | 1.48 | 0.4 | 0.7 | Existence | Existence |
| Inv. Example 1799 | 19.9 | FC | 1.75 | 1.49 | 0.6 | 1.8 | Existence | Existence |
| Inv. Example 1800 | 17.9 | FC | 12.4 | 1.34 | 10.6 | 0.7 | Existence | Existence |
| Inv. Example 1801 | 19.5 | FC | 17.2 | 1.29 | 9.5 | 0.7 | Existence | Existence |

| | | | | Coat Properties | | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 1779 | 10.6 | 200:1 | 0.14 | 37 | polyester resin | 200 | Brushing | very good |
| Inv. Example 1780 | 8.4 | 1:4 | 1.34 | 68 | alkali silicate | 25 | Spraying | very good |
| Inv. Example 1781 | 5.3 | 1:18 | 0.39 | 55 | alkali silicate | 15 | Spraying | very good |
| Inv. Example 1782 | 10.9 | 1:7 | 1.05 | 77 | alkyl silicate | 20 | Spraying | very good |
| Inv. Example 1783 | 7.8 | 1:11 | 0.78 | 43 | alkali silicate | 18 | Spraying | very good |

TABLE 102-continued

| | | | | | | | | |
|---|---|---|---|---|---|---|---|---|
| Inv. Example 1784 | 8.9 | 1:2 | 0.47 | 45 | alkyl silicate | 22 | Spraying | very good |
| Inv. Example 1785 | 7.5 | 1:7 | 0.53 | 66 | alkali silicate | 19 | Spraying | very good |
| Inv. Example 1786 | 10.9 | 1:2 | 2.40 | 33 | alkyl silicate | 29 | Spraying | very good |
| Inv. Example 1787 | 9.8 | 1:5 | 1.35 | 66 | alkali silicate | 23 | Spraying | very good |
| Inv. Example 1788 | 45.33 | 1:10 | 0.69 | 55 | alkyl silicate | 21 | Spraying | very good |
| Inv. Example 1789 | 43.22 | 1:9 | 0.99 | 49 | alkali silicate | 19 | Spraying | very good |
| Inv. Example 1790 | 5.6 | 240:1 | 0.40 | 77 | alkyl silicate | 15 | Spraying | very good |
| Inv. Example 1791 | 11.5 | 120:1 | 10.41 | 41 | alkali silicate | 18 | Spraying | very good |
| Inv. Example 1792 | 9.9 | 99:1 | 0.40 | 64 | alkyl silicate | 22 | Spraying | very good |
| Inv. Example 1793 | 10.5 | 1:99 | 0.11 | 58 | alkyl silicate | 21 | Spraying | very good |
| Inv. Example 1794 | 7.6 | 1:3 | 0.13 | 33 | alkyl silicate | 29 | Spraying | very good |
| Inv. Example 1795 | 8.2 | 1:6 | 1.40 | 66 | alkali silicate | 23 | Spraying | very good |
| Inv. Example 1796 | 9.1 | 1:1 | 0.26 | 55 | alkyl silicate | 21 | Spraying | very good |
| Inv. Example 1797 | 10.6 | 1:7 | 1.24 | 49 | alkali silicate | 19 | Spraying | very good |
| Inv. Example 1798 | 8.4 | 1:5 | 2.47 | 77 | alkyl silicate | 21 | Spraying | very good |
| Inv. Example 1799 | 5.3 | 1:150 | 0.13 | 43 | alkali silicate | 19 | Spraying | very good |
| Inv. Example 1800 | 10.9 | 1:55 | 0.32 | 45 | alkyl silicate | 15 | Spraying | very good |
| Inv. Example 1801 | 7.8 | 1:121 | 0.16 | 66 | alkali silicate | 18 | Spraying | very good |

(*1) F: Fracture facets existing, FC: Fracture facets and/or cracks existing, NO: No fracture facet and/or crack

TABLE 103

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ |
| Comp. Example 117 | 2.3 | FC | 205.6 | 1.23 | 12.5 | 0.05 | Existence | No |
| Comp. Example 118 | 12.5 | FC | 0.005 | 1.36 | 2.1 | 0 | Existence | Existence |
| Comp. Example 119 | 18.9 | FC | 205.6 | 1.11 | 1.5 | 0.05 | Existence | Existence |
| Comp. Example 120 | 29.5 | FC | 0.005 | 1.07 | 0.05 | 2.29 | Existence | Existence |
| Comp. Example 121 | 14.5 | FC | 205.6 | 1.42 | 0 | 0 | Existence | Existence |
| Comp. Example 122 | 12.5 | FC | 0.005 | 1.38 | 0 | 0 | Existence | No |
| Comp. Example 123 | 18.9 | FC | 205.6 | 1.22 | 0.07 | 0 | Existence | Existence |
| Comp. Example 124 | 29.5 | FC | 0.005 | 1.14 | 0 | 0.07 | Existence | No |
| Comp. Example 125 | 2.3 | FC | 10.6 | 1.13 | 0 | 0.02 | Existence | Existence |
| Comp. Example 126 | 12.5 | FC | 5.7 | 1.02 | 22.1 | 0 | Existence | Existence |
| Comp. Example 127 | 0.5 | FC | 6.4 | 1.06 | 25.8 | 0.05 | Existence | No |
| Comp. Example 128 | 29.5 | FC | 3.2 | 1.23 | 22.1 | 0 | Existence | Existence |
| Comp. Example 129 | 14.5 | FC | 4.5 | 1.36 | 21.5 | 0.05 | Existence | Existence |
| Comp. Example 130 | 9.8 | FC | 5.2 | 1.11 | 0.05 | 2.29 | No | No |
| Comp. Example 131 | 4.6 | NO | 1.9 | 1.07 | 0 | 0 | Existence | Existence |
| Comp. Example 132 | 3.2 | FC | 18.5 | 1.42 | 0 | 0 | Existence | No |
| Comp. Example 133 | 29.9 | FC | 12.5 | 1.38 | 0.07 | 0 | Existence | Existence |
| Comp. Example 134 | 7.6 | NO | 9.8 | 1.22 | 0 | 0.07 | Existence | Existence |
| Comp. Example 135 | 29.9 | FC | 7.6 | 1.14 | 0 | 0.007 | Existence | Existence |
| Comp. Example 136 | 0.6 | FC | 6.9 | 1.13 | 36.5 | 3.25 | Existence | Existence |

TABLE 103-continued

| | | | | | | | | |
|---|---|---|---|---|---|---|---|---|
| Comp. Example 137 | 4.5 | FC | 10.5 | 1.02 | 0.005 | 0 | Existence | Existence |
| Comp. Example 138 | 3.7 | FC | 12.6 | 1.06 | 22.1 | 0 | Existence | Existence |

| | Mean Size of Zn Metallic particle ($\mu$m) | Blend Ratio (Zn Alloy particle:Zn Metal Particle) | Mg Contents to Total Metal Particle (mass %) | Ratio of Metal Particle in Dry Coat (mass %) | Base Resin | Coat Thickness ($\mu$m) | Coating Method | Result of Corrosion Test |
|---|---|---|---|---|---|---|---|---|
| Comp. Example 117 | 10.5 | 1:5 | 0.38 | 77 | alkyl silicate | 25 | Spraying | poor |
| Comp. Example 118 | 12.6 | 1:3 | 3.13 | 77 | urethane-based resin | 25 | Spraying | poor |
| Comp. Example 119 | 7.8 | 1:19 | 0.95 | 43 | alkyl silicate | 105 | Brushing | poor |
| Comp. Example 120 | 16.8 | 1:100 | 0.29 | 52 | alkali silicate | 165 | Spraying | poor |
| Comp. Example 121 | 10.5 | 1:260 | 0.06 | 66 | alkyl silicate | 25 | Spraying | poor |
| Comp. Example 122 | 12.6 | 1:3 | 3.13 | 72 | alkyl silicate | 25 | Spraying | poor |
| Comp. Example 123 | 7.8 | 1:19 | 0.95 | 40 | alkyl silicate | 105 | Brushing | poor |
| Comp. Example 124 | 16.8 | 1:100 | 0.29 | 36 | alkali silicate | 165 | Spraying | poor |
| Comp. Example 125 | 10.5 | 1:256 | 0.01 | 32 | alkyl silicate | 25 | Spraying | poor |
| Comp. Example 126 | 12.6 | 1:200 | 0.06 | 53 | alkyl silicate | 25 | Spraying | poor |
| Comp. Example 127 | 7.8 | 1:167 | 0.00 | 67 | alkyl silicate | 105 | Brushing | poor |
| Comp. Example 128 | 16.8 | 1:300 | 0.10 | 53 | urethane-based resin | 165 | Spraying | poor |
| Comp. Example 129 | 10.5 | 1:260 | 0.06 | 67 | alkyl silicate | 25 | Spraying | poor |
| Comp. Example 130 | 12.6 | 1:100 | 0.10 | 72 | alkyl silicate | 25 | Spraying | poor |
| Comp. Example 131 | 7.8 | 1:47 | 0.10 | 77 | alkyl silicate | 105 | Brushing | poor |
| Comp. Example 132 | 16.8 | 1:32 | 0.10 | 34 | urethane-based resin | 55 | Spraying | poor |
| Comp. Example 133 | 12.6 | 1:345 | 0.09 | 43 | alkyl silicate | 28 | Spraying | poor |
| Comp. Example 134 | 7.8 | 1:390 | 0.02 | 52 | alkyl silicate | 15 | Spraying | poor |
| Comp. Example 135 | 16.8 | 1:301 | 0.10 | 66 | alkyl silicate | 14 | Spraying | poor |
| Comp. Example 136 | 10.5 | 1:333 | 0.00 | 72 | urethane-based resin | 118 | Brushing | poor |
| Comp. Example 137 | 12.6 | 1:325 | 0.01 | 40 | alkyl silicate | 22 | Spraying | poor |
| Comp. Example 138 | 7.8 | 1:456 | 0.01 | 36 | alkyl silicate | 54 | Spraying | poor |

(*1) F: Fracture facets existing, FC: Fracture facets and/or cracks existing, NO: No fracture facet and/or crack

TABLE 104

| | Zn-Alloy Particle Properties | | | | | | | |
|---|---|---|---|---|---|---|---|---|
| | Mg (mass %) | Fracture Facet &/or Cracks (*1) | Mean Size ($\mu$m) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, $MgZn$, or $Mg_7Zn_3$ |
| Inv. Example 2576 | 7.5 | FC | 5.07 | 1.42 | 0 | 0 | Existence | Existence |
| Inv. Example 2577 | 8.06 | FC | 7.72 | 1.38 | 0 | 0 | Existence | Existence |
| Inv. Example 2578 | 9.3 | FC | 8.32 | 1.22 | 0 | 0 | Existence | No |
| Inv. Example 2579 | 3.5 | FC | 3.04 | 1.02 | 0 | 0 | Existence | Existence |
| Inv. Example 2580 | 2.7 | FC | 4.12 | 1.21 | 0 | 0 | Existence | No |
| Inv. Example 2581 | 9.2 | FC | 7.81 | 1.47 | 0 | 0 | Existence | Existence |
| Inv. Example 2582 | 8.1 | FC | 1.45 | 1.31 | 0 | 0 | Existence | No |
| Inv. Example 2583 | 7.5 | FC | 9.6 | 1.07 | 0 | 0 | Existence | Existence |
| Inv. Example 2584 | 4.5 | FC | 8.5 | 1.42 | 0 | 0 | Existence | No |

TABLE 104-continued

| | | | | | | | | |
|---|---|---|---|---|---|---|---|---|
| Inv. Example 2585 | 3.6 | FC | 3.2 | 1.05 | 0 | 0 | Existence | No |
| Inv. Example 2586 | 4.2 | FC | 5.7 | 1.02 | 1.5 | 0 | Existence | Existence |
| Inv. Example 2587 | 4.3 | FC | 6.4 | 1.06 | 5.5 | 1.6 | Existence | No |
| Inv. Example 2588 | 4 | FC | 3.2 | 1.05 | 0 | 0 | Existence | Existence |
| Inv. Example 2589 | 6.4 | FC | 5.2 | 1.33 | 0 | 0 | Existence | Existence |
| Inv. Example 2590 | 9.8 | FC | 5.2 | 1.33 | 0 | 0 | Existence | No |
| Inv. Example 2591 | 7.5 | FC | 5.07 | 1.42 | 0 | 0 | Existence | No |
| Inv. Example 2592 | 8.4 | FC | 7.72 | 1.38 | 0.5 | 0 | Existence | Existence |
| Inv. Example 2593 | 2.7 | FC | 4.12 | 1.21 | 0 | 0 | Existence | No |
| Inv. Example 2594 | 2.64 | FC | 5.5 | 1.22 | 0 | 0 | Existence | No |
| Inv. Example 2595 | 1.59 | FC | 6.7 | 1.14 | 0 | 0 | Existence | Existence |
| Inv. Example 2596 | 2.58 | FC | 8.9 | 1.13 | 0 | 0 | Existence | Existence |
| Inv. Example 2597 | 7.55 | FC | 2.15 | 1.14 | 0 | 0 | Existence | Existence |

| | Mean Size of Zn Metallic particle (μm) | Blend Ratio (Zn Alloy particle:Zn Metal Particle) | Mg Contents to Total Metal Particle (mass %) | Coat Properties | | | | |
|---|---|---|---|---|---|---|---|---|
| | | | | Ratio of Metal Particle in Dry Coat (mass %) | Base Resin | Coat Thickness (μm) | Coating Method | Result of Corrosion Test |
| Inv. Example 2576 | 23.43 | 0.71 | 10.5 | 74 | alkali silicate | 24 | Brushing | very good |
| Inv. Example 2577 | 5.96 | 0.64 | 12.5 | 82 | alkyl silicate | 25 | Spraying | very good |
| Inv. Example 2578 | 10.64 | 6.20 | 1.5 | 37 | alkali silicate | 14 | Spraying | very good |
| Inv. Example 2579 | 16.5 | 3.89 | 0.9 | 48 | alkali silicate | 15 | Spraying | very good |
| Inv. Example 2580 | 7.95 | 0.26 | 10.5 | 32 | alkali silicate | 15 | Spraying | very good |
| Inv. Example 2581 | 7.95 | 0.03 | 299.5 | 45 | alkyl silicate | 15 | Brushing | very good |
| Inv. Example 2582 | 9.64 | 16.20 | 0.5 | 37 | epoxy-based resin | 5 | Spraying | good |
| Inv. Example 2583 | 0.96 | 28.85 | 0.26 | 72 | urethane-based resin | 150 | Spraying | very good |
| Inv. Example 2584 | 5.26 | 15.00 | 0.3 | 40 | alkali silicate | 18 | Spraying | very good |
| Inv. Example 2585 | 13.5 | 1.20 | 3 | 40 | alkali silicate | 18 | Spraying | very good |
| Inv. Example 2586 | 13.5 | 0.20 | 20.5 | 72 | alkyl silicate | 58 | Spraying | very good |
| Inv. Example 2587 | 9.64 | 1.02 | 4.2 | 40 | alkyl silicate | 21 | Spraying | very good |
| Inv. Example 2588 | 16.5 | 2.67 | 1.5 | 36 | alkali silicate | 19 | Brushing | very good |
| Inv. Example 2589 | 20.59 | 1.28 | 5 | 53 | alkyl silicate | 77 | Spraying | very good |
| Inv. Example 2590 | 0.96 | 0.63 | 15.6 | 53 | alkyl silicate | 77 | Spraying | very good |
| Inv. Example 2591 | 6.54 | 15.00 | 0.5 | 66 | alkali silicate | 13 | Brushing | very good |
| Inv. Example 2592 | 5.26 | 4.42 | 1.9 | 67 | alkyl silicate | 22 | Brushing | very good |
| Inv. Example 2593 | 10.64 | 1.69 | 1.6 | 57 | alkali silicate | 15 | Spraying | very good |
| Inv. Example 2594 | 9.64 | 1.06 | 2.5 | 43 | alkyl silicate | 16 | Spraying | very good |
| Inv. Example 2595 | 6.9 | 3.18 | 0.5 | 76 | alkyl silicate | 5 | Spraying | very good |
| Inv. Example 2596 | 10.5 | 0.52 | 5 | 49 | alkyl silicate | 22 | Spraying | very good |
| Inv. Example 2597 | 13.5 | 6.29 | 1.2 | 75 | alkyl silicate | 18 | Spraying | very good |

(*1) F: Fracture facets existing, FC: Fracture facets and/or cracks existing, NO: No fracture facet and/or crack

TABLE 105

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, $MgZn$, or $Mg_7Zn_3$ |
| Inv. Example 2598 | 8.01 | FC | 2.54 | 1.13 | 0 | 0 | Existence | No |
| Inv. Example 2599 | 1.06 | FC | 3.4 | 1.38 | 0 | 0 | Existence | Existence |
| Inv. Example 2600 | 2.64 | FC | 5.5 | 1.22 | 0 | 0 | Existence | Existence |
| Inv. Example 2601 | 1.59 | FC | 6.7 | 1.14 | 0 | 0 | Existence | Existence |
| Inv. Example 2602 | 20.5 | FC | 2.15 | 1.14 | 1.5 | 0 | Existence | No |
| Inv. Example 2603 | 18.5 | FC | 2.54 | 1.13 | 5.5 | 1.6 | Existence | Existence |
| Inv. Example 2604 | 9.51 | FC | 2.77 | 1.38 | 4.5 | 0 | Existence | Existence |
| Inv. Example 2605 | 10.01 | FC | 3.68 | 1.22 | 0 | 1.6 | Existence | Existence |
| Inv. Example 2606 | 3.54 | FC | 5.5 | 1.22 | 0 | 0 | Existence | No |
| Inv. Example 2607 | 4.05 | FC | 2.06 | 1.13 | 0 | 0 | Existence | Existence |
| Inv. Example 2608 | 8.57 | FC | 4.99 | 1.02 | 0 | 0 | Existence | Existence |
| Inv. Example 2609 | 0.02 | FC | 6.4 | 1.06 | 0 | 0 | Existence | No |
| Inv. Example 2610 | 25.5 | FC | 3.09 | 1.07 | 0 | 0 | Existence | Existence |
| Inv. Example 2611 | 2.36 | FC | 3.99 | 1.22 | 0 | 0 | Existence | No |
| Inv. Example 2612 | 0.05 | FC | 7.72 | 1.38 | 0 | 0 | Existence | Existence |
| Inv. Example 2613 | 0.04 | FC | 8.32 | 1.22 | 0 | 0 | Existence | No |
| Inv. Example 2614 | 5.22 | FC | 3.55 | 1.12 | 0 | 0 | Existence | Existence |
| Inv. Example 2615 | 4.01 | FC | 2.64 | 1.23 | 0 | 0 | Existence | Existence |
| Inv. Example 2616 | 0.05 | FC | 5.2 | 1.33 | 0 | 0 | Existence | Existence |
| Inv. Example 2617 | 10.5 | FC | 1.9 | 1.27 | 0 | 0 | Existence | Existence |
| Inv. Example 2618 | 0.05 | FC | 2.5 | 1.05 | 0 | 1.2 | Existence | No |
| Inv. Example 2619 | 10.5 | FC | 0.09 | 1.12 | 0 | 0.6 | Existence | No |

| | Coat Properties | | | | | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 2598 | 20.59 | 0.94 | 8.5 | 73 | alkyl silicate | 16 | Spraying | very good |
| Inv. Example 2599 | 7.82 | 0.50 | 2.1 | 49 | alkyl silicate | 8 | Spraying | very good |
| Inv. Example 2600 | 5.26 | 10.56 | 0.25 | 43 | alkyl silicate | 16 | Spraying | very good |
| Inv. Example 2601 | 7.06 | 1.59 | 1 | 76 | alkyl silicate | 5 | Spraying | very good |
| Inv. Example 2602 | 0.64 | 8.20 | 2.5 | 75 | alkyl silicate | 18 | Spraying | very good |
| Inv. Example 2603 | 46.8 | 3.70 | 5 | 73 | alkyl silicate | 16 | Spraying | very good |
| Inv. Example 2604 | 16.5 | 1.73 | 5.5 | 55 | alkyl silicate | 5 | Spraying | very good |
| Inv. Example 2605 | 13.5 | 1.54 | 6.5 | 48 | alkyl silicate | 22 | Spraying | very good |
| Inv. Example 2606 | 0.96 | 2.36 | 1.5 | 78 | alkyl silicate | 18 | Spraying | very good |
| Inv. Example 2607 | 0.96 | 0.81 | 5 | 52 | alkyl silicate | 8 | Spraying | very good |
| Inv. Example 2608 | 8.45 | 1.53 | 5.6 | 61 | alkyl silicate | 16 | Spraying | very good |
| Inv. Example 2609 | 2.9 | 0.20 | 0.05 | 77 | polyester resin | 47 | Spraying | very good |
| Inv. Example 2610 | 5.4 | 2.43 | 10.5 | 49 | alkyl silicate | 22 | Spraying | very good |
| Inv. Example 2611 | 10.6 | 4.72 | 0.5 | 80 | alkyl silicate | 21 | Spraying | very good |
| Inv. Example 2612 | 2.32 | 0.07 | 0.75 | 36 | alkyl silicate | 19 | Brushing | very good |
| Inv. Example 2613 | 7.8 | 0.20 | 0.2 | 32 | alkyl silicate | 24 | Spraying | very good |
| Inv. Example 2614 | 7.95 | 0.50 | 10.5 | 55 | alkyl silicate | 19 | Spraying | very good |
| Inv. Example 2615 | 20.59 | 10.03 | 0.4 | 40 | alkyl silicate | 8 | Spraying | very good |
| Inv. Example 2616 | 22.5 | 0.06 | 0.9 | 53 | urethane-based resin | 20 | Brushing | very good |
| Inv. Example 2617 | 4.6 | 0.08 | 3.5 | 60 | polyester resin | 200 | Brushing | very good |

TABLE 105-continued

| | | | | | | | | |
|---|---|---|---|---|---|---|---|---|
| Inv. Example 2618 | 4.9 | 5.00 | 0.01 | 38 | alkali silicate | 19 | Spraying | very good |
| Inv. Example 2619 | 10.5 | 0.08 | 3.5 | 49 | alkyl silicate | 11 | Spraying | very good |

(*1) F: Fracture facets existing, FC: Fracture facets and/or cracks existing, NO: No fracture facet and/or crack

TABLE 106

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, $MgZn$, or $Mg_7Zn_3$ |
| Inv. Example 2620 | 2.64 | FC | 5.5 | 1.22 | 0 | 0.01 | Existence | No |
| Inv. Example 2621 | 0.08 | FC | 5.6 | 1.36 | 1.5 | 0 | Existence | Existence |
| Inv. Example 2622 | 0.09 | FC | 11.5 | 1.11 | 5.5 | 1.6 | Existence | No |
| Inv. Example 2623 | 0.05 | FC | 19.5 | 1.07 | 4.5 | 0 | Existence | Existence |
| Inv. Example 2624 | 1.59 | FC | 6.7 | 1.14 | 0 | 0.1 | Existence | Existence |
| Inv. Example 2625 | 2.58 | FC | 8.9 | 1.13 | 0.01 | 0 | Existence | Existence |
| Inv. Example 2626 | 9.8 | FC | 8.32 | 1.22 | 3.2 | 0.9 | Existence | Existence |
| Inv. Example 2627 | 0.18 | FC | 10.05 | 1.14 | 0 | 0.5 | Existence | Existence |
| Inv. Example 2628 | 7.55 | FC | 2.15 | 1.14 | 0.2 | 0.1 | Existence | Existence |
| Inv. Example 2629 | 0.01 | FC | 0.06 | 1.23 | 1.2 | 0.6 | Existence | No |
| Inv. Example 2630 | 12.5 | FC | 2.54 | 1.13 | 0.5 | 0 | Existence | Existence |
| Inv. Example 2631 | 1.06 | FC | 3.4 | 1.38 | 1.5 | 0.9 | Existence | Existence |
| Inv. Example 2632 | 0.04 | FC | 8.5 | 1.42 | 0 | 1.2 | Existence | No |
| Inv. Example 2633 | 0.06 | FC | 7.72 | 1.38 | 0 | 0.6 | Existence | Existence |
| Inv. Example 2634 | 9.51 | FC | 2.77 | 1.38 | 0 | 0.01 | Existence | No |
| Inv. Example 2635 | 15.5 | FC | 3.68 | 1.22 | 1.5 | 0 | Existence | Existence |
| Inv. Example 2636 | 0.05 | FC | 10.6 | 1.13 | 5.5 | 1.6 | Existence | No |
| Inv. Example 2637 | 8.8 | FC | 5.7 | 1.02 | 4.5 | 0 | Existence | No |
| Inv. Example 2638 | 3.54 | FC | 5.5 | 1.22 | 0 | 0.1 | Existence | Existence |
| Inv. Example 2639 | 10.5 | FC | 3.2 | 1.05 | 0.01 | 0 | Existence | Existence |
| Inv. Example 2640 | 0.07 | FC | 4.5 | 1.24 | 3.2 | 0.9 | Existence | Existence |
| Inv. Example 2641 | 15.5 | FC | 2.54 | 1.14 | 0 | 0.5 | Existence | No |

| | Coat Properties | | | | | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 2620 | 8.45 | 1.32 | 2 | 43 | alkyl silicate | 16 | Spraying | very good |
| Inv. Example 2621 | 30.5 | 2.00 | 0.04 | 66 | alkyl silicate | 16 | Brushing | very good |
| Inv. Example 2622 | 49.5 | 0.09 | 1 | 67 | alkali silicate | 33 | Brushing | very good |
| Inv. Example 2623 | 5.9 | 0.10 | 0.5 | 54 | alkyl silicate | 8 | Brushing | good |
| Inv. Example 2624 | 4.52 | 0.32 | 5 | 76 | alkyl silicate | 5 | Spraying | very good |
| Inv. Example 2625 | 5.96 | 0.26 | 10 | 49 | alkyl silicate | 22 | Spraying | very good |
| Inv. Example 2626 | 5.5 | 0.15 | 3.5 | 32 | alkyl silicate | 23 | Spraying | very good |
| Inv. Example 2627 | 3.6 | 0.20 | 0.9 | 53 | epoxy-based resin | 30 | Spraying | very good |
| Inv. Example 2628 | 16.5 | 2.16 | 3.5 | 75 | alkyl silicate | 18 | Spraying | very good |
| Inv. Example 2629 | 12.5 | 20.00 | 0.0005 | 75 | alkali silicate | 5 | Spraying | good |
| Inv. Example 2630 | 16.5 | 0.06 | 205.7 | 73 | alkyl silicate | 16 | Spraying | very good |
| Inv. Example 2631 | 10.9 | 2.12 | 0.5 | 49 | alkyl silicate | 8 | Spraying | very good |
| Inv. Example 2632 | 5.6 | 0.03 | 1.2 | 40 | alkali silicate | 2 | Spraying | very good |
| Inv. Example 2633 | 22.6 | 3.00 | 0.02 | 36 | alkyl silicate | 18 | Spraying | very good |

TABLE 106-continued

| | | | | | | | | |
|---|---|---|---|---|---|---|---|---|
| Inv. Example 2634 | 20.59 | 0.88 | 10.8 | 55 | alkyl silicate | 5 | Spraying | very good |
| Inv. Example 2635 | 20.59 | 0.10 | 152.3 | 48 | alkyl silicate | 22 | Spraying | very good |
| Inv. Example 2636 | 9.56 | 0.10 | 0.5 | 67 | acryl-based resin | 77 | Brushing | very good |
| Inv. Example 2637 | 5.9 | 0.12 | 2.5 | 72 | urethane-based resin | 54 | Brushing | very good |
| Inv. Example 2638 | 6.54 | 0.71 | 5 | 78 | alkyl silicate | 18 | Spraying | very good |
| Inv. Example 2639 | 21.4 | 0.20 | 9 | 34 | epoxy-based resin | 43 | Spraying | very good |
| Inv. Example 2640 | 9.8 | 0.70 | 0.1 | 43 | acryl-based resin | 52 | Brushing | very good |
| Inv. Example 2641 | 6.59 | 17.22 | 0.9 | 45 | alkyl silicate | 19 | Spraying | very good |

(*1) F: Fracture facets existing, FC: Fracture facets and/or cracks existing, NO: No fracture facet and/or crack

TABLE 107

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, $MgZn$, or $Mg_7Zn_3$ |
| Inv. Example 2642 | 4.05 | FC | 2.06 | 1.13 | 0.2 | 0.1 | Existence | Existence |
| Inv. Example 2643 | 8.57 | FC | 4.99 | 1.02 | 1.2 | 0.6 | Existence | No |
| Inv. Example 2644 | 5.8 | FC | 6.4 | 1.06 | 0.5 | 0 | Existence | Existence |
| Inv. Example 2645 | 4.59 | FC | 3.09 | 1.07 | 1.5 | 0.9 | Existence | No |
| Inv. Example 2646 | 9.88 | FC | 4.66 | 1.42 | 0 | 1.2 | Existence | No |
| Inv. Example 2647 | 4.55 | FC | 4.09 | 1.38 | 0 | 0.6 | Existence | Existence |
| Inv. Example 2648 | 2.36 | FC | 3.99 | 1.22 | 0 | 0.01 | Existence | No |
| Inv. Example 2649 | 0.05 | FC | 7.72 | 1.38 | 1.5 | 0 | Existence | Existence |
| Inv. Example 2650 | 0.04 | FC | 8.32 | 1.22 | 5.5 | 1.6 | Existence | Existence |
| Inv. Example 2651 | 2.64 | FC | 4.55 | 1.11 | 4.5 | 0 | Existence | No |
| Inv. Example 2652 | 0.06 | FC | 10.6 | 1.13 | 0 | 0.1 | Existence | No |
| Inv. Example 2653 | 0.18 | FC | 5.7 | 1.02 | 0.01 | 0 | Existence | Existence |
| Inv. Example 2654 | 6.31 | FC | 3.52 | 1.27 | 3.2 | 0.9 | Existence | No |
| Inv. Example 2655 | 5.22 | FC | 3.55 | 1.12 | 0 | 0.5 | Existence | No |
| Inv. Example 2656 | 28.5 | FC | 2.64 | 1.23 | 0.2 | 0.1 | Existence | Existence |
| Inv. Example 2657 | 3.52 | FC | 3.15 | 1.36 | 1.2 | 0.6 | Existence | Existence |
| Inv. Example 2658 | 9.5 | FC | 5.2 | 1.33 | 0.5 | 0 | Existence | Existence |
| Inv. Example 2659 | 0.04 | FC | 1.9 | 1.27 | 1.5 | 0.9 | Existence | No |
| Inv. Example 2660 | 0.06 | FC | 10.5 | 1.12 | 0 | 1.2 | Existence | Existence |
| Inv. Example 2661 | 0.05 | FC | 12.5 | 1.23 | 0 | 0.6 | Existence | Existence |
| Inv. Example 2662 | 5.6 | FC | 18.5 | 1.36 | 0 | 0.01 | Existence | Existence |
| Inv. Example 2663 | 0.01 | FC | 11.5 | 1.11 | 1.5 | 0 | Existence | No |

| | | | | Coat Properties | | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 2642 | 6.54 | 0.40 | 10.2 | 52 | polyester resin | 8 | Spraying | very good |
| Inv. Example 2643 | 16.5 | 0.07 | 120.5 | 61 | polyester resin | 16 | Spraying | very good |
| Inv. Example 2644 | 7.8 | 0.05 | 2.5 | 77 | alkyl silicate | 20 | Spraying | very good |
| Inv. Example 2645 | 16.5 | 0.72 | 6.4 | 49 | alkyl silicate | 22 | Spraying | very good |
| Inv. Example 2646 | 6.54 | 0.48 | 20.4 | 79 | alkyl silicate | 18 | Spraying | very good |
| Inv. Example 2647 | 8.45 | 0.54 | 8.5 | 76 | alkyl silicate | 18 | Spraying | very good |
| Inv. Example 2648 | 8.5 | 2.36 | 1 | 80 | alkyl silicate | 21 | Spraying | very good |
| Inv. Example 2649 | 13.6 | 0.71 | 0.07 | 36 | alkyl silicate | 19 | Brushing | very good |

TABLE 107-continued

| | | | | | | | | |
|---|---|---|---|---|---|---|---|---|
| Inv. Example 2650 | 12.33 | 0.04 | 1.1 | 32 | alkyl silicate | 24 | Spraying | very good |
| Inv. Example 2651 | 16.5 | 0.59 | 4.5 | 43 | alkyl silicate | 5 | Spraying | very good |
| Inv. Example 2652 | 7.9 | 0.12 | 0.5 | 67 | alkyl silicate | 7 | Spraying | very good |
| Inv. Example 2653 | 10.5 | 0.26 | 0.7 | 72 | epoxy-based resin | 100 | Spraying | very good |
| Inv. Example 2654 | 16.5 | 12.62 | 0.5 | 51 | alkyl silicate | 21 | Spraying | very good |
| Inv. Example 2655 | 10.64 | 2.09 | 2.5 | 55 | alkyl silicate | 19 | Spraying | very good |
| Inv. Example 2656 | 10.5 | 0.93 | 30.5 | 40 | alkyl silicate | 8 | Spraying | very good |
| Inv. Example 2657 | 20.59 | 14.08 | 0.25 | 51 | alkyl silicate | 16 | Spraying | very good |
| Inv. Example 2658 | 8.5 | 5.00 | 2.4 | 53 | alkyl silicate | 20 | Brushing | very good |
| Inv. Example 2659 | 0.5 | 0.01 | 7.5 | 60 | polyester resin | 200 | Brushing | very good |
| Inv. Example 2660 | 10.5 | 0.02 | 3.5 | 77 | alkyl silicate | 25 | Spraying | very good |
| Inv. Example 2661 | 11.5 | 0.01 | 3.9 | 43 | alkali silicate | 14 | Spraying | very good |
| Inv. Example 2662 | 36.5 | 0.09 | 2.5 | 52 | urethane-based resin | 112 | Spraying | very good |
| Inv. Example 2663 | 1.5 | 0.01 | 0.7 | 66 | alkali silicate | 24 | Spraying | very good |

(*1) F: Fracture facets existing, FC: Fracture facets and/or cracks existing, NO: No fracture facet and/or crack

TABLE 108

| | Zn-Alloy Particle Properties | | | | | | |
|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, $MgZn$, or $Mg_7Zn_3$ |
|---|---|---|---|---|---|---|---|---|
| Inv. Example 2664 | 0.08 | FC | 9.6 | 1.07 | 5.5 | 1.6 | Existence | Existence |
| Inv. Example 2665 | 0.03 | FC | 8.5 | 1.42 | 4.5 | 0 | Existence | Existence |
| Inv. Example 2666 | 4.25 | FC | 2.36 | 1.33 | 0 | 0.1 | Existence | Existence |
| Inv. Example 2667 | 0.04 | FC | 23.5 | 1.42 | 0.01 | 0 | Existence | No |
| Inv. Example 2668 | 0.06 | FC | 101.5 | 1.38 | 3.2 | 0.9 | Existence | Existence |
| Inv. Example 2669 | 0.06 | FC | 55.4 | 1.38 | 0 | 0.5 | Existence | Existence |
| Inv. Example 2670 | 0.07 | FC | 10.5 | 1.12 | 0.2 | 0.1 | Existence | No |
| Inv. Example 2671 | 0.01 | FC | 12.5 | 1.23 | 1.2 | 0.6 | Existence | Existence |
| Inv. Example 2672 | 0.08 | FC | 18.5 | 1.36 | 0.5 | 0 | Existence | No |
| Inv. Example 2673 | 0.09 | FC | 11.5 | 1.11 | 1.5 | 0.9 | Existence | Existence |
| Inv. Example 2674 | 0.05 | FC | 9.6 | 1.07 | 0.5 | 0 | Existence | No |
| Inv. Example 2675 | 0.06 | FC | 10.05 | 1.14 | 1.5 | 0.9 | Existence | Existence |
| Inv. Example 2676 | 29.9 | FC | 10.5 | 1.36 | 0 | 0 | Existence | Existence |
| Inv. Example 2677 | 16.5 | FC | 7.5 | 1.11 | 0.01 | 0 | Existence | Existence |
| Inv. Example 2678 | 12.5 | FC | 2.6 | 1.07 | 3.2 | 0.9 | Existence | No |
| Inv. Example 2679 | 9.8 | FC | 3.5 | 1.42 | 0 | 0.5 | Existence | Existence |
| Inv. Example 2680 | 9.6 | FC | 4.5 | 1.33 | 0.2 | 0.1 | Existence | No |
| Inv. Example 2681 | 7.5 | FC | 1.6 | 1.42 | 0 | 0.5 | Existence | Existence |
| Inv. Example 2682 | 4.6 | FC | 2.5 | 1.12 | 5.8 | 0.1 | Existence | Existence |
| Inv. Example 2683 | 3.8 | FC | 23.5 | 1.23 | 1.2 | 0.6 | Existence | Existence |
| Inv. Example 2684 | 0.05 | FC | 9.8 | 1.27 | 15.5 | 0 | Existence | Existence |

| | | | | Coat Properties | | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
|---|---|---|---|---|---|---|---|---|
| Inv. Example 2664 | 8.7 | 0.04 | 1.9 | 72 | urethane-based resin | 150 | Spraying | very good |
| Inv. Example 2665 | 7.8 | 0.01 | 4.5 | 40 | alkali silicate | 18 | Spraying | very good |
| Inv. Example 2666 | 5.96 | 14.17 | 0.3 | 44 | alkyl silicate | 18 | Spraying | very good |

TABLE 108-continued

| | | | | | | | | |
|---|---|---|---|---|---|---|---|---|
| Inv. Example 2667 | 0.06 | 0.50 | 0.08 | 44 | alkali silicate | 38 | Spraying | very good |
| Inv. Example 2668 | 0.9 | 1.20 | 0.05 | 36 | alkyl silicate | 18 | Spraying | very good |
| Inv. Example 2669 | 3.6 | 12.00 | 0.005 | 76 | alkyl silicate | 10 | Spraying | very good |
| Inv. Example 2670 | 10.5 | 0.03 | 2.8 | 77 | alkyl silicate | 37 | Spraying | very good |
| Inv. Example 2671 | 0.05 | 0.02 | 0.6 | 43 | alkali silicate | 2 | Spraying | good |
| Inv. Example 2672 | 2.32 | 0.08 | 1 | 52 | alkyl silicate | 160 | Brushing | very good |
| Inv. Example 2673 | 20.4 | 1.00 | 0.09 | 66 | alkali silicate | 5 | Brushing | very good |
| Inv. Example 2674 | 7.34 | 0.01 | 3.4 | 72 | alkyl silicate | 56 | Brushing | very good |
| Inv. Example 2675 | 9.4 | 0.04 | 1.5 | 53 | urethane-based resin | 99 | Spraying | very good |
| Inv. Example 2676 | 16.5 | 0.15 | 200 | 55 | urethane-based resin | 700 | Spraying | very good |
| Inv. Example 2677 | 7.9 | 1.10 | 15 | 47 | alkyl silicate | 554 | Spraying | very good |
| Inv. Example 2678 | 10.5 | 2.50 | 5 | 79 | urethane-based resin | 688 | Brushing | very good |
| Inv. Example 2679 | 16.5 | 6.53 | 1.5 | 42 | urethane-based resin | 421 | Spraying | very good |
| Inv. Example 2680 | 8.5 | 0.12 | 78 | 36 | urethane-based resin | 651 | Spraying | very good |
| Inv. Example 2681 | 10.5 | 1.50 | 5 | 53 | urethane-based resin | 402 | Brushing | very good |
| Inv. Example 2682 | 5.8 | 0.44 | 10.5 | 55 | alkali silicate | 354 | Spraying | very good |
| Inv. Example 2683 | 1.2 | 1.52 | 2.5 | 42 | urethane-based resin | 504 | Brushing | very good |
| Inv. Example 2684 | 15.5 | 0.05 | 1 | 76 | urethane-based resin | 666 | Spraying | very good |

(*1) F: Fracture facets existing, FC: Fracture facets and/or cracks existing, NO: No fracture facet and/or crack

Example 8

Zn alloy particles with the chemical ingredients shown in Tables 109 to 125 were produced in the same way as in Example 5. The rest is the same as Example 5.

$MgZn_2$, $Mg_2Zn_{11}$, $Mg_2Zn_3$, $MgZn$, and $Mg_7Zn_3$ were identified by analysis of the ratio of composition of the Mg and Zn at the physical fracture facets or crack surfaces by the X-ray diffraction method or by observation by a scanning electron microscopy with an energy dispersion type X-ray analyzer.

The number of facets of the Zn alloy particles was identified by observation of 50 to 100 randomly extracted particles using a scan type electron microscope.

From Tables 109 to 125, it is learned that due to the surfaces of the particles including fractured parts and/or cracks having as intermetallic compounds one or more types of compounds of $MgZn_2$, $Mg_2Zn_{11}$, $Mg_2Zn_3$, $MgZn$, and $Mg_7Zn_3$ or due to the number of facets being two facets or more, the painting test pieces using the Zn alloy particles and Zn metal particles of the present invention are improved in corrosion resistance and rust protection regardless of the type of base resin, that is, both for inorganic-based and organic-based binders.

TABLE 109

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ | # of facets |
| Inv. Example 329 | 17.3 | F | 29.24 | 1.37 | 11.4 | 0.24 | Existence | No | 6 |
| Inv. Example 330 | 18.5 | F | 1.28 | 1.10 | 0.04 | 0.03 | Existence | No | 7 |
| Inv. Example 331 | 19.3 | F | 33.57 | 1.04 | 0.25 | 0.07 | Existence | No | 7 |
| Inv. Example 332 | 3.5 | F | 3.04 | 1.02 | 5.43 | 0.65 | Existence | No | 6 |
| Inv. Example 333 | 22.5 | F | 7.54 | 1.01 | 17.5 | 2.41 | Existence | No | 6 |
| Inv. Example 334 | 23.7 | F | 68.12 | 1.08 | 0.01 | 0.08 | Existence | No | 6 |
| Inv. Example 335 | 24.2 | F | 0.52 | 1.14 | 0.02 | 2.23 | Existence | No | 6 |
| Inv. Example 336 | 0.2 | F | 0.12 | 1.23 | 0.02 | 0.06 | Existence | No | 7 |
| Inv. Example 337 | 27.1 | F | 58.74 | 1.33 | 0.04 | 0.02 | Existence | No | 6 |
| Inv. Example 338 | 29.3 | F | 13.57 | 1.37 | 0.05 | 0.02 | Existence | No | 7 |
| Inv. Example 339 | 0.5 | F | 6.4 | 1.44 | 1.24 | 1.37 | Existence | No | 7 |
| Inv. Example 340 | 2.7 | F | 41.23 | 1.21 | 27.5 | 2.43 | Existence | No | 6 |
| Inv. Example 341 | 28.4 | F | 0.72 | 1.22 | 0.01 | 0.02 | Existence | No | 7 |

TABLE 109-continued

| | | | | | | | | |
|---|---|---|---|---|---|---|---|---|
| Inv. Example 342 | 8.7 | F | 1.18 | 1.23 | 0.01 | 0.01 | Existence | No | 6 |
| Inv. Example 343 | 9.2 | F | 7.12 | 1.47 | 0.02 | 0.05 | Existence | No | 7 |
| Inv. Example 344 | 17.8 | F | 8.01 | 1.01 | 0.03 | 0.04 | Existence | No | 6 |
| Inv. Example 345 | 20.2 | F | 0.84 | 1.04 | 7.78 | 0.24 | Existence | No | 7 |
| Inv. Example 346 | 0.4 | F | 87.65 | 1.05 | 0.04 | 0.06 | Existence | No | 6 |
| Inv. Example 347 | 13.7 | F | 2.59 | 1.12 | 11.21 | 0.74 | Existence | No | 6 |
| Inv. Example 348 | 14.7 | F | 93.45 | 1.11 | 0.09 | 0.01 | Existence | No | 7 |
| Inv. Example 349 | 2.4 | F | 9.84 | 1.08 | 5.41 | 1.27 | Existence | No | 6 |
| Inv. Example 350 | 4.5 | F | 5.45 | 1.47 | 0.02 | 0.03 | Existence | No | 6 |
| Inv. Example 351 | 0.1 | F | 1.08 | 1.50 | 0.02 | 0.07 | Existence | No | 6 |
| Inv. Example 352 | 30.0 | F | 180.24 | 1.13 | 0.03 | 0.08 | Existence | Existence | 7 |
| Inv. Example 353 | 24.5 | F | 11.4 | 1.04 | 11.04 | 0.21 | Existence | Existence | 6 |
| Inv. Example 354 | 27.6 | F | 38.75 | 1.02 | 0.01 | 0.02 | Existence | Existence | 6 |

| | Mean Size of Zn Metallic particle (μm) | Blend Ratio (Zn Alloy particle:Zn Metal Particle) | Mg Contents to Total Metal Particle (mass %) | Coat Properties | | | | |
|---|---|---|---|---|---|---|---|---|
| | | | | Ratio of Metal Particle in Dry Coat (mass %) | Base Resin | Coat Thickness (μm) | Coating Method | Result of Corrosion Test |
| Inv. Example 329 | 18.54 | 70:1 | 17.06 | 52 | alkali silicate | 30 | Spraying | very good |
| Inv. Example 330 | 5.42 | 300:1 | 18.44 | 34 | alkyl silicate | 15 | Spraying | very good |
| Inv. Example 331 | 7.54 | 100:1 | 19.11 | 43 | alkali silicate | 42 | Brushing | very good |
| Inv. Example 332 | 2.04 | 250:1 | 3.49 | 53 | alkyl silicate | 5 | Brushing | very good |
| Inv. Example 333 | 8.54 | 50:1 | 22.06 | 60 | alkali silicate | 12 | Brushing | very good |
| Inv. Example 334 | 38.54 | 30:1 | 22.94 | 68 | alkyl silicate | 75 | Brushing | very good |
| Inv. Example 335 | 2.05 | 20:1 | 23.05 | 61 | alkali silicate | 2 | Spraying | very good |
| Inv. Example 336 | 6.04 | 65:1 | 0.20 | 59 | alkyl silicate | 10 | Spraying | very good |
| Inv. Example 337 | 27.85 | 300:1 | 27.01 | 39 | alkali silicate | 75 | Brushing | very good |
| Inv. Example 338 | 5.44 | 150:1 | 29.11 | 42 | alkyl silicate | 20 | Spraying | very good |
| Inv. Example 339 | 7.55 | 70:1 | 0.49 | 48 | alkali silicate | 18 | Spraying | very good |
| Inv. Example 340 | 31.47 | 65:1 | 2.66 | 44 | alkyl silicate | 52 | Brushing | very good |
| Inv. Example 341 | 3.24 | 65:1 | 27.97 | 72 | alkali silicate | 5 | Spraying | very good |
| Inv. Example 342 | 6.54 | 160:1 | 8.65 | 40 | alkyl silicate | 13 | Spraying | very good |
| Inv. Example 343 | 13.45 | 100:1 | 9.11 | 36 | alkali silicate | 24 | Spraying | very good |
| Inv. Example 344 | 5.64 | 50:1 | 17.45 | 32 | alkyl silicate | 19 | Spraying | very good |
| Inv. Example 345 | 3.48 | 85:1 | 19.97 | 53 | alkali silicate | 6 | Spraying | very good |
| Inv. Example 346 | 35.47 | 70:1 | 0.39 | 67 | alkyl silicate | 95 | Brushing | very good |
| Inv. Example 347 | 7.44 | 1:99 | 0.14 | 72 | alkali silicate | 15 | Brushing | very good |
| Inv. Example 348 | 6.21 | 1:60 | 0.24 | 73 | alkyl silicate | 100 | Brushing | very good |
| Inv. Example 349 | 3.33 | 1:15 | 0.15 | 54 | alkali silicate | 20 | Brushing | very good |
| Inv. Example 350 | 4.56 | 90:1 | 4.45 | 62 | alkyl silicate | 18 | Spraying | very good |
| Inv. Example 351 | 4.57 | 120:1 | 0.10 | 68 | alkali silicate | 13 | Spraying | very good |
| Inv. Example 352 | 33.47 | 100:1 | 29.70 | 35 | alkyl silicate | 11 | Spraying | very good |
| Inv. Example 353 | 7.41 | 1:99 | 0.25 | 37 | alkali silicate | 23 | Spraying | very good |
| Inv. Example 354 | 12.54 | 1:60 | 0.45 | 38 | alkyl silicate | 45 | Brushing | very good |

(*1) F: Fracture facets existing, FC: Fracture facets and/or cracks existing, NO: No fracture facet and/or crack

TABLE 110

| | | | | | | | Mg Solid-Solution Phase & Zn—Mg Intermetallic Compounds on Surface of Particles | | |
|---|---|---|---|---|---|---|---|---|---|
| | | Fracture | Mean | Average Value of | | | | | |
| | Mg | Facet &/or | Size | Aspect | Al | Si | | MgZn$_2$ or | # of |
| | (mass %) | Cracks (*1) | (μm) | Ratio | (mass %) | (mass %) | | Mg$_2$Zn$_{11}$ | facets |
| Inv. Example 355 | 4.1 | F | 119.87 | 1.08 | 0.07 | 0.04 | Existence | Existence | 6 |
| Inv. Example 356 | 3.2 | F | 1.42 | 1.15 | 0.08 | 0.01 | Existence | Existence | 7 |
| Inv. Example 357 | 2.7 | F | 12.5 | 1.34 | 0.04 | 0.03 | Existence | Existence | 6 |
| Inv. Example 358 | 0.12 | F | 31.24 | 1.25 | 0.02 | 0.04 | Existence | Existence | 6 |
| Inv. Example 359 | 0.22 | F | 152.46 | 1.19 | 0.02 | 0.02 | Existence | Existence | 6 |
| Inv. Example 360 | 0.37 | F | 13.4 | 1.18 | 4.12 | 0.61 | Existence | Existence | 6 |
| Inv. Example 361 | 1.4 | F | 1.61 | 1.24 | 0.05 | 0.02 | Existence | Existence | 6 |
| Inv. Example 362 | 4.2 | F | 14.1 | 1.11 | 2.14 | 0.74 | Existence | Existence | 7 |
| Inv. Example 363 | 4.8 | F | 1.67 | 1.27 | 0.03 | 0.02 | Existence | Existence | 6 |
| Inv. Example 364 | 8.1 | F | 1.45 | 1.31 | 0.03 | 0.04 | Existence | Existence | 6 |
| Inv. Example 365 | 7.6 | F | 14.8 | 1.26 | 0.04 | 0.05 | Existence | Existence | 7 |
| Inv. Example 366 | 9.9 | F | 1.31 | 1.14 | 7.54 | 1.24 | Existence | Existence | 6 |
| Inv. Example 367 | 14.8 | F | 15.5 | 1.34 | 0.08 | 0.06 | Existence | Existence | 6 |
| Inv. Example 368 | 16.7 | F | 0.67 | 1.16 | 0.01 | 0.07 | Existence | Existence | 6 |
| Inv. Example 369 | 17.9 | F | 137.89 | 1.47 | 29.8 | 0.75 | Existence | Existence | 7 |
| Inv. Example 370 | 19.5 | F | 1.63 | 1.48 | 0.01 | 0.02 | Existence | Existence | 6 |
| Inv. Example 371 | 22.4 | F | 1.12 | 1.49 | 0.03 | 0.01 | Existence | Existence | 7 |
| Inv. Example 372 | 0.17 | F | 169.88 | 1.34 | 0.02 | 0.01 | Existence | Existence | 6 |
| Inv. Example 373 | 8.3 | F | 1.72 | 1.29 | 8.04 | 1.24 | Existence | Existence | 6 |
| Inv. Example 374 | 6.5 | F | 10.5 | 1.18 | 0.06 | 0.04 | Existence | Existence | 6 |
| Inv. Example 375 | 9.7 | F | 17.7 | 1.23 | 0.08 | 0.02 | Existence | Existence | 6 |
| Inv. Example 376 | 11.4 | F | 122.54 | 1.27 | 0.03 | 0.01 | Existence | Existence | 6 |
| Inv. Example 377 | 22.5 | F | 1.84 | 1.17 | 0.04 | 0.03 | Existence | Existence | 6 |
| Inv. Example 378 | 25.7 | F | 19.1 | 1.16 | 7.42 | 1.22 | Existence | Existence | 7 |
| Inv. Example 379 | 17.8 | F | 1.75 | 1.49 | 0.02 | 0.01 | Existence | Existence | 6 |
| Inv. Example 380 | 0.14 | F | 198.78 | 1.34 | 0.08 | 0.02 | Existence | Existence | 6 |

| | Coat Properties | | | | | | | |
|---|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 355 | 2.37 | 1:15 | 0.26 | 35 | alkali silicate | 130 | Brushing | very good |
| Inv. Example 356 | 6.65 | 90:1 | 3.16 | 37 | alkyl silicate | 17 | Brushing | very good |
| Inv. Example 357 | 8.14 | 120:1 | 2.68 | 38 | alkali silicate | 19 | Brushing | very good |
| Inv. Example 358 | 8.88 | 100:1 | 0.12 | 41 | alkyl silicate | 45 | Brushing | very good |
| Inv. Example 359 | 24.78 | 1:60 | 0.00 | 54 | epoxy-based resin | 160 | Brushing | very good |
| Inv. Example 360 | 9.54 | 130:1 | 0.37 | 57 | acryl-based resin | 21 | Spraying | very good |
| Inv. Example 361 | 3.54 | 160:1 | 1.39 | 59 | urethane-based resin | 15 | Spraying | very good |
| Inv. Example 362 | 4.11 | 100:1 | 4.16 | 64 | polyester resin | 7 | Spraying | very good |
| Inv. Example 363 | 3.87 | 50:1 | 4.71 | 66 | epoxy-based resin | 12 | Spraying | very good |
| Inv. Example 364 | 5.54 | 1:80 | 0.10 | 67 | acryl-based resin | 19 | Spraying | very good |
| Inv. Example 365 | 11.14 | 1:60 | 0.12 | 75 | urethane-based resin | 25 | Spraying | very good |
| Inv. Example 366 | 5.78 | 1:15 | 0.62 | 74 | polyester resin | 18 | Spraying | very good |
| Inv. Example 367 | 22.14 | 90:1 | 14.64 | 77 | epoxy-based resin | 30 | Spraying | very good |
| Inv. Example 368 | 2.04 | 120:1 | 16.56 | 41 | acryl-based resin | 2 | Brushing | very good |
| Inv. Example 369 | 38.47 | 100:1 | 17.72 | 34 | urethane-based resin | 157 | Brushing | very good |
| Inv. Example 370 | 6.47 | 170:1 | 19.39 | 43 | polyester resin | 13 | Brushing | very good |
| Inv. Example 371 | 5.22 | 300:1 | 22.33 | 53 | epoxy-based resin | 24 | Brushing | very good |
| Inv. Example 372 | 32.14 | 200:1 | 0.17 | 60 | acryl-based resin | 180 | Brushing | very good |

TABLE 110-continued

| | | | | | | | | |
|---|---|---|---|---|---|---|---|---|
| Inv. Example 373 | 5.22 | 300:1 | 8.27 | 35 | urethane-based resin | 14 | Brushing | very good |
| Inv. Example 374 | 10.45 | 150:1 | 6.46 | 37 | polyester resin | 22 | Brushing | very good |
| Inv. Example 375 | 6.87 | 65:1 | 9.55 | 30 | epoxy-based resin | 27 | Brushing | very good |
| Inv. Example 376 | 24.45 | 300:1 | 11.36 | 80 | acryl-based resin | 135 | Brushing | very good |
| Inv. Example 377 | 4.47 | 150:1 | 22.35 | 35 | urethane-based resin | 28 | Spraying | very good |
| Inv. Example 378 | 12.47 | 70:1 | 25.34 | 42 | polyester resin | 31 | Spraying | very good |
| Inv. Example 379 | 6.45 | 300:1 | 17.74 | 66 | epoxy-based resin | 16 | Spraying | very good |
| Inv. Example 380 | 39.45 | 100:1 | 0.14 | 35 | acryl-based resin | 199 | Brushing | very good |

(*1) F: Fracture facets existing, FC: Fracture facets and/or cracks existing, NO: No fracture facet and/or crack

TABLE 111

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | # of facets |
| Inv. Example 1802 | 0.15 | FC | 0.02 | 1.05 | 0.1 | 0.07 | Existence | Existence | 6 |
| Inv. Example 1803 | 0.19 | FC | 10.5 | 1.12 | 0.04 | 0.1 | Existence | Existence | 6 |
| Inv. Example 1804 | 0.18 | FC | 12.5 | 1.23 | 30.0 | 0.01 | Existence | No | 7 |
| Inv. Example 1805 | 0.11 | FC | 18.5 | 1.36 | 0.02 | 3 | Existence | Existence | 7 |
| Inv. Example 1806 | 0.15 | FC | 11.5 | 1.11 | 0 | 0 | Existence | No | 6 |
| Inv. Example 1807 | 0.24 | FC | 9.6 | 1.07 | 0 | 0 | Existence | Existence | 6 |
| Inv. Example 1808 | 0.18 | FC | 8.5 | 1.42 | 10.4 | 0.57 | Existence | No | 6 |
| Inv. Example 1809 | 0.12 | FC | 7.72 | 1.38 | 4.65 | 2.67 | Existence | Existence | 7 |
| Inv. Example 1810 | 0.19 | FC | 8.32 | 1.22 | 24.8 | 2.4 | Existence | No | 6 |
| Inv. Example 1811 | 0.18 | FC | 10.05 | 1.14 | 4.52 | 0.57 | Existence | No | 6 |
| Inv. Example 1812 | 0.21 | FC | 10.6 | 1.13 | 17.5 | 2.45 | Existence | Existence | 6 |
| Inv. Example 1813 | 0.76 | FC | 5.7 | 1.02 | 0 | 0 | Existence | No | 7 |
| Inv. Example 1814 | 0.11 | FC | 6.4 | 1.06 | 11.05 | 0.23 | Existence | Existence | 6 |
| Inv. Example 1815 | 0.14 | FC | 3.2 | 1.05 | 2.65 | 0.74 | Existence | Existence | 7 |
| Inv. Example 1816 | 15 | FC | 4.5 | 1.24 | 6.45 | 2.14 | Existence | No | 6 |
| Inv. Example 1817 | 14.5 | FC | 5.2 | 1.33 | 0 | 0 | Existence | No | 6 |
| Inv. Example 1818 | 18.5 | FC | 1.9 | 1.27 | 0 | 0 | Existence | Existence | 6 |
| Inv. Example 1819 | 15.1 | FC | 0.02 | 1.05 | 0.05 | 0.03 | Existence | No | 7 |
| Inv. Example 1820 | 15.6 | FC | 10.5 | 1.12 | 0 | 0.08 | Existence | No | 6 |
| Inv. Example 1821 | 12.5 | FC | 12.5 | 1.23 | 0.05 | 0 | Existence | Existence | 6 |
| Inv. Example 1822 | 18.7 | FC | 18.5 | 1.36 | 0.44 | 0.07 | Existence | Existence | 7 |
| Inv. Example 1823 | 14.5 | FC | 11.5 | 1.11 | 0.08 | 0.07 | Existence | Existence | 6 |

| | Mean Size of Zn Metallic particle (μm) | Blend Ratio (Zn Alloy particle:Zn Metal Particle) | Mg Contents to Total Metal Particle (mass %) | Coat Properties | | | | |
|---|---|---|---|---|---|---|---|---|
| | | | | Ratio of Metal Particle in Dry Coat (mass %) | Base Resin | Coat Thickness (μm) | Coating Method | Result of Corrosion Test |
| Inv. Example 1802 | 2.04 | 5:2 | 0.11 | 35 | alkali silicate | 2 | Spraying | very good |
| Inv. Example 1803 | 50.00 | 7:1 | 0.17 | 77 | alkyl silicate | 37 | Spraying | very good |
| Inv. Example 1804 | 2.45 | 68:1 | 0.18 | 43 | alkali silicate | 2 | Spraying | good |
| Inv. Example 1805 | 5.33 | 10:1 | 0.10 | 52 | alkyl silicate | 160 | Brushing | very good |
| Inv. Example 1806 | 2.41 | 25:7 | 0.12 | 66 | alkali silicate | 5 | Brushing | very good |
| Inv. Example 1807 | 23.43 | 300:9 | 0.23 | 72 | alkali silicate | 56 | Brushing | very good |
| Inv. Example 1808 | 6.03 | 180:1 | 0.18 | 40 | alkali silicate | 2 | Spraying | very good |
| Inv. Example 1809 | 24.5 | 23:1 | 0.12 | 36 | alkyl silicate | 18 | Spraying | very good |

TABLE 111-continued

| | | | | | | | | |
|---|---|---|---|---|---|---|---|---|
| Inv. Example 1810 | 5.32 | 165:1 | 0.19 | 32 | alkyl silicate | 23 | Spraying | very good |
| Inv. Example 1811 | 14.34 | 300:1 | 0.18 | 53 | epoxy-based resin | 30 | Brushing | very good |
| Inv. Example 1812 | 5.04 | 120:1 | 0.21 | 67 | acryl-based resin | 77 | Brushing | very good |
| Inv. Example 1813 | 2.32 | 2:9 | 0.14 | 72 | urethane-based resin | 54 | Brushing | very good |
| Inv. Example 1814 | 20.34 | 119:3 | 0.11 | 77 | polyester resin | 47 | Spraying | very good |
| Inv. Example 1815 | 12.33 | 233:1 | 0.14 | 34 | epoxy-based resin | 43 | Spraying | very good |
| Inv. Example 1816 | 17.84 | 1:132 | 0.11 | 43 | acryl-based resin | 52 | Brushing | very good |
| Inv. Example 1817 | 6.66 | 1:55 | 10.24 | 53 | urethane-based resin | 20 | Brushing | very good |
| Inv. Example 1818 | 3.65 | 1:23 | 0.77 | 60 | polyester resin | 200 | Brushing | very good |
| Inv. Example 1819 | 22.62 | 200:1 | 15.02 | 35 | alkali silicate | 22 | Spraying | very good |
| Inv. Example 1820 | 45.33 | 1:15 | 0.98 | 77 | alkyl silicate | 25 | Spraying | very good |
| Inv. Example 1821 | 43.22 | 1:10 | 1.14 | 43 | alkali silicate | 14 | Spraying | very good |
| Inv. Example 1822 | 12.33 | 1:6 | 2.67 | 52 | urethane-based resin | 112 | Spraying | very good |
| Inv. Example 1823 | 13.42 | 1:45 | 0.32 | 66 | alkali silicate | 24 | Spraying | very good |

(*1) F: Fracture facets existing, FC: Fracture facets and/or cracks existing, NO: No fracture facet and/or crack

TABLE 112

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | # of facets |
| Inv. Example 1824 | 7.5 | FC | 9.6 | 1.07 | 0.1 | 0.2 | Existence | No | 7 |
| Inv. Example 1825 | 4.5 | FC | 8.5 | 1.42 | 0 | 0 | Existence | Existence | 6 |
| Inv. Example 1826 | 1.5 | FC | 7.72 | 1.38 | 0 | 0 | Existence | Existence | 6 |
| Inv. Example 1827 | 4.8 | FC | 8.32 | 1.22 | 0 | 0.07 | Existence | Existence | 6 |
| Inv. Example 1828 | 9.6 | FC | 10.05 | 1.14 | 0 | 0.02 | Existence | No | 6 |
| Inv. Example 1829 | 11.5 | FC | 10.6 | 1.13 | 25.8 | 0.05 | Existence | Existence | 7 |
| Inv. Example 1830 | 9.8 | FC | 5.7 | 1.02 | 22.1 | 0 | Existence | Existence | 6 |
| Inv. Example 1831 | 7.6 | FC | 6.4 | 1.06 | 21.5 | 0.05 | Existence | Existence | 6 |
| Inv. Example 1832 | 3.2 | FC | 3.2 | 1.05 | 0.05 | 2.29 | Existence | No | 6 |
| Inv. Example 1833 | 1.9 | FC | 4.5 | 1.24 | 0.05 | 0.03 | Existence | Existence | 7 |
| Inv. Example 1834 | 11.5 | FC | 5.2 | 1.33 | 0 | 0.08 | Existence | Existence | 6 |
| Inv. Example 1835 | 8.7 | FC | 1.9 | 1.27 | 0 | 0 | Existence | No | 6 |
| Inv. Example 1836 | 9.6 | FC | 0.02 | 1.05 | 0 | 0 | Existence | Existence | 7 |
| Inv. Example 1837 | 9.4 | FC | 10.5 | 1.12 | 0.08 | 0.07 | Existence | No | 6 |
| Inv. Example 1838 | 10.5 | FC | 12.5 | 1.23 | 0.1 | 0.2 | Existence | Existence | 6 |
| Inv. Example 1839 | 12.6 | FC | 18.5 | 1.36 | 0.05 | 0.2 | Existence | No | 6 |
| Inv. Example 1840 | 29.5 | FC | 11.5 | 1.11 | 0.07 | 0 | Existence | Existence | 6 |
| Inv. Example 1841 | 29.4 | FC | 9.6 | 1.07 | 0 | 0.07 | Existence | Existence | 7 |
| Inv. Example 1842 | 27.5 | FC | 8.5 | 1.42 | 0 | 0.02 | Existence | Existence | 6 |
| Inv. Example 1843 | 0.8 | FC | 7.72 | 1.38 | 25.8 | 0.05 | Existence | Existence | 6 |
| Inv. Example 1844 | 1.6 | FC | 8.32 | 1.22 | 22.1 | 0 | Existence | No | 7 |
| Inv. Example 1845 | 22.9 | FC | 10.05 | 1.14 | 21.5 | 0.05 | Existence | No | 6 |

| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
|---|---|---|---|---|---|---|---|---|
| Inv. Example 1824 | 22.32 | 1:50 | 0.15 | 72 | urethane-based resin | 150 | Spraying | very good |
| Inv. Example 1825 | 7.34 | 1:9 | 0.45 | 40 | alkali silicate | 18 | Spraying | very good |

TABLE 112-continued

| | | | | | | | | |
|---|---|---|---|---|---|---|---|---|
| Inv. Example 1826 | 44.54 | 1:7 | 0.19 | 36 | alkyl silicate | 19 | Brushing | very good |
| Inv. Example 1827 | 32.87 | 1:4 | 0.96 | 32 | alkyl silicate | 24 | Spraying | very good |
| Inv. Example 1828 | 20.32 | 1:14 | 0.64 | 53 | urethane-based resin | 99 | Spraying | very good |
| Inv. Example 1829 | 2.03 | 1:11 | 0.96 | 67 | alkyl silicate | 7 | Spraying | very good |
| Inv. Example 1830 | 5.33 | 1:28 | 0.34 | 72 | epoxy-based resin | 100 | Spraying | very good |
| Inv. Example 1831 | 2.33 | 1:4 | 1.52 | 77 | alkyl silicate | 27 | Brushing | very good |
| Inv. Example 1832 | 27.44 | 250:1 | 3.19 | 34 | alkali silicate | 15 | Spraying | very good |
| Inv. Example 1833 | 12.33 | 1:1 | 0.95 | 43 | alkyl silicate | 14 | Spraying | very good |
| Inv. Example 1834 | 36.43 | 1:4 | 2.30 | 53 | urethane-based resin | 55 | Spraying | very good |
| Inv. Example 1835 | 12.33 | 1:12 | 0.67 | 35 | alkyl silicate | 8 | Spraying | very good |
| Inv. Example 1836 | 3.21 | 70:1 | 9.46 | 77 | urethane-based resin | 122 | Brushing | very good |
| Inv. Example 1837 | 26.33 | 1:3 | 2.35 | 43 | alkyl silicate | 54 | Spraying | very good |
| Inv. Example 1838 | 44.21 | 1:24 | 0.42 | 52 | alkali silicate | 19 | Spraying | very good |
| Inv. Example 1839 | 3.43 | 1:10 | 1.15 | 66 | alkyl silicate | 25 | Brushing | very good |
| Inv. Example 1840 | 47.32 | 300:1 | 29.40 | 72 | alkyl silicate | 58 | Spraying | very good |
| Inv. Example 1841 | 12.33 | 1:66 | 0.44 | 40 | alkyl silicate | 21 | Spraying | very good |
| Inv. Example 1842 | 17.44 | 120:1 | 27.27 | 36 | alkali silicate | 19 | Brushing | very good |
| Inv. Example 1843 | 42.21 | 6:5 | 0.44 | 32 | urethane-based resin | 56 | Spraying | very good |
| Inv. Example 1844 | 12.34 | 1:1 | 0.80 | 53 | alkyl silicate | 77 | Spraying | very good |
| Inv. Example 1845 | 20.32 | 1:1 | 11.45 | 67 | alkyl silicate | 54 | Spraying | very good |

(*1) F: Fracture facets existing, FC: Fracture facets and/or cracks existing, NO: No fracture facet and/or crack

TABLE 113

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ | # of facets |
| Inv. Example 1846 | 28.5 | FC | 10.6 | 1.13 | 0.05 | 2.29 | Existence | No | 6 |
| Inv. Example 1847 | 29.5 | FC | 5.7 | 1.02 | 0.1 | 0.2 | Existence | Existence | 6 |
| Inv. Example 1848 | 18.7 | FC | 6.4 | 1.06 | 0.05 | 0.2 | Existence | No | 7 |
| Inv. Example 1849 | 19.5 | FC | 3.2 | 1.05 | 0.07 | 0 | Existence | Existence | 6 |
| Inv. Example 1850 | 20.4 | FC | 4.5 | 1.24 | 0 | 0.07 | Existence | Existence | 6 |
| Inv. Example 1851 | 0.6 | FC | 5.2 | 1.33 | 0 | 0.02 | Existence | Existence | 6 |
| Inv. Example 1852 | 0.8 | FC | 1.9 | 1.27 | 22.1 | 0 | Existence | Existence | 7 |
| Inv. Example 1853 | 22.5 | FC | 0.02 | 1.05 | 0.1 | 0.07 | Existence | Existence | 6 |
| Inv. Example 1854 | 20.6 | FC | 10.5 | 1.12 | 0.04 | 0.1 | Existence | Existence | 6 |
| Inv. Example 1855 | 21.6 | FC | 12.5 | 1.23 | 30.0 | 0.01 | Existence | No | 7 |
| Inv. Example 1856 | 20.8 | FC | 7.72 | 1.38 | 0 | 0 | Existence | Existence | 7 |
| Inv. Example 1857 | 23.6 | FC | 8.32 | 1.22 | 0 | 0 | Existence | Existence | 6 |
| Inv. Example 1858 | 24.5 | FC | 10.05 | 1.14 | 4.52 | 0.57 | Existence | No | 6 |
| Inv. Example 1859 | 18.6 | FC | 10.6 | 1.13 | 17.5 | 2.45 | Existence | Existence | 7 |
| Inv. Example 1860 | 17.8 | FC | 5.2 | 1.33 | 27.6 | 2.4 | Existence | No | 6 |
| Inv. Example 1861 | 16.5 | FC | 1.9 | 1.27 | 4.32 | 1.07 | Existence | Existence | 6 |
| Inv. Example 1862 | 14.5 | FC | 0.02 | 1.05 | 0.05 | 0.03 | Existence | No | 7 |
| Inv. Example 1863 | 19 | FC | 10.5 | 1.12 | 0 | 0.08 | Existence | No | 6 |
| Inv. Example 1864 | 15 | FC | 12.5 | 1.23 | 0.05 | 0 | Existence | Existence | 6 |
| Inv. Example 1865 | 16.4 | FC | 18.5 | 1.36 | 0.44 | 0.07 | Existence | Existence | 7 |

TABLE 113-continued

| | | | | | | | | | |
|---|---|---|---|---|---|---|---|---|---|
| Inv. Example 1866 | 13.5 | FC | 11.5 | 1.11 | 0.08 | 0.07 | Existence | Existence | 6 |
| Inv. Example 1867 | 10.6 | FC | 11.5 | 1.11 | 8.02 | 2.04 | Existence | No | 6 |

| | Mean Size of Zn Metallic particle (μm) | Blend Ratio (Zn Alloy particle:Zn Metal Particle) | Mg Contents to Total Metal Particle (mass %) | Coat Properties | | | | |
|---|---|---|---|---|---|---|---|---|
| | | | | Ratio of Metal Particle in Dry Coat (mass %) | Base Resin | Coat Thickness (μm) | Coating Method | Result of Corrosion Test |
| Inv. Example 1846 | 23.44 | 1:76 | 0.37 | 72 | alkyl silicate | 64 | Spraying | very good |
| Inv. Example 1847 | 23.45 | 1:6 | 4.21 | 77 | alkyl silicate | 34 | Brushing | very good |
| Inv. Example 1848 | 23.21 | 1:35 | 0.52 | 34 | alkali silicate | 28 | Spraying | very good |
| Inv. Example 1849 | 39.44 | 1:5 | 3.25 | 43 | urethane-based resin | 109 | Brushing | very good |
| Inv. Example 1850 | 12.34 | 1:62 | 0.32 | 53 | alkyl silicate | 15 | Spraying | very good |
| Inv. Example 1851 | 29.99 | 1:4 | 0.12 | 72 | alkyl silicate | 14 | Spraying | very good |
| Inv. Example 1852 | 15.21 | 5:9 | 0.29 | 77 | alkyl silicate | 18 | Spraying | very good |
| Inv. Example 1853 | 23.34 | 1:220 | 0.10 | 35 | alkali silicate | 2 | Spraying | very good |
| Inv. Example 1854 | 2.32 | 1:80 | 0.25 | 77 | alkyl silicate | 37 | Spraying | very good |
| Inv. Example 1855 | 4.21 | 1:50 | 0.42 | 43 | alkali silicate | 2 | Spraying | good |
| Inv. Example 1856 | 15.21 | 1:10 | 1.89 | 52 | alkyl silicate | 160 | Brushing | very good |
| Inv. Example 1857 | 23.34 | 1:1 | 11.80 | 66 | alkali silicate | 5 | Brushing | very good |
| Inv. Example 1858 | 2.32 | 1:78 | 0.31 | 72 | alkyl silicate | 56 | Brushing | very good |
| Inv. Example 1859 | 4.21 | 1:10 | 1.69 | 40 | alkali silicate | 2 | Spraying | very good |
| Inv. Example 1860 | 29.99 | 1:50 | 0.35 | 36 | alkyl silicate | 18 | Spraying | very good |
| Inv. Example 1861 | 15.21 | 1:10 | 1.50 | 32 | alkyl silicate | 23 | Spraying | very good |
| Inv. Example 1862 | 23.34 | 1:1 | 7.25 | 53 | epoxy-based resin | 30 | Brushing | very good |
| Inv. Example 1863 | 2.32 | 1:3 | 4.75 | 67 | acryl-based resin | 77 | Brushing | very good |
| Inv. Example 1864 | 4.21 | 1:7 | 1.88 | 72 | urethane-based resin | 54 | Brushing | very good |
| Inv. Example 1865 | 15.21 | 1:50 | 0.32 | 77 | polyester resin | 47 | Spraying | very good |
| Inv. Example 1866 | 23.34 | 1:10 | 1.23 | 34 | epoxy-based resin | 43 | Spraying | very good |
| Inv. Example 1867 | 13.45 | 1:3 | 2.65 | 43 | acryl-based resin | 52 | Brushing | very good |

(*1) F: Fracture facets existing, FC: Fracture facets and/or cracks existing, NO: No fracture facet and/or crack

TABLE 114

| | Zn-Alloy Particle Properties | | | | | | | | |
|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ | # of facets |
| Inv. Example 1868 | 10.7 | FC | 9.6 | 1.07 | 15.6 | 1.27 | Existence | Existence | 6 |
| Inv. Example 1869 | 10.9 | FC | 8.5 | 1.42 | 10.4 | 0.57 | Existence | No | 6 |
| Inv. Example 1870 | 11.6 | FC | 7.72 | 1.38 | 4.65 | 2.67 | Existence | Existence | 7 |
| Inv. Example 1871 | 14.7 | FC | 8.32 | 1.22 | 24.8 | 2.4 | Existence | No | 6 |
| Inv. Example 1872 | 19.5 | FC | 10.05 | 1.14 | 4.52 | 0.57 | Existence | No | 6 |
| Inv. Example 1873 | 10.2 | FC | 10.6 | 1.13 | 0 | 0 | Existence | Existence | 6 |
| Inv. Example 1874 | 4 | FC | 5.7 | 1.02 | 0 | 0 | Existence | No | 7 |
| Inv. Example 1875 | 7.2 | FC | 6.4 | 1.06 | 11.05 | 0.23 | Existence | Existence | 6 |
| Inv. Example 1876 | 3.6 | FC | 3.2 | 1.05 | 2.65 | 0.74 | Existence | Existence | 7 |

TABLE 114-continued

| | | | | | | | | | |
|---|---|---|---|---|---|---|---|---|---|
| Inv. Example 1877 | 26.9 | FC | 4.5 | 1.24 | 6.45 | 2.14 | Existence | No | 6 |
| Inv. Example 1878 | 27.9 | FC | 5.2 | 1.33 | 27.6 | 2.4 | Existence | No | 6 |
| Inv. Example 1879 | 28.9 | FC | 1.9 | 1.27 | 4.32 | 1.07 | Existence | Existence | 6 |
| Inv. Example 1880 | 23.8 | FC | 0.02 | 1.05 | 0.05 | 0.03 | Existence | No | 7 |
| Inv. Example 1881 | 26.8 | FC | 10.5 | 1.12 | 0 | 0.08 | Existence | No | 6 |
| Inv. Example 1882 | 25.6 | FC | 12.5 | 1.23 | 0.05 | 0 | Existence | Existence | 6 |
| Inv. Example 1883 | 29.8 | FC | 18.5 | 1.36 | 0.44 | 0.07 | Existence | Existence | 7 |
| Inv. Example 1884 | 18.9 | FC | 11.5 | 1.11 | 0.08 | 0.07 | Existence | Existence | 6 |
| Inv. Example 1885 | 5.6 | FC | 9.6 | 1.07 | 0.1 | 0.2 | Existence | No | 7 |
| Inv. Example 1886 | 4.7 | FC | 8.5 | 1.42 | 0.05 | 0.2 | Existence | Existence | 6 |
| Inv. Example 1887 | 6.8 | FC | 7.72 | 1.38 | 0.07 | 0 | Existence | Existence | 6 |
| Inv. Example 1888 | 9 | FC | 8.32 | 1.22 | 0 | 0.07 | Existence | Existence | 6 |
| Inv. Example 1889 | 2.1 | FC | 10.05 | 1.14 | 0 | 0.02 | Existence | No | 6 |

| | Mean Size of Zn Metallic particle (μm) | Blend Ratio (Zn Alloy particle:Zn Metal Particle) | Mg Contents to Total Metal Particle (mass %) | Coat Properties | | | | |
|---|---|---|---|---|---|---|---|---|
| | | | | Ratio of Metal Particle in Dry Coat (mass %) | Base Resin | Coat Thickness (μm) | Coating Method | Result of Corrosion Test |
| Inv. Example 1868 | 2.34 | 1:10 | 0.97 | 53 | urethane-based resin | 20 | Brushing | very good |
| Inv. Example 1869 | 28.34 | 1:5 | 1.82 | 60 | polyester resin | 200 | Brushing | very good |
| Inv. Example 1870 | 19.87 | 200:1 | 11.54 | 35 | alkali silicate | 22 | Spraying | very good |
| Inv. Example 1871 | 39.74 | 1:8 | 1.63 | 77 | alkyl silicate | 25 | Spraying | very good |
| Inv. Example 1872 | 24.32 | 1:1 | 9.75 | 43 | alkali silicate | 14 | Spraying | very good |
| Inv. Example 1873 | 22.33 | 1:7 | 1.28 | 52 | urethane-based resin | 112 | Spraying | very good |
| Inv. Example 1874 | 48.54 | 1:3 | 1.00 | 66 | alkali silicate | 24 | Spraying | very good |
| Inv. Example 1875 | 23.75 | 1:7 | 0.90 | 72 | urethane-based resin | 150 | Spraying | very good |
| Inv. Example 1876 | 15.62 | 1:2 | 1.20 | 40 | alkali silicate | 18 | Spraying | very good |
| Inv. Example 1877 | 2.34 | 117:1 | 26.67 | 36 | alkyl silicate | 19 | Brushing | very good |
| Inv. Example 1878 | 23.04 | 1:270 | 0.10 | 32 | alkyl silicate | 24 | Spraying | very good |
| Inv. Example 1879 | 3.05 | 1:117 | 0.24 | 53 | urethane-based resin | 99 | Spraying | very good |
| Inv. Example 1880 | 43.23 | 1:66 | 0.36 | 67 | alkyl silicate | 7 | Spraying | very good |
| Inv. Example 1881 | 2.04 | 1:109 | 0.24 | 72 | epoxy-based resin | 100 | Spraying | very good |
| Inv. Example 1882 | 50.00 | 250:1 | 25.50 | 77 | alkyl silicate | 27 | Brushing | very good |
| Inv. Example 1883 | 2.45 | 70:1 | 29.38 | 34 | alkali silicate | 15 | Spraying | very good |
| Inv. Example 1884 | 5.33 | 1:15 | 1.18 | 43 | alkyl silicate | 14 | Spraying | very good |
| Inv. Example 1885 | 2.41 | 1:5 | 0.93 | 53 | urethane-based resin | 55 | Spraying | very good |
| Inv. Example 1886 | 23.43 | 2:3 | 1.88 | 35 | alkyl silicate | 8 | Spraying | very good |
| Inv. Example 1887 | 6.03 | 1:9 | 0.68 | 77 | urethane-based resin | 122 | Brushing | very good |
| Inv. Example 1888 | 24.5 | 1:10 | 0.82 | 43 | alkyl silicate | 54 | Spraying | very good |
| Inv. Example 1889 | 5.32 | 1:14 | 0.14 | 52 | alkali silicate | 19 | Spraying | very good |

(*1) F: Fracture facets existing, FC: Fracture facets and/or cracks existing, NO: No fracture facet and/or crack

TABLE 115

| | Zn-Alloy Particle Properties | | | | | | | | |
|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ | # of facets |
| Inv. Example 1890 | 4.8 | FC | 10.6 | 1.13 | 0 | 0 | Existence | Existence | 7 |
| Inv. Example 1891 | 4.2 | FC | 5.7 | 1.02 | 0 | 0 | Existence | Existence | 6 |
| Inv. Example 1892 | 4.3 | FC | 6.4 | 1.06 | 21.5 | 0.05 | Existence | Existence | 6 |
| Inv. Example 1893 | 4 | FC | 3.2 | 1.05 | 0.05 | 2.29 | Existence | No | 6 |
| Inv. Example 1894 | 3.7 | FC | 4.5 | 1.24 | 0.05 | 0.03 | Existence | Existence | 7 |
| Inv. Example 1895 | 6.4 | FC | 5.2 | 1.33 | 0 | 0.08 | Existence | Existence | 6 |
| Inv. Example 1896 | 6.9 | FC | 1.9 | 1.27 | 0.05 | 0 | Existence | No | 6 |
| Inv. Example 1897 | 16.9 | FC | 0.02 | 1.05 | 0.44 | 0.07 | Existence | Existence | 7 |
| Inv. Example 1898 | 18.7 | FC | 10.5 | 1.12 | 0.08 | 0.07 | Existence | No | 6 |
| Inv. Example 1899 | 24.4 | FC | 12.5 | 1.23 | 0.1 | 0.2 | Existence | Existence | 6 |
| Inv. Example 1900 | 10.6 | FC | 18.5 | 1.36 | 0 | 0 | Existence | No | 6 |
| Inv. Example 1901 | 15.8 | FC | 11.5 | 1.11 | 0 | 0 | Existence | Existence | 7 |
| Inv. Example 1902 | 19.5 | FC | 9.6 | 1.07 | 0 | 0.07 | Existence | Existence | 7 |
| Inv. Example 1903 | 7.8 | FC | 8.5 | 1.42 | 0 | 0.02 | Existence | Existence | 6 |
| Inv. Example 1904 | 4.9 | FC | 7.72 | 1.38 | 25.8 | 0.05 | Existence | Existence | 6 |
| Inv. Example 1905 | 10.8 | FC | 8.32 | 1.22 | 22.1 | 0 | Existence | No | 7 |
| Inv. Example 1906 | 3.8 | FC | 10.05 | 1.14 | 21.5 | 0.05 | Existence | No | 6 |
| Inv. Example 1907 | 22.6 | FC | 10.6 | 1.13 | 0.05 | 2.29 | Existence | No | 6 |
| Inv. Example 1908 | 27.9 | FC | 5.7 | 1.02 | 0 | 0 | Existence | Existence | 6 |
| Inv. Example 1909 | 24.8 | FC | 6.4 | 1.06 | 0 | 0 | Existence | No | 7 |
| Inv. Example 1910 | 26.8 | FC | 3.2 | 1.05 | 0.07 | 0 | Existence | Existence | 6 |
| Inv. Example 1911 | 25.9 | FC | 4.5 | 1.24 | 0 | 0.07 | Existence | Existence | 6 |
| Inv. Example 1912 | 9.8 | FC | 5.2 | 1.33 | 0 | 0.02 | Existence | Existence | 6 |

| | | | | Coat Properties | | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 1890 | 14.34 | 1:7 | 0.60 | 66 | alkyl silicate | 25 | Brushing | very good |
| Inv. Example 1891 | 5.04 | 1:12 | 0.32 | 72 | alkyl silicate | 58 | Spraying | very good |
| Inv. Example 1892 | 2.32 | 1:3 | 1.08 | 40 | alkyl silicate | 21 | Spraying | very good |
| Inv. Example 1893 | 20.34 | 1:7 | 0.50 | 36 | alkali silicate | 19 | Brushing | very good |
| Inv. Example 1894 | 12.33 | 1:10 | 0.34 | 32 | urethane-based resin | 56 | Spraying | very good |
| Inv. Example 1895 | 17.84 | 1:1 | 3.20 | 53 | alkyl silicate | 77 | Spraying | very good |
| Inv. Example 1896 | 6.66 | 1:3 | 1.73 | 67 | alkyl silicate | 54 | Spraying | very good |
| Inv. Example 1897 | 3.65 | 2:3 | 6.76 | 72 | alkyl silicate | 64 | Spraying | very good |
| Inv. Example 1898 | 22.62 | 1:2 | 6.23 | 77 | alkyl silicate | 34 | Brushing | very good |
| Inv. Example 1899 | 45.33 | 1:4 | 4.88 | 34 | alkali silicate | 28 | Spraying | very good |
| Inv. Example 1900 | 43.22 | 1:6 | 1.51 | 43 | urethane-based resin | 109 | Brushing | very good |
| Inv. Example 1901 | 12.33 | 1:115 | 0.14 | 53 | alkyl silicate | 15 | Spraying | very good |
| Inv. Example 1902 | 13.42 | 1:23 | 0.81 | 72 | alkyl silicate | 14 | Spraying | very good |
| Inv. Example 1903 | 22.32 | 1:12 | 0.60 | 77 | alkyl silicate | 18 | Spraying | very good |
| Inv. Example 1904 | 7.34 | 1:10 | 0.45 | 77 | urethane-based resin | 122 | Brushing | very good |
| Inv. Example 1905 | 44.54 | 1:3 | 2.70 | 43 | alkyl silicate | 54 | Spraying | very good |
| Inv. Example 1906 | 32.87 | 1:5 | 0.63 | 52 | alkali silicate | 19 | Spraying | very good |
| Inv. Example 1907 | 20.32 | 1:25 | 0.87 | 66 | alkyl silicate | 25 | Brushing | very good |
| Inv. Example 1908 | 2.03 | 4:5 | 12.40 | 72 | alkyl siliate | 58 | Spraying | very good |

TABLE 115-continued

| | | | | | | | |
|---|---|---|---|---|---|---|---|
| Inv. Example 1909 | 5.33 | 3:8 | 6.76 | 40 | alkyl silicate | 21 | Spraying | very good |
| Inv. Example 1910 | 2.33 | 9:34 | 5.61 | 36 | alkali silicate | 19 | Brushing | very good |
| Inv. Example 1911 | 27.44 | 7:8 | 12.09 | 32 | urethane-based resin | 56 | Spraying | very good |
| Inv. Example 1912 | 12.33 | 9:17 | 3.39 | 53 | alkyl silicate | 77 | Spraying | very good |

(*1) F: Fracture facets existing, FC: Fracture facets and/or cracks existing, NO: No fracture facet and/or crack

TABLE 116

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ | # of facets |
| Inv. Example 1913 | 5.6 | FC | 1.9 | 1.27 | 22.1 | 0 | Existence | Existence | 7 |
| Inv. Example 1914 | 12.3 | FC | 0.02 | 1.05 | 1.24 | 1.8 | Existence | Existence | 7 |
| Inv. Example 1915 | 0.8 | FC | 27.89 | 1.12 | 1.24 | 0.9 | Existence | Existence | 6 |
| Inv. Example 1916 | 1 | FC | 0.32 | 1.23 | 0.8 | 0.7 | Existence | No | 7 |
| Inv. Example 1917 | 2.3 | FC | 11.44 | 1.36 | 0 | 1.8 | Existence | Existence | 6 |
| Inv. Example 1918 | 15.6 | FC | 1.05 | 1.11 | 1.1 | 2.41 | Existence | Existence | 6 |
| Inv. Example 1919 | 6.7 | FC | 36.47 | 1.07 | 1.8 | 0.08 | Existence | Existence | 6 |
| Inv. Example 1920 | 7.5 | FC | 5.07 | 1.42 | 3.8 | 2.23 | Existence | No | 6 |
| Inv. Example 1921 | 8.4 | FC | 7.72 | 1.38 | 2.9 | 0.06 | Existence | Existence | 7 |
| Inv. Example 1922 | 9.3 | FC | 8.32 | 1.22 | 10.5 | 0.02 | Existence | Existence | 6 |
| Inv. Example 1923 | 10.4 | FC | 10.05 | 1.14 | 2.9 | 0.02 | Existence | Existence | 6 |
| Inv. Example 1924 | 11.2 | FC | 6.08 | 1.13 | 16.8 | 1.37 | Existence | No | 7 |
| Inv. Example 1925 | 11.7 | FC | 17.89 | 1.02 | 0 | 2.43 | Existence | Existence | 6 |
| Inv. Example 1926 | 21.5 | FC | 19.54 | 1.06 | 3.6 | 0.02 | Existence | Existence | 6 |
| Inv. Example 1927 | 13.4 | FC | 21.08 | 1.05 | 2.1 | 1.5 | Existence | No | 6 |
| Inv. Example 1928 | 14.6 | FC | 23.04 | 1.24 | 0.06 | 1.3 | Existence | Existence | 6 |
| Inv. Example 1929 | 25.8 | FC | 9.21 | 1.33 | 0.02 | 1.8 | Existence | Existence | 7 |
| Inv. Example 1930 | 16.7 | FC | 0.12 | 1.27 | 1.6 | 0.9 | Existence | Existence | 6 |
| Inv. Example 1931 | 17.3 | FC | 29.24 | 1.37 | 3.5 | 0 | Existence | Existence | 6 |
| Inv. Example 1932 | 18.5 | FC | 128.74 | 1.10 | 9.8 | 1.8 | Existence | No | 7 |
| Inv. Example 1933 | 19.3 | FC | 33.57 | 1.04 | 11.5 | 0.7 | Existence | Existence | 6 |
| Inv. Example 1934 | 3.5 | FC | 3.04 | 1.02 | 0.4 | 1.5 | Existence | Existence | 6 |
| Inv. Example 1935 | 22.5 | FC | 7.54 | 1.01 | 0.6 | 1.3 | Existence | Existence | 6 |

| | | | | Coat Properties | | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 1913 | 36.43 | 1:1 | 2.80 | 67 | alkyl silicate | 54 | Spraying | very good |
| Inv. Example 1914 | 11.9 | 1:31 | 0.38 | 52 | alkali silicate | 2 | Spraying | very good |
| Inv. Example 1915 | 10.5 | 1:4 | 0.16 | 55 | alkali silicate | 20 | Spraying | very good |
| Inv. Example 1916 | 9.8 | 1:1 | 0.50 | 69 | alkali silicate | 5 | Spraying | very good |
| Inv. Example 1917 | 7.9 | 1:7 | 0.29 | 78 | alkyl silicate | 20 | Spraying | very good |
| Inv. Example 1918 | 11.6 | 1:11 | 1.30 | 42 | alkali silicate | 15 | Brushing | very good |
| Inv. Example 1919 | 16.9 | 1:2 | 2.23 | 32 | alkyl silicate | 57 | Brushing | very good |
| Inv. Example 1920 | 20.34 | 1:7 | 0.94 | 66 | alkali silicate | 13 | Brushing | very good |
| Inv. Example 1921 | 8.9 | 1:4 | 1.68 | 67 | alkyl silicate | 22 | Brushing | very good |
| Inv. Example 1922 | 7.5 | 1:5 | 1.55 | 64 | alkali silicate | 20 | Spraying | very good |
| Inv. Example 1923 | 10.9 | 1:10 | 0.95 | 74 | alkyl silicate | 27 | Spraying | very good |
| Inv. Example 1924 | 20.34 | 1:9 | 1.12 | 82 | alkali silicate | 15 | Spraying | very good |

TABLE 116-continued

| | | | | | | | | |
|---|---|---|---|---|---|---|---|---|
| Inv. Example 1925 | 6.7 | 240:1 | 11.65 | 37 | alkyl silicate | 35 | Spraying | very good |
| Inv. Example 1926 | 7.9 | 1:120 | 0.18 | 42 | alkali silicate | 34 | Brushing | very good |
| Inv. Example 1927 | 5.6 | 99:1 | 13.27 | 66 | alkyl silicate | 45 | Brushing | very good |
| Inv. Example 1928 | 11.5 | 1:99 | 0.15 | 48 | alkali silicate | 52 | Brushing | very good |
| Inv. Example 1929 | 20.34 | 1:242 | 0.11 | 33 | alkyl silicate | 23 | Brushing | very good |
| Inv. Example 1930 | 10.5 | 1:6 | 2.39 | 75 | alkali silicate | 5 | Spraying | very good |
| Inv. Example 1931 | 7.6 | 1:1 | 8.65 | 77 | alkyl silicate | 52 | Brushing | very good |
| Inv. Example 1932 | 8.2 | 1:7 | 2.31 | 66 | alkali silicate | 150 | Brushing | very good |
| Inv. Example 1933 | 9.1 | 1:5 | 3.22 | 67 | alkyl silicate | 60 | Brushing | very good |
| Inv. Example 1934 | 10.6 | 1:2 | 1.17 | 45 | alkali silicate | 15 | Spraying | very good |
| Inv. Example 1935 | 8.4 | 1:221 | 0.10 | 48 | alkyl silicate | 24 | Spraying | very good |

(*1) F: Fracture facets existing, FC: Fracture facets and/or cracks existing, NO: No fracture facet and/or crack

TABLE 117

| | Zn-Alloy Particle Properties | | | | | | | |
|---|---|---|---|---|---|---|---|---|
| | Mg (mass %) | Fracture Facet &/or Cracks (*1) | Mean Size (µm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | # of facets |
| Inv. Example 1936 | 23.7 | FC | 6.81 | 1.08 | 10.6 | 1.8 | Existence | No | 6 |
| Inv. Example 1937 | 24.2 | FC | 5.25 | 1.14 | 9.5 | 0 | Existence | Existence | 7 |
| Inv. Example 1938 | 0.2 | FC | 194.23 | 1.23 | 11.04 | 0.7 | Existence | Existence | 6 |
| Inv. Example 1939 | 27.1 | FC | 28.74 | 1.33 | 0.01 | 1.8 | Existence | Existence | 6 |
| Inv. Example 1940 | 29.3 | FC | 13.57 | 1.37 | 0.07 | 0.7 | Existence | Existence | 7 |
| Inv. Example 1941 | 0.5 | FC | 0.65 | 1.44 | 1.8 | 1.5 | Existence | Existence | 6 |
| Inv. Example 1942 | 2.7 | FC | 4.12 | 1.21 | 0 | 1.3 | Existence | Existence | 6 |
| Inv. Example 1943 | 28.4 | FC | 0.72 | 1.22 | 2.9 | 1.8 | Existence | Existence | 6 |
| Inv. Example 1944 | 8.7 | FC | 117.54 | 1.23 | 10.5 | 0.9 | Existence | Existence | 6 |
| Inv. Example 1945 | 9.2 | FC | 7.81 | 1.47 | 2.9 | 0.7 | Existence | Existence | 7 |
| Inv. Example 1946 | 17.8 | FC | 80.25 | 1.01 | 16.8 | 1.8 | Existence | No | 6 |
| Inv. Example 1947 | 20.2 | FC | 8.47 | 1.04 | 2.7 | 0.7 | Existence | Existence | 6 |
| Inv. Example 1948 | 0.4 | FC | 0.87 | 1.05 | 0.04 | 0.7 | Existence | Existence | 7 |
| Inv. Example 1949 | 13.7 | FC | 25.78 | 1.12 | 0 | 0.04 | Existence | Existence | 6 |
| Inv. Example 1950 | 14.7 | FC | 93.45 | 1.11 | 1.24 | 0.05 | Existence | Existence | 6 |
| Inv. Example 1951 | 2.4 | FC | 0.97 | 1.08 | 0.05 | 1.24 | Existence | Existence | 6 |
| Inv. Example 1952 | 4.5 | FC | 54.89 | 1.47 | 1.24 | 0.06 | Existence | Existence | 6 |
| Inv. Example 1953 | 0.1 | FC | 10.81 | 1.50 | 1.24 | 0.07 | Existence | Existence | 7 |
| Inv. Example 1954 | 30.0 | FC | 18.24 | 1.13 | 0 | 0.75 | Existence | Existence | 6 |
| Inv. Example 1955 | 24.5 | FC | 114.78 | 1.04 | 0.9 | 1.5 | Existence | Existence | 6 |
| Inv. Example 1956 | 27.6 | FC | 3.87 | 1.02 | 0.03 | 1.3 | Existence | Existence | 7 |
| Inv. Example 1957 | 4.1 | FC | 11.94 | 1.08 | 10.5 | 1.8 | Existence | No | 6 |
| Inv. Example 1958 | 3.2 | FC | 142.58 | 1.15 | 2.9 | 0.9 | Existence | Existence | 6 |

| | | | | Coat Properties | | | |
|---|---|---|---|---|---|---|---|
| | Mean Size of Zn Metallic particle (µm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (µm) | Coating Method | Result of Corrosion Test |
| Inv. Example 1936 | 5.3 | 1:31 | 0.74 | 68 | alkali silicate | 34 | Spraying | very good |
| Inv. Example 1937 | 20.34 | 1:4 | 4.84 | 35 | alkyl silicate | 20 | Brushing | very good |
| Inv. Example 1938 | 7.8 | 1:1 | 0.10 | 37 | alkyl silicate | 200 | Brushing | very good |
| Inv. Example 1939 | 10.5 | 1:7 | 3.39 | 38 | alkyl silicate | 56 | Brushing | very good |
| Inv. Example 1940 | 20.34 | 400:1 | 29.23 | 41 | alkali silicate | 34 | Spraying | very good |

TABLE 117-continued

| | | | | | | | | |
|---|---|---|---|---|---|---|---|---|
| Inv. Example 1941 | 7.9 | 1:2 | 0.17 | 54 | alkyl silicate | 2 | Spraying | very good |
| Inv. Example 1942 | 11.6 | 1:300 | 0.01 | 57 | alkali silicate | 15 | Spraying | very good |
| Inv. Example 1943 | 16.9 | 1:4 | 5.68 | 59 | alkali silicate | 10 | Spraying | very good |
| Inv. Example 1944 | 10.5 | 1:5 | 1.45 | 64 | alkyl silicate | 125 | Brushing | very good |
| Inv. Example 1945 | 8.9 | 1:10 | 0.84 | 66 | alkali silicate | 24 | Brushing | very good |
| Inv. Example 1946 | 7.5 | 1:9 | 1.78 | 67 | alkyl silicate | 110 | Brushing | very good |
| Inv. Example 1947 | 10.9 | 1:1 | 10.10 | 34 | alkali silicate | 24 | Brushing | very good |
| Inv. Example 1948 | 20.34 | 130:1 | 0.40 | 54 | alkyl silicate | 2 | Spraying | very good |
| Inv. Example 1949 | 6.7 | 130:1 | 13.60 | 62 | alkali silicate | 37 | Spraying | very good |
| Inv. Example 1950 | 7.9 | 1:31 | 0.46 | 66 | alkyl silicate | 113 | Brushing | very good |
| Inv. Example 1951 | 5.6 | 1:1 | 1.20 | 67 | alkali silicate | 2 | Spraying | very good |
| Inv. Example 1952 | 20.34 | 2:1 | 3.00 | 68 | alkyl silicate | 75 | Brushing | very good |
| Inv. Example 1953 | 9.9 | 300:1 | 0.10 | 33 | alkali silicate | 30 | Brushing | very good |
| Inv. Example 1954 | 10.5 | 1:270 | 0.11 | 35 | alkyl silicate | 34 | Brushing | very good |
| Inv. Example 1955 | 7.6 | 1:115 | 0.21 | 43 | epoxy-based resin | 124 | Brushing | very good |
| Inv. Example 1956 | 45.33 | 1:29 | 0.92 | 44 | acryl-based resin | 15 | Spraying | very good |
| Inv. Example 1957 | 43.22 | 1:3 | 1.03 | 43 | urethane-based resin | 23 | Spraying | very good |
| Inv. Example 1958 | 10.6 | 1:9 | 0.32 | 44 | polyester resin | 157 | Brushing | very good |

(*1) F: Fracture facets existing, FC: Fracture facets and/or cracks existing, NO: No fracture facet and/or crack

TABLE 118

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ | # of facets |
| Inv. Example 1959 | 2.7 | FC | 12.5 | 1.34 | 16.8 | 0.7 | Existence | Existence | 6 |
| Inv. Example 1960 | 0.12 | FC | 31.24 | 1.25 | 2.7 | 1.8 | Existence | Existence | 6 |
| Inv. Example 1961 | 0.22 | FC | 152.46 | 1.19 | 0.02 | 0.7 | Existence | Existence | 7 |
| Inv. Example 1962 | 0.37 | FC | 13.4 | 1.18 | 0 | 1.5 | Existence | Existence | 6 |
| Inv. Example 1963 | 1.4 | FC | 160.57 | 1.24 | 7.42 | 1.3 | Existence | Existence | 6 |
| Inv. Example 1964 | 4.2 | FC | 14.1 | 1.11 | 0.02 | 1.8 | Existence | Existence | 7 |
| Inv. Example 1965 | 4.8 | FC | 167.55 | 1.27 | 0.04 | 0.9 | Existence | Existence | 6 |
| Inv. Example 1966 | 8.1 | FC | 1.45 | 1.31 | 17.5 | 0 | Existence | Existence | 6 |
| Inv. Example 1967 | 7.6 | FC | 0.15 | 1.26 | 0.01 | 1.8 | Existence | Existence | 6 |
| Inv. Example 1968 | 9.9 | FC | 13.1 | 1.14 | 0.02 | 0.7 | Existence | Existence | 6 |
| Inv. Example 1969 | 14.8 | FC | 15.5 | 1.34 | 3.8 | 0 | Existence | Existence | 7 |
| Inv. Example 1970 | 16.7 | FC | 0.67 | 1.16 | 2.9 | 0 | Existence | Existence | 6 |
| Inv. Example 1971 | 17.9 | FC | 137.89 | 1.47 | 10.5 | 1.8 | Existence | Existence | 6 |
| Inv. Example 1972 | 19.5 | FC | 16.3 | 1.48 | 2.9 | 0.9 | Existence | Existence | 7 |
| Inv. Example 1973 | 22.4 | FC | 110.38 | 1.49 | 16.8 | 0.7 | Existence | Existence | 6 |
| Inv. Example 1974 | 0.17 | FC | 12.4 | 1.34 | 2.7 | 1.8 | Existence | Existence | 6 |
| Inv. Example 1975 | 8.3 | FC | 17.2 | 1.29 | 0.02 | 0.7 | Existence | No | 6 |
| Inv. Example 1976 | 6.5 | FC | 105.23 | 1.18 | 0.02 | 0.7 | Existence | Existence | 6 |
| Inv. Example 1977 | 9.7 | FC | 177.89 | 1.23 | 0.04 | 0.02 | Existence | Existence | 7 |
| Inv. Example 1978 | 11.4 | FC | 12.2 | 1.27 | 0.05 | 0.02 | Existence | Existence | 6 |
| Inv. Example 1979 | 22.5 | FC | 1.84 | 1.17 | 1.24 | 1.37 | Existence | Existence | 6 |

TABLE 118-continued

| | | | | | | | | |
|---|---|---|---|---|---|---|---|---|
| Inv. Example 1980 | 25.7 | FC | 16.02 | 1.16 | 0.05 | 0.02 | Existence | Existence | 7 |
| Inv. Example 1981 | 17.8 | FC | 1.75 | 1.49 | 1.24 | 1.37 | Existence | Existence | 6 |

| | Mean Size of Zn Metallic particle (μm) | Blend Ratio (Zn Alloy particle:Zn Metal Particle) | Mg Contents to Total Metal Particle (mass %) | Coat Properties Ratio of Metal Particle in Dry Coat (mass %) | Base Resin | Coat Thickness (μm) | Coating Method | Result of Corrosion Test |
|---|---|---|---|---|---|---|---|---|
| Inv. Example 1959 | 20.34 | 1:5 | 0.45 | 54 | epoxy-based resin | 26 | Spraying | very good |
| Inv. Example 1960 | 5.3 | 100:1 | 0.12 | 79 | acryl-based resin | 38 | Spraying | very good |
| Inv. Example 1961 | 10.9 | 1:1 | 0.11 | 73 | urethane-based resin | 160 | Brushing | very good |
| Inv. Example 1962 | 7.8 | 99:1 | 0.37 | 69 | polyester resin | 27 | Brushing | very good |
| Inv. Example 1963 | 10.5 | 1:6 | 0.20 | 63 | epoxy-based resin | 180 | Brushing | very good |
| Inv. Example 1964 | 20.34 | 1:12 | 0.32 | 35 | acryl-based resin | 26 | Spraying | very good |
| Inv. Example 1965 | 7.9 | 1:5 | 0.80 | 35 | urethane-based resin | 180 | Brushing | very good |
| Inv. Example 1966 | 11.6 | 1:33 | 0.24 | 66 | polyester resin | 15 | Spraying | very good |
| Inv. Example 1967 | 16.9 | 1:9 | 0.76 | 67 | epoxy-based resin | 2 | Spraying | very good |
| Inv. Example 1968 | 10.5 | 1:18 | 0.52 | 68 | acryl-based resin | 28 | Spraying | very good |
| Inv. Example 1969 | 8.9 | 1:38 | 0.38 | 33 | urethane-based resin | 30 | Spraying | very good |
| Inv. Example 1970 | 7.5 | 1:117 | 0.14 | 35 | polyester resin | 2 | Spraying | very good |
| Inv. Example 1971 | 20.34 | 1:42 | 0.42 | 43 | epoxy-based resin | 157 | Brushing | very good |
| Inv. Example 1972 | 9.8 | 1:1 | 9.75 | 44 | acryl-based resin | 28 | Brushing | very good |
| Inv. Example 1973 | 6.7 | 1:121 | 0.18 | 42 | urethane-based resin | 130 | Brushing | very good |
| Inv. Example 1974 | 45.33 | 120:1 | 0.17 | 33 | polyester resin | 29 | Brushing | very good |
| Inv. Example 1975 | 43.22 | 1:145 | 0.06 | 30 | epoxy-based resin | 30 | Brushing | very good |
| Inv. Example 1976 | 11.5 | 1:31 | 0.20 | 35 | acryl-based resin | 120 | Brushing | very good |
| Inv. Example 1977 | 9.9 | 1:95 | 0.10 | 37 | urethane-based resin | 187 | Brushing | very good |
| Inv. Example 1978 | 10.5 | 1:33 | 0.34 | 77 | polyester resin | 28 | Spraying | very good |
| Inv. Example 1979 | 7.6 | 120:1 | 22.31 | 41 | epoxy-based resin | 5 | Spraying | very good |
| Inv. Example 1980 | 8.2 | 1:28 | 0.89 | 35 | acryl-based resin | 35 | Spraying | very good |
| Inv. Example 1981 | 9.1 | 1:33 | 0.52 | 58 | urethane-based resin | 5 | Spraying | very good |

(*1) F: Fracture facets existing, FC: Fracture facets and/or cracks existing, NO: No fracture facet and/or crack

TABLE 119

| | Zn-Alloy Particle Properties | | | | | | | | |
|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$ or $Mg_2Zn_{11}$ | # of facets |
| Inv. Example 1982 | 0.14 | FC | 198.78 | 1.34 | 1.24 | 1.37 | Existence | Existence | 6 |
| Inv. Example 1983 | 6.7 | FC | 13.1 | 1.16 | 0.8 | 1.5 | Existence | Existence | 6 |
| Inv. Example 1984 | 7.5 | FC | 15.5 | 1.47 | 0.9 | 1.3 | Existence | Existence | 6 |
| Inv. Example 1985 | 8.4 | FC | 0.67 | 1.48 | 1.1 | 1.8 | Existence | No | 7 |
| Inv. Example 1986 | 9.3 | FC | 12.2 | 1.49 | 1.8 | 0.9 | Existence | Existence | 6 |
| Inv. Example 1987 | 1.4 | FC | 1.84 | 1.34 | 3.8 | 0.7 | Existence | Existence | 6 |
| Inv. Example 1988 | 4.2 | FC | 16.02 | 1.29 | 2.9 | 1.8 | Existence | Existence | 7 |

TABLE 119-continued

| | | | | | | | | | |
|---|---|---|---|---|---|---|---|---|---|
| Inv. Example 1989 | 4.8 | FC | 1.75 | 1.18 | 10.5 | 0.7 | Existence | Existence | 6 |
| Inv. Example 1990 | 8.1 | FC | 12.4 | 1.23 | 2.9 | 1.5 | Existence | Existence | 6 |
| Inv. Example 1991 | 7.6 | FC | 17.2 | 1.27 | 16.8 | 1.3 | Existence | Existence | 6 |
| Inv. Example 1992 | 9.9 | FC | 13.1 | 1.17 | 2.7 | 1.8 | Existence | Existence | 6 |
| Inv. Example 1993 | 0.4 | FC | 29.9 | 1.16 | 3.6 | 0.9 | Existence | Existence | 7 |
| Inv. Example 1994 | 10.5 | FC | 0.21 | 1.27 | 0 | 0.7 | Existence | Existence | 6 |
| Inv. Example 1995 | 0.4 | FC | 0.22 | 1.17 | 0.06 | 1.8 | Existence | Existence | 7 |
| Inv. Example 1996 | 10.5 | FC | 29.5 | 1.27 | 0.02 | 0.7 | Existence | Existence | 6 |
| Inv. Example 1997 | 0.51 | FC | 29.9 | 1.18 | 1.6 | 1.5 | Existence | Existence | 6 |
| Inv. Example 1998 | 9.8 | FC | 0.21 | 1.23 | 3.5 | 0 | Existence | Existence | 6 |
| Inv. Example 1999 | 0.52 | FC | 0.22 | 1.27 | 9.8 | 1.8 | Existence | Existence | 6 |
| Inv. Example 2000 | 9.9 | FC | 29.5 | 1.17 | 11.5 | 0.9 | Existence | No | 7 |
| Inv. Example 2001 | 14.8 | FC | 16.02 | 1.48 | 0.4 | 0.7 | Existence | Existence | 6 |
| Inv. Example 2002 | 19.9 | FC | 1.75 | 1.49 | 0.6 | 1.8 | Existence | Existence | 6 |
| Inv. Example 2003 | 17.9 | FC | 12.4 | 1.34 | 10.6 | 0.7 | Existence | Existence | 7 |
| Inv. Example 2004 | 19.5 | FC | 17.2 | 1.29 | 9.5 | 0.7 | Existence | Existence | 6 |

| | Coat Properties | | | | | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 1982 | 10.6 | 200:1 | 0.14 | 37 | polyester resin | 200 | Brushing | very good |
| Inv. Example 1983 | 8.4 | 1:4 | 1.34 | 68 | alkali silicate | 25 | Spraying | very good |
| Inv. Example 1984 | 5.3 | 1:18 | 0.39 | 55 | alkali silicate | 15 | Spraying | very good |
| Inv. Example 1985 | 10.9 | 1:7 | 1.05 | 77 | alkyl silicate | 20 | Spraying | very good |
| Inv. Example 1986 | 7.8 | 1:11 | 0.78 | 43 | alkali silicate | 18 | Spraying | very good |
| Inv. Example 1987 | 8.9 | 1:2 | 0.47 | 45 | alkyl silicate | 22 | Spraying | very good |
| Inv. Example 1988 | 7.5 | 1:7 | 0.53 | 66 | alkali silicate | 19 | Spraying | very good |
| Inv. Example 1989 | 10.9 | 1:2 | 2.40 | 33 | alkyl silicate | 29 | Spraying | very good |
| Inv. Example 1990 | 9.8 | 1:5 | 1.35 | 66 | alkali silicate | 23 | Spraying | very good |
| Inv. Example 1991 | 45.33 | 1:10 | 0.69 | 55 | alkyl silicate | 21 | Spraying | very good |
| Inv. Example 1992 | 43.22 | 1:9 | 0.99 | 49 | alkali silicate | 19 | Spraying | very good |
| Inv. Example 1993 | 5.6 | 240:1 | 0.40 | 77 | alkyl silicate | 15 | Spraying | very good |
| Inv. Example 1994 | 11.5 | 120:1 | 10.41 | 41 | alkali silicate | 18 | Spraying | very good |
| Inv. Example 1995 | 9.9 | 99:1 | 0.40 | 64 | alkyl silicate | 22 | Spraying | very good |
| Inv. Example 1996 | 10.5 | 1:99 | 0.11 | 58 | alkyl silicate | 21 | Spraying | very good |
| Inv. Example 1997 | 7.6 | 1:3 | 0.13 | 33 | alkyl silicate | 29 | Spraying | very good |
| Inv. Example 1998 | 8.2 | 1:6 | 1.40 | 66 | alkali silicate | 23 | Spraying | very good |
| Inv. Example 1999 | 9.1 | 1:1 | 0.26 | 55 | alkyl silicate | 21 | Spraying | very good |
| Inv. Example 2000 | 10.6 | 1:7 | 1.24 | 49 | alkali silicate | 19 | Spraying | very good |
| Inv. Example 2001 | 8.4 | 1:5 | 2.47 | 77 | alkyl silicate | 21 | Spraying | very good |
| Inv. Example 2002 | 5.3 | 1:150 | 0.13 | 43 | alkali silicate | 19 | Spraying | very good |
| Inv. Example 2003 | 10.9 | 1:55 | 0.32 | 45 | alkyl silicate | 15 | Spraying | very good |
| Inv. Example 2004 | 7.8 | 1:121 | 0.16 | 66 | alkali silicate | 18 | Spraying | very good |

(*1) F: Fracture facets existing, FC: Fracture facets and/or cracks existing, NO: No fracture facet and/or crack

TABLE 120

| | Zn-Alloy Particle Properties | | | | | | | | |
|---|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | MgZn$_2$ or Mg$_2$Zn$_{11}$ | # of facets |
| Comp. Example 119 | 2.3 | FC | 205.6 | 1.23 | 12.5 | 0.05 | Existence | No | 6 |
| Comp. Example 120 | 12.5 | FC | 0.005 | 1.36 | 2.1 | 0 | Existence | Existence | 6 |
| Comp. Example 121 | 18.9 | FC | 205.6 | 1.11 | 1.5 | 0.05 | Existence | Existence | 7 |
| Comp. Example 122 | 29.5 | FC | 0.005 | 1.07 | 0.05 | 2.29 | Existence | Existence | 6 |
| Comp. Example 123 | 14.5 | FC | 205.6 | 1.42 | 0 | 0 | Existence | Existence | 7 |
| Comp. Example 124 | 12.5 | FC | 0.005 | 1.38 | 0 | 0 | Existence | No | 6 |
| Comp. Example 125 | 18.9 | FC | 205.6 | 1.22 | 0.07 | 0 | Existence | Existence | 6 |
| Comp. Example 126 | 29.5 | FC | 0.005 | 1.14 | 0 | 0.07 | Existence | No | 6 |
| Comp. Example 127 | 2.3 | NO | 10.6 | 1.13 | 0 | 0.02 | Existence | Existence | 7 |
| Comp. Example 128 | 12.5 | FC | 5.7 | 1.02 | 22.1 | 0 | Existence | Existence | 6 |
| Comp. Example 129 | 0.5 | FC | 6.4 | 1.06 | 25.8 | 0.05 | Existence | No | 6 |
| Comp. Example 130 | 29.5 | FC | 3.2 | 1.23 | 22.1 | 0 | Existence | Existence | 7 |
| Comp. Example 131 | 14.5 | NO | 4.5 | 1.36 | 21.5 | 0.05 | Existence | Existence | 6 |
| Comp. Example 132 | 9.8 | FC | 5.2 | 1.11 | 0.05 | 2.29 | No | No | 7 |
| Comp. Example 133 | 4.6 | FC | 1.9 | 1.07 | 0 | 0 | Existence | Existence | 6 |
| Comp. Example 134 | 3.2 | FC | 18.5 | 1.42 | 0 | 0 | Existence | No | 6 |
| Comp. Example 135 | 29.9 | FC | 12.5 | 1.38 | 0.07 | 0 | Existence | Existence | 6 |
| Comp. Example 136 | 7.6 | FC | 9.8 | 1.22 | 0 | 0.07 | Existence | Existence | 7 |
| Comp. Example 137 | 29.9 | FC | 7.6 | 1.14 | 0 | 0.007 | Existence | Existence | 6 |
| Comp. Example 138 | 0.6 | FC | 6.9 | 1.13 | 36.5 | 3.25 | Existence | Existence | 6 |
| Comp. Example 139 | 4.5 | FC | 10.5 | 1.02 | 0.005 | 0 | Existence | Existence | 7 |
| Comp. Example 140 | 3.7 | FC | 12.6 | 1.06 | 22.1 | 0 | Existence | Existence | 6 |

| | | | | Coat Properties | | | | |
|---|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Comp. Example 119 | 10.5 | 1:5 | 0.38 | 77 | alkyl silicate | 25 | Spraying | poor |
| Comp. Example 120 | 12.6 | 1:3 | 3.13 | 77 | urethane-based resin | 25 | Spraying | poor |
| Comp. Example 121 | 7.8 | 1:19 | 0.95 | 43 | alkyl silicate | 105 | Brushing | poor |
| Comp. Example 122 | 16.8 | 1:100 | 0.29 | 52 | alkali silicate | 165 | Spraying | poor |
| Comp. Example 123 | 10.5 | 1:260 | 0.06 | 66 | alkyl silicate | 25 | Spraying | poor |
| Comp. Example 124 | 12.6 | 1:3 | 3.13 | 72 | alkyl silicate | 25 | Spraying | poor |
| Comp. Example 125 | 7.8 | 1:19 | 0.95 | 40 | alkyl silicate | 105 | Brushing | poor |
| Comp. Example 126 | 16.8 | 1:100 | 0.29 | 36 | alkali silicate | 165 | Spraying | poor |
| Comp. Example 127 | 10.5 | 1:256 | 0.01 | 32 | alkyl silicate | 25 | Spraying | poor |
| Comp. Example 128 | 12.6 | 1:200 | 0.06 | 53 | alkyl silicate | 25 | Spraying | poor |
| Comp. Example 129 | 7.8 | 1:167 | 0.00 | 67 | alkyl silicate | 105 | Brushing | poor |
| Comp. Example 130 | 16.8 | 1:300 | 0.10 | 53 | urethane-based resin | 165 | Spraying | poor |
| Comp. Example 131 | 10.5 | 1:260 | 0.06 | 67 | alkyl silicate | 25 | Spraying | poor |
| Comp. Example 132 | 12.6 | 1:100 | 0.10 | 72 | alkyl silicate | 25 | Spraying | poor |
| Comp. Example 133 | 7.8 | 1:47 | 0.10 | 77 | alkyl silicate | 105 | Brushing | poor |
| Comp. Example 134 | 16.8 | 1:32 | 0.10 | 34 | urethane-based resin | 55 | Spraying | poor |
| Comp. Example 135 | 12.6 | 1:345 | 0.09 | 43 | alkyl silicate | 28 | Spraying | poor |
| Comp. Example 136 | 7.8 | 1:390 | 0.02 | 52 | alkyl silicate | 15 | Spraying | poor |
| Comp. Example 137 | 16.8 | 1:301 | 0.10 | 66 | alkyl silicate | 14 | Spraying | poor |
| Comp. Example 138 | 10.5 | 1:333 | 0.00 | 72 | urethane-based resin | 118 | Brushing | poor |

TABLE 120-continued

| | | | | | | | | |
|---|---|---|---|---|---|---|---|---|
| Comp. Example 139 | 12.6 | 1:325 | 0.01 | 40 | alkyl silicate | 22 | Spraying | poor |
| Comp. Example 140 | 7.8 | 1:456 | 0.01 | 36 | alkyl silicate | 54 | Spraying | poor |

(*1) F: Fracture facets existing, FC: Fracture facets and/or cracks existing, NO: No fracture facet and/or crack

TABLE 121

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, MgZn or $Mg_1Zn_3$ | # of facets |
|---|---|---|---|---|---|---|---|---|---|
| Inv. Example 2689 | 7.5 | FC | 5.07 | 1.42 | 0 | 0 | Existence | Existence | 2 |
| Inv. Example 2690 | 8.06 | FC | 7.72 | 1.38 | 0 | 0 | Existence | Existence | 2 |
| Inv. Example 2691 | 9.3 | FC | 8.32 | 1.22 | 0 | 0 | Existence | No | 2 |
| Inv. Example 2692 | 3.5 | FC | 3.04 | 1.02 | 0 | 0 | Existence | Existence | 2 |
| Inv. Example 2693 | 2.7 | FC | 4.12 | 1.21 | 0 | 0 | Existence | No | 6 |
| Inv. Example 2694 | 9.2 | FC | 7.81 | 1.47 | 0 | 0 | Existence | Existence | 6 |
| Inv. Example 2695 | 8.1 | FC | 1.45 | 1.31 | 0 | 0 | Existence | No | 7 |
| Inv. Example 2696 | 7.5 | FC | 9.6 | 1.07 | 0 | 0 | Existence | Existence | 6 |
| Inv. Example 2697 | 4.5 | FC | 8.5 | 1.42 | 0 | 0 | Existence | No | 2 |
| Inv. Example 2698 | 3.6 | FC | 3.2 | 1.05 | 0 | 0 | Existence | No | 7 |
| Inv. Example 2699 | 4.2 | FC | 5.7 | 1.02 | 1.5 | 0 | Existence | Existence | 2 |
| Inv. Example 2700 | 4.3 | FC | 6.4 | 1.06 | 5.5 | 1.6 | Existence | No | 6 |
| Inv. Example 2701 | 4 | FC | 3.2 | 1.05 | 0 | 0 | Existence | Existence | 6 |
| Inv. Example 2702 | 6.4 | FC | 5.2 | 1.33 | 0 | 0 | Existence | Existence | 2 |
| Inv. Example 2703 | 9.8 | FC | 5.2 | 1.33 | 0 | 0 | Existence | No | 2 |
| Inv. Example 2704 | 7.5 | FC | 5.07 | 1.42 | 0 | 0 | Existence | No | 7 |
| Inv. Example 2705 | 8.4 | FC | 7.72 | 1.38 | 0.5 | 0 | Existence | Existence | 6 |
| Inv. Example 2706 | 2.7 | FC | 4.12 | 1.21 | 0 | 0 | Existence | No | 7 |
| Inv. Example 2707 | 2.64 | FC | 5.5 | 1.22 | 0 | 0 | Existence | No | 2 |
| Inv. Example 2708 | 1.59 | FC | 6.7 | 1.14 | 0 | 0 | Existence | Existence | 7 |
| Inv. Example 2709 | 2.58 | FC | 8.9 | 1.13 | 0 | 0 | Existence | Existence | 6 |
| Inv. Example 2710 | 7.55 | FC | 2.15 | 1.14 | 0 | 0 | Existence | Existence | 7 |
| Inv. Example 2711 | 8.01 | FC | 2.54 | 1.13 | 0 | 0 | Existence | No | 6 |

| | | | | Coat Properties | | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
|---|---|---|---|---|---|---|---|---|
| Inv. Example 2689 | 23.43 | 0.71 | 10.5 | 74 | alkali silicate | 24 | Brushing | very good |
| Inv. Example 2690 | 5.96 | 0.64 | 12.5 | 82 | alkyl silicate | 25 | Spraying | very good |
| Inv. Example 2691 | 10.64 | 6.20 | 1.5 | 37 | alkali silicate | 14 | Spraying | very good |
| Inv. Example 2692 | 16.5 | 3.89 | 0.9 | 48 | alkali silicate | 15 | Spraying | very good |
| Inv. Example 2693 | 7.95 | 0.26 | 10.5 | 32 | alkali silicate | 15 | Spraying | very good |
| Inv. Example 2694 | 7.95 | 0.03 | 299.5 | 45 | alkyl silicate | 15 | Brushing | very good |
| Inv. Example 2695 | 9.64 | 16.20 | 0.5 | 37 | epoxy-based resin | 5 | Spraying | good |
| Inv. Example 2696 | 0.96 | 28.85 | 0.26 | 72 | urethane-based resin | 150 | Spraying | very good |
| Inv. Example 2697 | 5.26 | 15.00 | 0.3 | 40 | alkali silicate | 18 | Spraying | very good |
| Inv. Example 2698 | 13.5 | 1.20 | 3 | 40 | alkali silicate | 18 | Spraying | very good |
| Inv. Example 2699 | 13.5 | 0.20 | 20.5 | 72 | alkyl silicate | 58 | Spraying | very good |
| Inv. Example 2700 | 9.64 | 1.02 | 4.2 | 40 | alkyl silicate | 21 | Spraying | very good |
| Inv. Example 2701 | 16.5 | 2.67 | 1.5 | 36 | alkali silicate | 19 | Brushing | very good |
| Inv. Example 2702 | 20.59 | 1.28 | 5 | 53 | alkyl silicate | 77 | Spraying | very good |

TABLE 121-continued

| | | | | | | | | |
|---|---|---|---|---|---|---|---|---|
| Inv. Example 2703 | 0.96 | 0.63 | 15.6 | 53 | alkyl silicate | 77 | Spraying | very good |
| Inv. Example 2704 | 6.54 | 15.00 | 0.5 | 66 | alkali silicate | 13 | Brushing | very good |
| Inv. Example 2705 | 5.26 | 4.42 | 1.9 | 67 | alkyl silicate | 22 | Brushing | very good |
| Inv. Example 2706 | 10.64 | 1.69 | 1.6 | 57 | alkali silicate | 15 | Spraying | very good |
| Inv. Example 2707 | 9.64 | 1.06 | 2.5 | 43 | alkyl silicate | 16 | Spraying | very good |
| Inv. Example 2708 | 6.9 | 3.18 | 0.5 | 76 | alkyl silicate | 5 | Spraying | very good |
| Inv. Example 2709 | 10.5 | 0.52 | 5 | 49 | alkyl silicate | 22 | Spraying | very good |
| Inv. Example 2710 | 13.5 | 6.29 | 1.2 | 75 | alkyl silicate | 18 | Spraying | very good |
| Inv. Example 2711 | 20.59 | 0.94 | 8.5 | 73 | alkyl silicate | 16 | Spraying | very good |

(*1) F: Fracture facets existing, FC: Fracture facets and/or cracks existing, NO: No fracture facet and/or crack

TABLE 122

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, $MgZn$, or $Mg_7Zn_3$ | # of facets |
| Inv. Example 2712 | 1.06 | FC | 3.4 | 1.38 | 0 | 0 | Existence | Existence | 7 |
| Inv. Example 2713 | 2.64 | FC | 5.5 | 1.22 | 0 | 0 | Existence | Existence | 6 |
| Inv. Example 2714 | 1.59 | FC | 6.7 | 1.14 | 0 | 0 | Existence | Existence | 2 |
| Inv. Example 2715 | 20.5 | FC | 2.15 | 1.14 | 1.5 | 0 | Existence | No | 7 |
| Inv. Example 2716 | 18.5 | FC | 2.54 | 1.13 | 5.5 | 1.6 | Existence | Existence | 6 |
| Inv. Example 2717 | 9.51 | FC | 2.77 | 1.38 | 4.5 | 0 | Existence | Existence | 6 |
| Inv. Example 2718 | 10.01 | FC | 3.68 | 1.22 | 0 | 1.6 | Existence | Existence | 6 |
| Inv. Example 2719 | 3.54 | FC | 5.5 | 1.22 | 0 | 0 | Existence | No | 2 |
| Inv. Example 2720 | 4.05 | FC | 2.06 | 1.13 | 0 | 0 | Existence | Existence | 6 |
| Inv. Example 2721 | 8.57 | FC | 4.99 | 1.02 | 0 | 0 | Existence | Existence | 7 |
| Inv. Example 2722 | 0.02 | FC | 6.4 | 1.06 | 0 | 0 | Existence | No | 2 |
| Inv. Example 2723 | 25.5 | FC | 3.09 | 1.07 | 0 | 0 | Existence | Existence | 6 |
| Inv. Example 2724 | 2.36 | FC | 3.99 | 1.22 | 0 | 0 | Existence | No | 2 |
| Inv. Example 2725 | 0.05 | FC | 7.72 | 1.38 | 0 | 0 | Existence | Existence | 6 |
| Inv. Example 2726 | 0.04 | FC | 8.32 | 1.22 | 0 | 0 | Existence | No | 7 |
| Inv. Example 2727 | 5.22 | FC | 3.55 | 1.12 | 0 | 0 | Existence | Existence | 7 |
| Inv. Example 2728 | 4.01 | FC | 2.64 | 1.23 | 0 | 0 | Existence | Existence | 2 |
| Inv. Example 2729 | 0.05 | FC | 5.2 | 1.33 | 0 | 0 | Existence | Existence | 2 |
| Inv. Example 2730 | 10.5 | FC | 1.9 | 1.27 | 0 | 0 | Existence | Existence | 6 |
| Inv. Example 2731 | 0.05 | FC | 2.5 | 1.05 | 0 | 1.2 | Existence | No | 7 |
| Inv. Example 2732 | 10.5 | FC | 0.09 | 1.12 | 0 | 0.6 | Existence | No | 6 |
| Inv. Example 2733 | 2.64 | FC | 5.5 | 1.22 | 0 | 0.01 | Existence | No | 7 |

| | Coat Properties | | | | | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 2712 | 7.82 | 0.50 | 2.1 | 49 | alkyl silicate | 8 | Spraying | very good |
| Inv. Example 2713 | 5.26 | 10.56 | 0.25 | 43 | alkyl silicate | 16 | Spraying | very good |
| Inv. Example 2714 | 7.06 | 1.59 | 1 | 76 | alkyl silicate | 5 | Spraying | very good |
| Inv. Example 2715 | 0.64 | 8.20 | 2.5 | 75 | alkyl silicate | 18 | Spraying | very good |
| Inv. Example 2716 | 46.8 | 3.70 | 5 | 73 | alkyl silicate | 16 | Spraying | very good |
| Inv. Example 2717 | 16.5 | 1.73 | 5.5 | 55 | alkyl silicate | 5 | Spraying | very good |
| Inv. Example 2718 | 13.5 | 1.54 | 6.5 | 48 | alkyl silicate | 22 | Spraying | very good |

TABLE 122-continued

| | | | | | | | | |
|---|---|---|---|---|---|---|---|---|
| Inv. Example 2719 | 0.96 | 2.36 | 1.5 | 78 | alkyl silicate | 18 | Spraying | very good |
| Inv. Example 2720 | 0.96 | 0.81 | 5 | 52 | alkyl silicate | 8 | Spraying | very good |
| Inv. Example 2721 | 8.45 | 1.53 | 5.6 | 61 | alkyl silicate | 16 | Spraying | very good |
| Inv. Example 2722 | 2.9 | 0.20 | 0.05 | 77 | polyester resin | 47 | Spraying | very good |
| Inv. Example 2723 | 5.4 | 2.43 | 10.5 | 49 | alkyl silicate | 22 | Spraying | very good |
| Inv. Example 2724 | 10.6 | 4.72 | 0.5 | 80 | alkyl silicate | 21 | Spraying | very good |
| Inv. Example 2725 | 2.32 | 0.07 | 0.75 | 36 | alkyl silicate | 19 | Brushing | very good |
| Inv. Example 2726 | 7.8 | 0.20 | 0.2 | 32 | alkyl silicate | 24 | Spraying | very good |
| Inv. Example 2727 | 7.95 | 0.50 | 10.5 | 55 | alkyl silicate | 19 | Spraying | very good |
| Inv. Example 2728 | 20.59 | 10.03 | 0.4 | 40 | alkyl silicate | 8 | Spraying | very good |
| Inv. Example 2729 | 22.5 | 0.06 | 0.9 | 53 | urethane-based resin | 20 | Brushing | very good |
| Inv. Example 2730 | 4.6 | 0.08 | 3.5 | 60 | polyester resin | 200 | Brushing | very good |
| Inv. Example 2731 | 4.9 | 5.00 | 0.01 | 38 | alkali silicate | 19 | Spraying | very good |
| Inv. Example 2732 | 10.5 | 0.08 | 3.5 | 49 | alkyl silicate | 11 | Spraying | very good |
| Inv. Example 2733 | 8.45 | 1.32 | 2 | 43 | alkyl silicate | 16 | Spraying | very good |

(*1) F: Fracture facets existing, FC: Fracture facets and/or cracks existing, NO: No fracture facet and/or crack

TABLE 123

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, MgZn, or $Mg_7Zn_3$ | # of facets |
| Inv. Example 2734 | 0.08 | FC | 5.6 | 1.36 | 1.5 | 0 | Existence | Existence | 6 |
| Inv. Example 2735 | 0.09 | FC | 11.5 | 1.11 | 5.5 | 1.6 | Existence | No | 2 |
| Inv. Example 2736 | 0.05 | FC | 19.5 | 1.07 | 4.5 | 0 | Existence | Existence | 2 |
| Inv. Example 2737 | 1.59 | FC | 6.7 | 1.14 | 0 | 0.1 | Existence | Existence | 6 |
| Inv. Example 2738 | 2.58 | FC | 8.9 | 1.13 | 0.01 | 0 | Existence | Existence | 7 |
| Inv. Example 2739 | 9.8 | FC | 8.32 | 1.22 | 3.2 | 0.9 | Existence | Existence | 6 |
| Inv. Example 2740 | 0.18 | FC | 10.05 | 1.14 | 0 | 0.5 | Existence | Existence | 6 |
| Inv. Example 2741 | 7.55 | FC | 2.15 | 1.14 | 0.2 | 0.1 | Existence | Existence | 2 |
| Inv. Example 2742 | 0.01 | FC | 0.06 | 1.23 | 1.2 | 0.6 | Existence | No | 7 |
| Inv. Example 2743 | 12.5 | FC | 2.54 | 1.13 | 0.5 | 0 | Existence | Existence | 2 |
| Inv. Example 2744 | 1.06 | FC | 3.4 | 1.38 | 1.5 | 0.9 | Existence | Existence | 2 |
| Inv. Example 2745 | 0.04 | FC | 8.5 | 1.42 | 0 | 1.2 | Existence | No | 6 |
| Inv. Example 2746 | 0.06 | FC | 7.72 | 1.38 | 0 | 0.6 | Existence | Existence | 7 |
| Inv. Example 2747 | 9.51 | FC | 2.77 | 1.38 | 0 | 0.01 | Existence | No | 7 |
| Inv. Example 2748 | 15.5 | FC | 3.68 | 1.22 | 1.5 | 0 | Existence | Existence | 6 |
| Inv. Example 2749 | 0.05 | FC | 10.6 | 1.13 | 5.5 | 1.6 | Existence | No | 7 |
| Inv. Example 2750 | 8.8 | FC | 5.7 | 1.02 | 4.5 | 0 | Existence | No | 7 |
| Inv. Example 2751 | 3.54 | FC | 5.5 | 1.22 | 0 | 0.1 | Existence | Existence | 6 |
| Inv. Example 2752 | 10.5 | FC | 3.2 | 1.05 | 0.01 | 0 | Existence | Existence | 7 |
| Inv. Example 2753 | 0.07 | FC | 4.5 | 1.24 | 3.2 | 0.9 | Existence | Existence | 2 |
| Inv. Example 2754 | 15.5 | FC | 2.54 | 1.14 | 0 | 0.5 | Existence | No | 7 |
| Inv. Example 2755 | 4.05 | FC | 2.06 | 1.13 | 0.2 | 0.1 | Existence | Existence | 7 |

| | | | | Coat Properties | | | |
|---|---|---|---|---|---|---|---|
| | Mean Size of Zn Metallic particle (μm) | Blend Ratio (Zn Alloy particle:Zn Metal Particle) | Mg Contents to Total Metal Particle (mass %) | Ratio of Metal Particle in Dry Coat (mass %) | Base Resin | Coat Thickness (μm) | Coating Method | Result of Corrosion Test |
| Inv. Example 2734 | 30.5 | 2.00 | 0.04 | 66 | alkyl silicate | 16 | Brushing | very good |
| Inv. Example 2735 | 49.5 | 0.09 | 1 | 67 | alkali silicate | 33 | Brushing | very good |

TABLE 123-continued

| | | | | | | | | |
|---|---|---|---|---|---|---|---|---|
| Inv. Example 2736 | 5.9 | 0.10 | 0.5 | 54 | alkyl silicate | 8 | Brushing | good |
| Inv. Example 2737 | 4.52 | 0.32 | 5 | 76 | alkyl silicate | 5 | Spraying | very good |
| Inv. Example 2738 | 5.96 | 0.26 | 10 | 49 | alkyl silicate | 22 | Spraying | very good |
| Inv. Example 2739 | 5.5 | 0.15 | 3.5 | 32 | alkyl silicate | 23 | Spraying | very good |
| Inv. Example 2740 | 3.6 | 0.20 | 0.9 | 53 | epoxy-based resin | 30 | Spraying | very good |
| Inv. Example 2741 | 16.5 | 2.16 | 3.5 | 75 | alkyl silicate | 18 | Spraying | very good |
| Inv. Example 2742 | 12.5 | 20.00 | 0.0005 | 75 | alkali silicate | 5 | Spraying | good |
| Inv. Example 2743 | 16.5 | 0.06 | 205.7 | 73 | alkyl silicate | 16 | Spraying | very good |
| Inv. Example 2744 | 10.9 | 2.12 | 0.5 | 49 | alkyl silicate | 8 | Spraying | very good |
| Inv. Example 2745 | 5.6 | 0.03 | 1.2 | 40 | alkali silicate | 2 | Spraying | very good |
| Inv. Example 2746 | 22.6 | 3.00 | 0.02 | 36 | alkyl silicate | 18 | Spraying | very good |
| Inv. Example 2747 | 20.59 | 0.88 | 10.8 | 55 | alkyl silicate | 5 | Spraying | very good |
| Inv. Example 2748 | 20.59 | 0.10 | 152.3 | 48 | alkyl silicate | 22 | Spraying | very good |
| Inv. Example 2749 | 9.56 | 0.10 | 0.5 | 67 | acryl-based resin | 77 | Brushing | very good |
| Inv. Example 2750 | 5.9 | 0.12 | 2.5 | 72 | urethane-based resin | 54 | Brushing | very good |
| Inv. Example 2751 | 6.54 | 0.71 | 5 | 78 | alkyl silicate | 18 | Spraying | very good |
| Inv. Example 2752 | 21.4 | 0.20 | 9 | 34 | epoxy-based resin | 43 | Spraying | very good |
| Inv. Example 2753 | 9.8 | 0.70 | 0.1 | 43 | acryl-based resin | 52 | Brushing | very good |
| Inv. Example 2754 | 6.59 | 17.22 | 0.9 | 45 | alkyl silicate | 19 | Spraying | very good |
| Inv. Example 2755 | 6.54 | 0.40 | 10.2 | 52 | polyester resin | 8 | Spraying | very good |

(*1) F: Fracture facets existing, FC: Fracture facets and/or cracks existing, NO: No fracture facet and/or crack

TABLE 124

| | Zn-Alloy Particle Properties | | | | | | | |
|---|---|---|---|---|---|---|---|---|
| | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, $MgZn$, or $Mg_7Zn_3$ | # of facets |
| Inv. Example 2756 | 8.57 | FC | 4.99 | 1.02 | 1.2 | 0.6 | Existence | No | 2 |
| Inv. Example 2757 | 5.8 | FC | 6.4 | 1.06 | 0.5 | 0 | Existence | Existence | 6 |
| Inv. Example 2758 | 4.59 | FC | 3.09 | 1.07 | 1.5 | 0.9 | Existence | No | 6 |
| Inv. Example 2759 | 9.88 | FC | 4.66 | 1.42 | 0 | 1.2 | Existence | No | 7 |
| Inv. Example 2760 | 4.55 | FC | 4.09 | 1.38 | 0 | 0.6 | Existence | Existence | 7 |
| Inv. Example 2761 | 2.36 | FC | 3.99 | 1.22 | 0 | 0.01 | Existence | No | 6 |
| Inv. Example 2762 | 0.05 | FC | 7.72 | 1.38 | 1.5 | 0 | Existence | Existence | 7 |
| Inv. Example 2763 | 0.04 | FC | 8.32 | 1.22 | 5.5 | 1.6 | Existence | Existence | 2 |
| Inv. Example 2764 | 2.64 | FC | 4.55 | 1.11 | 4.5 | 0 | Existence | No | 2 |
| Inv. Example 2765 | 0.06 | FC | 10.6 | 1.13 | 0 | 0.1 | Existence | No | 6 |
| Inv. Example 2766 | 0.18 | FC | 5.7 | 1.02 | 0.01 | 0 | Existence | Existence | 7 |
| Inv. Example 2767 | 6.31 | FC | 3.52 | 1.27 | 3.2 | 0.9 | Existence | No | 6 |
| Inv. Example 2768 | 5.22 | FC | 3.55 | 1.12 | 0 | 0.5 | Existence | No | 2 |
| Inv. Example 2769 | 28.5 | FC | 2.64 | 1.23 | 0.2 | 0.1 | Existence | Existence | 2 |
| Inv. Example 2770 | 3.52 | FC | 3.15 | 1.36 | 1.2 | 0.6 | Existence | Existence | 7 |
| Inv. Example 2771 | 9.5 | FC | 5.2 | 1.33 | 0.5 | 0 | Existence | Existence | 6 |
| Inv. Example 2772 | 0.04 | FC | 1.9 | 1.27 | 1.5 | 0.9 | Existence | No | 7 |
| Inv. Example 2773 | 0.06 | FC | 10.5 | 1.12 | 0 | 1.2 | Existence | Existence | 7 |
| Inv. Example 2774 | 0.05 | FC | 12.5 | 1.23 | 0 | 0.6 | Existence | Existence | 6 |
| Inv. Example 2775 | 5.6 | FC | 18.5 | 1.36 | 0 | 0.01 | Existence | Existence | 2 |
| Inv. Example 2776 | 0.01 | FC | 11.5 | 1.11 | 1.5 | 0 | Existence | No | 7 |
| Inv. Example 2777 | 0.08 | FC | 9.6 | 1.07 | 5.5 | 1.6 | Existence | Existence | 2 |

TABLE 124-continued

|  | Mean Size of Zn Metallic particle (μm) | Blend Ratio (Zn Alloy particle:Zn Metal Particle) | Mg Contents to Total Metal Particle (mass %) | Coat Properties ||||
|---|---|---|---|---|---|---|---|
|  |  |  |  | Ratio of Metal Particle in Dry Coat (mass %) | Base Resin | Coat Thickness (μm) | Coating Method | Result of Corrosion Test |
| Inv. Example 2756 | 16.5 | 0.07 | 120.5 | 61 | polyester resin | 16 | Spraying | very good |
| Inv. Example 2757 | 7.8 | 0.05 | 2.5 | 77 | alkyl silicate | 20 | Spraying | very good |
| Inv. Example 2758 | 16.5 | 0.72 | 6.4 | 49 | alkyl silicate | 22 | Spraying | very good |
| Inv. Example 2759 | 6.54 | 0.48 | 20.4 | 79 | alkyl silicate | 18 | Spraying | very good |
| Inv. Example 2760 | 8.45 | 0.54 | 8.5 | 76 | alkyl silicate | 18 | Spraying | very good |
| Inv. Example 2761 | 8.5 | 2.36 | 1 | 80 | alkyl silicate | 21 | Spraying | very good |
| Inv. Example 2762 | 13.6 | 0.71 | 0.07 | 36 | alkyl silicate | 19 | Brushing | very good |
| Inv. Example 2763 | 12.33 | 0.04 | 1.1 | 32 | alkyl silicate | 24 | Spraying | very good |
| Inv. Example 2764 | 16.5 | 0.59 | 4.5 | 43 | alkyl silicate | 5 | Spraying | very good |
| Inv. Example 2765 | 7.9 | 0.12 | 0.5 | 67 | alkyl silicate | 7 | Spraying | very good |
| Inv. Example 2766 | 10.5 | 0.26 | 0.7 | 72 | epoxy-based resin | 100 | Spraying | very good |
| Inv. Example 2767 | 16.5 | 12.62 | 0.5 | 51 | alkyl silicate | 21 | Spraying | very good |
| Inv. Example 2768 | 10.64 | 2.09 | 2.5 | 55 | alkyl silicate | 19 | Spraying | very good |
| Inv. Example 2769 | 10.5 | 0.93 | 30.5 | 40 | alkyl silicate | 8 | Spraying | very good |
| Inv. Example 2770 | 20.59 | 14.08 | 0.25 | 51 | alkyl silicate | 16 | Spraying | very good |
| Inv. Example 2771 | 8.5 | 5.00 | 2.4 | 53 | alkyl silicate | 20 | Brushing | very good |
| Inv. Example 2772 | 0.5 | 0.01 | 7.5 | 60 | polyester resin | 200 | Brushing | very good |
| Inv. Example 2773 | 10.5 | 0.02 | 3.5 | 77 | alkyl silicate | 25 | Spraying | very good |
| Inv. Example 2774 | 11.5 | 0.01 | 3.9 | 43 | alkali silicate | 14 | Spraying | very good |
| Inv. Example 2775 | 36.5 | 0.09 | 2.5 | 52 | urethane-based resin | 112 | Spraying | very good |
| Inv. Example 2776 | 1.5 | 0.01 | 0.7 | 66 | alkali silicate | 24 | Spraying | very good |
| Inv. Example 2777 | 8.7 | 0.04 | 1.9 | 72 | urethane-based resin | 150 | Spraying | very good |

(*1) F: Fracture facets existing, FC: Fracture facets and/or cracks existing, NO: No fracture facet and/or crack

TABLE 125

|  | Zn-Alloy Particle Properties |||||||||
|---|---|---|---|---|---|---|---|---|
|  | Mg (mass %) | Fracture Facet &/or Cracks (*1) | Mean Size (μm) | Average Value of Aspect Ratio | Al (mass %) | Si (mass %) | Mg Solid-Solution Phase & Zn—Mg Intermetallic Compounds on Surface of Particles | $MgZn_2$, $Mg_2Zn_{11}$, $Mg_2Zn_3$, $MgZn$, or $Mg_7Zn_3$ | # of facets |
| Inv. Example 2778 | 0.03 | FC | 8.5 | 1.42 | 4.5 | 0 | Existence | Existence | 2 |
| Inv. Example 2779 | 4.25 | FC | 2.36 | 1.33 | 0 | 0.1 | Existence | Existence | 7 |
| Inv. Example 2780 | 0.04 | FC | 23.5 | 1.42 | 0.01 | 0 | Existence | No | 2 |
| Inv. Example 2781 | 0.06 | FC | 101.5 | 1.38 | 3.2 | 0.9 | Existence | Existence | 7 |
| Inv. Example 2782 | 0.06 | FC | 55.4 | 1.38 | 0 | 0.5 | Existence | Existence | 2 |
| Inv. Example 2783 | 0.07 | FC | 10.5 | 1.12 | 0.2 | 0.1 | Existence | No | 6 |
| Inv. Example 2784 | 0.01 | FC | 12.5 | 1.23 | 1.2 | 0.6 | Existence | Existence | 6 |
| Inv. Example 2785 | 0.08 | FC | 18.5 | 1.36 | 0.5 | 0 | Existence | No | 7 |
| Inv. Example 2786 | 0.09 | FC | 11.5 | 1.11 | 1.5 | 0.9 | Existence | Existence | 6 |
| Inv. Example 2787 | 0.05 | FC | 9.6 | 1.07 | 0.5 | 0 | Existence | No | 2 |
| Inv. Example 2788 | 0.06 | FC | 10.05 | 1.14 | 1.5 | 0.9 | Existence | Existence | 2 |
| Inv. Example 2789 | 29.9 | FC | 10.5 | 1.36 | 0 | 0 | Existence | Existence | 2 |

TABLE 125-continued

| | | | | | | | | | |
|---|---|---|---|---|---|---|---|---|---|
| Inv. Example 2790 | 16.5 | FC | 7.5 | 1.11 | 0.01 | 0 | Existence | Existence | 7 |
| Inv. Example 2791 | 12.5 | FC | 2.6 | 1.07 | 3.2 | 0.9 | Existence | No | 2 |
| Inv. Example 2792 | 9.8 | FC | 3.5 | 1.42 | 0 | 0.5 | Existence | Existence | 6 |
| Inv. Example 2793 | 9.6 | FC | 4.5 | 1.33 | 0.2 | 0.1 | Existence | No | 6 |
| Inv. Example 2794 | 7.5 | FC | 1.6 | 1.42 | 0 | 0.5 | Existence | Existence | 2 |
| Inv. Example 2795 | 4.6 | FC | 2.5 | 1.12 | 5.8 | 0.1 | Existence | Existence | 7 |
| Inv. Example 2796 | 3.8 | FC | 23.5 | 1.23 | 1.2 | 0.6 | Existence | Existence | 6 |
| Inv. Example 2797 | 0.05 | FC | 9.8 | 1.27 | 15.5 | 0 | Existence | Existence | 6 |

| | Mean Size of Zn Metallic particle (μm) | Blend Ratio (Zn Alloy particle:Zn Metal Particle) | Mg Contents to Total Metal Particle (mass %) | Coat Properties | | | | |
|---|---|---|---|---|---|---|---|---|
| | | | | Ratio of Metal Particle in Dry Coat (mass %) | Base Resin | Coat Thickness (μm) | Coating Method | Result of Corrosion Test |
| Inv. Example 2778 | 7.8 | 0.01 | 4.5 | 40 | alkali silicate | 18 | Spraying | very good |
| Inv. Example 2779 | 5.96 | 14.17 | 0.3 | 44 | alkyl silicate | 18 | Spraying | very good |
| Inv. Example 2780 | 0.06 | 0.50 | 0.08 | 44 | alkali silicate | 38 | Spraying | very good |
| Inv. Example 2781 | 0.9 | 1.20 | 0.05 | 36 | alkyl silicate | 18 | Spraying | very good |
| Inv. Example 2782 | 3.6 | 12.00 | 0.005 | 76 | alkyl silicate | 10 | Spraying | very good |
| Inv. Example 2783 | 10.5 | 0.03 | 2.8 | 77 | alkyl silicate | 37 | Spraying | very good |
| Inv. Example 2784 | 0.05 | 0.02 | 0.6 | 43 | alkali silicate | 2 | Spraying | good |
| Inv. Example 2785 | 2.32 | 0.08 | 1 | 52 | alkyl silicate | 160 | Brushing | very good |
| Inv. Example 2786 | 20.4 | 1.00 | 0.09 | 66 | alkali silicate | 5 | Brushing | very good |
| Inv. Example 2787 | 7.34 | 0.01 | 3.4 | 72 | alkyl silicate | 56 | Brushing | very good |
| Inv. Example 2788 | 9.4 | 0.04 | 1.5 | 53 | urethane-based resin | 99 | Spraying | very good |
| Inv. Example 2789 | 16.5 | 0.15 | 200 | 55 | urethane-based resin | 700 | Spraying | very good |
| Inv. Example 2790 | 7.9 | 1.10 | 15 | 47 | alkyl silicate | 554 | Spraying | very good |
| Inv. Example 2791 | 10.5 | 2.50 | 5 | 79 | urethane-based resin | 688 | Brushing | very good |
| Inv. Example 2792 | 16.5 | 6.53 | 1.5 | 42 | urethane-based resin | 421 | Spraying | very good |
| Inv. Example 2793 | 8.5 | 0.12 | 78 | 36 | urethane-based resin | 651 | Spraying | very good |
| Inv. Example 2794 | 10.5 | 1.50 | 5 | 53 | urethane-based resin | 402 | Brushing | very good |
| Inv. Example 2795 | 5.8 | 0.44 | 10.5 | 55 | alkali silicate | 354 | Spraying | very good |
| Inv. Example 2796 | 1.2 | 1.52 | 2.5 | 42 | urethane-based resin | 504 | Brushing | very good |
| Inv. Example 2797 | 15.5 | 0.05 | 1 | 76 | urethane-based resin | 666 | Spraying | very good |

(*1) F: Fracture facets existing, FC: Fracture facets and/or cracks existing, NO: No fracture facet and/or crack

Example 9

Table 126 shows a method of production of Zn alloy particles. The primary particles were prepared by the gas atomization method. Furthermore, in accordance with the present invention, Zn alloy particles were made to impact each other or Zn alloy particles were made to impact a solid to prepare secondary particles. Further, Zn alloy particles were added to toluene or xylene with a moisture content of 0.3% or less to make slurry and the method of making the particles impact each other or impact a solid was used to prepare secondary particles.

The methods of measurement of the average particle size of the Zn alloy particles and the average value of the aspect ratio are the same as in Example 1. Further, the methods of identification of the Mg solid solution phase and Zn—Mg intermetallic compounds are the same as in Example 3. The method of identification of $MgZn_2$, $Mg_2Zn_{11}$, $Mg_2Zn_3$, $MgZn$, and $Mg_7Zn_3$ and the method of measurement of the number of facets are the same as in Example 4.

From Table 126, it is learned that Zn alloy particles of the range of the present invention are prepared.

TABLE 126

| | Diameter of Primary Particle (μm) | Mg (mass %) | Al (mass %) | Si (mass %) | Fructure Method | Slurry & Solvent |
|---|---|---|---|---|---|---|
| Inv. Method 1 | 125 | 0.1 | 0.05 | 0.03 | Impact each other of alloy particles | No |
| Inv. Method 2 | 3 | 12.3 | 0.1 | 0.07 | Impact each other of alloy particles | Exisitence (Solvent:toluene) |
| Inv. Method 3 | 340 | 19.3 | 0.05 | 0.05 | Impact with solid | Exisitence (Solvent:xylene) |
| Inv. Method 4 | 60 | 2.7 | 0.05 | 0.05 | Impact | No |
| Inv. Method 5 | 1000 | 16.7 | 4.32 | 0.03 | Impact | Exisitence (Solvent:toluene) |
| Inv. Method 6 | 30 | 3.5 | 5.43 | 0.65 | Impact with solid | Exisitence (Solvent:xylene) |
| Inv. Method 7 | 80 | 7.5 | 0.05 | 0.05 | Impact with solid | No |
| Inv. Method 8 | 230 | 21.5 | 11.05 | 0.23 | Impact | Exisitence (Solvent:toluene) |
| Inv. Method 9 | 500 | 2.3 | 0.03 | 2.4 | Impact | Exisitence (Solvent:xylene) |
| Inv. Method 1 | 125 | 0.1 | 0.05 | 0.03 | Impact each other of alloy particles | No |
| Inv. Method 2 | 3 | 12.3 | 0.1 | 0.07 | Impact each other of alloy particles | Exisitence (Solvent:toluene) |
| Inv. Method 3 | 340 | 19.3 | 0.05 | 0.05 | Impact with solid | Exisitence (Solvent:xylene) |
| Inv. Method 4 | 60 | 2.7 | 0.05 | 0.05 | Impact | No |
| Inv. Method 5 | 1000 | 16.7 | 4.32 | 0.03 | Impact | Exisitence (Solvent:toluene) |
| Inv. Method 6 | 30 | 3.5 | 5.43 | 0.65 | Impact with solid | Exisitence (Solvent:xylene) |
| Inv. Method 7 | 80 | 7.5 | 0.05 | 0.05 | Impact with-solid | No |
| Inv. Method 8 | 230 | 21.5 | 11.05 | 0.23 | Impact | Exisitence (Solvent:toluene) |
| Inv. Method 9 | 500 | 2.3 | 0.03 | 2.4 | Impact | Exisitence (Solvent:xylene) |
| Comp. Method 1 | 300 | 0.6 | 0.02 | 0.03 | Ball mill | No |
| Comp. Method 2 | 70 | 4.5 | 11.05 | 0.25 | Ball mill | Exisitence (Solvent:toluene) |
| Comp. Method 3 | 500 | 12.5 | 0.03 | 2.45 | Ball mill | Exisitence (Solvent:xylene) |
| Comp. Method 4 | 60 | 2.7 | 0.05 | 0.05 | Ball mill | No |
| Comp. Method 5 | 800 | 16.7 | 4.32 | 0.03 | Ball mill | Exisitence (Solvent:toluene) |
| Comp. Method 6 | 30 | 3.5 | 5.43 | 0.65 | Beads mill | Exisitence (Solvent:xylene) |
| Comp. Method 7 | 80 | 7.5 | 0.05 | 0.05 | Beads mill | No |
| Comp. Method 8 | 230 | 21.5 | 11.05 | 0.23 | Beads mill | Exisitence (Solvent:toluene) |
| Comp. Method 9 | 500 | 2.3 | 0.03 | 2.4 | Beads mill | Exisitence (Solvent:xylene) |

| | Mean Diameter of After-Treated Alloy Particle (μm) | Mean Value of Aspect Ratio (Max. D/Min. D) of After-treated Alloy Particle | Mg Solid-Solution Phase & Zn—Mg Intermetallic Compounds on Surface of Particles | $MgZn_2$ or $Mg_2Zn_{11}$ | Min. # of facets |
|---|---|---|---|---|---|
| Inv. Method 1 | 10.81 | 1.50 | No | No | 4 |
| Inv. Method 2 | 0.02 | 1.05 | Exisitence | Exisitence | 4 |
| Inv. Method 3 | 33.57 | 1.04 | Exisitence | Exisitence | 6 |
| Inv. Method 4 | 4.12 | 1.21 | Exisitence | Exisitence | 6 |
| Inv. Method 5 | 194.23 | 1.27 | Exisitence | Exisitence | 6 |
| Inv. Method 6 | 3.04 | 1.02 | Exisitence | Exisitence | 6 |
| Inv. Method 7 | 5.07 | 1.42 | Exisitence | Exisitence | 6 |
| Inv. Method 8 | 19.54 | 1.06 | Exisitence | Exisitence | 6 |
| Inv. Method 9 | 147.23 | 1.35 | Exisitence | Exisitence | 6 |
| Inv. Method 1 | 10.81 | 1.50 | No | No | 4 |
| Inv. Method 2 | 0.02 | 1.05 | Exisitence | Exisitence | 4 |
| Inv. Method 3 | 33.57 | 1.04 | Exisitence | Exisitence | 6 |
| Inv. Method 4 | 4.12 | 1.21 | Exisitence | Exisitence | 6 |
| Inv. Method 5 | 194.23 | 1.27 | Exisitence | Exisitence | 6 |
| Inv. Method 6 | 3.04 | 1.02 | Exisitence | Exisitence | 6 |
| Inv. Method 7 | 5.07 | 1.42 | Exisitence | Exisitence | 6 |
| Inv. Method 8 | 19.54 | 1.06 | Exisitence | Exisitence | 6 |
| Inv. Method 9 | 147.23 | 1.35 | Exisitence | Exisitence | 6 |
| Comp. Method 1 | 35.45 | 4.3 | Exisitence | Exisitence | 6 |
| Comp. Method 2 | 6.54 | 5.6 | Exisitence | Exisitence | 6 |
| Comp. Method 3 | 194.35 | 2.7 | No | No | 6 |

TABLE 126-continued

| | | | | | |
|---|---|---|---|---|---|
| Comp. Method 4 | 15.78 | 5.7 | Exisitence | Exisitence | 6 |
| Comp. Method 5 | 187.54 | 2.3 | No | No | 6 |
| Comp. Method 6 | 7.45 | 6.2 | Exisitence | Exisitence | 6 |
| Comp. Method 7 | 6.87 | 6.3 | Exisitence | Exisitence | 6 |
| Comp. Method 8 | 28.74 | 4.1 | Exisitence | No | 6 |
| Comp. Method 9 | 168.74 | 2.1 | No | No | 6 |

INDUSTRIAL APPLICABILITY

If coating the high corrosion resistance rust prevention paint containing Zn alloy particles having physical fracture facets and/or cracks of the present invention, it is possible to impart to a ferrous metal material etc. an unprecedented long-lasting, superior corrosion resistance and rust prevention without impairing the coatability and economy. Further, as a result, it is possible to provide a high corrosion resistance ferrous metal material and steel structure enabling the maintenance cycles to be greatly extended.

Accordingly, the present invention has high applicability in the ferrous metal industry.

The invention claimed is:

1. Zn alloy particles for high corrosion resistance rust prevention paint containing, by mass %, Mg: 0.01 to 30% and a balance of Zn and unavoidable impurities, having physical fracture facets and/or cracks of a length of 0.01 μm or more or cracks of a depth of 0.01 μm or more, having an average particle size of 0.05 to 200 μm, and having an average value of an aspect ratio of maximum size and minimum size (maximum size/minimum size) of 1 to 1.5.

2. Zn alloy particles for high corrosion resistance rust prevention paint as set forth in claim 1, characterized in that said Zn alloy particles further contain, by mass %, one or both of Al: 0.01 to 30% and Si: 0.01 to 3%.

3. Zn alloy particles for high corrosion resistance rust prevention paint as set forth in claim 1, characterized by having an Mg solid solution phase and Zn—Mg intermetallic compounds on the surface of said Zn alloy particles.

4. Zn alloy particles for high corrosion resistance rust prevention paint as set forth in claim 3, characterized in that said Zn—Mg intermetallic compounds include at least one type of compound of $MgZn_2$, $Mg_2Zn_{11}$, $Mg_2Zn_3$, $MgZn$, and $Mg_7Zn_3$.

5. Zn alloy particles for high corrosion resistance rust prevention paint as set forth in claim 1, characterized in that said Zn alloy particles are shaped as aspherical polyhedrons with two or more facets.

6. A high corrosion resistance rust prevention paint characterized by containing Zn alloy particles for high corrosion resistance rust protection paint as set forth in claim 1 in 30 mass % or more converted to dry coat.

7. A high corrosion resistance rust prevention paint as set forth in claim 6 characterized by comprising a high corrosion resistance rust prevention paint containing, in addition to said Zn alloy particles, Zn metal particles having an average particle size of 0.05 to 50 μm comprised of Zn and unavoidable impurities and by having an x of 300.0 or less when defining, by mass %, (mass % of said Zn alloy particles):(mass % of said Zn metal particles) as 1/x.

8. A high corrosion resistance rust prevention paint as set forth in claim 7 characterized by having, by mass %, a content of Mg of 0.01 to less than 30% when the total of said Zn alloy particles and said Zn metal particles is defined as 100%.

9. A high corrosion resistance rust prevention paint as set forth in claim 6 further comprising an inorganic binder or organic binder.

10. A ferrous metal material coated with a high corrosion resistance rust prevention paint as set forth in claim 6 on its surface, said high corrosion resistance ferrous metal material characterized in that a coating thickness is 2 to 700 μm and in that Zn alloy particles are dispersed in the coat.

11. A steel structure characterized by being provided partially or completely with a high corrosion resistance ferrous metal material as set forth in claim 10.

12. A ferrous metal material coated with a high corrosion resistance rust prevention paint as set forth in claim 7 on its surface, said high corrosion resistance ferrous metal material characterized in that a coating thickness is 2 to 700 μm and in that Zn alloy particles and Zn metal particles are dispersed in the coat.

13. A method of production of Zn alloy particles for high corrosion resistance rust prevention paint as set forth in claim 1, said method of production of Zn alloy particles for high corrosion resistance rust prevention paint characterized by making primary particles comprised of the composition of ingredients as described in claim 1 and having an average particle size of 0.05 to 1000 μm impact each other or making said primary particles impact a solid to fracture said primary particles to produce Zn alloy particles having physical fracture facets and/or cracks.

14. A method of production of Zn alloy particles for high corrosion resistance rust prevention paint as set forth in claim 13 characterized by making said primary particles disperse in an organic solvent to make a slurry, then making the slurry impact itself or making said slurry impact a solid to fracture the primary particles.

* * * * *